(12) United States Patent
Beshai

(10) Patent No.: US 10,757,488 B2
(45) Date of Patent: Aug. 25, 2020

(54) FUSED THREE-STAGE NETWORKS FORMING A GLOBAL CONTIGUOUS NETWORK

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 0 days.

(21) Appl. No.: 16/559,704

(22) Filed: Sep. 4, 2019

(65) Prior Publication Data

US 2020/0077166 A1 Mar. 5, 2020

Related U.S. Application Data

(63) Continuation-in-part of application No. 16/116,932, filed on Aug. 30, 2018, now Pat. No. 10,412,472.

(60) Provisional application No. 62/814,235, filed on Mar. 5, 2019.

(51) Int. Cl.
*H04B 10/00* (2013.01)
*H04Q 11/00* (2006.01)
*H04J 14/02* (2006.01)

(52) U.S. Cl.
CPC ...... *H04Q 11/0005* (2013.01); *H04J 14/0228* (2013.01); *H04J 14/0284* (2013.01); *H04Q 2011/0016* (2013.01); *H04Q 2011/0058* (2013.01)

(58) Field of Classification Search
USPC .................................................... 398/66–73
See application file for complete search history.

(56) References Cited

U.S. PATENT DOCUMENTS

| | | | | |
|---|---|---|---|---|
| 6,487,177 B1* | 11/2002 | Weston-Dawkes | ..... | H04L 45/04 370/254 |
| 6,567,429 B1* | 5/2003 | DeMartino | ............. | H04J 14/02 370/395.64 |
| 7,016,608 B1* | 3/2006 | Ball | ..................... | H04J 14/0204 398/58 |
| 7,313,094 B2* | 12/2007 | Oki | ......................... | H04L 45/02 370/238 |
| 7,587,516 B2* | 9/2009 | Bhanot | .................. | G09G 5/008 709/238 |
| 7,613,187 B2* | 11/2009 | Choi | .................. | H04Q 11/0067 370/392 |
| 7,693,142 B2 | 4/2010 | Beshai | | |
| 8,107,458 B1* | 1/2012 | Ranganathan | .......... | H04L 41/12 370/254 |

(Continued)

*Primary Examiner* — Agustin Bello

(57) ABSTRACT

A vast contiguous network comprises a large number of three-stage networks, each constituent three-stage network interconnecting a group of access nodes to a group of distributors. The three-stage networks are mutually fused where each pair of three-stage networks shares a respective distributor so that each distributor of the entire network is common in exactly two three-stage networks. Consequently, each access node has multiple parallel paths, each traversing one distributor, to each access node of a same access group and a path traversing one distributor, in addition to numerous compound paths, to each access node of a different access group. Each access node of the contiguous network has a cyclic time-limited dedicated dual control path to each distributor of a respective distributor group as well as a dedicated end-to-end control path, configured as a reserved time-limited path or a contention-free path, to each other access node of the contiguous network.

20 Claims, 95 Drawing Sheets

(56) References Cited

U.S. PATENT DOCUMENTS

| | | | | |
|---|---|---|---|---|
| 8,406,128 B1* | 3/2013 | Brar | H04L 49/15 | |
| | | | 370/229 | |
| 8,428,457 B2* | 4/2013 | Mizutani | H04B 10/272 | |
| | | | 370/314 | |
| 8,774,176 B2 | 7/2014 | Beshai | | |
| 8,972,603 B1* | 3/2015 | Brandwine | H04L 69/14 | |
| | | | 370/399 | |
| 9,407,576 B1* | 8/2016 | Brar | H04L 49/356 | |
| 9,571,421 B1* | 2/2017 | Brar | H04Q 3/68 | |
| 9,860,132 B2 | 1/2018 | Beshai | | |
| 10,412,472 B2* | 9/2019 | Beshai | H04J 14/0284 | |
| 2003/0020982 A1* | 1/2003 | Rychlicki | H04J 14/02 | |
| | | | 398/79 | |
| 2003/0156536 A1* | 8/2003 | Oki | H04L 45/02 | |
| | | | 370/229 | |
| 2005/0002405 A1* | 1/2005 | Gao | G06F 13/102 | |
| | | | 370/401 | |
| 2005/0129400 A1* | 6/2005 | Kim | H04J 14/0227 | |
| | | | 398/67 | |
| 2007/0092252 A1* | 4/2007 | Bouda | H04J 14/0227 | |
| | | | 398/72 | |
| 2007/0248009 A1* | 10/2007 | Petersen | H04L 12/4633 | |
| | | | 370/230 | |
| 2010/0239257 A1* | 9/2010 | Grossman | H04J 14/0282 | |
| | | | 398/68 | |
| 2010/0254703 A1* | 10/2010 | Kirkpatrick | H04Q 11/0005 | |
| | | | 398/45 | |
| 2011/0087799 A1* | 4/2011 | Padhye | H04L 12/6418 | |
| | | | 709/235 | |
| 2011/0228767 A1* | 9/2011 | Singla | H04L 49/00 | |
| | | | 370/389 | |
| 2012/0250574 A1* | 10/2012 | Marr | G02B 6/354 | |
| | | | 370/254 | |
| 2012/0320753 A1* | 12/2012 | Vasseur | H04L 45/02 | |
| | | | 370/237 | |
| 2014/0160939 A1* | 6/2014 | Arad | H04L 47/122 | |
| | | | 370/237 | |
| 2014/0369184 A1* | 12/2014 | Keesara | H04L 12/4658 | |
| | | | 370/221 | |
| 2015/0236980 A1* | 8/2015 | Brar | H04L 49/15 | |
| | | | 370/400 | |
| 2015/0304046 A1* | 10/2015 | Kramer | H04Q 11/0067 | |
| | | | 398/66 | |
| 2018/0375760 A1* | 12/2018 | Saavedra | H04L 45/64 | |
| 2019/0014397 A1* | 1/2019 | Beshai | H04L 45/122 | |
| 2020/0077166 A1* | 3/2020 | Beshai | H04J 14/0228 | |

* cited by examiner

5200
Spectral-bands distribution:
8×8 spectral router

| Y0 | Y1 | Y2 | Y3 | Y4 | Y5 | Y6 | Y7 |
|---|---|---|---|---|---|---|---|
| X0 | X1 | X2 | X3 | X4 | X5 | X6 | X7 |
| F0 | F1 | F2 | F3 | F4 | F5 | F6 | F7 |
| E0 | E1 | E2 | E3 | E4 | E5 | E6 | E7 |
| D0 | D1 | D2 | D3 | D4 | D5 | D6 | D7 |
| C0 | C1 | C2 | C3 | C4 | C5 | C6 | C7 |
| B0 | B1 | B2 | B3 | B4 | B5 | B6 | B7 |
| A0 | A1 | A2 | A3 | A4 | A5 | A6 | A4 |

5220 Spectral bands from an access node to eight five switches

↕

| Y0 | A1 | B2 | C3 | D4 | E5 | F6 | X7 |
|---|---|---|---|---|---|---|---|
| X0 | Y1 | A2 | B3 | C4 | D5 | E6 | F7 |
| F0 | X1 | Y2 | A3 | B4 | C5 | D6 | E7 |
| E0 | F1 | X2 | Y3 | A4 | B5 | C6 | D7 |
| D0 | E1 | F2 | X3 | Y4 | A5 | B6 | C7 |
| C0 | D1 | E2 | F3 | X4 | Y5 | A6 | B7 |
| B0 | C1 | D2 | E3 | F4 | X5 | Y6 | A7 |
| A0 | B1 | C2 | D3 | E4 | F5 | X6 | Y7 |

5230 Spectral bands from eight access nodes to one switch

*FIG. 52*

| | Constellations | | | | | |
|---|---|---|---|---|---|---|
| 7410 Access groups | $C_0$ | $C_1$ | $C_2$ | $C_3$ | $C_4$ | $C_5$ |
| $G_0$ | 0, 1, 3 | 6, 10, 15 | | 21, 28, 36 | | |
| $G_1$ | 0, 2, 4 | 7, 11, 16 | | 22, 29, 37 | | |
| $G_2$ | 1, 2, 5 | 8, 12, 17 | | 23, 30, 38 | | |
| $G_3$ | 3, 4, 5 | | 9, 13, 18 | | 24, 31, 39 | |
| $G_4$ | | 6, 7, 8 | 9, 14, 19 | | 25, 32, 40 | |
| $G_5$ | | 10, 11, 12 | 13, 14, 20 | | 26, 33, 41 | |
| $G_6$ | | 15, 16, 17 | 18, 19, 20 | | | 27, 34, 42 |
| $G_7$ | | | | 21, 22, 23 | 24, 25, 26 | 27, 35, 43 |
| $G_8$ | | | | 28, 29, 30 | 31, 32, 33 | 34, 35, 44 |
| $G_9$ | | | | 36, 37, 38 | 39, 40, 41 | 42, 43, 44 |

7420 Indices of distributors

*FIG. 74*

FUSED THREE-STAGE NETWORKS FORMING A GLOBAL CONTIGUOUS NETWORK

CROSS-REFERENCE TO RELATED APPLICATIONS

The present application is a continuation-in-part of U.S. patent application Ser. No. 16/116,932 filed on Aug. 30, 2018, entitled "Contiguous Network", the specification of which is incorporated herein by reference in its entirety, and claims priority to provisional application 62/814,235 filed on Mar. 5, 2019, entitled "Contiguous Network Providing Dedicated Control Paths", the specification of which is incorporated herein by reference in its entirety.

FIELD OF THE INVENTION

The invention is related to a switching system configured as a universal contiguous network for global data communication, cloud computing, and edge computing. In particular, the invention is concerned with efficient distribution of payload data and control data in a switching system having a large number of access nodes interconnected through switches or rotators.

BACKGROUND

It is well known to expand a telecommunications network virtually indefinitely using multi-stage switching. It is also known that the network-control complexity and cost per unit of throughput increase significantly, and performance deteriorates, as the number of switching stages increases. There is a need, therefore, to explore methods and apparatus for enabling network expansion while maintaining control simplicity and reducing structural complexity. Control and structural simplicity naturally lead to superior performance.

SUMMARY

The invention provides a vast contiguous network encompassing a large number of three-stage networks where each constituent three-stage network interconnects a respective group of access nodes of a plurality of access nodes through a group of distributors of a plurality of distributors. The three-stage networks are mutually fused where each pair of three-stage networks shares a respective distributor so that each distributor of the entire network is common in exactly two three-stage networks. Consequently, each access node of an access group has multiple parallel dual paths, each traversing a single distributor, to each other access node of the same access group and has one dual path to each access node of each other access group traversing a single distributor of the plurality of distributors.

The distributors are independent of each other; none of the distributors directly connects to any other distributor. Each access node comprises a respective access controller comprising a memory device storing identifiers of paths to the other access nodes. Thus, the invention provides a large-scale network supporting tens of thousands of access nodes while enabling data transfer from any access node to any other access node through only one distributor. Most importantly, the network provides a dedicated control path from each access node to each distributor of a respective group of distributors in addition to a dedicated control path to each other access node of the entire network.

An access group may also include at least one global controller. At least one access group comprises a global controller having a dual channel to each distributor of a corresponding set of distributors, where the corresponding set of distributors is selected so that the global controller has a dual path to each access node of the network through a respective distributor of the plurality of distributors. This greatly facilitates combined network-wide distributed control and central control.

An access node may connect to respective external data sources and sinks. Alternatively, access node may connect to servers of a plurality of servers. An access node may connect to data sources and sinks in addition to servers of a plurality of servers.

Each distributor is coupled to a respective distributor controller and, optionally, a timing circuit for exchanging timing data with access nodes of respective two access groups. Timing-data exchange is needed where a distributor is bufferless having no facility to queue data at input.

The number of access nodes per access group is limited by the number, m, of dual ports of individual distributors which connect to access nodes of one access group. A distributor may also comprise at least one dual control port. Thus, the plurality of access nodes comprises at most $m\times\mu$ access nodes, $\mu$ being the total number of access groups of the contiguous network.

In order to connect the access groups to distributors through wavelength-division-multiplexed (WDM) links, the plurality of distributors may be arranged into a plurality of constellations and a given access node connects to a respective set of constellations, of the plurality of constellations, through a set of multichannel links. Each access node connects to a designated group of distributors and the respective set of constellations are selected to collectively contain the distributors of the designated group of distributors. Each multichannel link from an access node to a constellation carries a set of dual channels connecting through a spectral demultiplexer and a spectral multiplexer to a subset of distributors of the designated group of distributors.

The number $\Pi$ of constellations to which an access node connects and the number $\Omega$ of dual channels per multichannel link are selected so that $(\Pi\times\Omega)\geq(\mu-1)$, $\Pi$ and $\Omega$ being positive integers, and $\mu$ denoting a count of the access groups of the plurality of access groups as mentioned above, which is the number of three-stage networks.

In accordance with an aspect, the invention provides a contiguous network comprising a plurality of three-stage networks. Each three-stage network comprises an access group comprising a respective set of access nodes of a plurality of access nodes and a distributor group comprising a respective set of distributors of a plurality of distributors. Each access node of an access group has a dual channel to each distributor of a respective distributor group.

The three-stage networks of the plurality of three-stage networks are mutually fused so that distributor groups of each pair of three-stage networks have one common distributor and each distributor is common in exactly two three-stage networks of the plurality of three-stage networks. Consequently, each access node of a specific access group has:

multiple parallel paths, each traversing one distributor, to each other access node of the specific access group; and
a path to each access node of each other access group traversing only one distributor.

Each distributor comprises a respective distributor controller and each access node comprises a respective access controller. An access node connects to (μ−1) distributors, μ being the total number of access groups, μ>3. An access controller of a specific access node establishes a cyclic time-limited dedicated dual control path, during a respective time period, to a distributor controller of each distributor of a distributor group to which the specific access node connects.

An access node has a dual channel to each distributor of a respective set of (μ−1) distributors. Each distributor of the respective distributor group provides, through a respective distributor controller, an end-to-end control path from the access node to each other access node connecting to the same distributor. The end-to-end control path may be configured as a reserved time-limited path during a time slice.

An access controller of an access node is configured to periodically send control data to distributor controllers of a specific distributor group to which the access node connects. The control data comprises:
  requests for flow-rate allocations to other access nodes; and
  control messages individually directed to access nodes directly coupled to distributors of the specific distributor group.

An access controller of a specific access node of a specific three-stage network is configured to direct a request for flow-rate allocations, for a path from the specific access node to any other access node belonging to the same access group, to any distributor of the specific three-stage network.

The access controller is further configured to equitably distribute requests for flow-rate allocations to distributors of the specific three-stage network, so that aggregate data flow within each three-stage network is equitably divided among the distributors of the specific three-stage network.

The access controller is further configured to direct a request for flow-rate allocations for a path from the specific access node to a destination access node of a destination three-stage network, other than the specific three-stage network, to a respective common distributor of the specific three-stage network and the destination three-stage network.

The access controller is further configured to direct a request for flow-rate allocations for a path from the specific access node to a destination access node of a destination three-stage network to a first distributor joining the specific three-stage network to an intermediate three-stage network other than the destination three-stage network. Any access node of the intermediate three-stage network may be selected to forward the request to the destination access node.

Each distributor controller is configured to receive a request for flow-rate allocation from a source access node to a destination access node. Subject to a determination that the source access node and destination access node belong to different access groups, the distributor controller places the request in a first scheduling queue. Otherwise, where the source access node and destination access node belong to same access group, the distributor controller places the request the request in a second scheduling queue. The distributor controller processes requests of the first scheduling queue ahead of requests of the second scheduling queue.

A plurality of dual spectral routers may be employed to interconnect the plurality of access nodes to the plurality of distributors, where each spectral router directs individual channels of WDM links connecting to a respective set of access nodes to WDM links connecting to a respective set of distributors.

In order to directly connect the access nodes to distributors through wavelength-division-multiplexed (WDM) links, without employing intermediate cross connectors, the plurality of distributors may be arranged into a plurality of constellations and a given access node connects to a respective set of constellations, of the plurality of constellations, through a set of multichannel links.

Each constellation comprises a respective set of spatially collocated distributors. Each access node connects to distributors of a designated distributor group. While the distributors of a constellation are spatially collocated, the distributors of an entire distributor group need not be spatially collocated. In fact, the distributors of each distributor group are assigned to a predetermined number, Π, of constellations, Π>1, which is also the number of constellations to which an access node connects. Each multichannel link from an access node to a constellation carries a set of at most Ω dual channels, Ω>1, connecting through a spectral demultiplexer and a spectral multiplexer to a subset of distributors of the designated distributor group.

The number Π of constellations to which an access node connects and the number Ω of dual channels per multichannel link from an access node to a constellation are selected so that (Π×Ω)≥(μ−1), Π and Ω being positive integers, and μ denoting a count of the access groups of the plurality of access groups, which is the number of constituent three-stage networks 7610 (FIG. 76). The envisaged large-scale contiguous network comprises a relatively large number, ranging from 20 to 2000, or so, of access groups.

The value of Ω is determined as: Ω=⌈(μ−1)/Π⌉>1. Since Π>1 and Ω>1, the minimum value of μ would be 5 to benefit from WDM spectral multiplexing. As mentioned above, the value of μ for a large-scale network would be much higher than 5. The number, Π, of constellations to which an access node connects may be a specified design parameter, in which case, the total number of constellations of the entire contiguous network is determined as:

$$K=(\Pi\times(\Pi+1))/2.$$

Alternatively, the total number, K, of constellations may be a specified design parameter, in which case, the number, Π, of constellations to which an access node connects is determined as: $\Pi=\lceil\{(1+8\times K)^{1/2}-1\}/2\rceil$, where $2<K\le(\lfloor\mu/2\rfloor\times\lfloor\mu/2\rfloor+1)/2$, μ being a number of access groups of the plurality of access groups, μ>4.

With the plurality of access groups indexed as 0, 1, ..., μ−1, and the plurality of constellations indexed as (j, k), 0≤j<Π, j≤j<Π, an access group of index ν, 0≤ν<μ, connects to constellations of indices (j, k) determined as:

0≤j≤η, k=η, where η=⌊ν×Π/μ⌋<Π; and for η<Π−1, j=h, η<k<Π, where:

h=η, if (ν$_{modulo}$ Ω)≠0, and h=η+1 otherwise.

A distributor connecting a pair of access groups of indices j and k, 0≤j<(μ−1), j<k<μ, is assigned to a constellation indexed (α, β) where:

α=⌊j/Ω⌋<Π and =⌊(k−1)/Ω⌋<Π, where Ω=⌈(μ−1)/Π⌉>1.

In accordance with another aspect, the invention provides a contiguous network comprising a plurality of access nodes arranged into a plurality of access groups and a plurality of distributors arranged into a plurality of distributor groups wherein each pair of distributor groups shares a common distributor and each access node of the plurality of access nodes has a dual channel to each distributor of a respective distributor group. Each access group and a respective distributor group form a respective three-stage network. Thus, a plurality of mutually fused three-stage networks is formed.

Each distributor is coupled to a respective distributor controller employing at least one hardware processor. A distributor controller of a distributor is configured to establish a path, through the distributor, for any pair of access nodes coupled to the distributor.

Accordingly, with each distributor of the plurality of distributors being common in two three-stage networks of the formed plurality of three-stage networks, there is a path from any access node to any other node of the plurality of access nodes traversing only one distributor.

According to a further aspect, the invention provides a method of data switching. According to the method, a plurality of access nodes is arranged into a plurality of access groups and a plurality of distributors is arranged into a plurality of distributor groups where each pair of access groups has a common distributor. Each access node of the plurality of access nodes connects to each distributor of a respective distributor group so that each access group and a respective distributor group form a respective three-stage network, thus yielding a plurality of mutually fused three-stage networks.

Each distributor group comprises a predetermined number of distributors and each access group comprises a respective number of access nodes which may differ from one access group to another. Each distributor is coupled to a respective hardware processor executing instructions for establishing a path from each access node connecting to the distributor to each other access node connecting to the same distributor.

Thus, each distributor of the plurality of distributors is common in two three-stage networks of the formed plurality of three-stage networks, thereby the method creates a path from each access node to each other node of the plurality of access nodes traversing only one distributor.

The method further comprises organising the time domain into repetitive control cycles. During each control cycle of successive control cycles, an access node sends to each distributor, of a respective distributor group:
(1) control data directed to a distributor controller of each distributor of the respective distributor group during a control interval; and
(2) content data directed to access nodes coupled to each distributor of the respective access group during a content interval.

The control interval of a control cycle is further divided into:
a first period during which requests for flow-rate allocations for flows originating from the access node are communicated to a respective distributor controller; and
a second period during which control messages from an access node are communicated to the respective distributed controller to be relayed to access nodes coupled to a respective distributor.

The time-domain is further organized into repetitive scheduling cycles. Each scheduling cycle comprises a predetermined number of control cycles. Each content interval of a control cycle is divided into a number of time slots. The number of time slots is preferably equal to the total number of dual ports per distributor. At least one time slot per scheduling cycle is allocated to a flow. A flow may be allocated multiple time slots per scheduling cycle. The number of time slots per flow per scheduling cycle is time varying, being adapted to changes of the flow rate of a flow; the flow rate is typically specified in terms of bits/second.

The distributors may comprise switches, temporal rotators, or a mixture of switches and temporal rotators. A temporal rotator is also referenced as a rotator. In accordance with an implementation, at least one distributor of the plurality of distributors is configured as an optical rotator. In accordance with another implementation, at least one distributor of the plurality of distributers is configured as an optical distributor. The optical distributor comprises a plurality of dual ports connecting to access nodes of a respective pair of access groups and a respective distributor controller.

BRIEF DESCRIPTION OF THE DRAWINGS

Features and implementations will be further described with reference to the accompanying exemplary drawings, in which:

FIG. 52 illustrates distribution of spectral bands of input WDM links among a same number of output WDM links for use as an upstream spectral router or a downstream spectral router;

FIG. 74 tabulates indices of distributors within each constellation to which each of the access group connects in the exemplary formation of constellations of FIG. 58;

TERMINOLOGY

Figure 1:
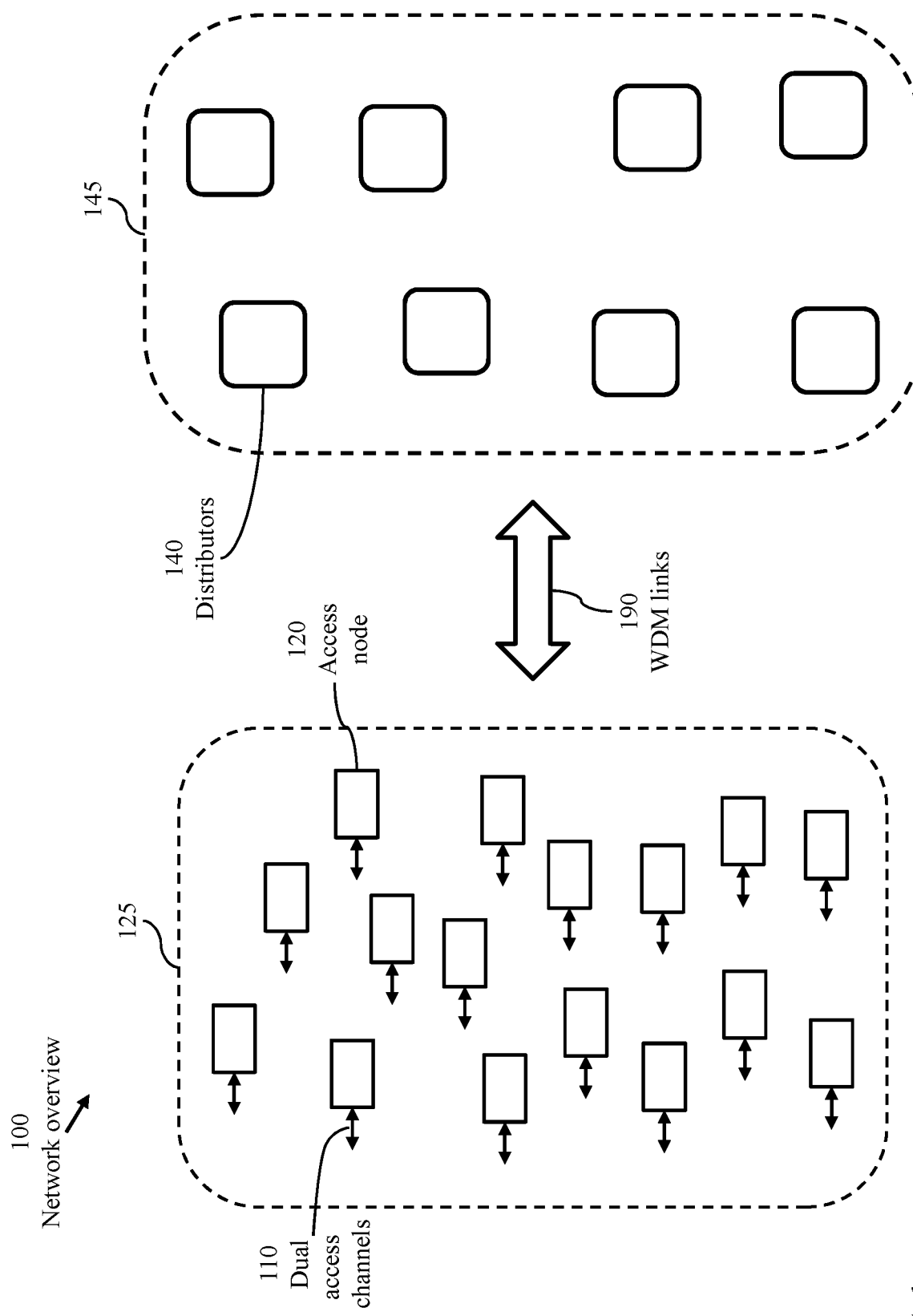
FIG. 1 illustrates a network of a plurality of distributors interconnecting a plurality of access nodes through a plurality of links.

Terms used in the present application are defined below.

Access node: A switching device connecting to data sources and data sinks, and configured to transfer data from the data sources to another switching device and transfer data from another switching device to the data sinks is referenced as an access node or an edge node.

Switch: A switch comprises a switching mechanism for transferring data from a set of input ports to a set of output ports. In the switching system of the present application, a switch transfers data from one set of access nodes connecting to input ports of the switch to another set, or the same set, of access nodes connecting to output ports of the distributor. A switch may use an electronic or a photonic switching mechanism.

Rotator: A rotator comprises a rotation mechanism for cyclically transferring data from a set of input ports and at least one control inlet to a set of output ports and at least one control outlet. Each input port transfers data to each output port and to each control outlet during a respective time interval of a rotation time frame. Likewise, each control inlet transfers data to each output port and to each control outlet during a respective time interval of the rotation time frame. A rotator may use an electronic or a photonic rotation mechanism. The term "rotator" is used in the present application to refer exclusively to a "temporal rotator" which cyclically connects each port on the input side (i.e., an input port or a control inlet) to each port on the output side (i.e., an output port or a control outlet).

Distributor: A device comprising a plurality of input ports and a plurality of output ports where any input port may transfer data to any output port is herein referenced as a distributor. The transfer of data may be selective or cyclic. A distributor configured to transfer data from any input port to selected output port is conventionally called a "switch, as defined above. A distributor configured to cyclically transfer data from each input port to each output port is conventionally called a "rotator", as defined above. Thus, the term "distributor" refers to either a switch or a rotator. Certain architectural aspects of the contiguous network of the present invention are independent of the type of distributor.

Content port: A content port is a distributor port connecting to an access node. A content port comprises an input content port configured to receive content data (payload data) as well as control data from an access node and an output content port configured to transmit content data as well as control data to an access node.

Control port: A control port is a dual port, having an input side and an output side, configured to receive control data from a distributor controller and transmit control data to the distributor controller.

Access group: An access group comprises a number of access nodes that connect to each distributor of a respective set of distributors. The number of access nodes per access group may vary from one access group to another. In order to simplify addressing of access nodes in a growing network, the number of access nodes per access group is limited to a predefined upper bound.

Connector: The term "connector" is used herein to refer to a distributor which connects to one access group.

Spectral band: The term refers to a frequency band (bandwidth) occupied by a signal in a transmission medium, such as a fiber-optic link.

Dual channel: A dual channel comprises a channel from a first device to a second device and a channel from the second device to the first device.

Multichannel link: The term refers to a transmission link comprising multiple channels—a wavelength-division-multiplexed link (WDM link) carrying multiple spectral bands is a multichannel link.

Dual multichannel link: The term refers to a transmission link comprising multiple dual channels where a dual channel comprises two channels of opposite transmission directions.

Constellation of distributors: A number of distributors may be spatially collocated to enable direct communication with access nodes through wavelength-division-multiplexed (WDM) links avoiding the need for intermediate spectral routers.

Symmetrical-access network: The term refers to a network in which each access node has an upstream channel to a respective distributor and a downstream channel from the same distributor, i.e., each access node has a dual path to a respective distributor. In the symmetrical network of the present invention, each access node has multiple dual paths to distributors of a respective set of distributors.

Asymmetrical-access network: The term refers to a network in which an access node has upstream channels to a first set of distributors and downstream channels from a second set of distributors where the first set and the second set has only one common distributor.

Dimension of a switch: The number of input ports and output ports, excluding ports used exclusively for control purposes, defines a "dimension" of a switch. The input ports and output ports of a switch handle payload data (content data) while a control inlet or a control outlet of a switch handle control data relevant to scheduling and timing.

Dimension of a rotator: The number of input ports and output ports, excluding ports used exclusively for control purposes, defines a "dimension" of a rotator. The input ports and output ports of a rotator handle payload data (content data) while a control inlet or a control outlet of a rotator handle timing data.

Contiguous network: A network supporting access nodes interconnected through distributors in which any access node may transfer data to any other access node through a path traversing only one distributor is herein referenced as a "contiguous network).

Collocation: The term refers to spatial proximity of devices which may be interconnected using relatively short links, such as fiber links each carrying a single spectral band. In some implementations, the lengths of the (short) links may be selected to equalize propagation delays.

Global network: A network comprising a large number of nodes covering a wide geographical area is traditionally referenced as a global network.

Switching-system coverage: In a switching system configured as a network comprising geographically distributed access nodes, the term "coverage" refers to the number of access nodes.

Spectral multiplexer: A spectral multiplexer combines spectral bands of separate input channels onto an output wavelength-division-multiplexed link (WDM link).

Spectral demultiplexer: A spectral demultiplexer directs individual spectral bands of an input WDM link to separate output channels.

Diagonal pair of distributors: In a switching system employing a plurality of distributors logically arranged in a square matrix of distributors (having equal numbers of columns and rows), a diagonal pair of distributors comprises a distributor of column j and row k and a distributor of column k and row j, j≠k, the columns being indexed as 0 to ($\mu$−1) and the rows being indexed as 0 to ($\mu$−1), $\mu$ being the number of columns. A distributor of a column and a row of the same index is referenced as a "diagonal distributor".

Complementary pair of distributors: In a switching system employing a plurality of distributors interconnecting a number of access nodes, a complementary pair of distributors (complementary distributor pair) comprises a first distributor, transferring data from a first set of access nodes to a second set of access nodes, and a second distributor transferring data from the second set of access nodes to the first set of access nodes. The complementary pair of distributors may share a common controller or a dual controller comprising a first controller coupled to the first distributor and a second controller coupled to the second distributor where the two controllers are communicatively coupled to enable transferring control data from the first controller to the first set of access nodes and control data from the second controller to the second set of access nodes. Herein, the two distributors, and respective controller(s), of a complementary pair of distributors are considered to be collocated.

Constellation of distributors: A number of collocated distributors form a constellation.

Diagonal constellation pair: In a switching system employing a plurality of distributors arranged into a matrix of constellations of collated distributors having a number of $\chi$ columns and $\chi$ rows, $\chi$>1, a diagonal pair of constellations comprises a constellation of column j and row k and a constellation of column k and row j, j≠k, the columns being indexed as 0 to ($\chi$−1) and the rows being indexed as 0 to ($\chi$−1).

Diagonal pair of rotators: In a switching system employing a plurality of rotators logically arranged in a square matrix rotators (having equal numbers of columns and rows), a diagonal pair of rotators comprises a rotator of column j and row k and a rotator of column k and row j, j≠k, the columns being indexed as 0 to ($\mu$−1) and the rows being indexed as 0 to ($\mu$−1), $\mu$ being the number of columns. A rotator of a column and a row of the same index is referenced as a "diagonal rotator".

Complementary pair of rotators: In a switching system employing a plurality of rotators interconnecting a number of access nodes, a complementary pair of rotators comprises a first rotator, transferring data from a first set of access nodes to a second set of access nodes, and a second rotator transferring data from the second set of access nodes to the first set of access nodes.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "access controller", "switch controller", or "global controller" is a hardware entity.

Software instructions: The term refers to processor-executable instructions which may be applied to cause a processor to perform specific functions.

Configuring a controller or a processor: The term refers to an action of installing appropriate software for a specific function.

Channel: A directional channel is a communication path from a transmitter to a receiver. A dual channel between a first device having a transmitter and a receiver and a second device having a transmitter and a receiver comprises a directional channel from the transmitter of the first device to the receiver of the second device and a directional channel from the transmitter of the second device to the receiver of the first device. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Spectral router: A spectral router (also called "wavelength router") is a passive device connecting a number of input WDM links to a number of output WDM links where each output WDM link carries a spectral band from each input WDM link.

$\lfloor r \rfloor$: $\lfloor r \rfloor$ denotes the nearest integer lower than or equal to a real number "r"; $\lfloor q \rfloor$=q, if "q" is an integer. For example: $\lfloor 7/8 \rfloor$=0, $\lfloor -7/8 \rfloor$=−1, $\lfloor 8/8 \rfloor$=1, $\lfloor -8/8 \rfloor$=−1, $\lfloor 9/8 \rfloor$=1, $\lfloor -9/8 \rfloor$=−2.

$\lceil r \rceil$: $\lceil r \rceil$ denotes the nearest integer higher than or equal to a real number "r"; $\lceil q \rceil$=q, if "q" is an integer Modulo operation: The operation J modulo K, herein denoted $J_{modulo\ K}$, where J is any integer and K is a positive integer is a remainder determined as:

$$J_{modulo\ K} = J - K \times \lfloor J/K \rfloor, \text{Thus, } 7_{modulo\ 8} = 7, (-7)_{modulo\ 8} = \{-7-(-1) \times 8\} = 1, 8_{modulo\ 8} = 0, (-8)_{modulo\ 8} = 0, 9_{modulo\ 8} = 1, \text{ and } (-9)_{modulo\ 8} = 7.$$

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

A reference numeral may individually or collectively refer to items of a same type. A reference numeral may further be indexed to distinguish individual items of a same type.

DETAILED DESCRIPTION

The invention provides a large-scale contiguous network comprising a plurality of access nodes interconnected through a plurality of distributors. A distributor may be electronic or optical and may be configured as a switch or a temporal rotator. A switch comprises a set of input ports which selectively connects to a set of output ports. A temporal rotator comprises a set of input ports each of which cyclically connects to each output port of a set of output ports. The description below covers contiguous networks employing distributors configured as switches as well as contiguous networks employing distributors configures as temporal rotators. The two types of contiguous networks have similar structures but may employ different control systems. A switch provides selective steering of data from input ports to output ports, thus requiring intra-switch data-transfer scheduling. A switch controller of a specific switch may perform time-alignment with subtending access nodes as well as scheduling data transfer through a switching mechanism of the specific switch. A temporal rotator is a clock-driven cyclical connector. A rotator controller of a specific rotator may perform time-alignment with subtending access nodes.

FIG. 1 is an overview 100 a network comprising plurality 145 of distributors 140 for interconnecting a plurality 125 of access nodes 120 through a plurality of WDM links 190. Each access node connects to data sources and data sinks (not illustrated) through dual access channels 110. An access node 120 comprises a source node and a sink node which may be separate or integrated.

Figure 2:
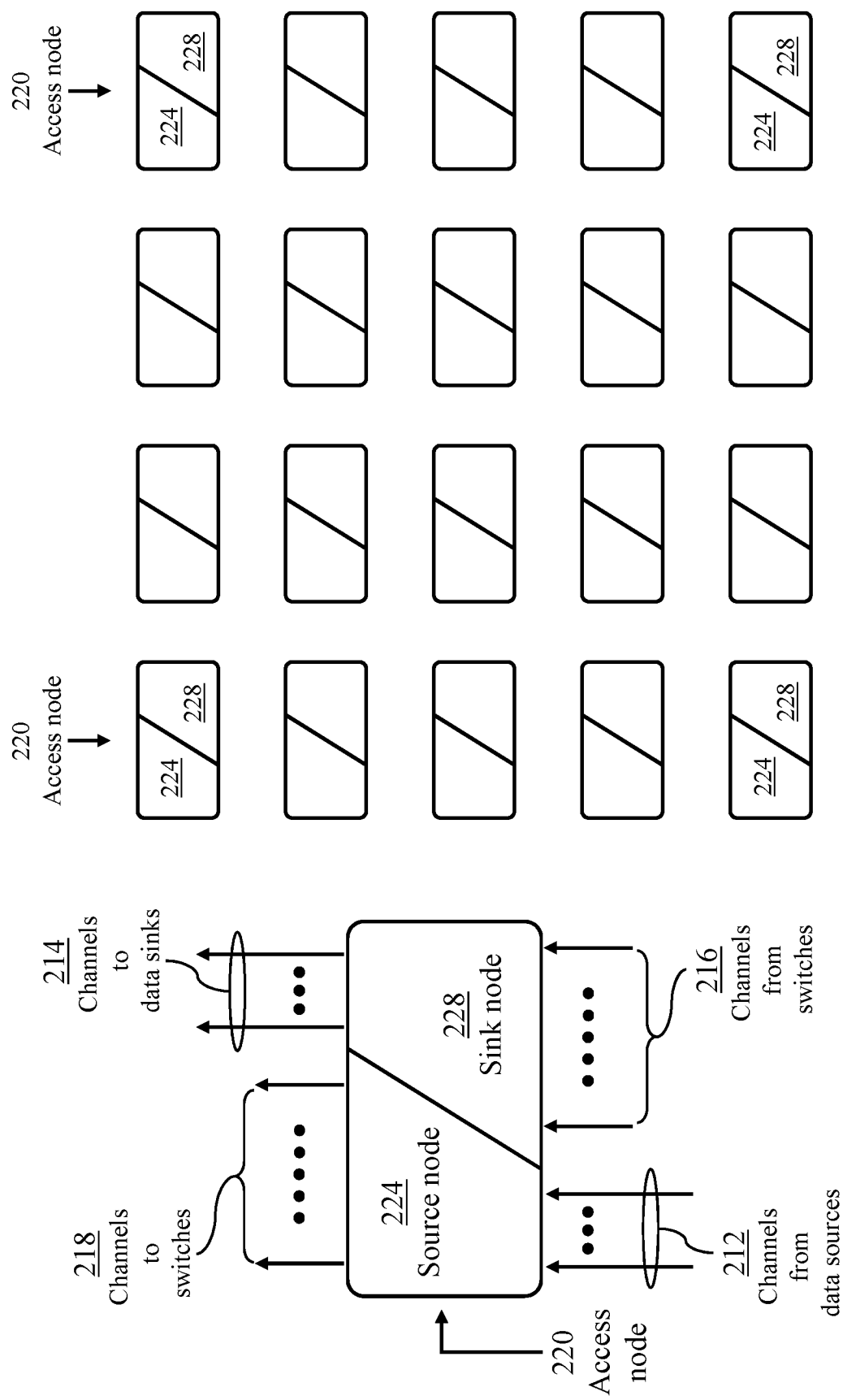
FIG. 2 illustrates a plurality of access nodes interconnected through distributors of the plurality of distributors of FIG. 1.

FIG. 2 illustrates access nodes 220 which may be interconnected through the plurality of distributors of FIG. 1. Each access node 220 comprises a source node 224 and a sink node 228. The source node 224 and the sink node 228 are integrated having a shared switching mechanism and a shared access controller. Each access node 220 (source node 224) connects to an upstream channel 218 to each distributor 140 of a selected first set of distributors. Each access node 220 (sink node 228) connects to a downstream channel 216 from each distributor 140 of a second set of distributors. In one implementation, the second set of distributors is the same first set of distributors. In another implementation, the second set of distributors is selected to be orthogonal to the first set of distributors. A source node 224 (of access node 220) receives data from data sources through a number of channels 212. A sink node 228 (of access node 220) transmits data from data sinks through a number of channels 214.

An access node 220 serves external traffic and may support servers of a server farm. A dual channel 212/214 of an access node may connect to a server or a set of network users constituting data sources and data sinks. In one embodiment, the entire set of dual channels 212/214 of an access node 220 connects to network users. In another embodiment, the entire set of dual channels 212/214 of an access node 220 may connect to a server farm. In a further embodiment, some dual channels 212/214 of an access node connect to network users and some other dual channels 212/214 connect to servers.

Each access node 220 comprises a respective access controller (not illustrated) configured to communicate with controllers of distributors or other network components. The access controller is a hardware entity which employs at least one hardware processor, memory devices storing software instructions, and memory devices storing control data such as routing-related data.

Figure 3:
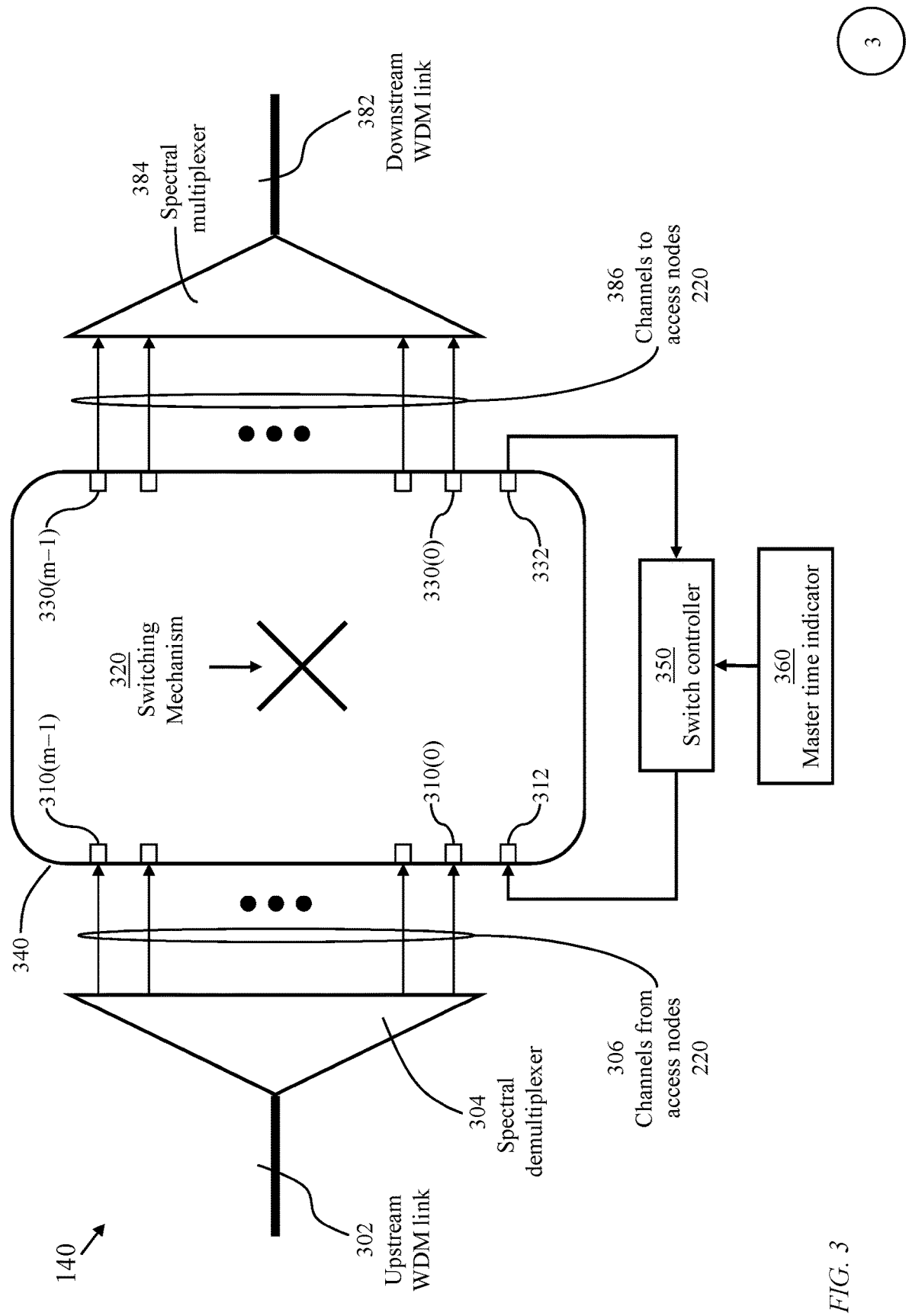
FIG. 3 illustrates a distributor configured as a switch.

FIG. 3 illustrates a distributor 140 configured as a switch comprising a number m of input ports 310, m>2, a control inlet 312, a number m of output ports 330, and a control outlet 332. The m input ports are individually identified as input ports 310(0), 310(1), . . . , 310(m−1). The m output ports are individually identified as output ports 330(0), 330(1), . . . , 330(m−1). The m input ports receive data originating at a respective set of access nodes 220 through upstream channels 306. The m output ports transmit data to a respective set of access nodes 220 through downstream channels 386. A switching mechanism 320 selectively transfers data from the input ports and from the control inlet to the output ports and the control outlet. A switch controller 350 receives control data from the input ports 310 through the switching mechanism 320 and control outlet 332. The switch controller 350 transmits control data to the output ports 310 through control inlet 312 and the switching mechanism 320. A master time indicator 360 provides reference time to the switch controller 350. The switch controller 350 is a hardware entity comprising at least one hardware processor and a storage medium holding software instructions which cause the at least one hardware processor to implement routing and time alignment functions.

Upstream channels 306 from a first set of access nodes 220 and downstream channels 386 to a second set of access nodes may be routed individually if the switching mechanism is collocated with the first set and second set of access nodes. In a geographically distributed switching system, upstream channels 306 may occupy different spectral bands in an upstream WDM link 302 and a spectral demultiplexer 304 separates the spectral bands to be directed to different input ports of the switching mechanism 320. Downstream channels 386 from different output ports of the switching mechanism may occupy different spectral bands and a spectral multiplexer 384 combines the spectral bands onto in a downstream WDM link 382. While FIG. 3 illustrates one upstream WDM link 302, one spectral demultiplexer 304, one spectral multiplexer 384, and one downstream WDM link 382, it should be understood that the spectral demultiplexer 304 may be implemented as multiple spectral demultiplexers, and the upstream WDM link may be implemented as multiple upstream WDM links each connected to a respective spectral demultiplexer. Likewise, the spectral multiplexer 384 may be implemented as multiple spectral multiplexers each combining a respective number of spectral bands onto a respective downstream WDM links. For example, if the number m of input ports or output ports is 128 and it is desired to use WDM links each carrying 64 spectral bands, then spectral demultiplexer 304 would be implemented as two demultiplexers and spectral multiplexer 384 would be implemented as two spectral multiplexers.

Figure 4:
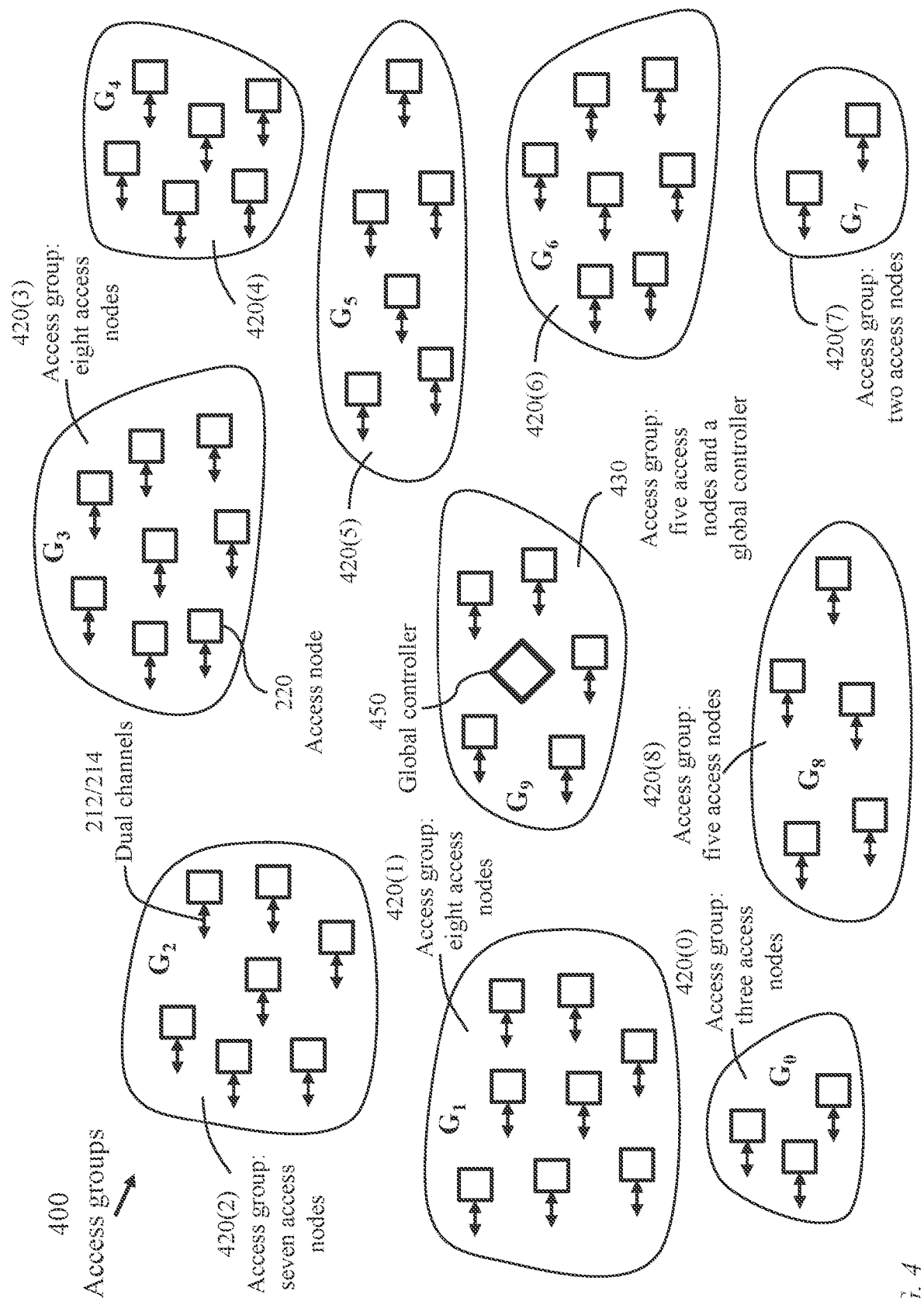
FIG. 4 illustrates arrangement of access nodes into access groups with one access group also including a global controller, in accordance with an embodiment of the present invention.

FIG. 4 illustrates arrangement of a plurality of access nodes 220 into ten access groups 420, individually identified as 420(0) to 420(8) and 430, labeled $G_0$ to $G_9$, respectively. The access groups comprise different numbers of access nodes 220. An access group 430, labeled $G_9$, comprises five access nodes 220 and a global controller 450.

Connection of Access Nodes to Distributors

Figure 5:
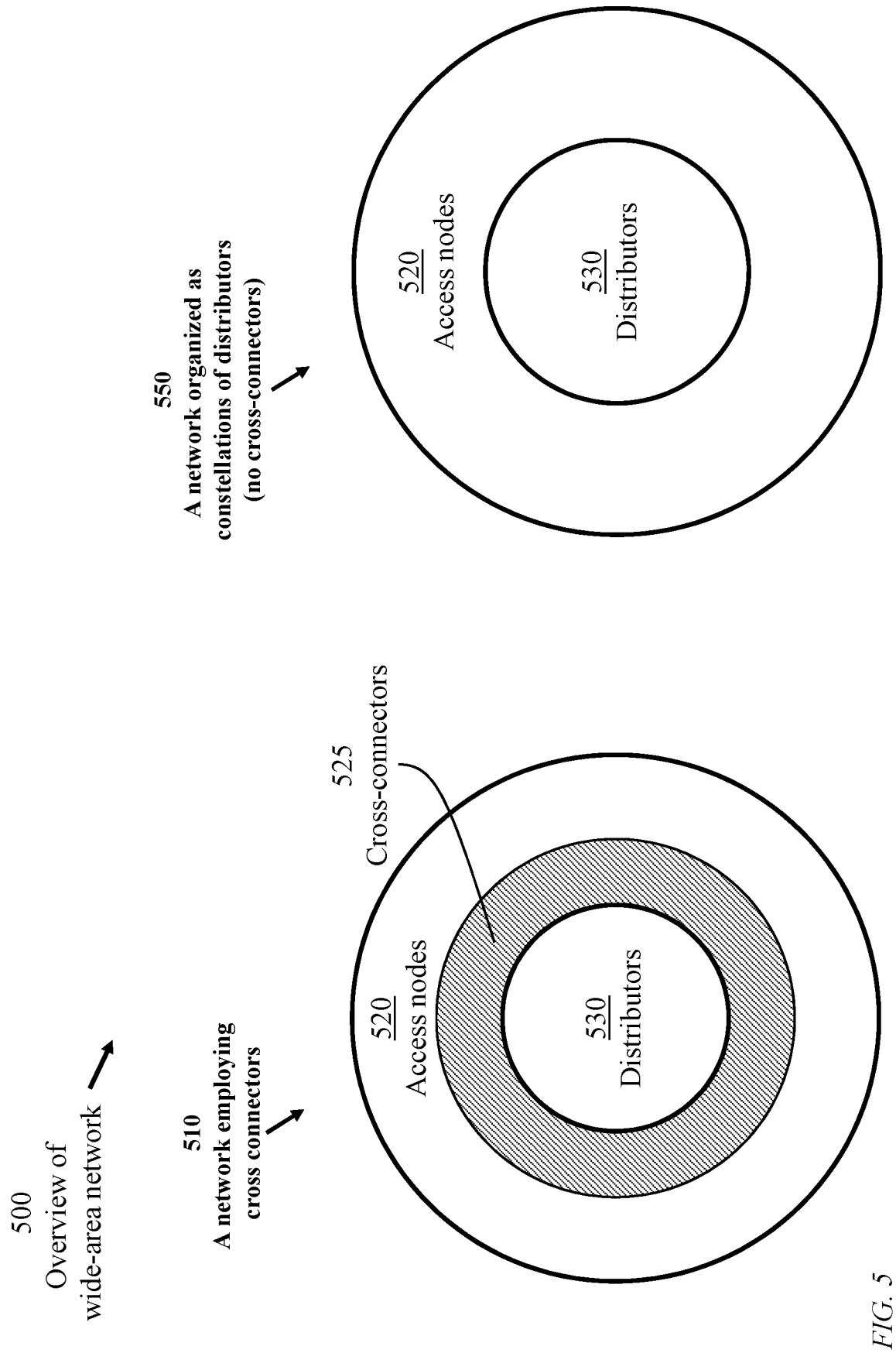
FIG. 5 illustrates two schemes of interconnecting access nodes to distributors, in accordance with an embodiment of the present invention.

FIG. 5 illustrates two schemes of interconnecting the plurality of access nodes 120 or 220 to the plurality of distributors 140. Each access node 120 or 220 connects to multiple distributors 140 which may be spatially distributed over a wide geographical area. If the plurality of access nodes and the plurality of distributors are spatially collocated, individual physical channels may be employed to connect the access nodes to the distributors. Otherwise, multi-channel links 190 would be employed to connect the access nodes to the distributors. In accordance with a first connection scheme 510, cross-connectors 525, such as spectral routers (also called wavelength routers), may be used as an intermediate stage between a plurality 520 of access nodes 120 or 220 and a plurality 530 of distributors 140. In accordance with a second connection scheme 550, the distributors may be grouped into constellations where each constellation comprises a respective number of spatially collocated distributors 140. Thus, each access node may connect to selected constellations through wavelength-division-multiplexed (WDM) links, eliminating the need for intermediate cross-connectors.

The distributors 140 may be logically arranged in a matrix of distributors (switches or rotators) having $\mu$ columns and $\mu$ rows, $\mu > 4$. The distributors are individually identified as 140$(j,k)$, $0 \leq j < \mu$, $0 \leq k < \mu$, where j and k are indices of a column and a row, respectively, of the matrix of distributors.

Figure 6:
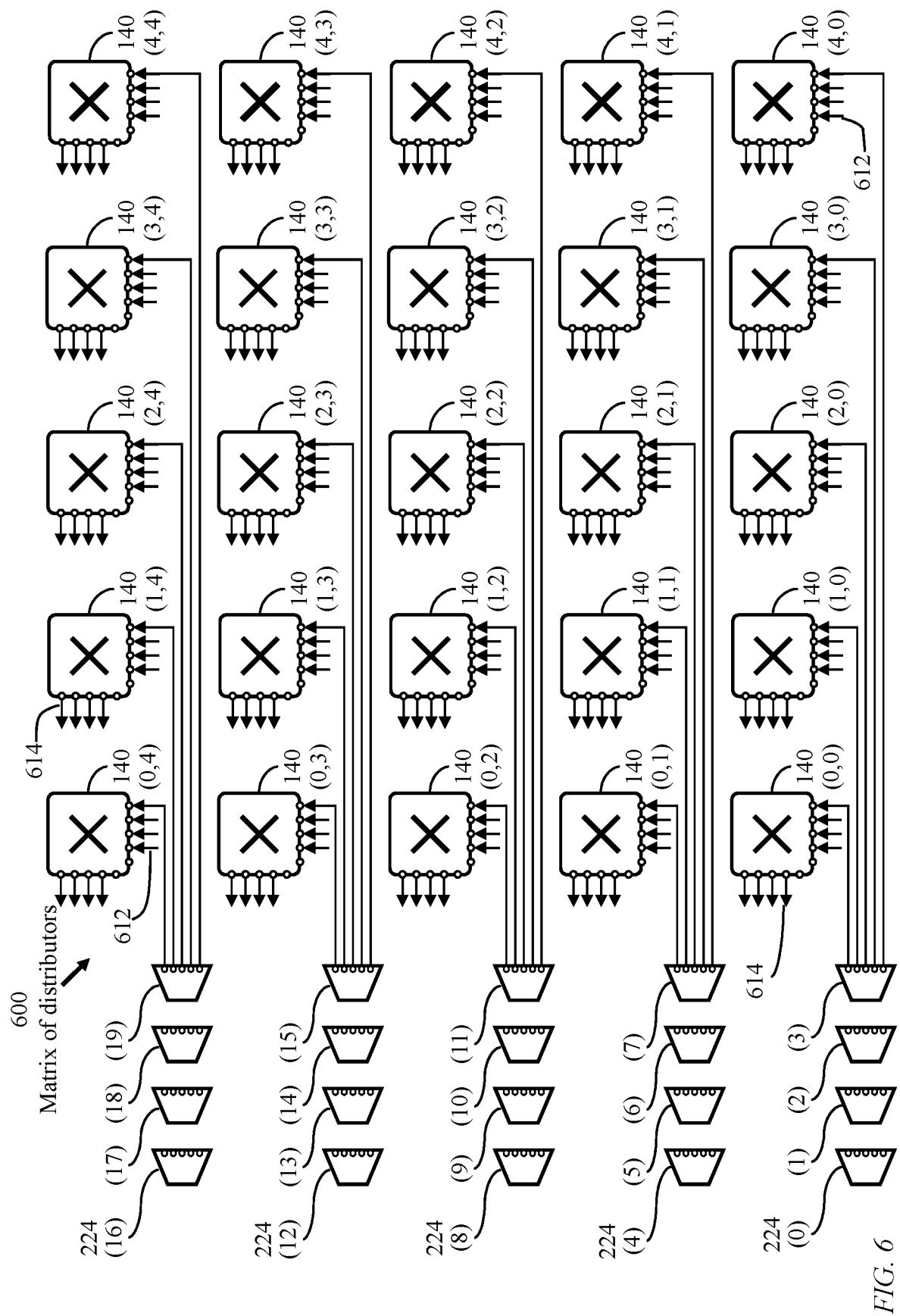
FIG. 6 illustrates source nodes connecting to distributors logically arranged in a matrix of distributors.
Figure 7:
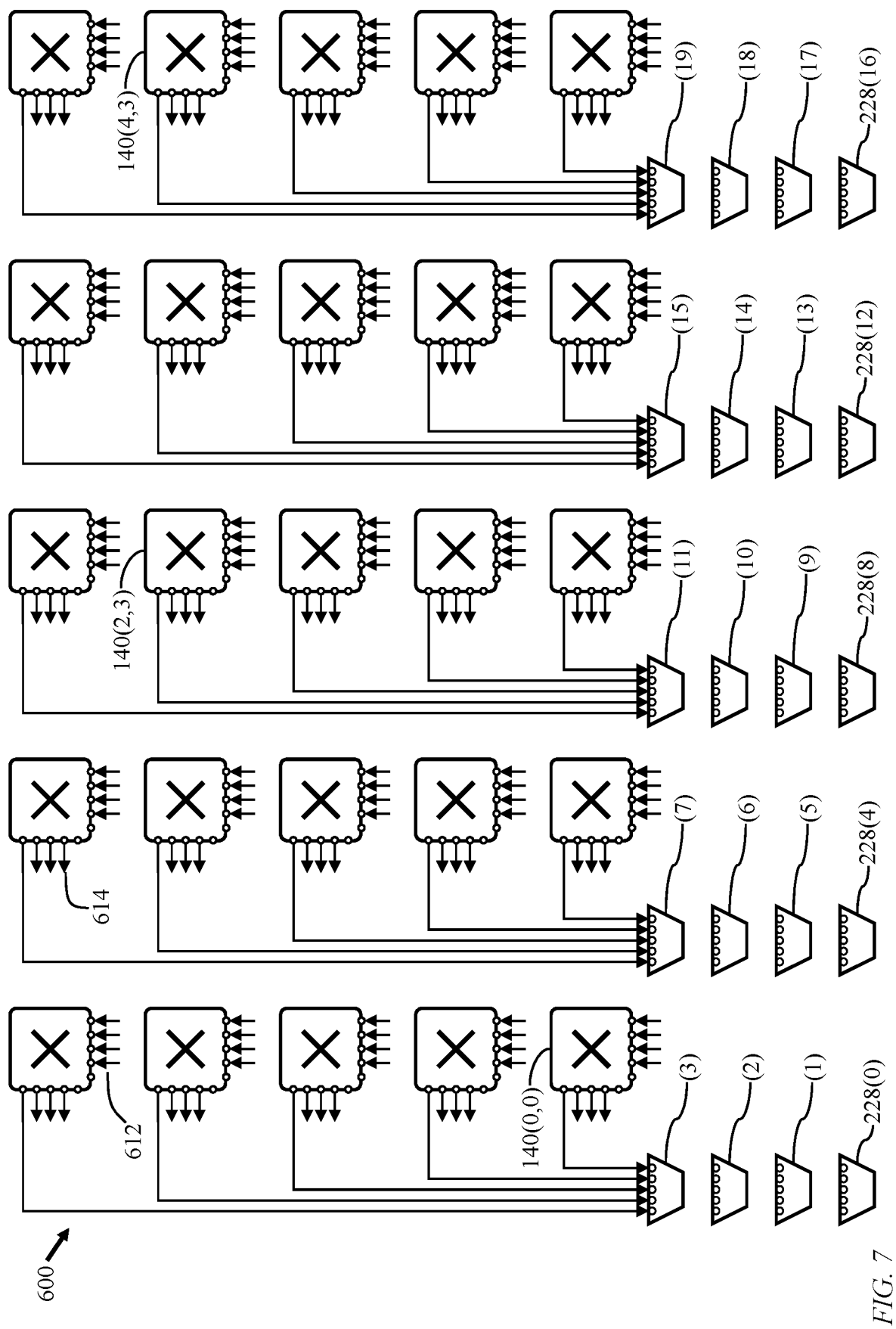
FIG. 7 illustrate sink nodes connecting to the distributors of the matrix of distributors of FIG. 6.

FIG. 6 and FIG. 7 illustrate a switching system configured as a matrix 600 of distributors 140 arranged in five columns and five rows ($\mu = 5$) where each distributor is configured as a switch. FIG. 6 illustrates upstream connectivity of source nodes to respective distributors. FIG. 7 illustrates downstream connectivity of distributors to respective sink nodes.

Each distributor 140 connects to respective input channels 612 and respective output channels 614. The $\mu$ columns may be indexed as 0 to ($\mu - 1$) and the $\mu$ rows may be indexed as 0 to ($\mu - 1$). A distributor of column j and row k together with a distributor of column k and row j, $0 \leq j < \mu$, $0 \leq k < \mu$, $j \neq k$, form a diagonal distributor pair.

A distributor of column j and row j, $0 \leq j < \mu$, in a matrix of distributors having $\mu$ columns and $\mu$ rows, $\mu > 4$, is referenced as a diagonal distributor, the columns being indexed as 0 to ($\mu - 1$) and the rows being indexed as 0 to ($\mu - 1$). A diagonal pair of distributors comprises a distributor of column j and row k and a distributor of column k and row j, $j \neq k$, of the matrix of distributors.

For a distributor (connector) along a diagonal of matrix 600, i.e., a distributor positioned in a column j and a row j, $0 \leq j < \mu$, channels 306 (FIG. 3) receive data from a set of m access nodes and channels 386 (FIG. 3) transmit data to the same set of m access nodes 220. For a distributor positioned in a column j and a row k, where $k \neq j$, channels 306 receive data from a respective first set of m access nodes and channels 386 transmit data to a respective second set of m access nodes 220, where the first set of m access nodes and the second set of m access nodes are disjoint, i.e., not having any access node in common.

Thus, the switching system accommodates $\mu \times m$ access nodes. For a requisite initial number of access nodes, $\mu$ and m may be selected so that the product $\mu \times m$ at least equals the requisite initial number.

Switching-System Expansion

With the matrix of distributors containing $\mu^2$ distributors 140 arranged into $\mu$ columns and $\mu$ rows, each distributor having m dual ports (m input ports and m output ports), in addition to control inlets and outlets, the maximum number of access nodes 220 supported by the network would be limited to $\mu \times m$. To increase the number of access nodes 220, the dimension of each distributor, i.e., the number m of dual ports, may be increased, the number of distributors may be increased, or both the dimension of each distributor and the number of distributors may be increased. Expansion of the switching system may be realized according to either of two schemes.

According to a first expansion scheme, m new access nodes 220 may be accommodated by adding a number $(2 \times \mu + 1)$ of new distributors to form a new column of distributors and a new row of distributors, thus extending the matrix of distributors. The switching system is expanded through processes of:

connecting each access node of m additional access nodes to an input port of each distributor of ($\mu + 1$) distributors of a new row of distributors; and connecting m input ports of each distributor of remaining $\mu$ distributors of the ($2 \times \mu + 1$) new distributors to a set of access nodes connecting to a respective row of distributors.

According to the second expansion scheme, the number of access nodes may be increased through:

providing an additional input port and an additional output port to each distributor of a current plurality of distributors;

providing $\mu$ additional access nodes; and connecting each access node of the $\mu$ additional access nodes to an input port of each distributor of a respective row and an output port of each distributor of a respective column of the matrix of distributors.

Routing Control of the Switching System

Figure 8:
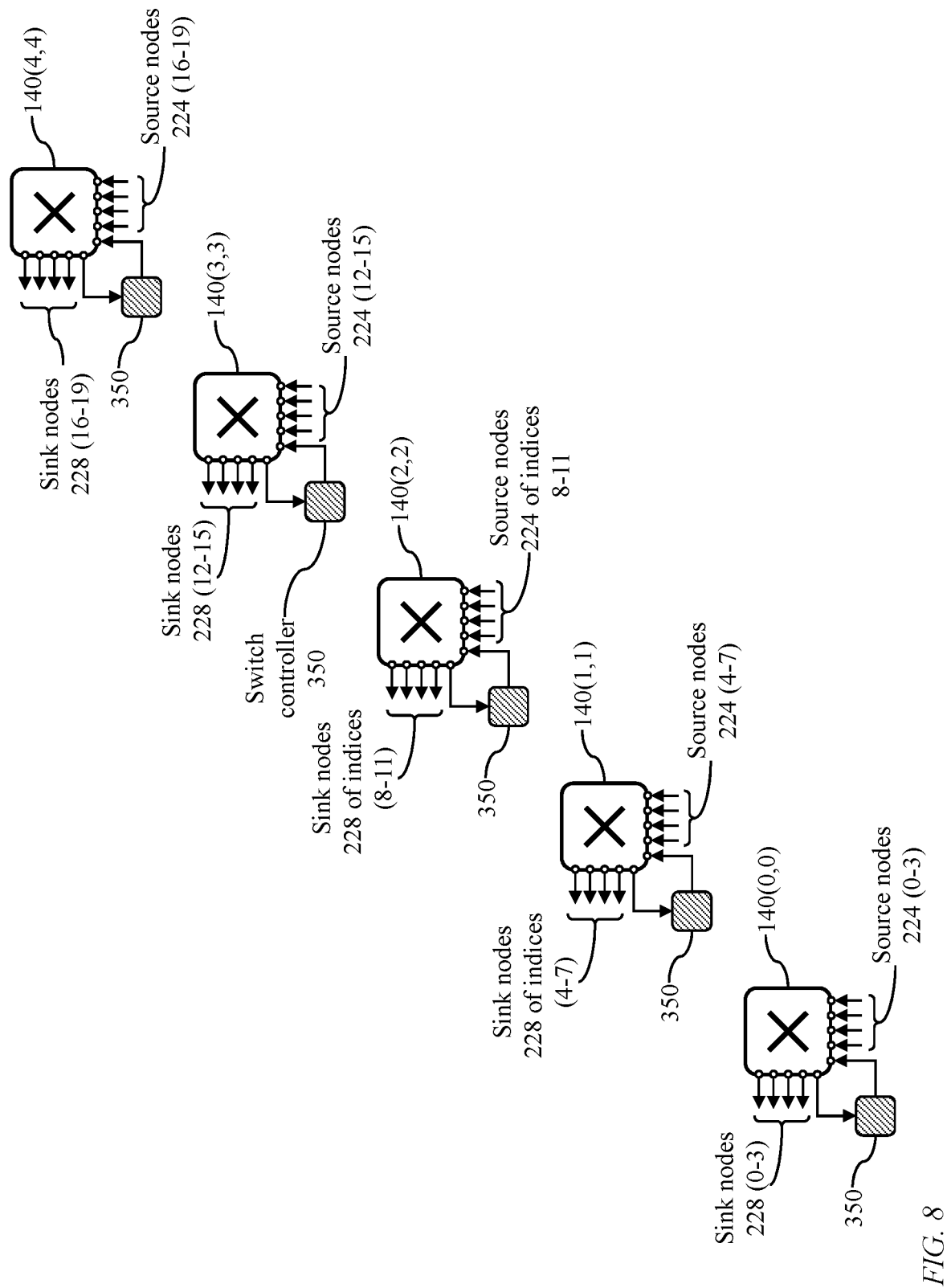
FIG. 8 illustrates diagonal distributors along a diagonal of the matrix of distributors of FIG. 6.

FIG. 8 illustrates diagonal distributors (connectors) 140$(j, j)$, $0 \leq j < \mu$, along a diagonal of the matrix of distributors of FIG. 6. Each access node 220 which connects to an input port of a distributor (connector) 140$(j,k)$, where $j = k$, also connects to an output port of the same distributor (connector). Thus, where an access node 220 connects to a distributor (connector) 140$(j,j)$, there is a return path from the access node 220 to itself, i.e., from the source node 224 to the sink node 228 of the same access node, through the same distributor (connector) 140$(j,j)$. This is not the case where $k \neq j$. In the configurations of FIG. 6 and FIG. 7, each source node 224 has a path to each sink node 228 through one of the distributors 140. Thus, when a source node 224 and a sink node 228 of a same access node 220 connect to different distributors, a return control path from an access node to itself can be provided through any intermediate access node 220. It is preferable, however, that such a return control path be created without the need to traverse an intermediate access node 220. This can be realized by collocating a distributor 140$(j, k)$ with a distributor 140$(k, j)$, where $j \neq k$, $0 \leq j < \mu$, $0 \leq k < \mu$. A distributor 140$(j,k)$ and a distributor 140 $(k,j)$, $j \neq k$, form a "diagonal distributor pair". With the connectivity schemes of FIG. 6 and FIG. 7, distributor 140$(j,k)$ and 140$(k,j)$ are complementary distributors forming a "complementary distributor pair" as defined above.

Figure 9:
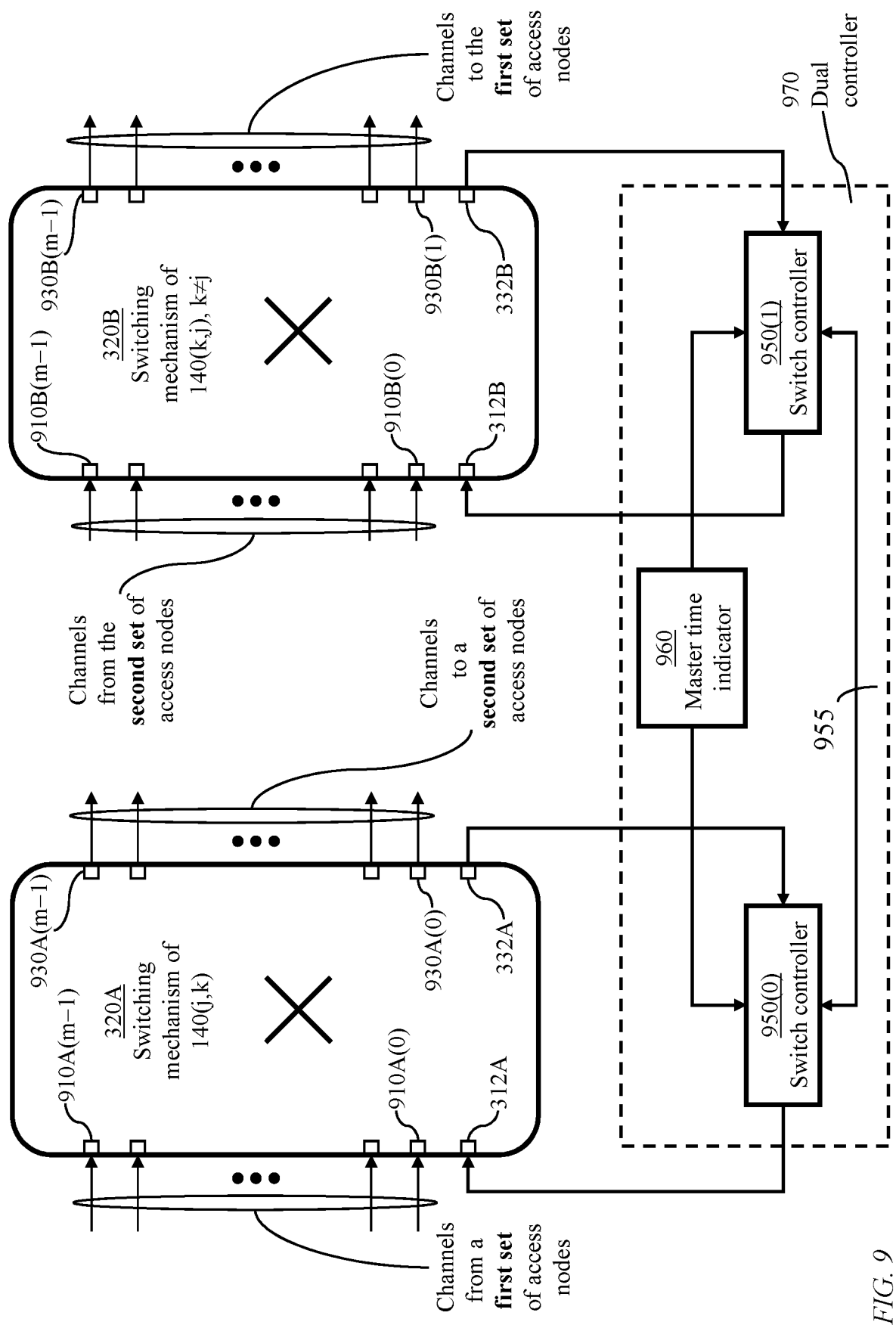
FIG. 9 illustrates coupling of controllers of any complementary distributor pairs, in accordance with an embodiment of the present invention.

FIG. 9 illustrates coupling of controllers of any complementary pair of distributors of the matrix 600 of distributors 140 of FIG. 6 to form a "dual controller". A controller 950(0), which comprises a processor, a scheduler and a timing circuit for time-aligning data arriving at inputs of a switching mechanism 320A of a distributor 140$(j, k)$, is coupled through a dual channel 955 to a similar controller 950(1) of a switching mechanism 320B of a distributor 140$(k,j)$, $j \neq k$. The mutually coupled controllers 950(0) and 950(1) are herein referenced as a "dual controller" 970.

Controller 950(0) connects to control inlet 312A and control outlet 332A of switching mechanism 320A while controller 950(1) connects to control inlet 312B and control outlet 332B of switching mechanism 320B. Controllers 950(0) and 950(1) are coupled to a master time indicator 960. Each controller receives control data from respective input ports through a respective switching mechanism and transmits control data to respective output ports through a respective switching mechanism 320A or 320B.

Since the input ports 910A(0) to 910A(m−1) of a switching mechanism 320A and the output ports 920B(0) to 920B(m−1) of switching mechanism 320B connect to a same set of access nodes, control data from controller 950(0) may be sent through controller 950(1) to the same set of access nodes. Likewise, control data may be sent from controller 950(1) through controller 950(0) to access nodes connecting to input ports of switching mechanism 320B and output ports of switching mechanism 320A. The two controllers 950(0) and 950(1) may be integrated to function as a single controller (not illustrated).

FIG. 10, FIG. 11, FIG. 12, and FIG. 13 illustrate diagonal distributor pairs {140($j,k$), 140($k,j$), $j \neq k$}, $0 \leq j < \mu$, $0 \leq k < \mu$, each diagonal distributor pair connecting to a respective set of source nodes and a respective set of sink nodes where, for each distributor pair, source nodes of a respective first set of access nodes and sink nodes of a respective second set of access nodes connect to one of the two distributors of the distributor pair while source nodes of the respective second set of access nodes and sink nodes of the respective first set of access nodes connect to the other switch of the diagonal distributor pair. Thus, each of the diagonal distributor pairs is also a complementary distributor pair as defined above.

Figure 10:
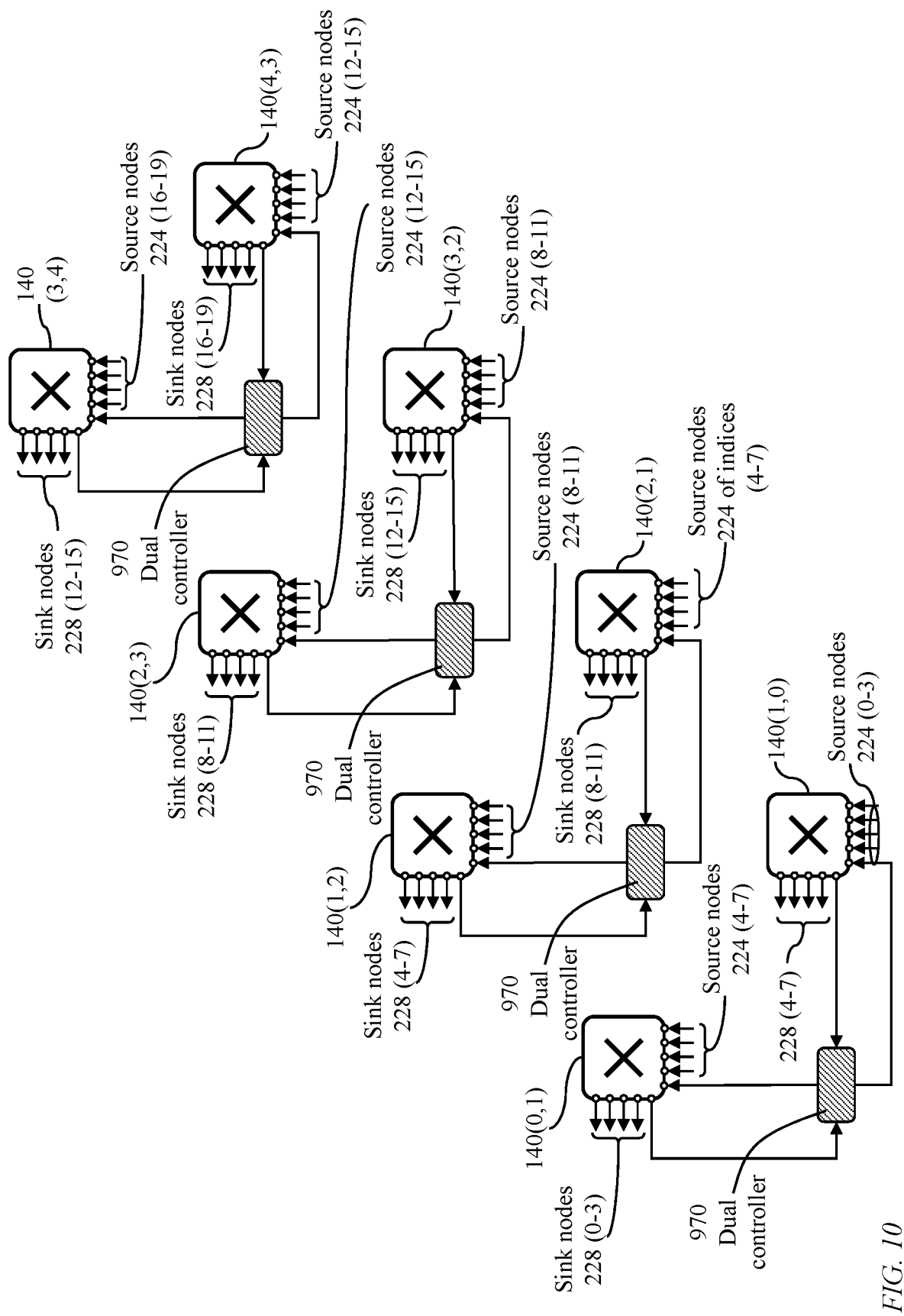
FIG. 10 illustrates a first set of distributor pairs each connecting to a respective dual controller where, for each distributor pair, source nodes of a respective first set of access nodes and sink nodes of a respective second set of access nodes connect to one of the distributors while source nodes of the respective second set of access nodes and sink nodes of the respective first set of access nodes connect to the other distributor, in accordance with an embodiment of the present invention.

FIG. 10 illustrates diagonal distributor pairs of the matrix of distributors of FIG. 6. A distributor 140(1,0) connects to source nodes 224 of indices {0, 1, 2, 3} and sink nodes 228 of indices {4, 5, 6, 7} while a complementary distributor 140(0,1) connects to source nodes 224 of indices {4, 5, 6, 7} and sink nodes 228 of indices {0, 1, 2, 3}. Thus, if the two distributors 140(1,0) and 140(0,1) are collocated, the two distributors may share a dual controller 970 and a return control path through the distributor pair can be established. A distributor 140(2,1) connects to source nodes 224 of indices {4, 5, 6, 7} and sink nodes 228 of indices {8, 9, 10, 11} while a complementary distributor 140(1,2) of distributor 140(2, 1) connects to source nodes 224 of indices {8, 9, 10, 11} and sink nodes 228 of indices {4, 5, 6, 7}. Thus, collocating distributors 140(2,1) and 140(1,2) enables employing a dual controller 970 and creating a return control path for each of the access nodes of indices 4 to 11 through the distributor pair. Likewise, distributors 140(3, 2) and 140(2,3) form a complementary pair, and distributor 140(3, 4) and distributor 140(4, 3) form a complementary pair. The source nodes 224 and sink nodes 228 connecting to each of distributors 140(1,0), 140(0,1), 140(2,1), 140(1,2), 140(3,2), 140(2,3), 140(4,3), and 140(3,4) are indicated in FIG. 10.

Figure 11:
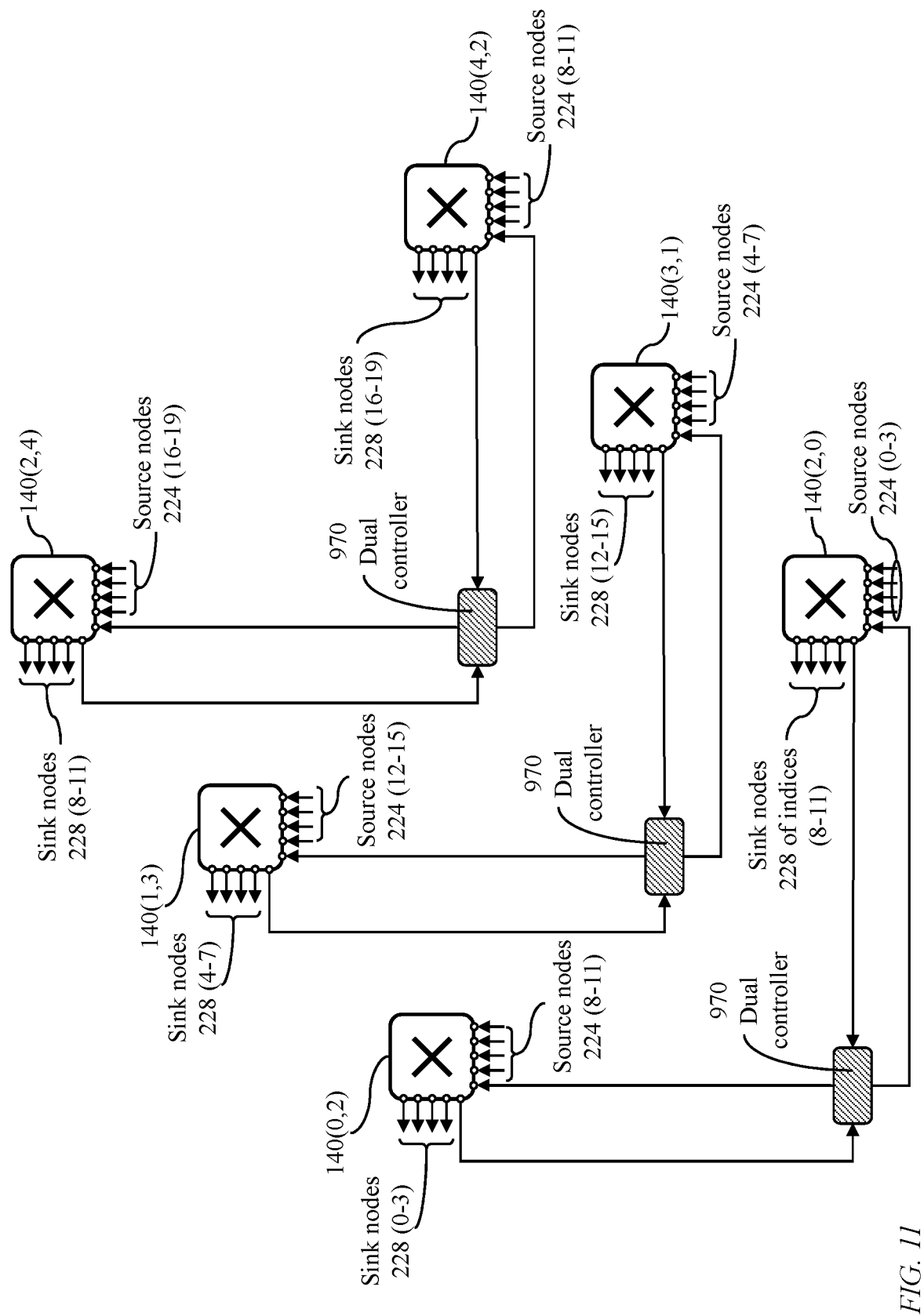
FIG. 11 illustrates a second set of distributor pairs each connecting to a respective dual controller where the connectivity of each distributor pair to source nodes and sink nodes is analogous to the connectivity of FIG. 10.

As illustrated in FIG. 11, distributor 140(2, 0) and distributor 140(0,2) form a complementary distributor pair, distributor 140(3,1) and distributor 140(1,3) form a complementary distributor pair, and distributor 140(4,2) and distributor 140(2,4) form a complementary distributor pair. The source nodes 224 and sink nodes 228 connecting to each of distributors 140(2,0), 140(0,2), 140(3,1), 140(1,3), 140(4,2), and 140(2,4) are indicated in FIG. 11.

Figure 12:
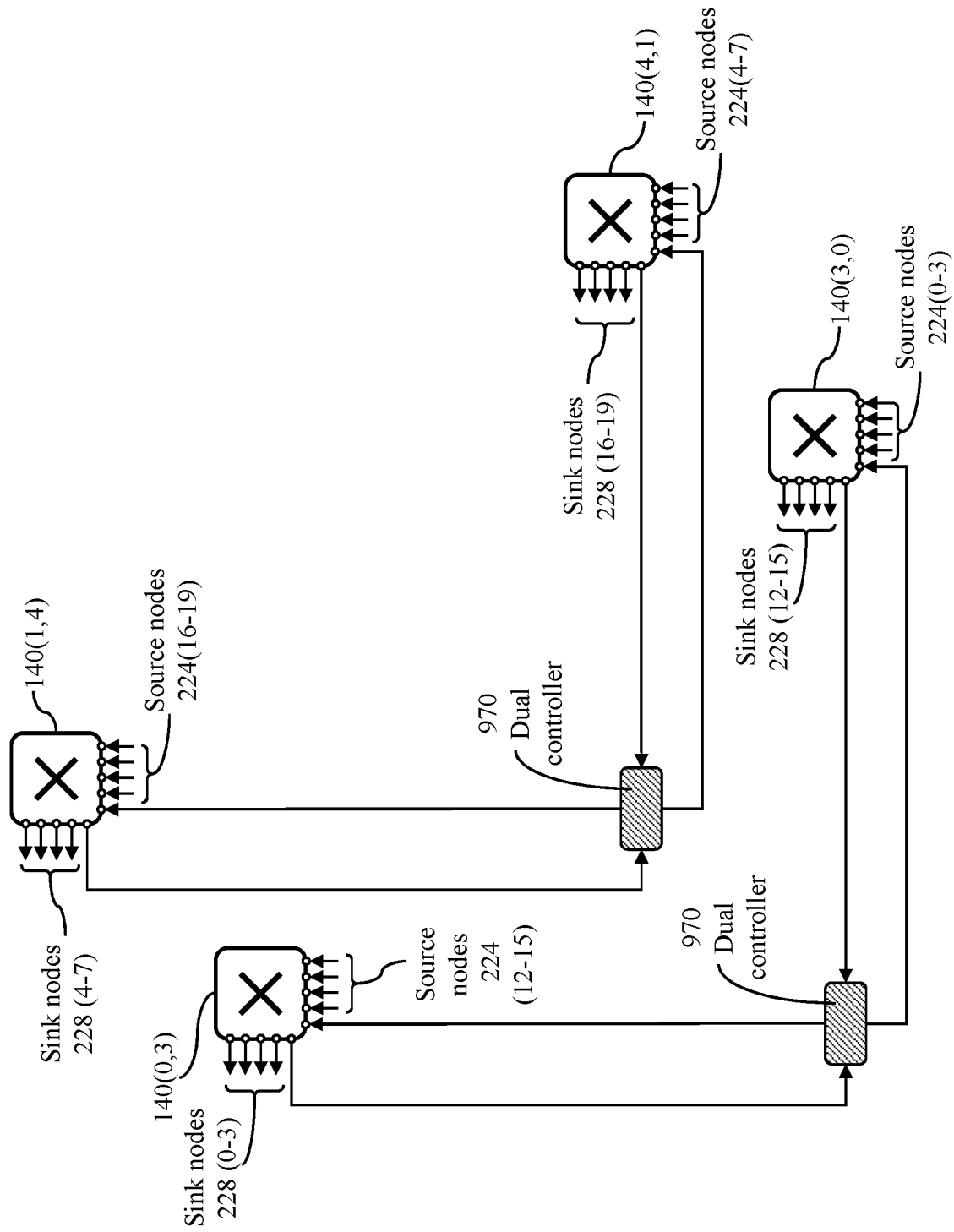
FIG. 12 illustrates a third set of distributor pairs each connecting to a respective dual controller where the connectivity of each distributor pair to source nodes and sink nodes is analogous to the connectivity of FIG. 10.

FIG. 12 illustrates a dual controller 970 of distributor 140(3, 0) and distributor 140(0,3) which form a complementary distributor pair, and a dual controller 970 of distributor 140(4,1) and distributor 140(1,4) which form a complementary distributor pair. Distributor 140(3, 0) connects to source nodes 224 of indices 0-3 and sink nodes 228 of indices 12-15, while complementary distributor 140(0, 3) connects to sink nodes 228 of indices 0-3 and source nodes 224 of indices 12-15. Distributor 140(4, 1) connects to source nodes 224 of indices 4-7 and sink nodes 228 of indices 16-19, while complementary distributor 140(1,4) connects to sink nodes 228 of indices 4-7 and source nodes 224 of indices 16-19.

Figure 13:
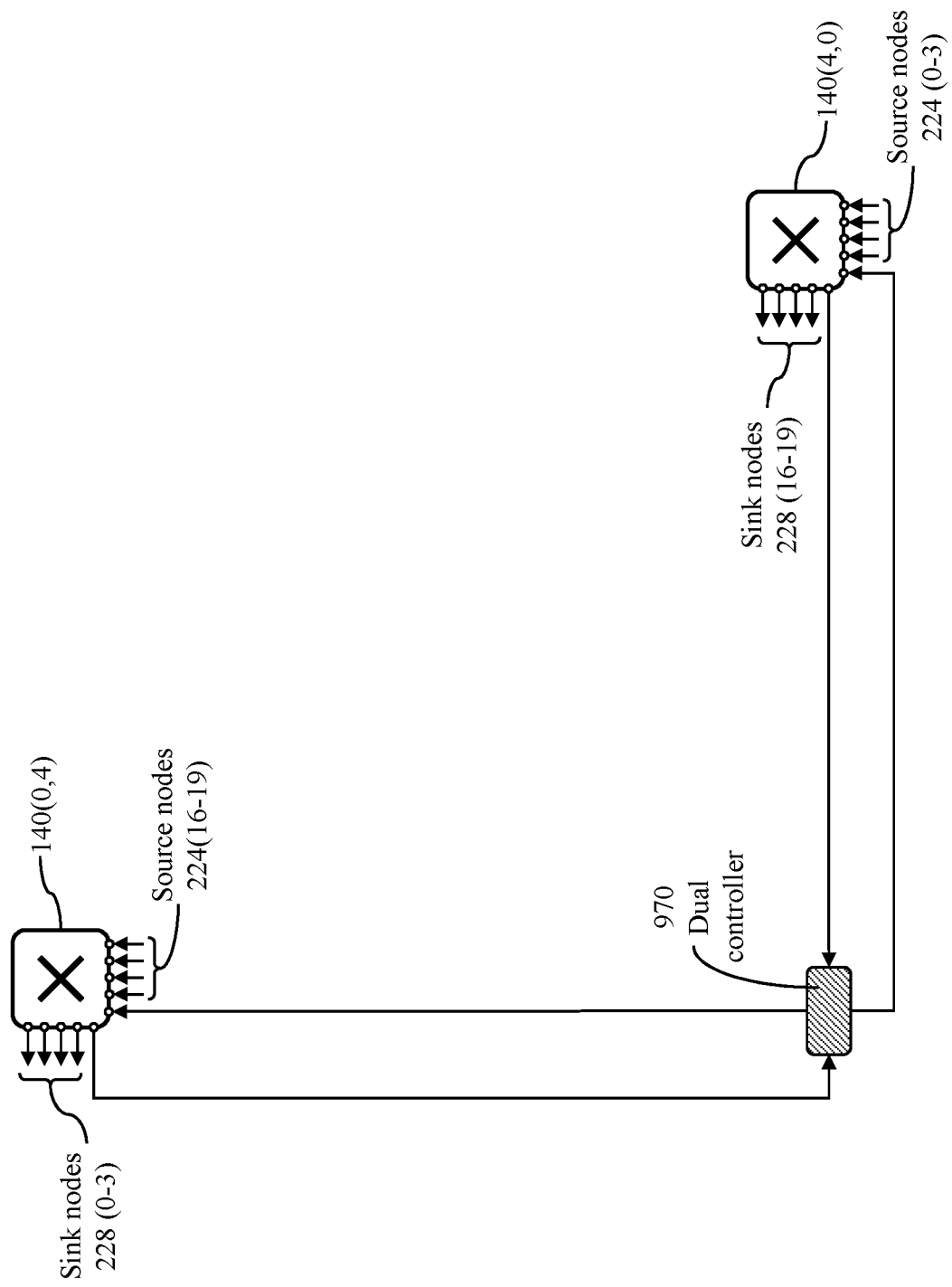
FIG. 13 illustrates a distributor pair connecting to a respective dual controller where the connectivity of the distributor pair to source nodes and sink nodes is analogous to the connectivity of FIG. 10.

FIG. 13 illustrates a dual controller 970 of distributor 140(4, 0) and distributor 140(0,4) which form a complementary distributor pair. Distributor 140(4, 0) connects to source nodes 224 of indices 0-3 and sink nodes 228 of indices 16-19, while complementary distributor 140(0,4) connects to sink nodes 228 of indices 0-3 and source nodes 224 of indices 16-19.

Switching System Employing Core Rotators

A large-scale temporal rotator may be used to interconnect a large number of access nodes to create a fully-meshed network. A temporal rotator having N input ports and N output ports, N>2, provides a path from each access node to each other access node. With each input port (and each output port) having a capacity of R bits/second, a path of capacity R/N from each port to each other port is created, with each access node having a return data path to itself. A number of N×N temporal rotators may be operated in parallel to distribute data from N upstream wavelength-division-multiplexed (WDM) links to N downstream WDM links. However, with a large number N (8000, for example), the delay resulting from use of a temporal rotator of large dimension and the small capacity of a path within each temporal rotator may be undesirable.

Figure 14:
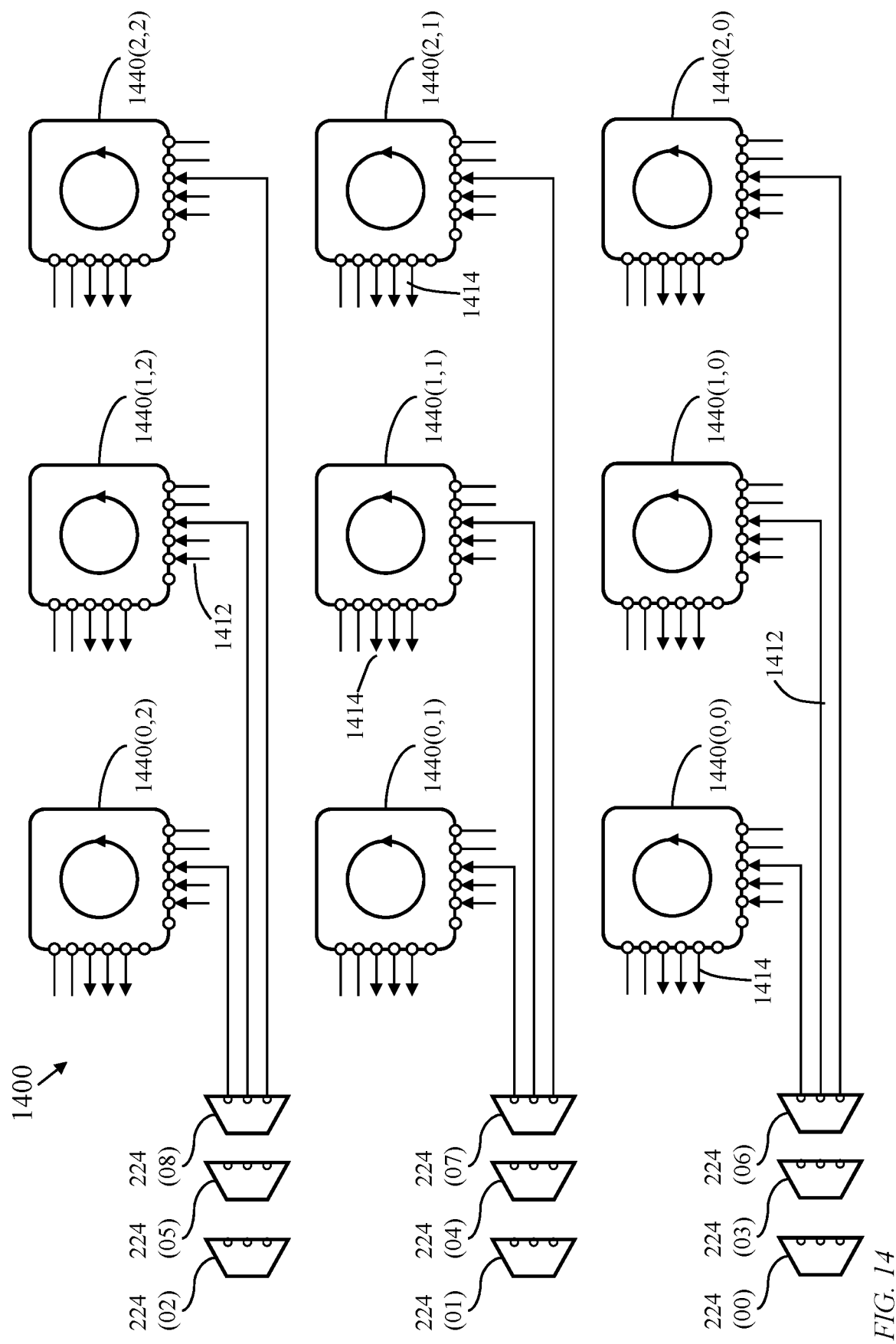
FIG. 14 illustrates source nodes connecting to rotators arranged in a matrix of rotators, in accordance with an embodiment of the present invention.

FIG. 14 illustrates temporal rotators 1440, each having a relatively small dimension, arranged in a μ×μ matrix 1400 of temporal rotators, μ>2. A temporal rotator is herein also referenced as a "rotator"; all rotators used in the present application are temporal rotators. The access nodes of FIG. 2 may be interconnected through a matrix of rotators. The matrix of rotators may interconnect a large number of access nodes 220 with a reduced delay and a larger path capacity for each directed pair of access nodes. The matrix 1400 of rotators illustrated in FIG. 14 has three columns and three rows (μ=3). Each rotator 1440 connects to a respective set of input channels 1412 and a respective set of output channels 1414. With each rotator 1440 having m inputs and m outputs, m>2, and each source node having μ upstream channels individually connecting to rotators of a respective row of the matrix of rotators, the total number of source nodes is m×μ. With m=32 and μ=256, for example, the total number of source nodes is 8192.

The μ columns of matrix 1400 may be indexed as 0 to (μ−1) and the μ rows may be indexed as 0 to (μ−1). A rotator of column j and row j, $0 \leq j < \mu$ is referenced as a "diagonal rotator". A rotator of column j and row k together with a rotator of column k and row j, $0 \leq j < \mu$, $0 \leq k < \mu$, $j \neq k$, are said to form a "diagonal rotator pair".

Figure 15:
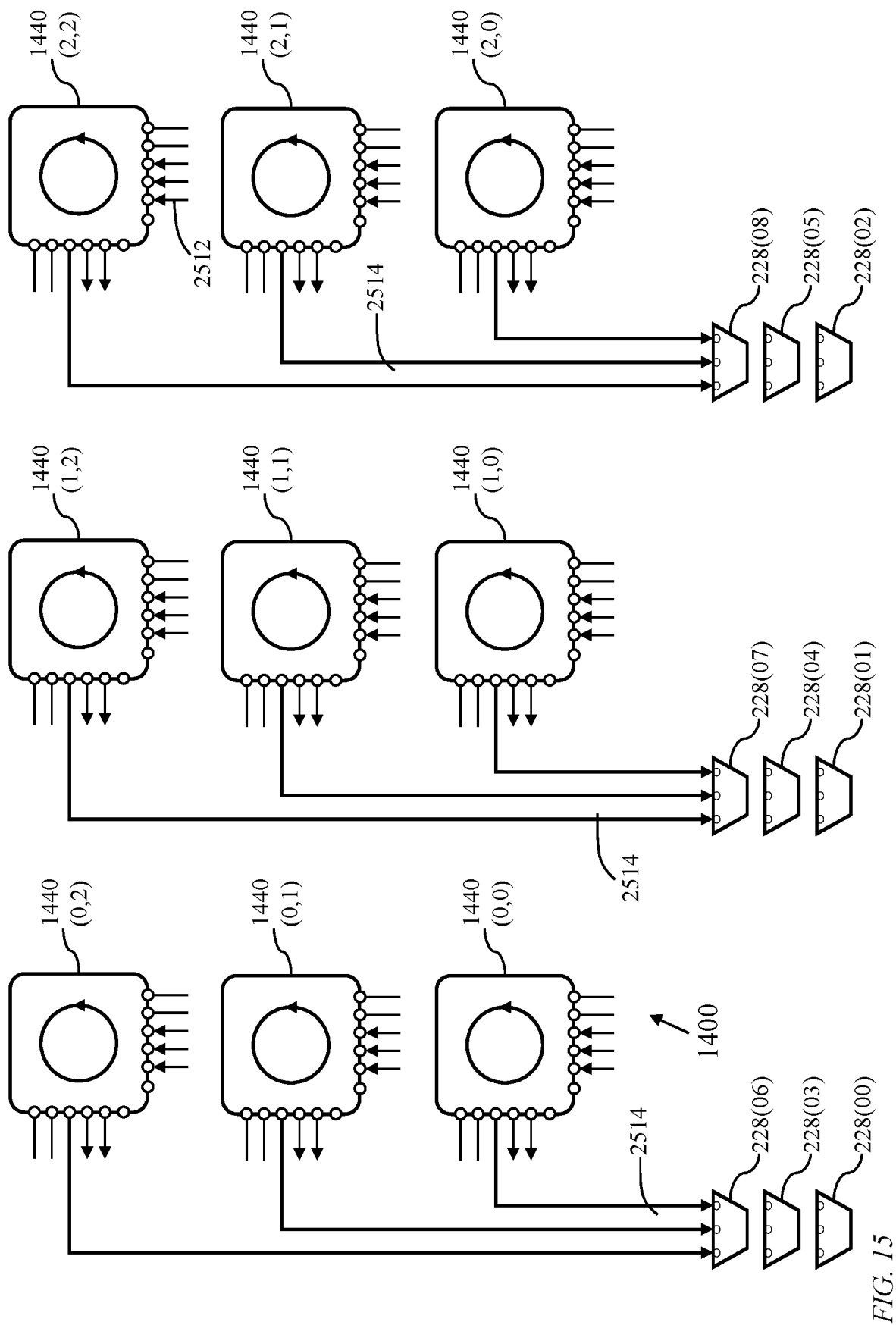
FIG. 15 illustrates connections of the rotators of FIG. 14 to sink nodes.

FIG. 15 illustrates connections of the rotators of FIG. 14 to sink nodes 228. With each sink node having μ downstream channels individually connecting to rotators of a respective column of the matrix of rotators, the number of sink nodes is m×μ.

Figure 16:
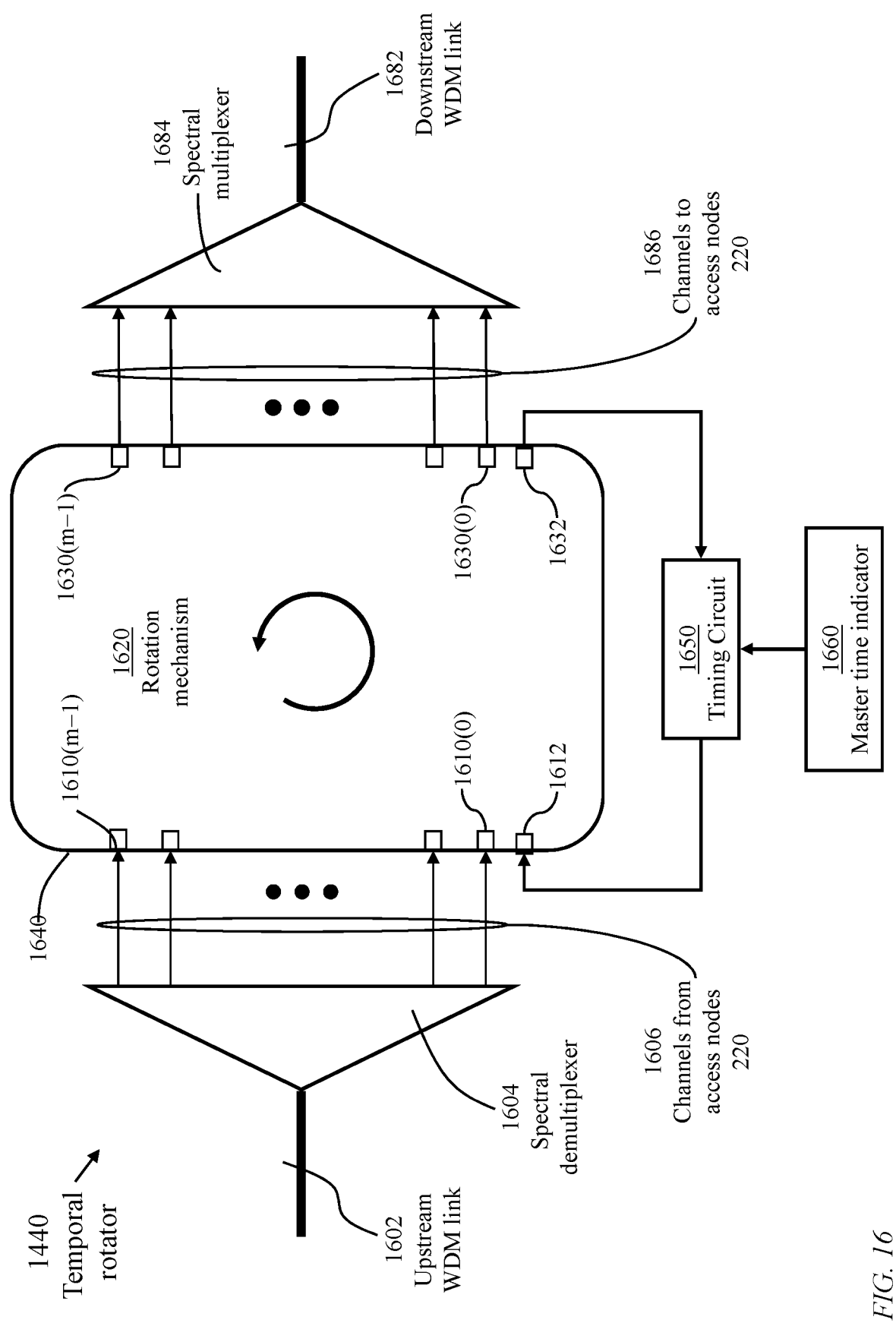
FIG. 16 illustrates a rotator coupled to a timing circuit.

FIG. 16 illustrates a temporal rotator 1440 comprising a number, m, of input ports 1610, m output ports 1630, a control inlet 1612, and a control outlet 1632, and a rotation mechanism 1620 cyclically connecting each input port 1610 and control inlet 1612 to each output port 1630 and control outlet 1632. The m input ports are individually identified as input ports 1610(0), 1610(1), . . . , 1610(m−1), m>2. The m output ports are individually identified as output ports 1630 (0), 1630(1), . . . , 1630(m−1). The m input ports receive data originating at a respective set of access nodes 220 through upstream channels 1606. The m output ports transmit data to a respective set of access nodes 220 through downstream channels 1686. For a rotator along a diagonal of matrix 1400 of rotators, i.e., a rotator positioned in a column j and a row j, $0 \leq j < \mu$, channels 1606 receive data from a set of m access nodes and channels 1686 transmit data to the same set of m access nodes 220. For a rotator positioned in a column j and a row k, where k≠j, channels 1606 receive data from a respective first set of m access nodes and channels 1686 transmit data to a respective second set of m access nodes 220, where the first set and the second set are disjoint, i.e., not having any access node in common. A rotation mechanism 1620 cyclically transfers data from the input ports and the control inlet to the output ports and the control outlet.

A timing circuit 1650 receives timing data from a set of access nodes 220 connecting to input ports 1610 through the input ports 1610, the rotation mechanism, and control outlet 1632. The timing circuit 1650 transmits timing data to a set of access nodes 220 connecting to output ports 1630 through control inlet 1612, the rotation mechanism, and output ports 1630. Timing circuit 1650 is coupled to a master time indicator 1660. Timing circuit 1650 comprises a processor and a memory device storing processor-executable instructions which cause the processor to perform processes relevant to comparing timing data received from an access node with corresponding time indications of master time indicator 1660 and reporting any discrepancy to the access node.

Upstream channels 1606 from a first set of access nodes 220 and downstream channels 1686 to a second set of access nodes may be routed individually if the rotation mechanism is collocated with the first set and second set of access nodes. In a geographically distributed switching system, upstream channels 1606 may occupy different spectral bands in an upstream WDM link 1602 and a spectral demultiplexer 1604 separates the spectral bands to be directed to different input ports of the rotation mechanism 1620. Downstream channels 1686 from different output ports of the rotation mechanism may occupy different spectral bands and a spectral multiplexer 1684 combines the spectral bands onto in a downstream WDM link 1682. While FIG. 16 illustrates one upstream WDM link 1602, one spectral demultiplexer 1604, one spectral multiplexer 1684, and one downstream WDM link 1682, the spectral demultiplexer 1604 may be implemented as multiple spectral demultiplexers, and the upstream WDM link may be implemented as multiple upstream WDM links each connected to a respective spectral demultiplexer. Likewise, the spectral multiplexer 1684 may be implemented as multiple spectral multiplexers each combining a respective number of spectral bands onto a respective downstream WDM link.

Figure 17:
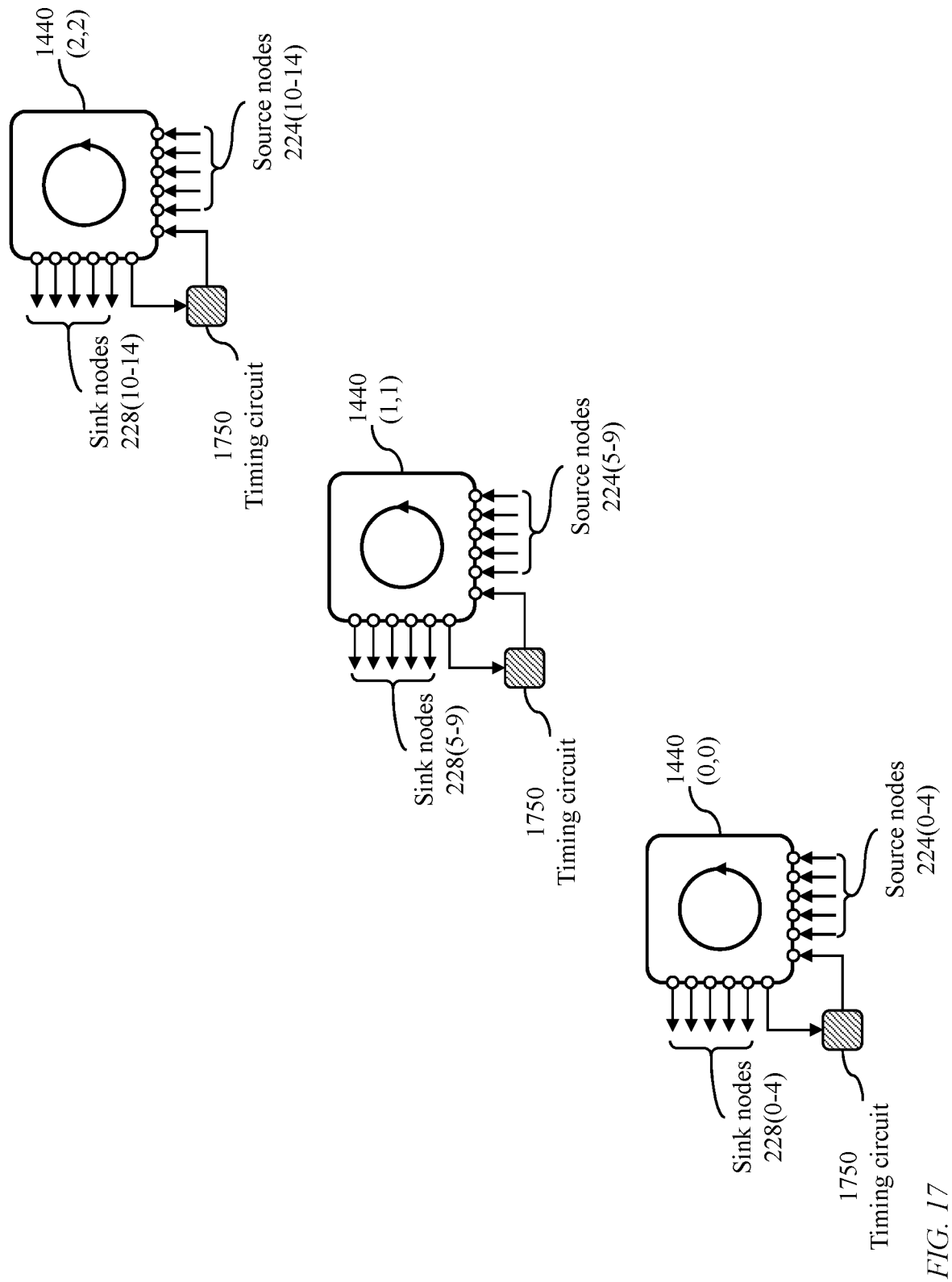
FIG. 17 illustrates diagonal rotators each of which connecting to a respective set of access nodes, where each access node combines a source node and a sink node.

FIG. 17 illustrates diagonal rotators 1440(j, j), $0 \leq j < \mu$, along a diagonal of the matrix of rotators of FIG. 14. Each access node which connects to an input port of a rotator 1440(j,k), where j=k, also connects to an output port of the same rotator. Thus, where an access node connects to a rotator 1440(j,j), there is a return path from the access node to itself through the same rotator 1440(j,j). In the configuration of FIG. 14 and FIG. 15, each source node 224 has a path to each sink node 228 through one of the rotators 1440. Thus, when a source node 224 and a sink node 228 of a same access node connect to different rotators, a return path from an access node to itself can be realized through any intermediate access node. However, it is preferable that such a return control path be created without the need to traverse an intermediate access node. This can be realized by collocating a rotator 1440(j, k) with a rotator 1440(k, j), where j≠k, $0 \leq j < \mu$, $0 \leq k < \mu$, where j and k are indices of a column and a row, respectively, of the matrix of rotators.

Rotator 1440(0,0) cyclically connects source nodes 224 of indices 0-4 to sink nodes 228 of indices 0-4. Rotator 1440(1,1) cyclically connects source nodes 224 of indices 5-9 to sink nodes 228 of indices 5-9. Rotator 1440(2,2) cyclically connects source nodes 224 of indices 10-14 to sink nodes 228 of indices 10-14.

Figure 18:
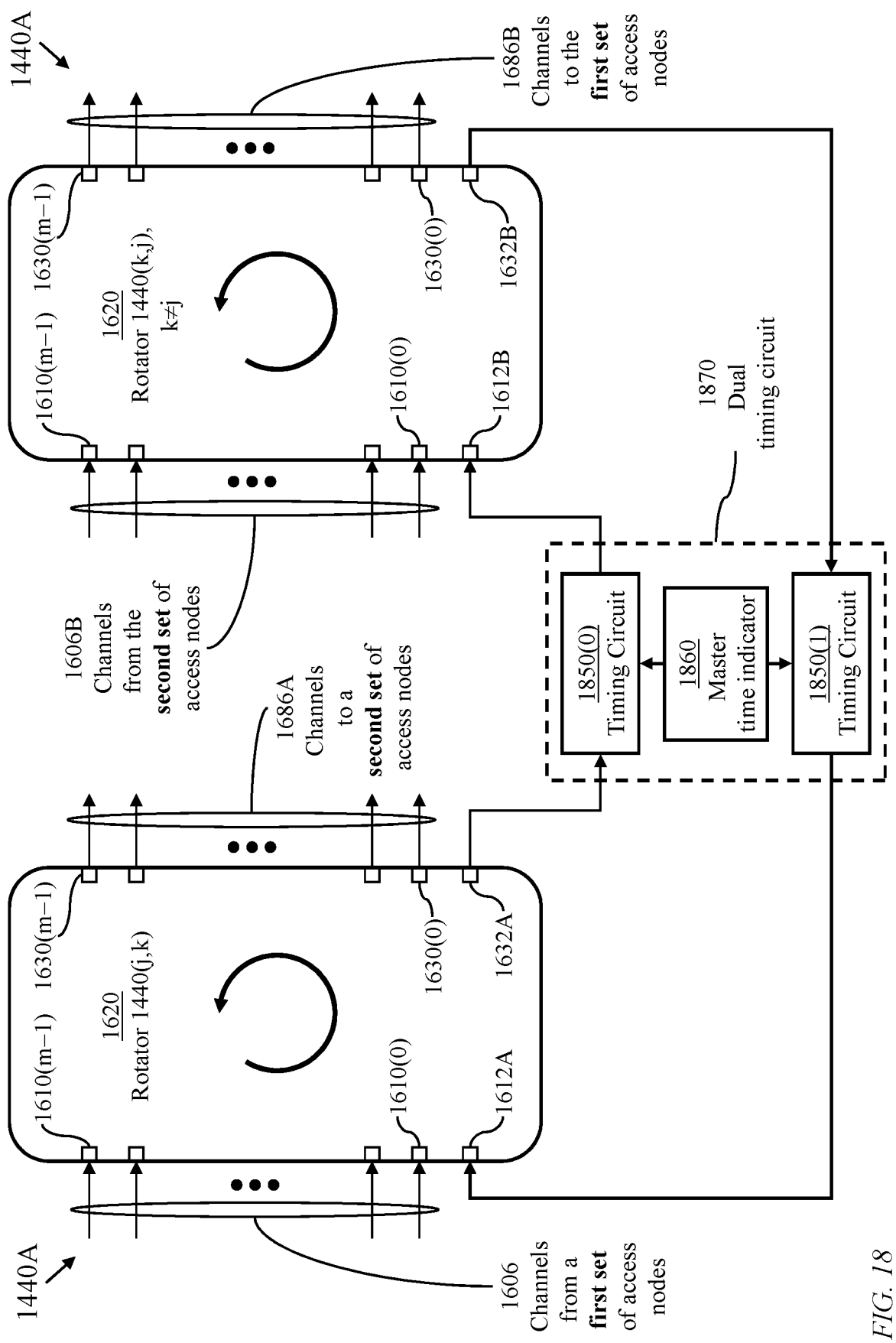
FIG. 18 illustrates coupling of timing circuits to rotators of any complementary rotator pair, in accordance with an embodiment of the present invention.

FIG. 18 illustrates coupling a dual timing circuit 1870 to a diagonal rotator pair. (a complementary rotator pair). The dual timing circuit 1870 comprises constituent timing circuits 1850(0) and 1850(1), both coupled to a master time indicator 1860. Timing circuit 1850(0) compares timing data received from input channels 1606A of rotator 1440(j,k), demultiplexed from an upstream WDM link, with corresponding readings of master time indicator 1860 and sends a result of the comparison from control inlet 1612B to output channels 1686B of rotator 1440(k,j), which are multiplexed over a downstream WDM link. Likewise, timing circuit 1850(1) compares timing data received from input channels 1606B of rotator 1440(k,j) with corresponding readings of the master time indicator 1860 and sends a result of the comparison from control inlet 1612A to output channels 1686A of rotator 1440(j,k).

As defined earlier, a rotator of column j and row j, $0 \leq j < \mu$, in a matrix of rotators having μ columns and μ rows, μ>2, is referenced as a diagonal rotator, the columns being indexed as 0 to (μ−1) and the rows being indexed as 0 to (μ−1). A diagonal pair of rotators comprises a rotator of column j and row k and a rotator of column k and row j, j≠k, of the matrix of rotators.

Each diagonal rotator is coupled to a timing circuit coupled to a control outlet and a control inlet of the same diagonal rotator. The timing circuit is coupled to a respective master time indicator and is configured to receive timing data from external sources and return information relevant to any discrepancy of received timing data from corresponding readings of the master time indicator.

Thus, the switching system of FIG. 14 and FIG. 15 comprises a plurality of rotators 1440 arranged in a matrix of a number of columns and the same number of rows, wherein a first rotator 1440A and a second rotator 1440B of each diagonal pair of rotators (FIG. 18) are collocated. Each rotator 1440 comprises a number m of input ports 1610, m output ports 1630, m>2, a control inlet 1612, a control outlet 1632, and a rotating mechanism 1620. Each access node is communicatively coupled to an input port 1610 of each rotator 1440 of a respective row, and an output port 1630 of each rotator 1440 of a respective column of the matrix of rotators.

A first timing circuit 1850(0) connects to a control outlet 1632A of the first rotator 1440A and a control inlet 1612B of the second rotator. A second timing circuit 1850(1) connects to a control outlet 1632B of the second rotator 1440B and a control inlet 1612A of the first rotator. A master time indicator 1860 provides reference time to the first timing circuit 1850(0) and the second timing circuit 1850(1).

Figure 19:
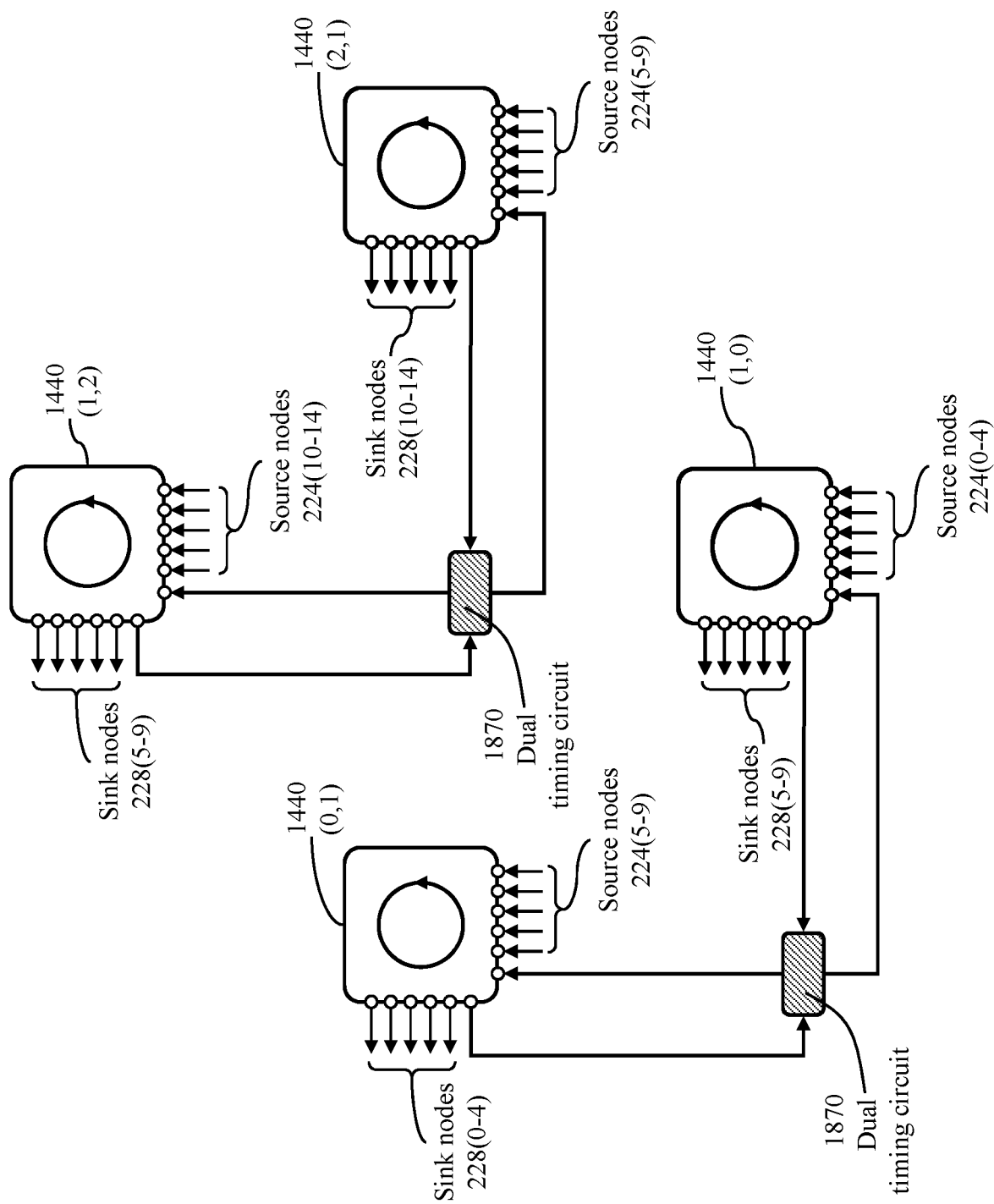
FIG. 19 illustrates rotator pairs each connecting to a respective dual timing circuit where, for each rotator pair, source nodes of a respective first set of access nodes and sink nodes of a respective second set of access nodes connect to one of the rotators while source nodes of the respective second set of access nodes and sink nodes of the respective first set of access nodes connect to the other rotator of the each rotator pair, in accordance with an embodiment of the present invention.
Figure 20:
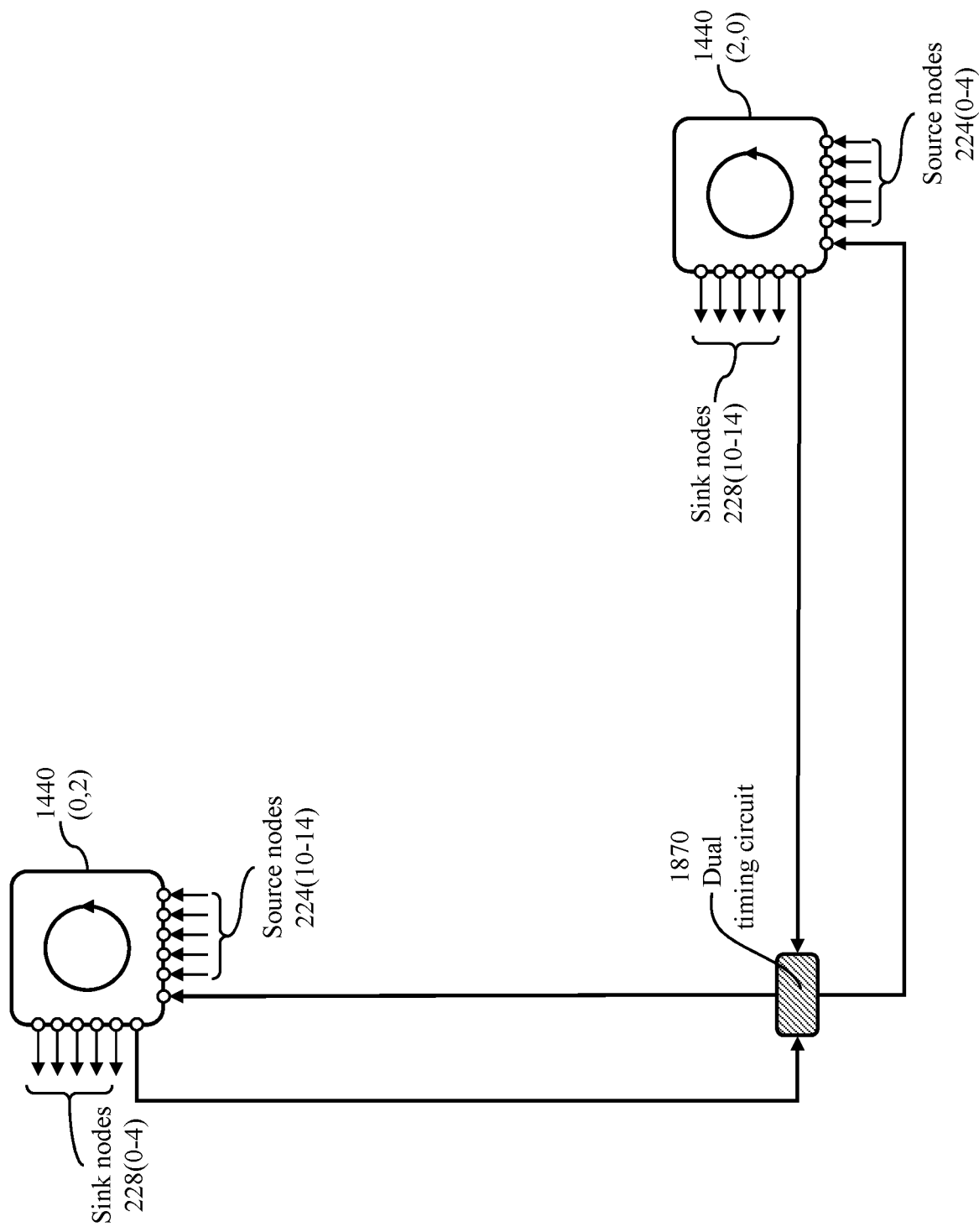
FIG. 20 illustrates a rotator pair connecting to a respective dual timing circuit where the connectivity of the rotator pair to source nodes and sink nodes is analogous to the connectivity of FIG. 19.

FIG. 19 and FIG. 20 illustrate rotator pairs each connecting to a respective set of source nodes and a respective set of sink nodes where, for each rotator pair, source nodes of a respective first set of access nodes and sink nodes of a respective second set of access nodes connect to one of the rotators while source nodes of the respective second set of access nodes and sink nodes of the respective first set of access nodes connect to the other rotator of the each rotator pair. The rotator-pair connectivity illustrated in FIG. 19 and FIG. 20 are analogous to the switch-pair connectivity of FIG. 12 and FIG. 13, respectively. Rotators 1440(j, k) and 1440(k,j), k≠j, are preferably collocated to exchange timing data using a dual timing circuit 1870 illustrated in FIG. 18.

Rotator 1440(1,0) transfers data from source nodes 224 of indices 0-4 to sink nodes 228 of indices 5-9 while rotator 1440(0,1) transfers data from source nodes 224 of indices 5-9 to sink nodes 228 of indices 0-4. Rotator 1440(2,1) transfers data from source nodes 224 of indices 5-9 to sink nodes 228 of indices 10-14 while rotator 1440(1,2) transfers data from source nodes 224 of indices 10-14 to sink nodes 228 of indices 5-9. Rotator 1440(2,0) transfers data from source nodes 224 of indices 0-4 to sink nodes 228 of indices 10-14 while rotator 1440(0,2) transfers data from source nodes 224 of indices 10-14 to sink nodes 228 of indices 0-4.

Rotators 1440(1,0) and 1440(0,1) form a diagonal rotator pair and with the connectivity scheme of FIGS. 14 and 15, the two rotators also form a complementary rotator pair. Likewise, rotators 1440(2,1) and 1440(1,2) form a diagonal rotator pair which is also a complementary rotator pair. Rotators 1440(2,0) and 1440(0,2) form a diagonal rotator pair which is also a complementary rotator pair.

Thus, the invention provides a switching system 1400 comprising a plurality of rotators 1440 interconnecting a plurality of access nodes 220, each access node comprising a source-node component 224 and a sink-node component 228. Each rotator 1440 comprises a number of input ports 1610 and a same number of output ports 1630. The rotators are logically arranged in a matrix of μ columns and μ rows; μ=3 in the configuration of FIG. 14 and FIG. 15. Each access node 220 connects to an input port 1610 of each rotator 1440 of a respective row and an output port 1630 of each rotator of a respective column.

To facilitate temporal alignment of data received at input ports 1610 of each rotator 1440, a diagonal rotator pair, as illustrated in FIG. 18, FIG. 19, and FIG. 20, is coupled to a respective dual timing circuit 1870 configured to directly exchange timing data with each access node connecting to the diagonal rotator pair. With the μ columns indexed as 0 to (μ−1) and the μ rows indexed as 0 to (μ−1), a rotator of column j and row k together with a rotator of column k and row j, 0≤j<μ, 0≤k<μ, j≠k, form a diagonal rotator pair. With the above connectivity pattern, the switching system provides a path from each access node 220 to each other access node 220 that traverses only one rotator.

Each diagonal rotator, i.e., a rotator belonging to column j and row j, 0≤j<μ, is coupled to a respective single timing circuit 1750 connected to a respective master time indicator. The timing circuit of a diagonal rotator comprises a processor configured to directly exchange timing data with each access node connecting to the diagonal rotator. The single timing circuit is configured to receive timing data from any input port of the diagonal rotator and communicate a corresponding time indication of the master time indicator to a corresponding output port of the diagonal rotator.

A dual timing circuit 1870 of a diagonal rotator pair comprises two constituent timing circuits 1850(0) and 1850(1), both coupled to a master time indicator 1860. A first timing circuit 1850(0) connects to a control outlet 1632A of a first rotator 1440(j,k) of a diagonal rotator pair and a control inlet 1612B of a second rotator 1440(k,j) of the diagonal rotator pair. A second timing circuit 1850(1) connects to a control outlet 1632B of the second rotator and a control inlet 1612A of the first rotator. The first timing circuit is configured to receive timing data from any input port 1610 of the first rotator and communicate a corresponding time indication of the master time indicator to a corresponding output port 1630 of the second rotator. The second timing circuit is configured to receive timing data from any input port 1610 of the second rotator and communicate a corresponding time indication of the master time indicator to a corresponding output port 1630 of the first rotator.

According to an embodiment, the switching system comprises at least one spectral demultiplexer 1604 preceding each rotator and at least one spectral multiplexer 1684 succeeding each rotator. A spectral demultiplexer directs individual spectral bands from a respective upstream wavelength-division-multiplexed link 1602 to respective input ports 1610 of a rotator. A spectral multiplexer 1684 combines spectral bands from respective output ports 1630 of a rotator onto a respective downstream wavelength-division-multiplexed link 1682.

A plurality of upstream spectral routers 2125 connects the source-node components 224 of a plurality of access nodes 220 to a plurality of rotators and a plurality of downstream spectral routers 2245 connects the plurality of rotators to the plurality of access nodes. Each upstream spectral router connects a set of input WDM links originating from a respective set of access nodes to a set of output WDM links each terminating on one rotator of the plurality of rotators. Each output WDM link carries a spectral band from each input WDM link of a respective set of input WDM links. Each downstream spectral router connects a set of input WDM links each originating from a respective rotator to a set of output WDM links each terminating on a single access node with each output WDM link carrying a spectral band from each input WDM link connecting to the downstream spectral router.

Connectivity of Access Nodes to Distributors

Figure 21:
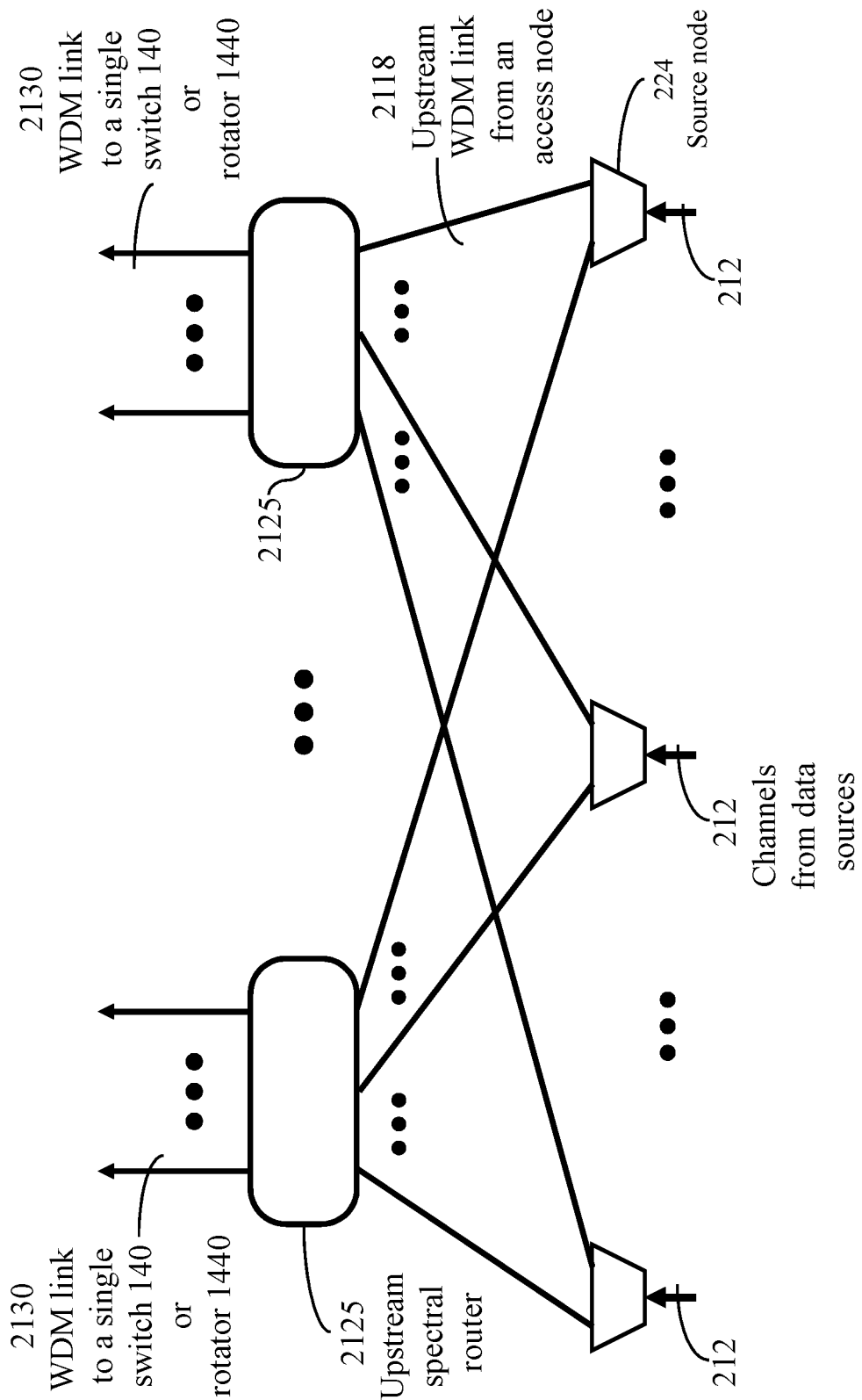
FIG. 21 illustrates connection of source nodes to switches or rotators through upstream spectral routers.

FIG. 21 illustrates connection of a set of source nodes 224 (a set of access nodes 220) to distributors 140 (switches or rotators) through a respective set of upstream spectral routers 2125. Each source node 224 of the set of source nodes has an upstream WDM link 2118 to each upstream spectral router 2125 of the respective set of upstream spectral routers. Each upstream spectral router receives optical signals through an upstream WDM link 2118 from each source node 224 of the set of source nodes and directs individual spectral bands from each upstream WDM link 2118 connecting to the upstream spectral router to each output WDM link 2130 connecting to the upstream spectral router. Each output WDM link 2130 is directed to a respective distributor 140. Thus, each distributor 140 (switch or rotator) receives a spectral band from each source node 224 of the set of source nodes. Each source node 224 receives data from data sources through channels 212 as illustrated in FIG. 2.

Figure 22:
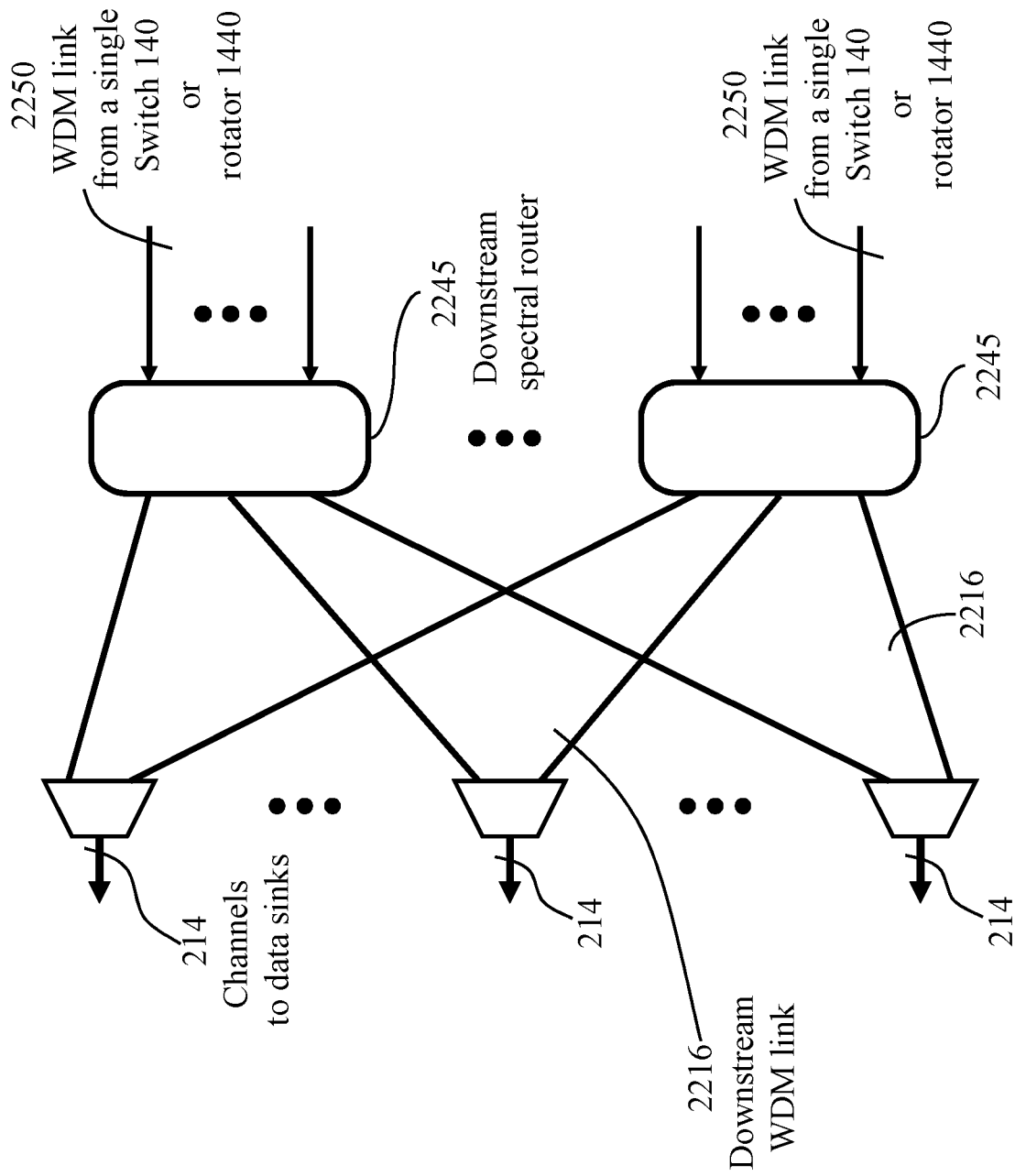
FIG. 22 illustrates connection of switches or rotators to sink nodes, through downstream spectral routers.

FIG. 22 illustrates connection of distributors 140 to a set of sink nodes 228 (a set of access nodes 220) through a respective set of downstream spectral routers 2245. Each sink node 228 of the set of sink nodes connects to a downstream WDM link 2216 from each downstream spectral router 2245 of the respective set of downstream spectral routers. Each downstream spectral router receives optical signals from a set of distributors 140 (switches or rotators) through input WDM links 2250 and directs individual spectral bands of each input WDM link 2250 to each sink node 228 of the set of sink nodes through a respective downstream WDM link 2116. Thus, each sink node 228 of the set of sink nodes receives a spectral band from each input WDM link 2250. Each sink node 228 transmits data to data sinks through channels 214 as illustrated in FIG. 2.

Eliminating the Need for Spectral Routers

As described above with reference to FIG. 21 and FIG. 22, the connectivity scheme of access nodes to switches or rotators, where the access nodes are geographically distributed and the switches or rotators are geographically distributed, relies on use of intermediate spectral routers. Each access node is coupled to an upstream WDM link to each of a respective set of upstream spectral routers and a downstream WDM link from each of a respective set of downstream spectral routers. To eliminate the need for upstream and downstream spectral routers, the distributors 140 may be arranged into constellations of collocated distributors. Preferably, the distributors of each constellation are logically arranged in a matrix and the entire plurality of distributors 140 (switches or rotators) is arranged in a matrix of constellations. Each source node 224 may connect to each constellation of a respective row of the matrix of constellations through an upstream WDM link. Each sink node 228 may connect to each constellation of a respective column of the matrix of constellations through a downstream WDM link.

Figure 23:
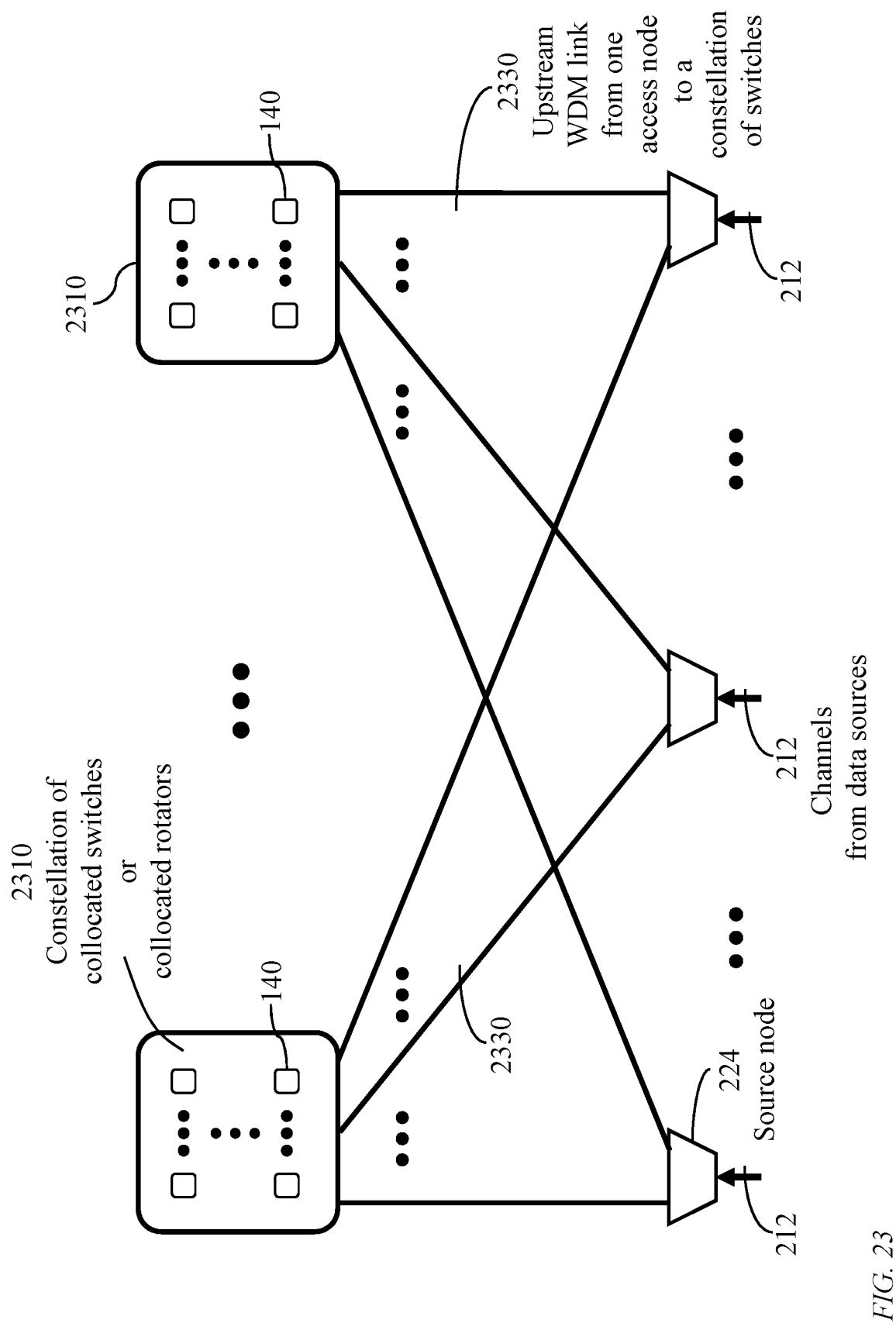
FIG. 23 illustrates direct connection, through upstream wavelength-division-multiplexed links (WDM links), of source nodes to a number of constellations of switches or rotators, in accordance with an embodiment of the present invention.

FIG. 23 illustrates direct connection, through upstream WDM links 2330, of source nodes 224 (of access nodes 220) to constellations 2310 of distributors belonging to a row of a matrix of constellations. As illustrated, each constellation 2310 comprises a respective set of distributors 140.

Figure 24:
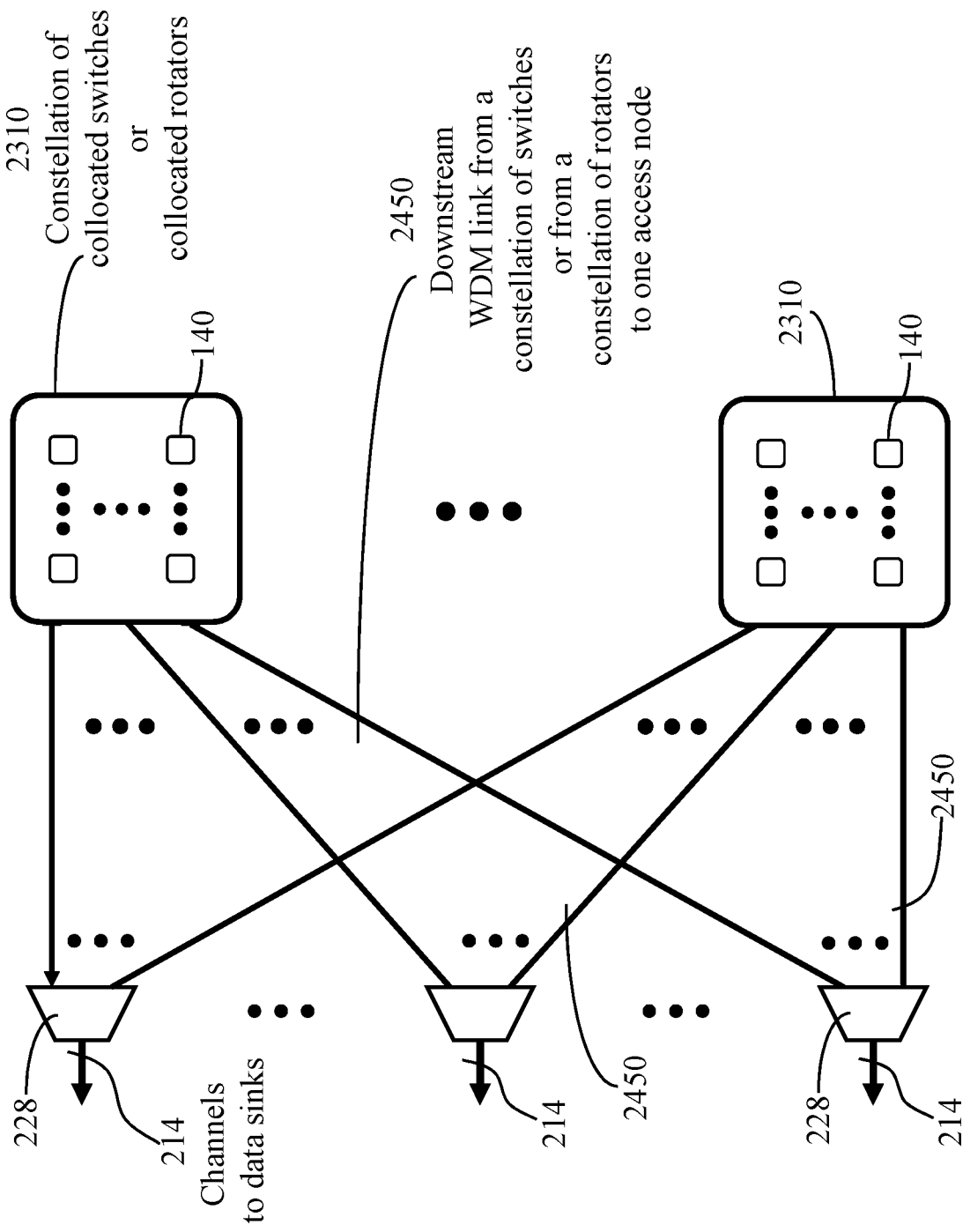
FIG. 24 illustrates connection of constellations of switches or rotators to sink nodes through downstream WDM links, in accordance with an embodiment of the present invention.

FIG. 24 illustrates connection of constellations 2310 of distributors belonging to a column of a matrix of constellations to sink nodes 228 (of access nodes 220) through downstream WDM links 2450.

WDM Linkage of Access Nodes to Distributors

In the exemplary switching system of FIG. 25 to FIG. 30, distributors (switches or rotators) 2540 are arranged in a matrix having six columns and six rows ($\mu$=6). Each distributor has four input ports, four output ports (m=4), a control inlet, and a control outlet.

Figure 25:
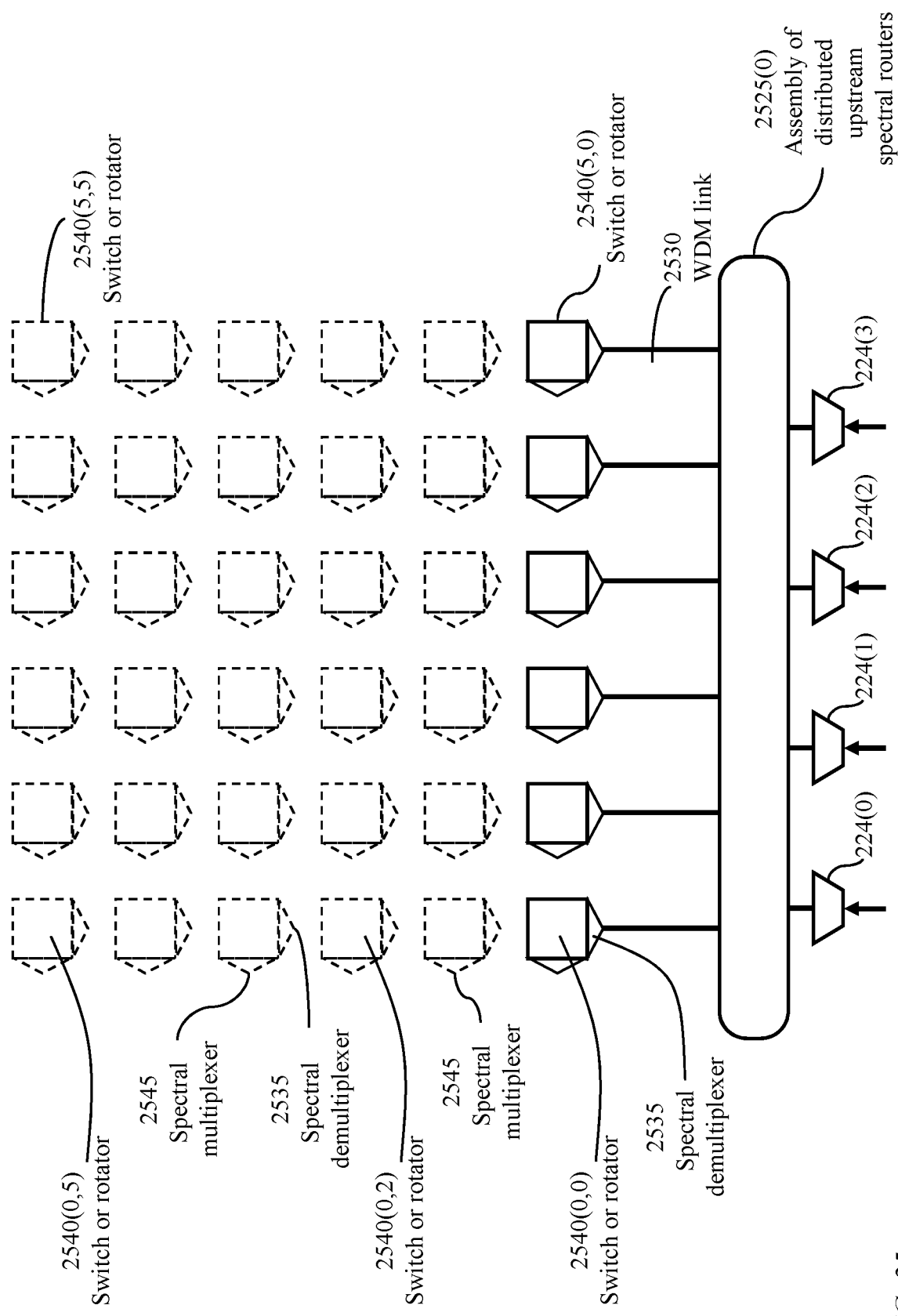
FIG. 25 illustrates upstream connections from a subset of access nodes to switches or rotators through an assembly of upstream spectral routers.
Figure 26:
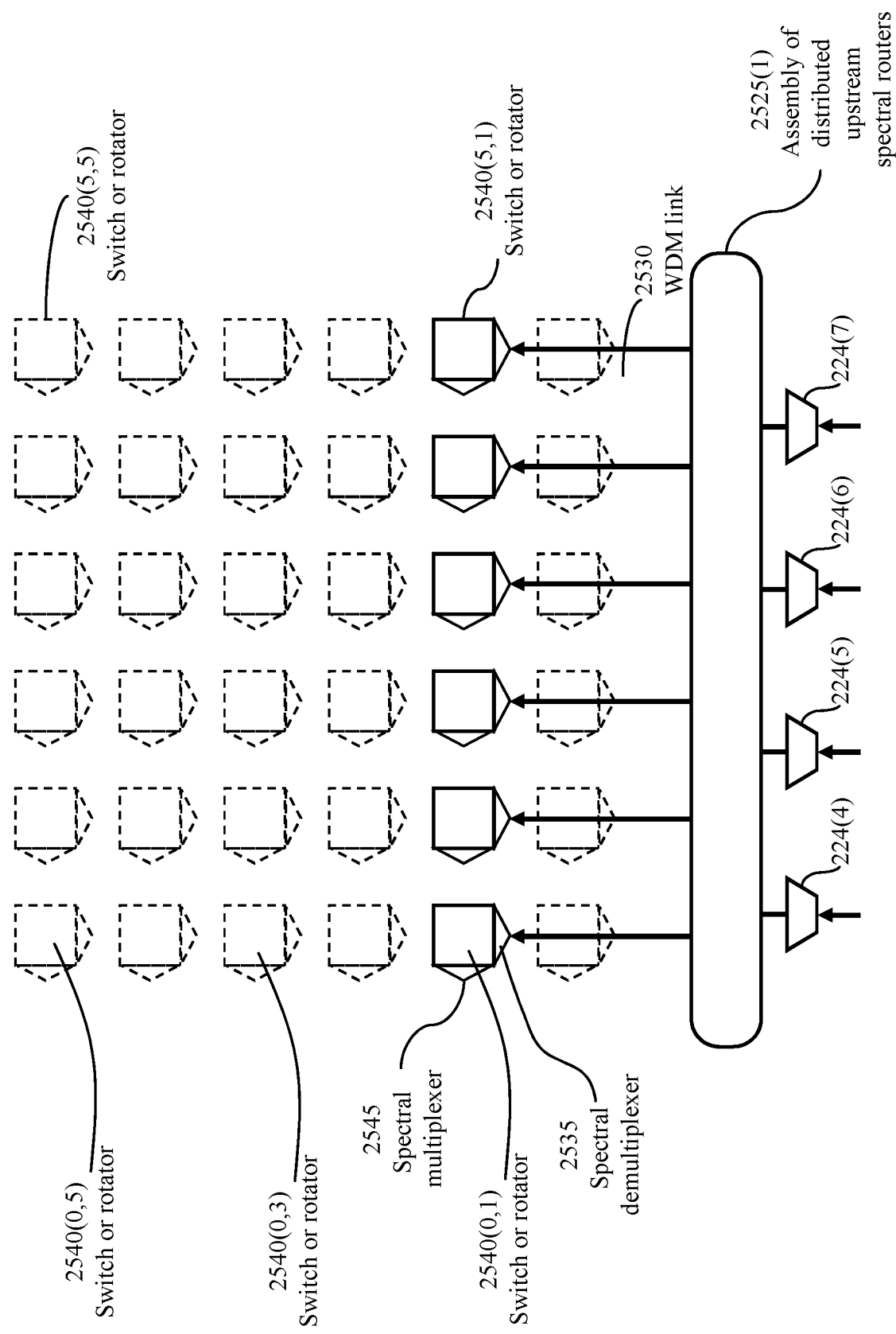
FIG. 26 illustrates upstream connections from another subset of access nodes to switches or rotators through an assembly of upstream spectral routers.
Figure 27:
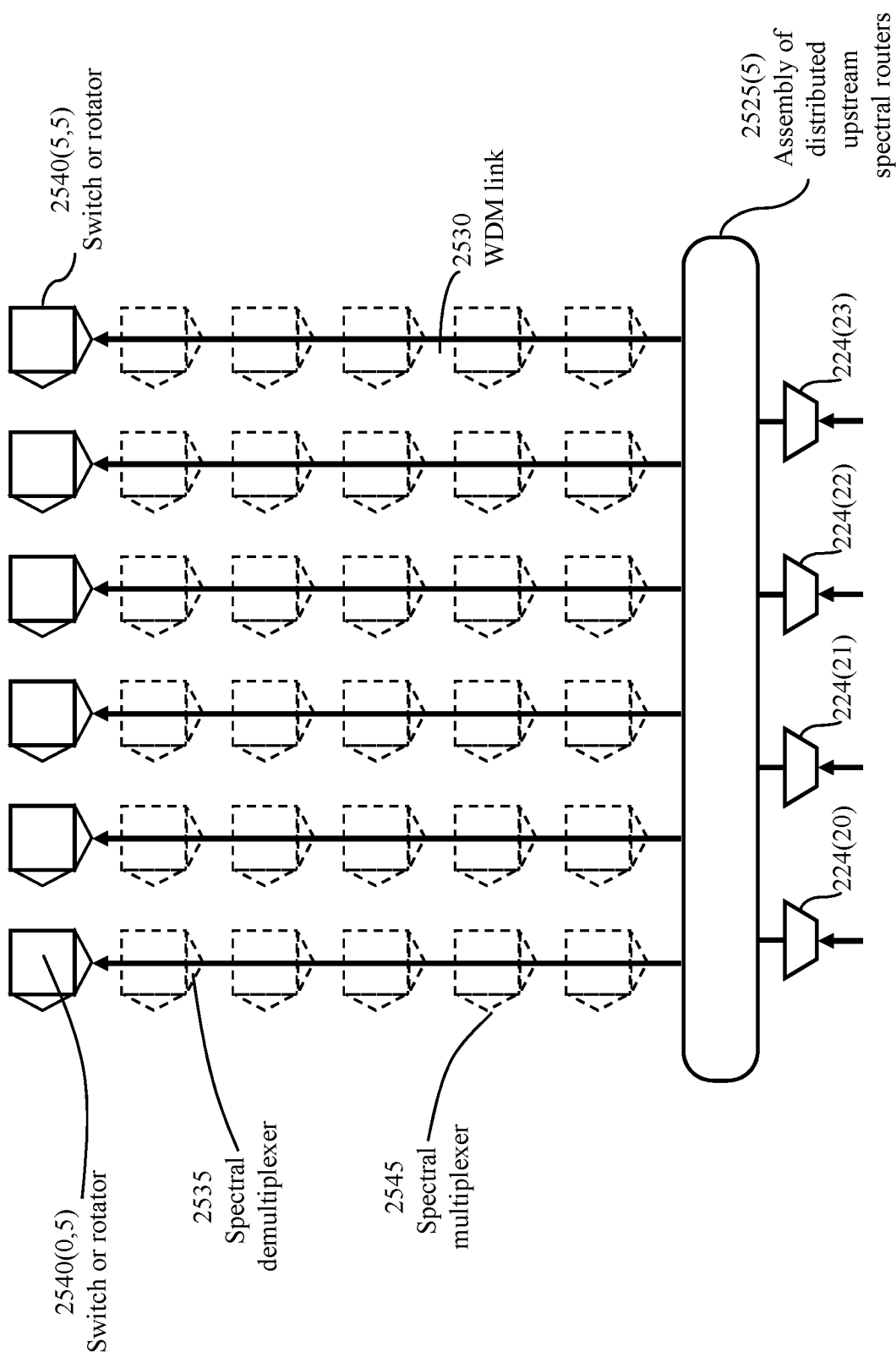
FIG. 27 illustrates upstream connections from a further subset of access nodes to switches or rotators through an assembly of upstream spectral routers.

FIG. 25, FIG. 26, and FIG. 27 illustrate upstream connections from source nodes 224 (of access nodes 220) to distributors 2540 through an assembly 2525 of upstream spectral routers. Each distributor is coupled to a spectral demultiplexer 2535 at input and a spectral multiplexer 2545 at output. Assembly 2525 of upstream spectral routers connects a set of four source nodes 224 to six spectral demultiplexers 2535 each preceding a distributor of a row of the matrix of distributors 2540. A WDM link 2530 at input of each spectral demultiplexer 2535 carries a spectral band from each of the four source nodes 224.

FIG. 25 illustrates connectivity of a set of source nodes 224(0), 224(1), 224(2), and 224(3) to a row of spectral demultiplexers preceding a first row of distributors of the matrix of distributors. FIG. 26 illustrates connectivity of a set of source nodes 224(4), 224(5), 224(6), and 224(7) to a row of spectral demultiplexers preceding a second row of distributors. FIG. 27 illustrates connectivity of a set of source nodes 224(20), 224(21), 224(22), and 224(23) to a row of spectral demultiplexers preceding the last row of distributors of the matrix of distributors.

Figure 28:
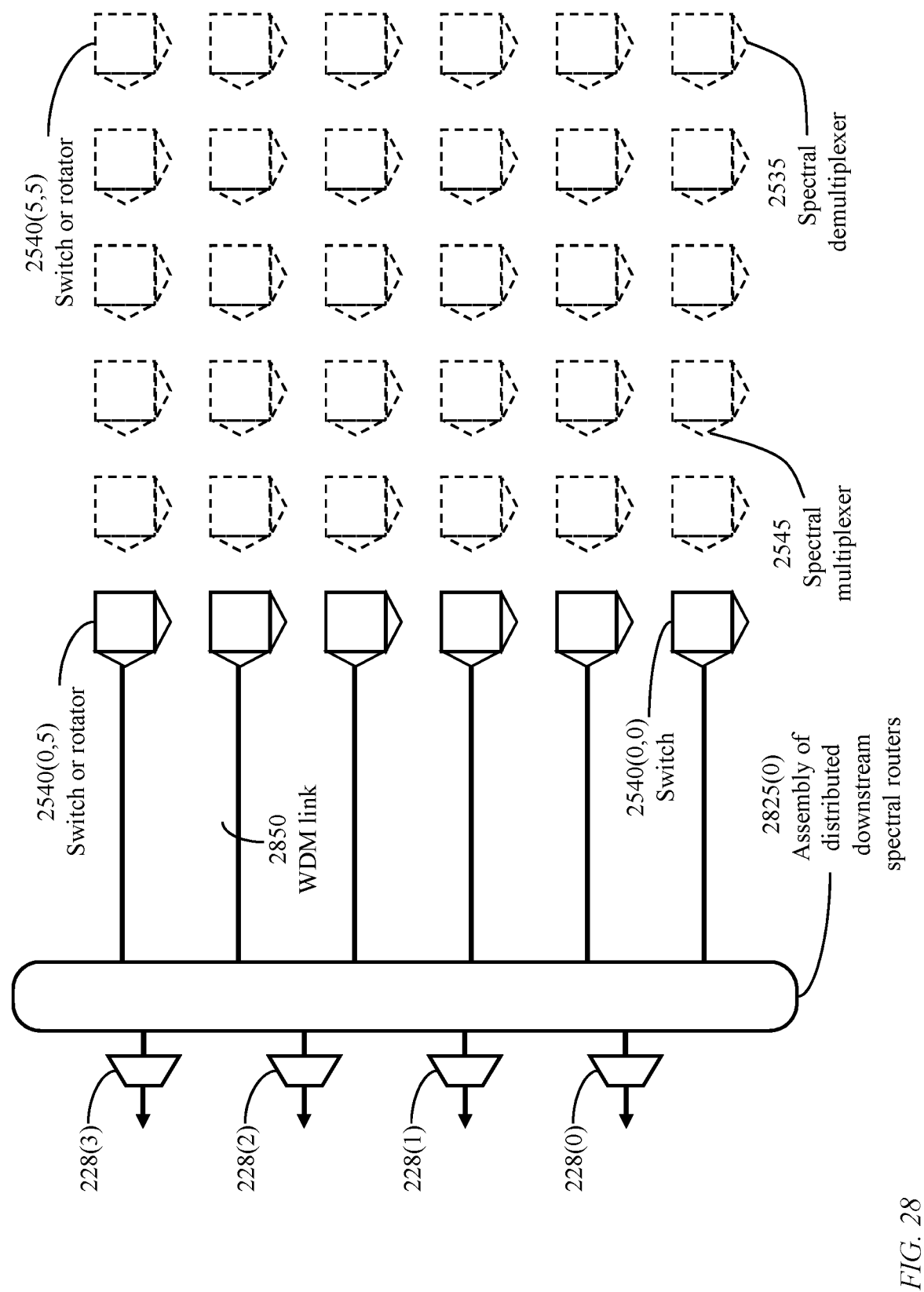
FIG. 28 illustrates downstream connections from switches or rotators to a subset of access nodes through an assembly of downstream spectral routers.
Figure 29:
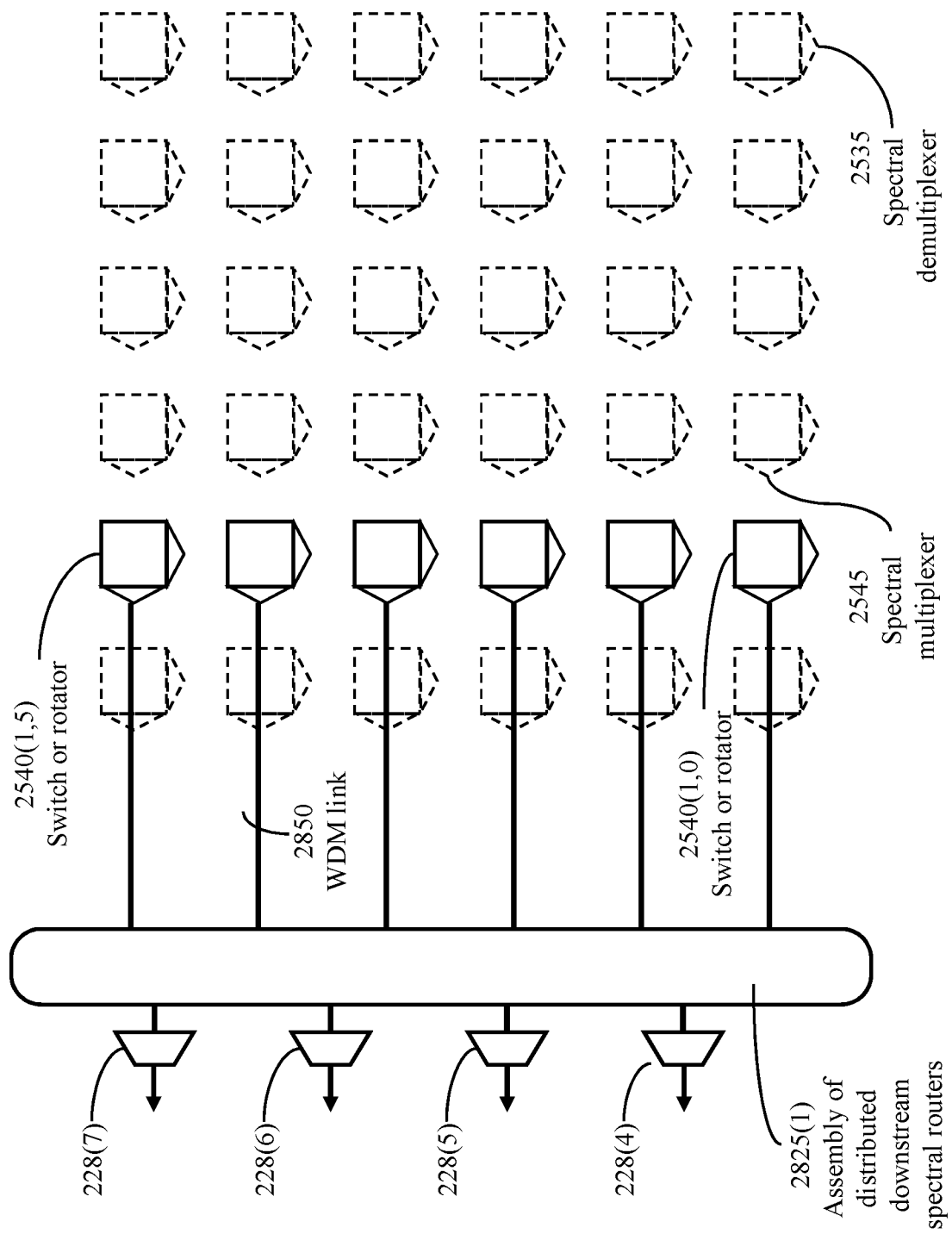
FIG. 29 illustrates downstream connections from switches or rotators to another subset of access nodes through an assembly of downstream spectral routers.
Figure 30:
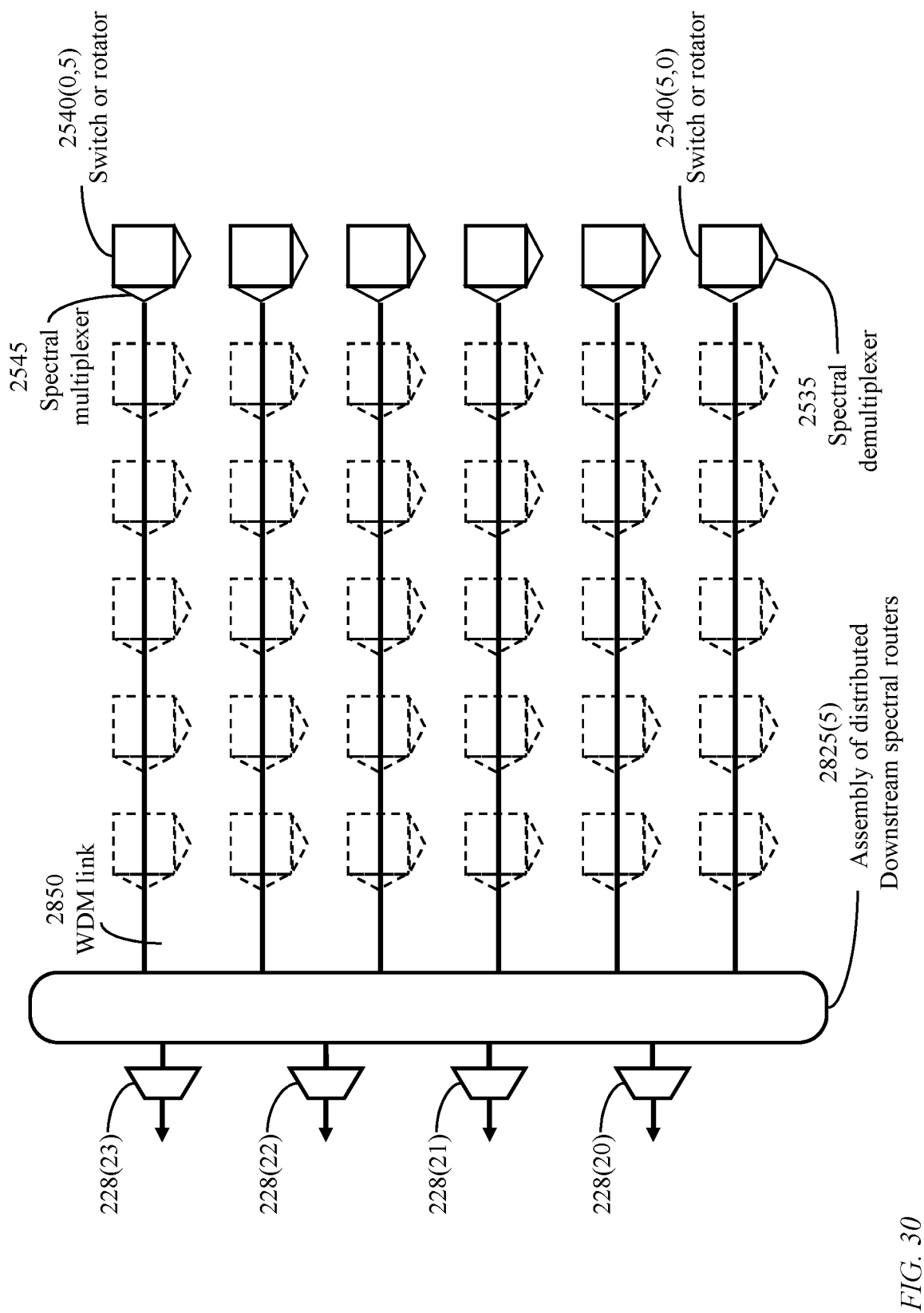
FIG. 30 illustrates downstream connections from switches or rotators to a further subset of access nodes through an assembly of downstream spectral routers.

FIG. 28, FIG. 29, and FIG. 30 illustrate downstream connections from distributors 2540 to sink nodes 228 (of access nodes 220) through an assembly 2825 of downstream spectral routers. Assembly 2825 of downstream spectral routers connects six spectral multiplexers 2545 each succeeding a distributor of a column of the matrix of distributors 2540 to a set of four sink nodes 228. A WDM link 2850 at output of each spectral multiplexer 2545 carries a spectral band to each of the four sink nodes 228.

FIG. 28 illustrates connectivity of a column of spectral multiplexers succeeding a first column of distributors of the matrix of distributors to a set of sink nodes 228(0), 228(1), 228(2), and 228(3). FIG. 29 illustrates connectivity of a column of spectral multiplexers succeeding a second column of distributors to a set of sink nodes 228(4), 228(5), 228(6), and 228(7). FIG. 30 illustrates connectivity of a column of spectral multiplexers succeeding the last column of distributors of the matrix of distributors to a set of sink nodes 228(20), 228(21), 228(22), and 228(23).

Source nodes 224 of indices $\{j \times m\}$ to $\{(j+1) \times m-1\}$ connect to distributors 2540 of a row of index j through an assembly 2525(j), $0 \le j < \mu$, of upstream spectral routers. For j=0, FIG. 25 illustrates source nodes 2520 of indices 0 to 3 $\{0$ to m-1$\}$ connecting through assembly 2525(0) of upstream spectral routers to distributors 2540 of a row of index 0 of the matrix of distributors 2540. For j=1, FIG. 26 illustrates source nodes 2520 of indices 4 to 7 $\{m$ to $2 \times m-1\}$ connecting through assembly 2525(1) of upstream spectral routers to distributors 2540 of a row of index 1 of the matrix of distributors 2540. For j=$\mu$-1, $\mu$=6, FIG. 27 illustrates source nodes 2520 of indices 20 to 23 $\{(\mu-1) \times m$ to $\mu \times m-1)\}$ connecting through assembly 2525($\mu$-1) of upstream spectral routers to distributors 2540 of a row of index ($\mu$-1) of the matrix of distributors 2540.

Distributors 2540 of a column of index j connect to sink nodes of indices $\{j \times m\}$ to $\{(j+1) \times m-1\}$ through an assembly 2825(j), $0 \le j < \mu$, of downstream spectral routers. For j=0, FIG. 28 illustrates distributors 2540 of a column of index 0 of the matrix of distributors 2540 connecting to sink nodes 228 of indices 0 to 3 $\{0$ to m-1$\}$ through assembly 2825(0) of downstream spectral routers. For j=1, FIG. 29 illustrates distributors 2540 of a column of index 1 of the matrix of distributors 2540 connecting to sink nodes 228 of indices 4 to 7 $\{m$ to $2 \times m-1\}$ through assembly 2825(1) of downstream spectral routers. For j=$\mu$-1, FIG. 30 illustrates distributors 2540 of a column of index ($\mu$-1), $\mu$=6, of the matrix of distributors 2540 connecting to sink nodes 228 of indices 20 to 23 $\{(\mu-1) \times m$ to $\mu \times m-1)\}$ through assembly 2825($\mu$-1) of downstream spectral routers ($\mu$=6).

Figure 31:
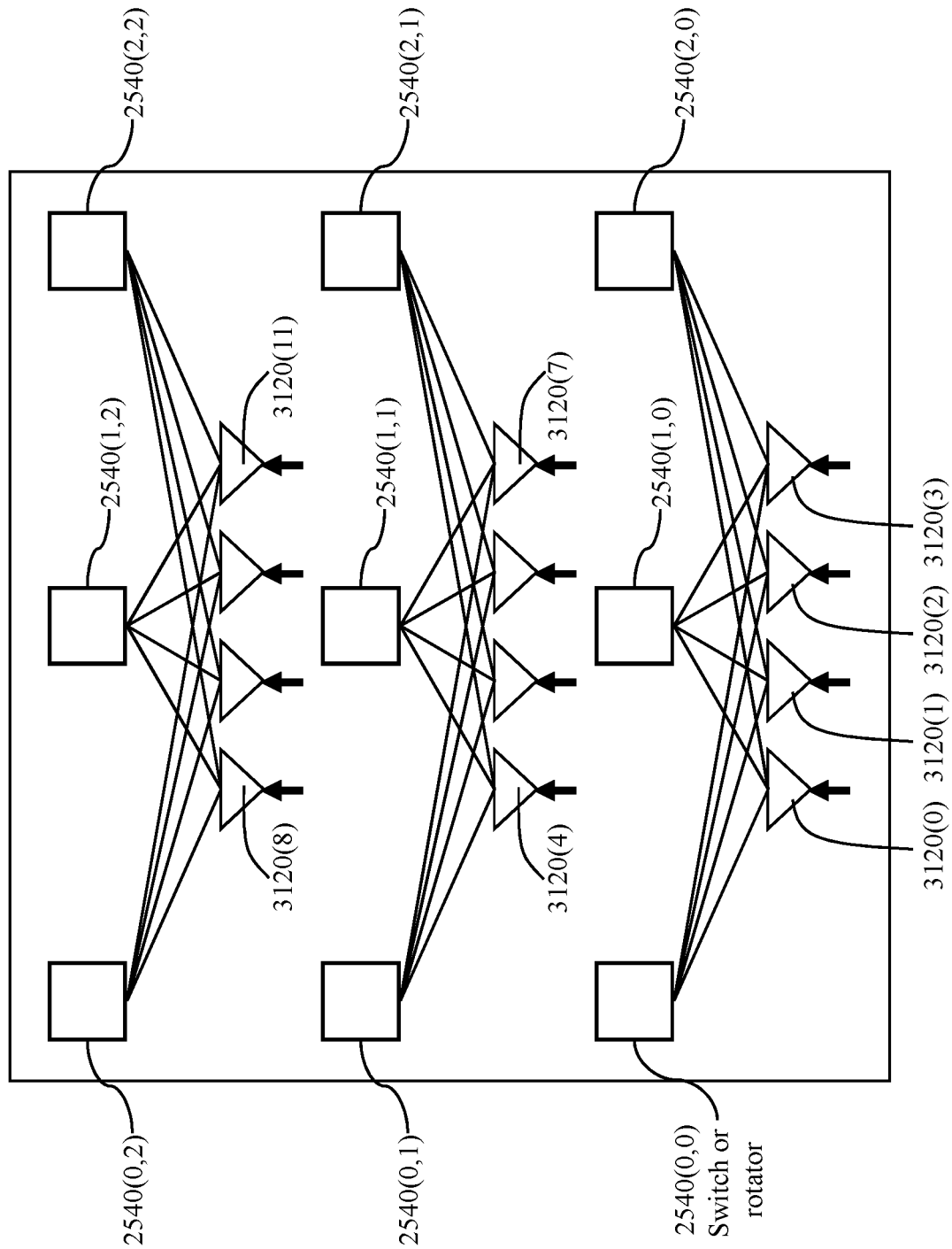
FIG. 31 illustrates a constellation of collocated switches or rotators indicating collocated spectral demultiplexers, each spectral demultiplexer separating spectral bands from a WDM link originating from a respective access node.

FIG. 31 illustrates a constellation of collocated distributors 2540 indicating collocated spectral demultiplexers 3120, each spectral demultiplexer separating spectral bands from an upstream WDM link originating from a respective source node 224 (a respective access node 220). Each spectral demultiplexer receives data from a single access node 220 (a single source node 224) through an upstream WDM link. Spectral demultiplexers 3120(0) to 3120(3) coupled to the first row of distributors of the constellation connect to upstream WDM links from access nodes 220(0) to 220(3). Spectral demultiplexers 3120(4) to 3120(7) coupled to the second row of distributors of the constellation connect to upstream WDM links from access nodes 220(4) to 220(7). Spectral demultiplexers 3120(8) to 3120(11) coupled to the third row of distributors of the constellation connect to upstream WDM links from access nodes 220(8) to 220(11).

Figure 32:
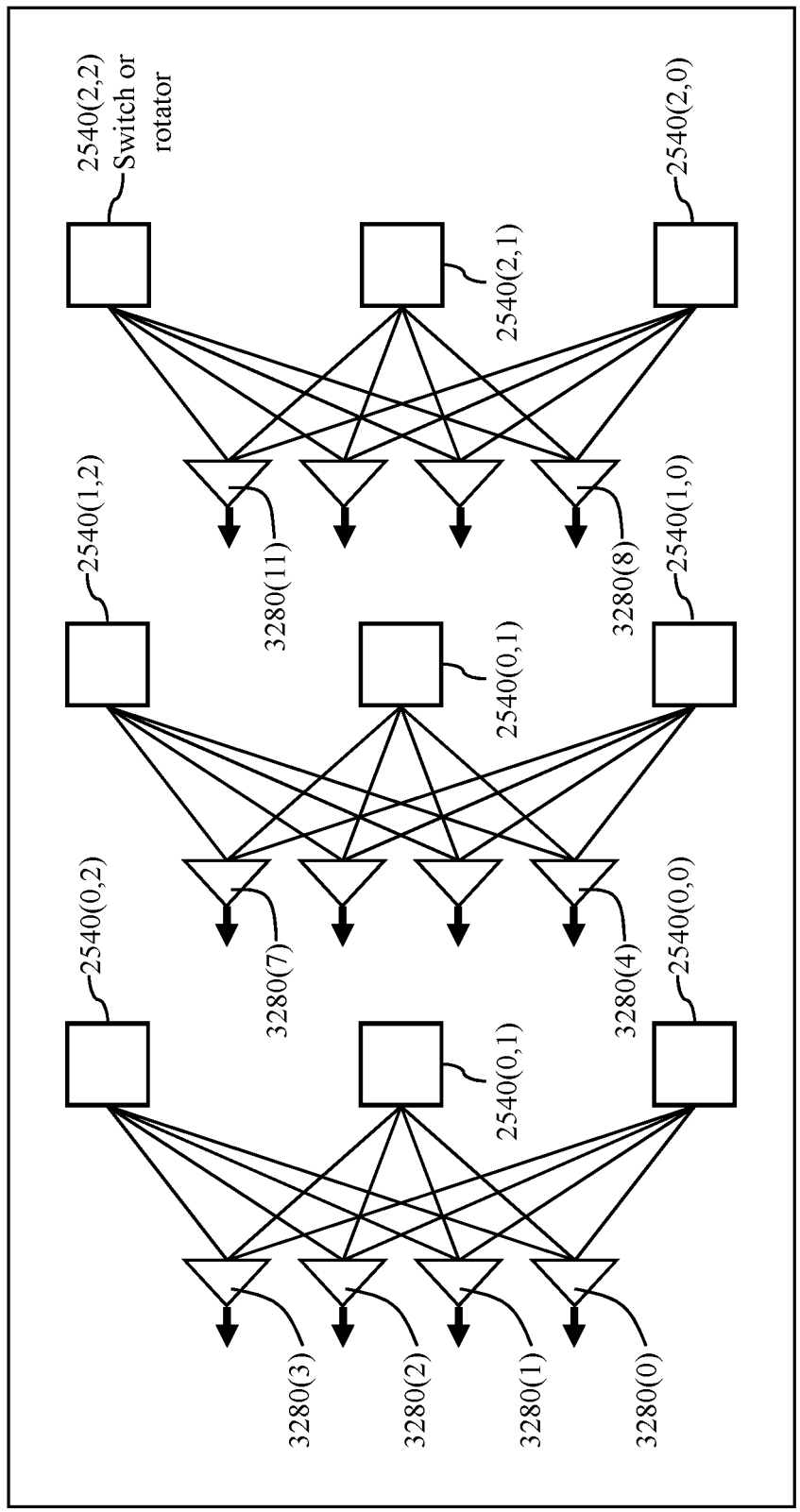
FIG. 32 illustrates collocated spectral multiplexers coupled to the constellation of collocated switches or rotators of FIG. 31, each spectral multiplexer combining spectral bands onto a WDM link directed to a respective access node.

FIG. 32 illustrates collocated spectral multiplexers 3280 coupled to the constellation of collocated distributors of FIG. 31, each spectral multiplexer 3280 combining spectral bands directed to a respective sink node 228 (a respective access node 220). Each spectral multiplexer transmits data to a single access node 220 (a single sink node 228) through a downstream WDM link 3280. Spectral multiplexers 3280 (0) to 3280(3) coupled to the first column of distributors of the constellation connect to downstream WDM links to access nodes 220(0) to 220(3). Spectral multiplexers 3280 (4) to 3280(7) coupled to the second column of distributors of the constellation connect to downstream WDM links to access nodes 220(4) to 220(7). Spectral multiplexers 3280 (8) to 3280(11) coupled to the third column of distributors of the constellation connect to downstream WDM links to access nodes 220(8) to 220(11).

The matrix of distributors 2540 of FIG. 25 may be arranged into four constellations arranged in a constellation matrix of $\chi$ columns and $\chi$ rows, each constellation comprising distributors (switches or rotators) arranged in a sub-matrix of $\Lambda$ columns and $\Lambda$ rows so that $\mu=\chi\times\Lambda$. In the configurations of FIG. 33 to FIG. 36, $\Lambda=3$ and $\chi=2$.

Figure 33:
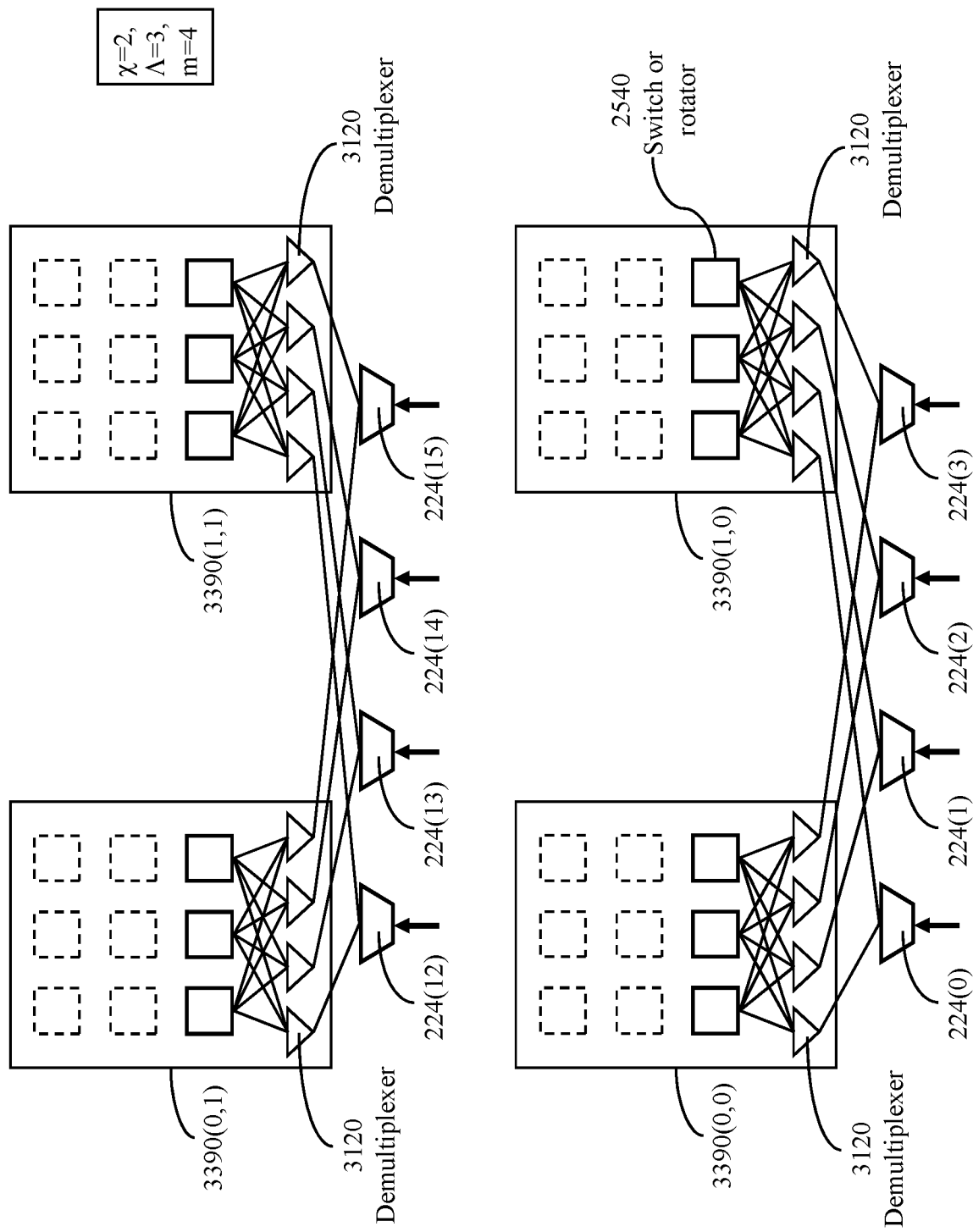
FIG. 33 illustrates upstream connections of a subset of access nodes to constellations of switches or rotators to eliminate the need for intermediate upstream spectral routers.
Figure 34:
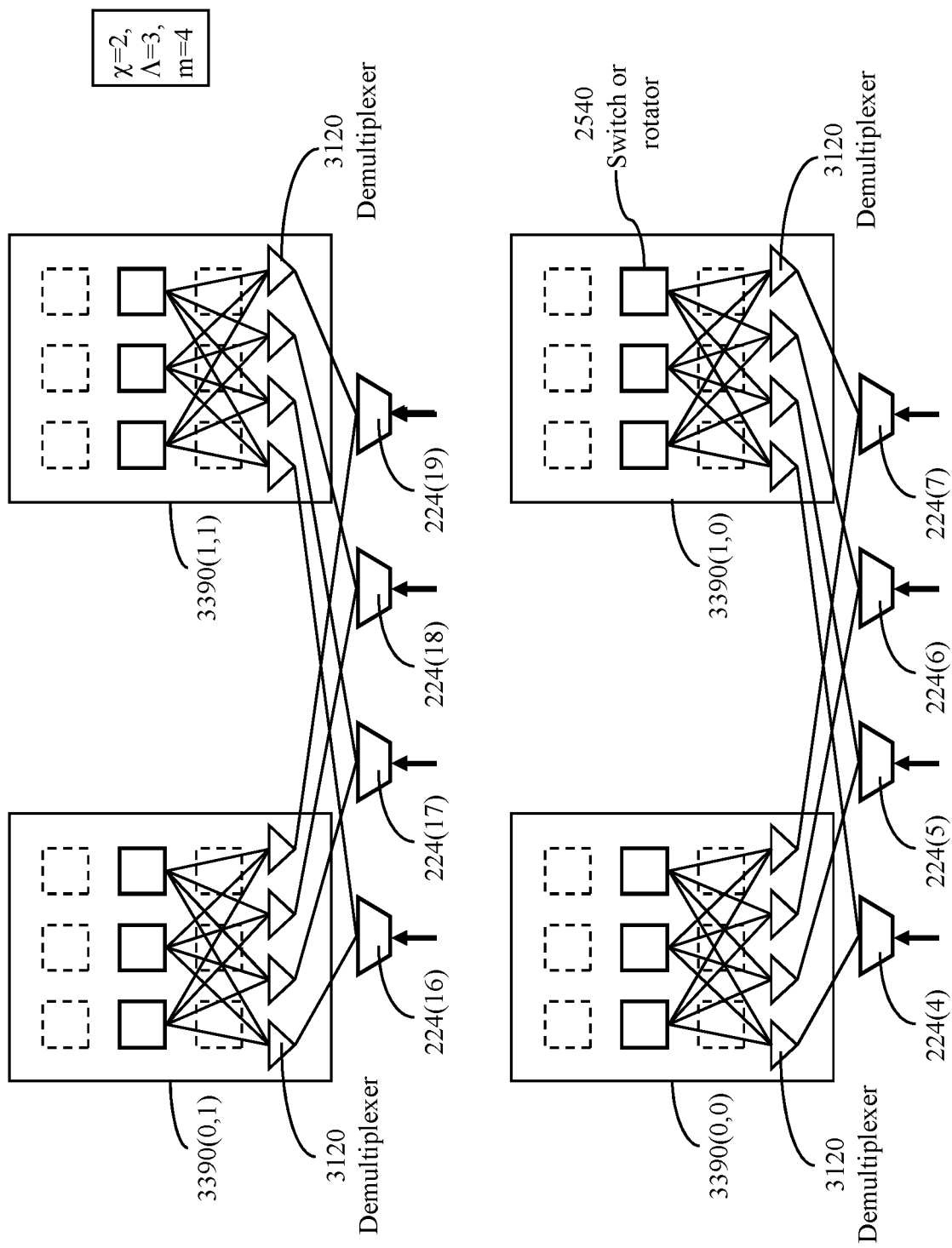
FIG. 34 illustrates upstream connections of another subset of access nodes to constellations of switches or rotators to eliminate the need for intermediate upstream spectral routers.

FIG. 33 and FIG. 34 illustrate upstream connections of access nodes 220 (source nodes 224) to four constellations of distributors 2540 of the matrix of distributors of FIG. 25. The four constellations are arranged into a constellation matrix of two rows and two columns. A constellation assembly 3390 comprises distributors 2540 of a constellation coupled to respective demultiplexers 3120 and respective multiplexers 3280. Each of access nodes 220 of indices (j×m) to (j×m+m−1), $0 \le j < \mu$, has two upstream WDM links each connecting to a demultiplexer 3120 coupled to respective distributors 2540 of a row of index j, $0 \le j < \mu$, of the matrix of distributors of FIG. 25.

Thus, each of access nodes 220(0) to 220(3) has:
(1) an upstream WDM link to a demultiplexer 3120 coupled to distributors 2540 of a first row of distributors of constellation assembly 3390(0,0); and
(2) an upstream WDM link to a demultiplexer 3120 coupled to distributors 2540 of a first row of distributors of constellation assembly 3390(1,0), as illustrated in FIG. 33.

Each of access nodes 220(4) to 220(7) has an upstream WDM link to a demultiplexer 3120 coupled to distributors 2540 of a second row of distributors of each of the two constellation assemblies 3390(0,0) and 3390(1,0), as illustrated in FIG. 34.

Each of access nodes 220(12) to 220(15) has an upstream WDM link to a demultiplexer 3120 coupled to distributors 2540 of a row of distributors of each of the two constellation assemblies 3390(0,1) and 3390(1,1), as illustrated in FIG. 33.

Each of access nodes 220(16) to 220(19) has an upstream WDM link to a demultiplexer 3120 coupled to distributors 2540 of a row of distributors of each of the two constellation assemblies 3390(0,1) and 3390(1,1), as illustrated in FIG. 34.

Figure 35:
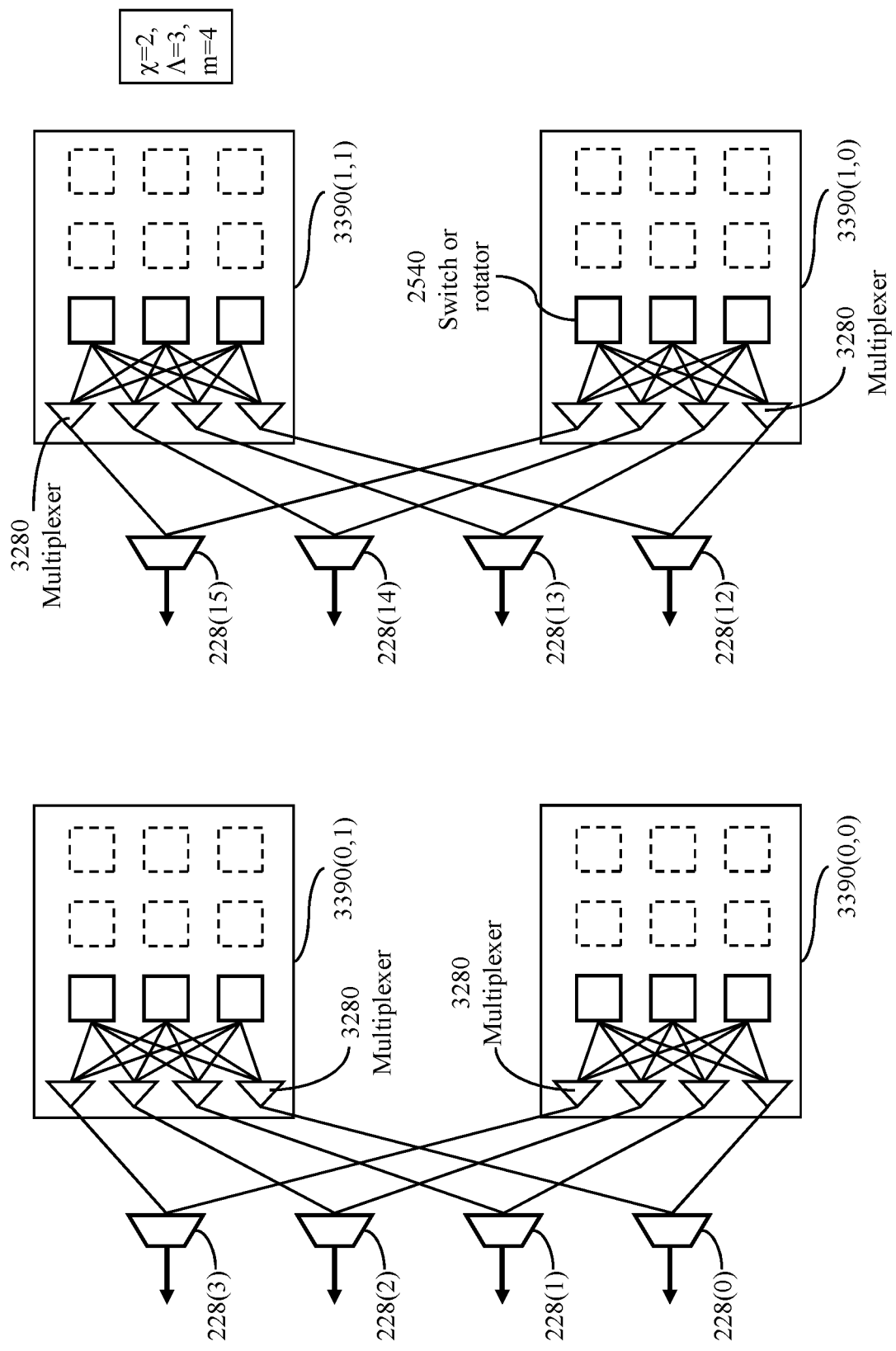
FIG. 35 illustrates downstream connections of constellations of switches or rotators to a subset of access nodes to eliminate the need for intermediate downstream spectral routers.
Figure 36:
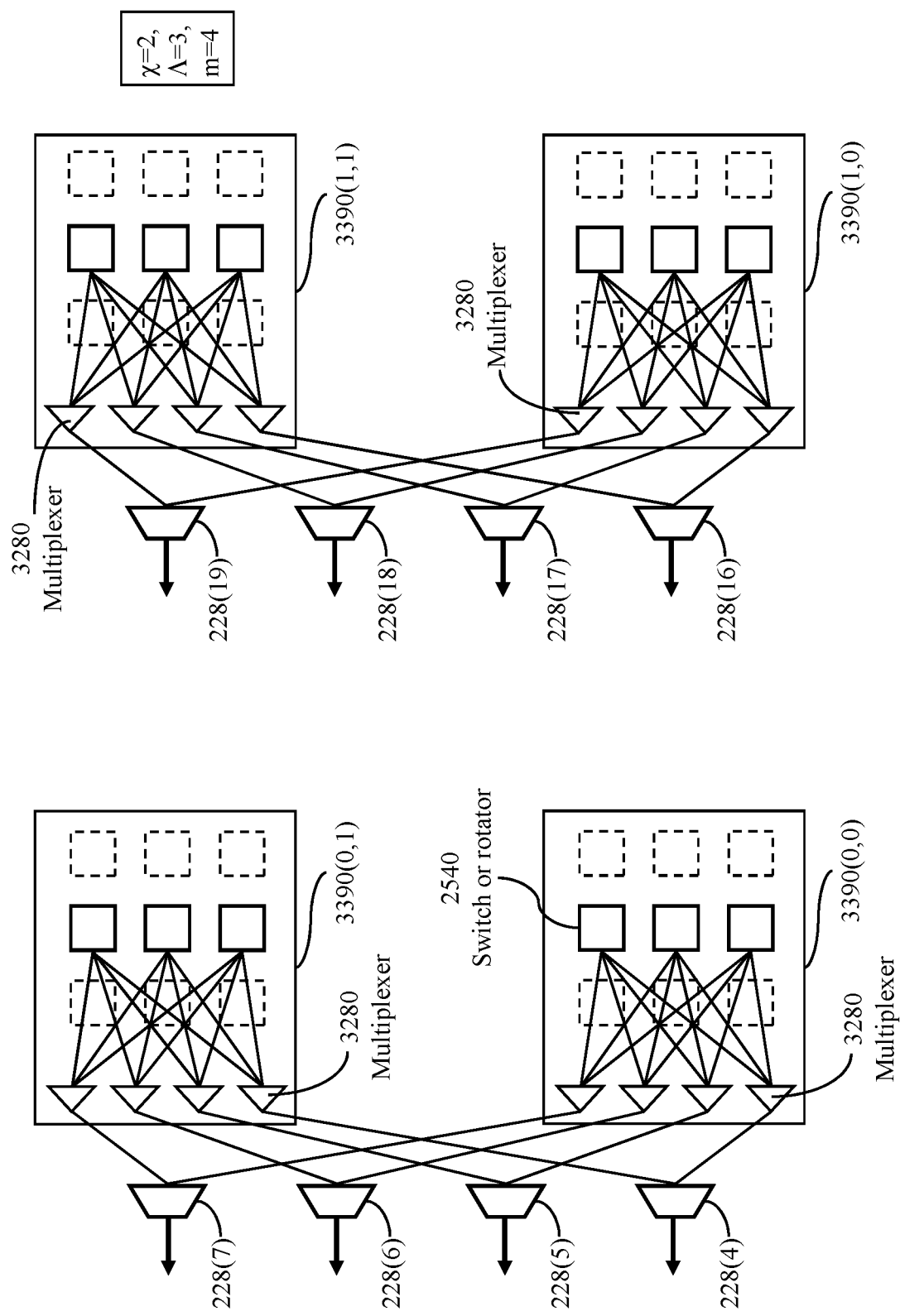
FIG. 36 illustrates downstream connections of constellations of switches or rotators to another subset of access nodes to eliminate the need for intermediate downstream spectral routers.

FIG. 35 and FIG. 36 illustrate downstream connections of access nodes 220 to the four constellations of distributors 2540 of the matrix of distributors of FIG. 25. Each of access nodes 220 (sink nodes 228) of indices (j×m) to (j×m+m−1), has two downstream WDM links each originating from a multiplexer 3280 coupled to distributors 2540 of a column of index j, $0 \le j < \mu$, of the matrix of distributors of FIG. 25.

Thus, each of access nodes 220(0) to 220(3) has:
(i) a downstream WDM link from a multiplexer 3280 coupled to distributors 2540 of a first column of distributors of constellation assembly 3390(0,0); and
(ii) a downstream WDM link from a multiplexer 3280 coupled to distributors 2540 of a first column of distributors of constellation assembly 3390(0,1) as illustrated in FIG. 35.

Each of access nodes 220(4) to 220(7) has a downstream WDM link from a multiplexer 3280 coupled to distributors 2540 of a second column of distributors of each of the two constellation assemblies 3390(0,0) and 3390(0,1), as illustrated in FIG. 36.

Each of access nodes 220(12) to 220(15) has a downstream WDM link from a multiplexer 3280 coupled to distributors 2540 of a column of distributors of each of the two constellation assemblies 3390(1,0) and 3390(1,1), as illustrated in FIG. 35.

Each of access nodes 220(16) to 220(19) has a downstream WDM link from a multiplexer 3280 coupled to distributors 2540 of a column of distributors of each of the two constellation assemblies 3390(1,0) and 3390(1,1), as illustrated in FIG. 36.

Figure 37:
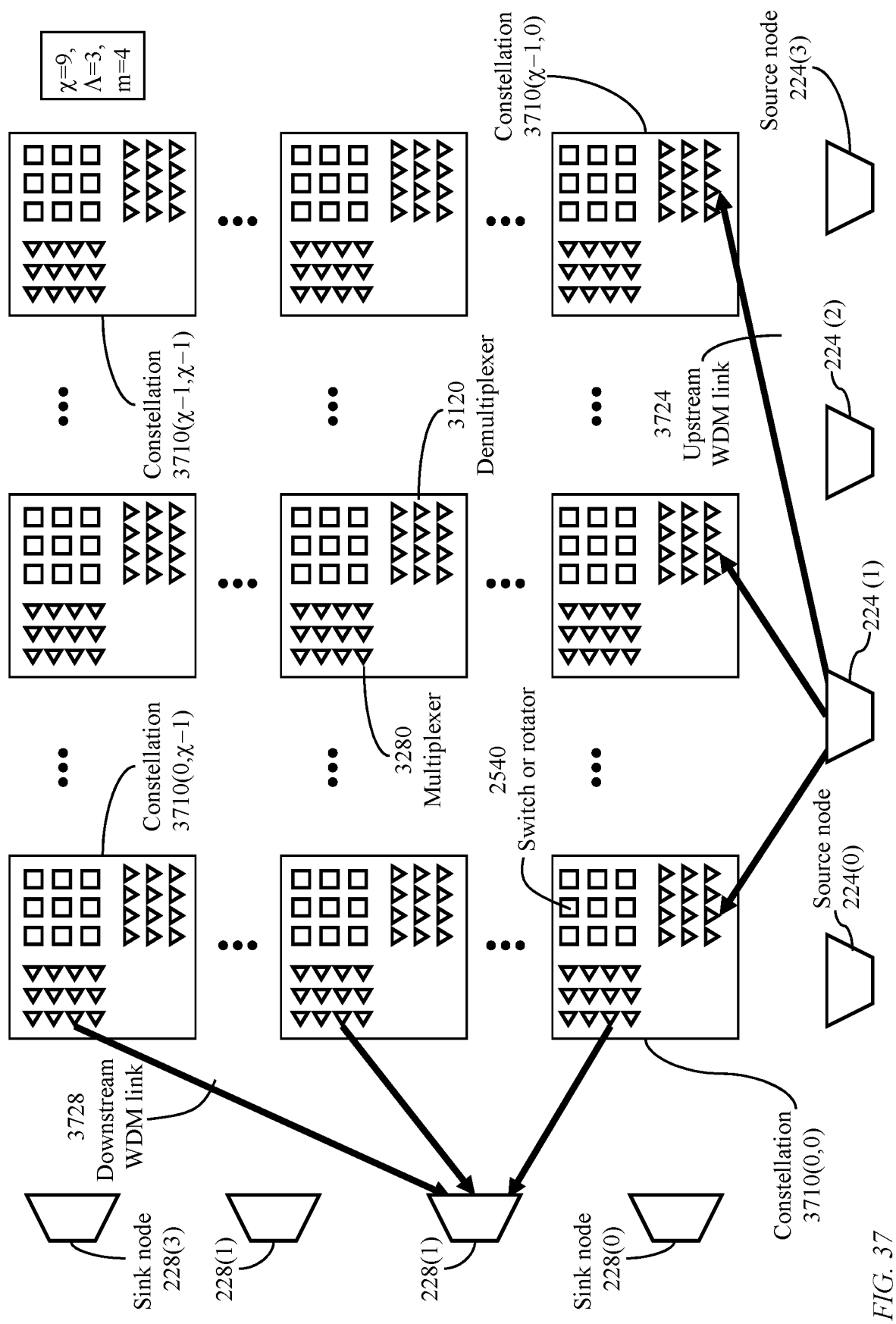
FIG. 37 illustrates connecting a source node to a row of constellations of distributors of a matrix of constellations, and connecting a column of constellations of distributors to a sink node in accordance with an embodiment of the present invention.

FIG. 37 illustrates a switching system comprising distributors arranged into a constellation matrix of $\chi$ columns of constellations and $\chi$ rows of constellations where $\chi=9$. Each constellation is similar to the constellation of FIG. 31 and FIG. 32 which comprises distributors logically arranged in a sub-matrix of $\Lambda$ columns and $\Lambda$ rows where $\Lambda=3$. Each distributor has m input ports and m output ports, m=4, in addition to a control inlet and a control outlet as illustrated in FIG. 3 and FIG. 16. Source nodes 224 and sink nodes 228 are connected to the constellations of distributors through spectral demultiplexers 3120 and spectral multiplexers 3280. Each source node 224 (of access node 220) may have an upstream WDM link 3724 to a respective spectral demultiplexer in each of respective constellations and each sink node 228 (of access node 220) may have a downstream WDM link 3728 from a respective spectral multiplexer in each of respective constellations. The distributors of all of the constellations of FIG. 37 form a logical matrix of distributors of $\mu$ columns and $\mu$ rows, $\mu=\chi\times\Lambda=27$. The total number of access nodes 220 is $\mu\times m=108$.

Figure 38:
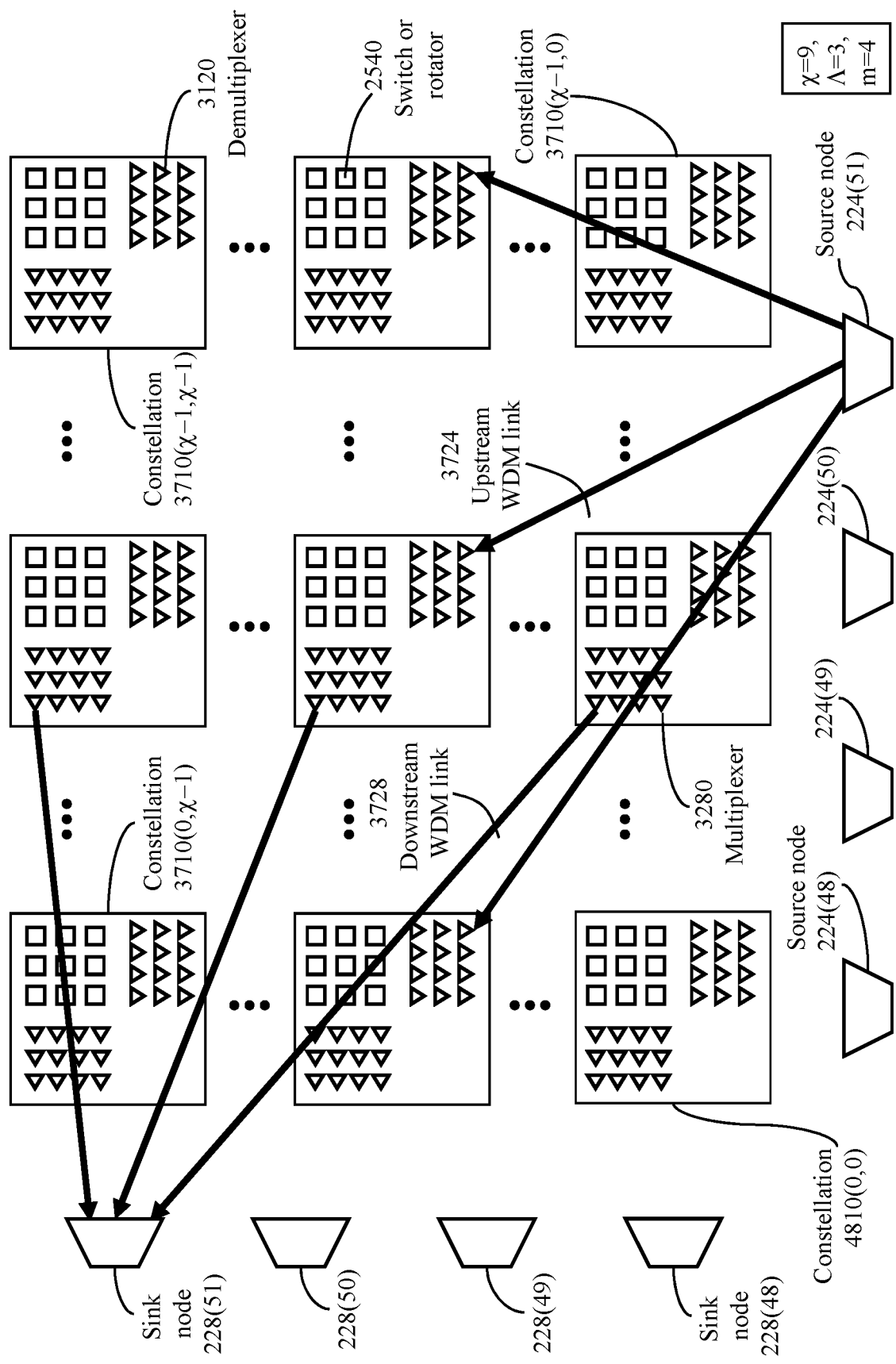
FIG. 38 illustrates connectivity of another source node and another sink node to the matrix of constellations.

FIG. 37 illustrates upstream WDM links 3724 from access node 220(1), i.e. from source node 224(1), and downstream WDM links 3728 to access node 220(1), i.e., to sink node 228(1). FIG. 38 illustrates upstream WDM links 3724 from access node 220(51), i.e. from source node 224(51), to constellations of distributors of a respective row of constellations, and downstream WDM links 3728 to access node 220(51), i.e., to sink node 228(51), from constellations of distributors of a respective column of constellations.

In a switching system configured as a global network having a relatively large number of distributors, the distributors may be grouped into a large number of constellations of collocated distributors. For example, the network may comprise 256 constellations arranged in a constellation matrix of 16 columns of constellations and 16 rows of constellations ($\chi=16$), each constellation being organized into a sub-matrix of 64 columns of distributors and 64 rows of distributors ($\Lambda=64$). With each distributor having 64 input ports and 64 output ports (m=64), in addition to a control inlet and a control outlet, the network may support 65536 access nodes 220 where each access node has 1024 upstream channels 218 (FIG. 2) to a set of 1024 distributors in different constellations of a row of 16 constellations and 1024 downstream channels 216 (FIG. 2) from another set of 1024 of distributors in different constellations of a column of 16 constellations.

In a switching system configured as a large-scale network, upstream spectral routers may be used to connect source nodes 224 (of access nodes 220) to the distributors 140 and downstream spectral routers may be used to connect the distributors 140 to the sink nodes 228 (of access nodes 220) as illustrated in FIG. 21 and FIG. 22. To eliminate the need for spectral routers, the distributors may be arranged in collocated constellations as described above with reference to FIG. 31 to FIG. 38.

Thus, the invention provides a switching system comprising a plurality of distributors 140 interconnecting a plurality of access nodes 220. Each distributor 140 comprises a number of input ports and the same number of output ports. The plurality of distributors is logically organized into a matrix of constellations. Each constellation comprises a set of collocated distributors, a set of spectral demultiplexers 3120, and a set of spectral multiplexers 3280.

Each access node is coupled to an upstream WDM link 3724 to a respective spectral demultiplexer 3120 within each constellation of a respective row of the matrix of constellations. Each access node is coupled to a downstream WDM link 3728 from a spectral multiplexer 3280 within each constellation of a respective column of the matrix of constellations. A spectral demultiplexer 3120 directs each spectral band within an upstream WDM link to an input port of a respective distributor of a constellation. A spectral multiplexer combines spectral bands from output ports of respective distributors of a constellation onto a downstream WDM link.

According to a preferred implementation, the collocated distributors of a constellation are organized into a sub-matrix of $\Lambda$ rows and $\Lambda$ columns of distributors, $\Lambda>1$, as illustrated in FIG. 31 and FIG. 32. The set of spectral demultiplexers within a constellation comprises $\Lambda$ arrays of spectral demultiplexers 3120, where each spectral demultiplexer 3120 is coupled to distributors of a respective row of the sub-matrix. The set of spectral multiplexers 3280 within a constellation comprises $\Lambda$ arrays of spectral multiplexers 3280, where each spectral multiplexer 3280 is coupled to distributors of a respective column of the sub-matrix.

Integrating Diagonal Pairs of Distributors

The distributors 140 are preferably implemented as fast optical distributors (switches or rotators). A fast optical switch, or a fast optical rotator, has a scalability limitation in terms of the number of input and output ports. The coverage and capacity of the switching systems described above increases with the number of input ports (and output ports) of a distributor. A preferred implementation of a switching system may be based on employing collocated switches of each diagonal pair of switches as illustrated in FIG. 9, where the two distributors of a diagonal pair of distributors share a dual controller 970 comprising two mutually coupled controllers, or have a common controller (not illustrated). Likewise, a preferred implementation of a switching system employing rotators (FIG. 14 and FIG. 15) to interconnect access nodes may be based on employing collocated rotators of each diagonal pair of rotators as illustrated in FIG. 18, where the two rotators of a diagonal pair of rotators share a dual timing circuit 1870.

Symmetrical-Access Contiguous Network

The contiguous switching system (network) described above with reference to FIGS. 6 to 38 is based on asymmetrical access where an access node has upstream channels to a first set of distributors and downstream channels from a second set of distributors, the first set and the second set having only one common distributor. In an alternate implementation, a contiguous switching system (network) may be based on symmetrical access where each access node has upstream channels to a respective set of distributors and downstream channels from the same set of distributors. The advantages of a contiguous network in general include control simplicity and high overall efficiency. The advantages of a contiguous network (contiguous switching system) based on symmetrical access include formation of embedded constituent three-stage networks and further control simplicity.

Figure 39:
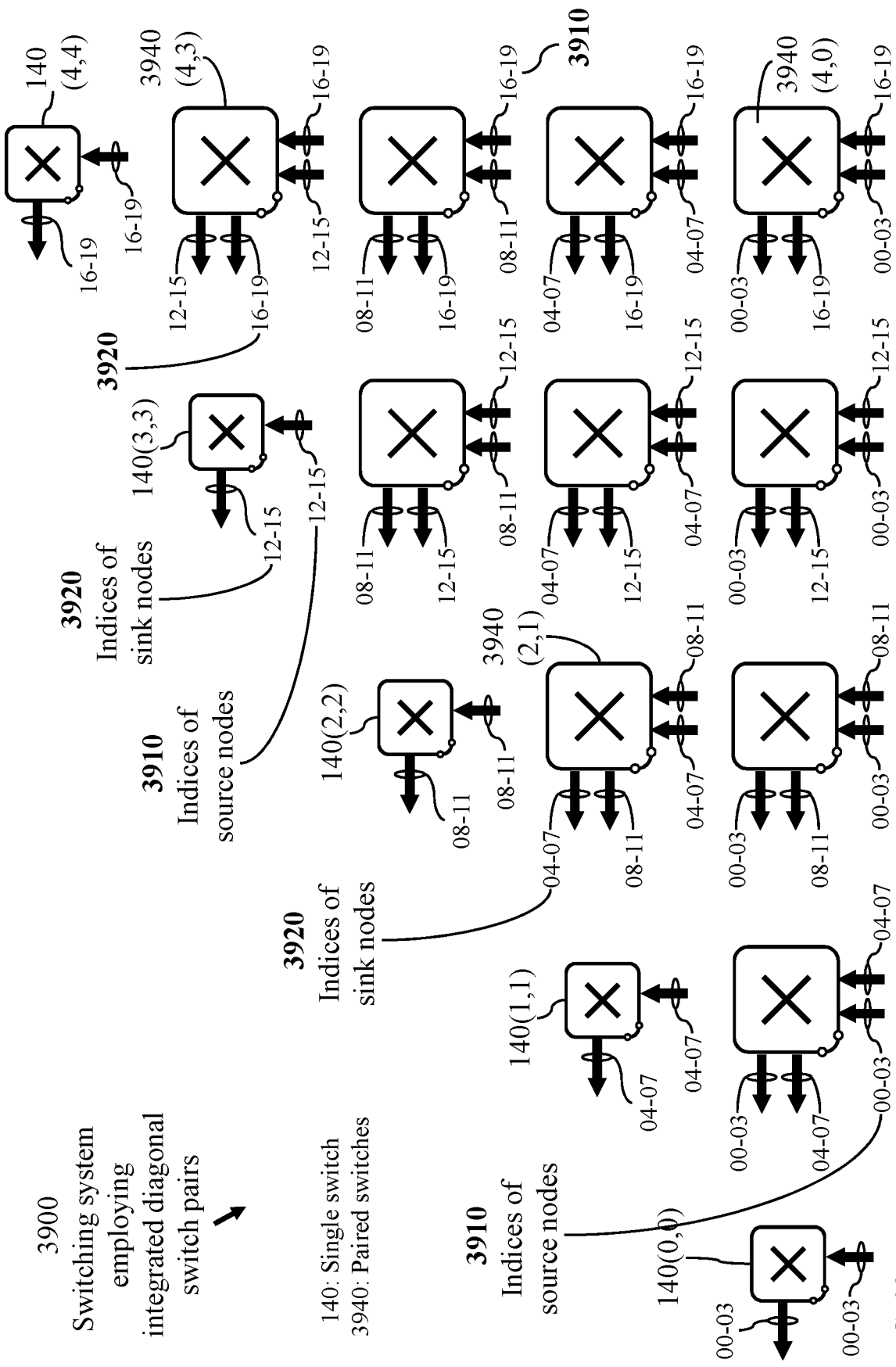
FIG. 39 illustrates a switching system based on the matrix of distributors of FIG. 6 where the two distributors of each diagonal pair of distributors are integrated to share a common distributing mechanism, in accordance with an embodiment of the present invention.

FIG. 39 illustrates a switching system 3900 similar to the switching system of FIG. 6 and FIG. 7 where the two distributors 140 of each diagonal pair of distributors, each having m dual ports, m>2, are integrated to share a common distributing mechanism (a common switching mechanism or a common rotation mechanism) forming a larger distributor 3940 supporting 2×m input ports and 2×m output ports in addition to a control inlet and a control outlet. As described above, a diagonal pair of distributors comprises a distributor of column j and row k and a distributor of column k and row j, j≠k, of a matrix of distributors having $\mu$ columns and $\mu$ rows, $\mu>2$. The columns are indexed as 0 to ($\mu-1$) and the rows are indexed as 0 to ($\mu-1$). The diagonal distributors 140(j, j), 0≤j<$\mu$, of switching system 3900, are the same as the diagonal distributors of the switching system of FIG. 6 and FIG. 7.

Indices 3910 of source nodes 224 (of access nodes 220) connecting to input ports of each distributor 140 or 3940, and the indices 3920 of sink nodes 228 (of access nodes 220) connecting to output ports of each distributor 140 or 3940, are indicated in FIG. 39. For example, distributor 3940(2,1) receives data from access nodes 220 (source nodes 224) of indices 4 to 11 and transmits switched data to access nodes 220 (sink nodes 228) of indices 4 to 11. Distributor 3940 (4,0) receives data from access nodes 220 (source nodes 224) of indices 0 to 3 and 16 to 19, and transmits switched data to access nodes 220 (sink nodes 228) of indices 0 to 3 and 16 to 19. Diagonal distributor 140(2,2) receives data from access nodes 220 (source nodes 224) of indices 8 to 11 and transmits data to access nodes 220 (sink nodes 228) of indices 8 to 11.

Figure 40:
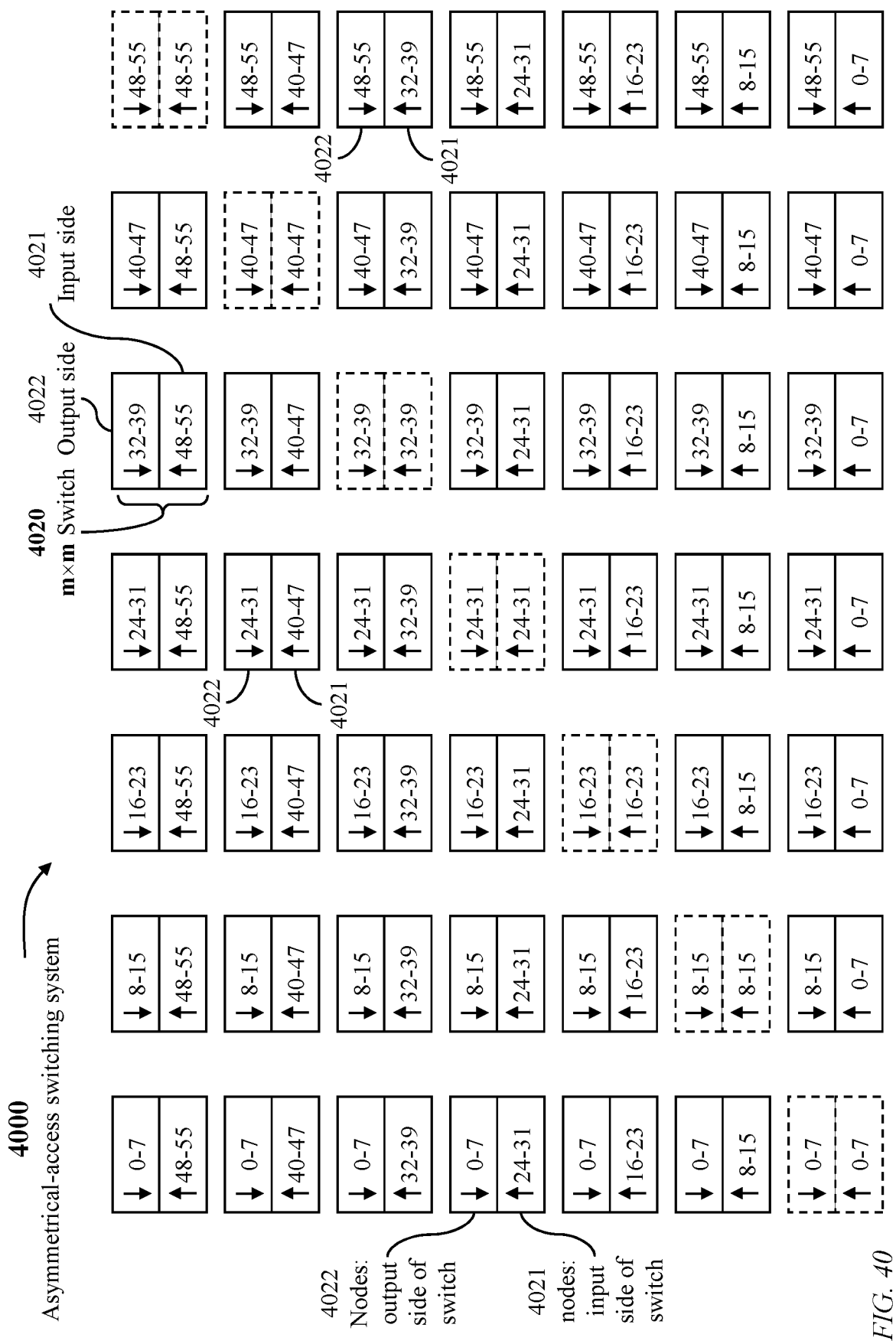
FIG. 40 illustrates connectivity of access nodes to distributors of an asymmetrical-access switching system where the accessed nodes are arranged into access groups.

FIG. 40 illustrates an asymmetrical-access switching system 4000. Switching system 4000 comprises distributors 4020 arranged in a matrix of $\mu$ columns and $\mu$ rows; $\mu$=7 in the exemplary switching system of FIG. 40. The distributors 4020 are independent of each other, none of the distributors 4020 has a direct connection to any other distributor 4020. Each distributor comprises a respective controller and a respective master time indicator. The $\mu^2$ distributors interconnect a plurality of access nodes 220 (FIG. 2). The access nodes 220 are arranged into access groups each access group comprising at least two access nodes and at most a predetermined number, m, of access nodes, m>2. Each access group connects to a respective number of input ports of each distributor of a respective row of distributors and to a respective number of output ports of each distributor of a respective column of distributors. For example, with each access group comprising eight nodes, a group of access nodes of indices 0 to 7 connects to input ports of each distributor of a row of index 0 of the matrix of distributors and to output ports of each distributor of a column of index 0 of the matrix of distributors. A group of access nodes of indices 40 to 47 connects to input ports of each distributor of a row of index 5 of the matrix of distributors and to output ports of each distributor of a column of index 5 of the matrix of distributors. Thus, the connectivity of access nodes to the distributors is asymmetrical; a group 4021 of access nodes connecting to the input ports of a distributor 4020 may differ from a group 4022 of access nodes connecting to the output port of the same distributor. As illustrated in FIG. 40, each distributor 4020 belonging to one diagonal of the $\mu \times \mu$ switching matrix connects to a respective group of access nodes at both input and output while each other distributor connects to a respective group 4021 of access nodes at input and a disjoint group 4022 of access nodes at output. The access-node numbers are selected to correspond to full provisioning where each access group contains m access nodes. With access groups comprising less than m access nodes, the indices of access nodes are preferably still based on full provisioning where each access group contains the predefined bound m; absent access nodes are still assigned indices for ease of identification and for potential future expansion.

Indexing the $\mu$ columns of distributors of the matrix distributors as 0 to $(\mu-1)$ and indexing the rows of the matrix of distributors as 0 to $(\mu-1)$, each distributor 4020 belonging to a column j and a row j, $0 \le j < \mu$, connects at input and at output to a same group of access nodes. However, each distributor 4020 belonging to column j and row k, where $j \ne k$, connects to different groups of access nodes at input and output. Each access group connects only once to input ports and output ports of a same distributor. Each access group connects to input ports of $(\mu-1)$ distributors which connect at output to other groups of access nodes. Each access group connects to output ports of $(\mu-1)$ distributors which connect at input to other groups of access nodes. This connectivity pattern realizes a contiguous switching system supporting $\mu \times m$ access nodes where each access node has a path to each other access node traversing a single distributor. With $\mu=256$ and m=64, for example, the total number of access nodes would be 16384.

Indexing the distributors 4020 according to the column and row to which a distributor belongs, a first distributor of column j and row k, $0 \le j < \mu$, $0 \le k < \mu$, $k \ne j$, connects at input to a first access group and connects at output to a second access group while a distributor of column k and row j connects at input to the second access group and connects at output to the first access group. The first and second distributors form a complementary distributor pair as defined above. Thus, as illustrated in FIG. 9 to FIG. 13, coupling controllers of complementary distributors or providing a common controller for complementary distributors facilitates control of the entire switching system.

Figure 41:
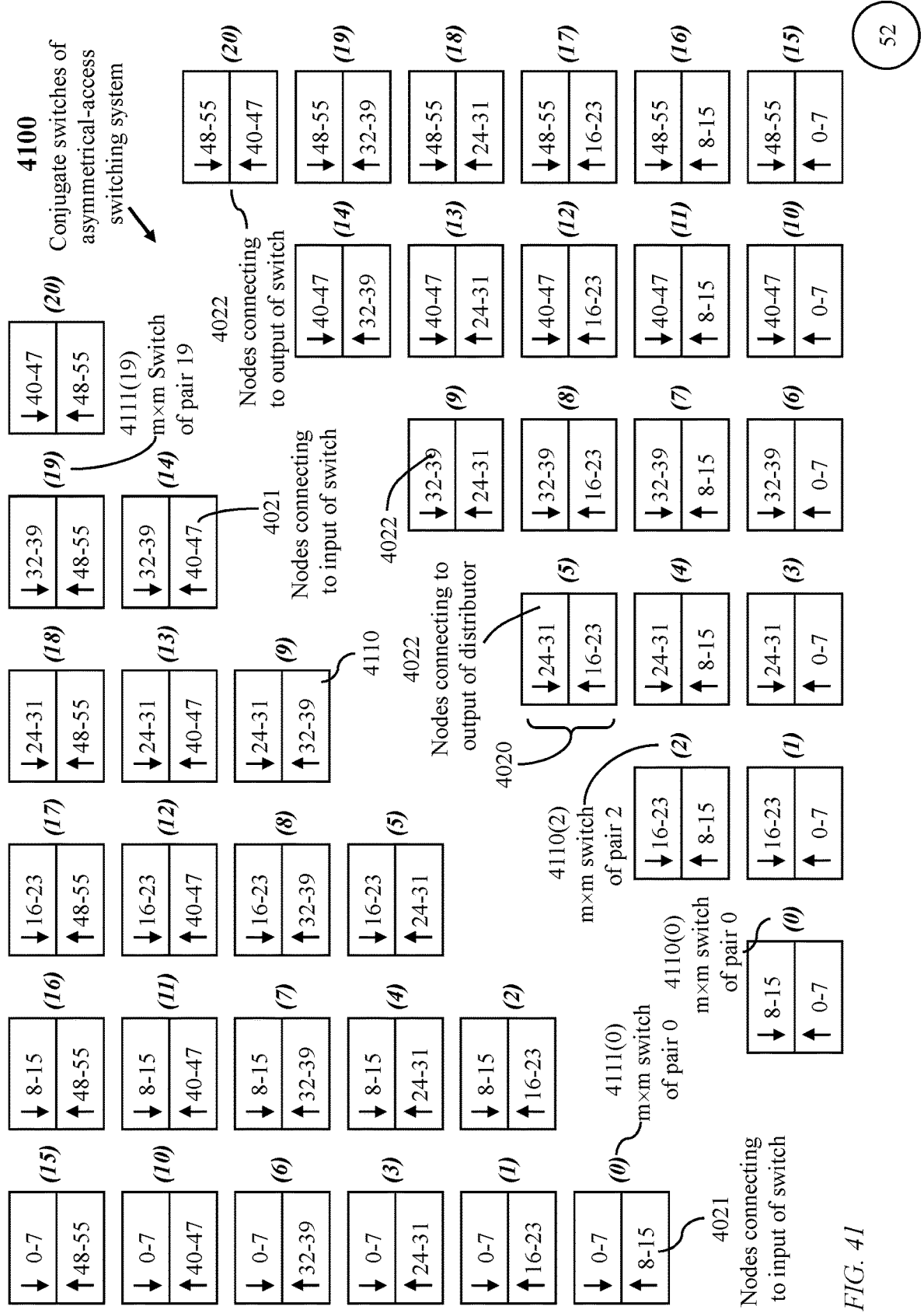
FIG. 41 illustrates conjugate distributors of the switching system of FIG. 40.

FIG. 41 illustrates the complementary distributor pairs 4100 of asymmetrical-access switching system 4000, omitting diagonal distributors. Each complementary pair is assigned a same index and a same reference numeral 4111. For example, a distributor of column 2 and raw 0 and a distributor of column 0 and row 2 are assigned an index of 1. The distributor of column 2 and raw 0 connects at input to access nodes of indices of indices 0 to 7 and connects at output to access nodes of indices 16 to 23 while the distributor of column 0 and raw 2 connects at input to access nodes of indices 16 to 23 and connects at output to access nodes of indices 0 to 7. The symbols "↑" and "↓" indicate an input side and an output side of a distributor, respectively. The distributor pairs are indexed as 0 to 20.

Figure 42:
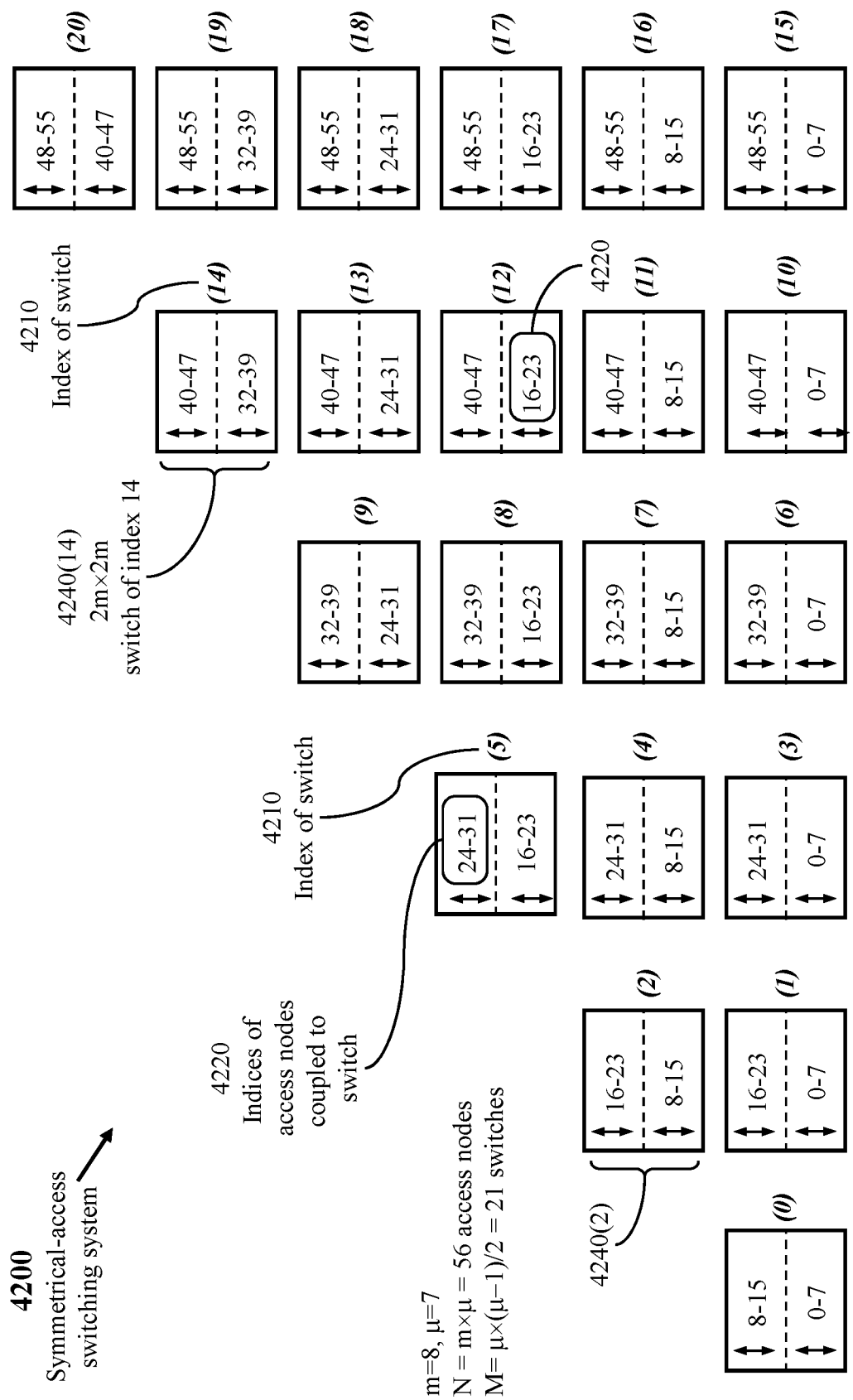
FIG. 42 illustrates a symmetrical-access switching system based on combining each pair of conjugate distributors to form a respective single distributor, in accordance with an embodiment of the present invention.

FIG. 42 illustrates a symmetrical-access switching system 4200 based on combining two distributors 4020 of each complementary distributor pair to form a respective integrated distributor 4240 having a switching mechanism of larger dimension. Thus, an integrated distributor 4240 has dual channels to two access groups. The indices 4220 of access nodes of each of the two access groups are indicated.

With each distributor 4020 having a switching mechanism supporting m dual ports, handling payload data (content data), in addition to any dual control ports, an integrated distributor 4240 would have a switching mechanism supporting 2×m dual ports in addition to any dual control ports. The diagonal distributors of the asymmetrical switching system 4000 are not needed in the symmetrical switching system 4200 where the access nodes of each access group can connect to each other access group without the diagonal distributors. As illustrated in FIG. 42, access nodes of indices 0 to 7 may connect to each other through any of integrated distributors of indices 0, 1, 3, 6, 10, and 15, and access nodes of indices 32 to 39 may connect to each other through any of integrated distributors of indices 6, 7, 8, 9, 14, and 19. With each access node connecting to each of $(\mu-1)$ distributors 4240, the total number M of integrated distributors 4240 is $\mu \times (\mu-1)/2$. The M complementary distributor pairs may be indexed sequentially as 0, 1, ... (M−1). The symbol "↔" indicates connectivity of an access node to both sides a distributor.

The total number of access groups is limited to $\mu$. With each access group comprising m access nodes, m>2, the total number, N, of access nodes is limited to $m \times \mu$. With $\mu=7$, the total number of integrated distributors 4240 is (7×6)/2 indexed as 0 to 20. With m=8, the total number, N, of access nodes is limited to 56; the access nodes are conveniently indexed as 0 to (N−1). The sequential order is arbitrary. In the arrangement of FIG. 42, the index 4210 of a distributor 4240 is selected so that an access node of an access group of index v, $0 \le v < \mu$, connects to $(\mu-1)$ distributors 4240 of indices:

$\{j+v \times (v-1)/2 \text{ for } 0 \le j < v, \text{ and}$ $\{v+j \times (j-1)/2\} \text{ for } v < j < \mu.$ It is noted that in the above expressions, the index j does not assume the value of v; $j \ne v$.

An access node of index n, $0 \le n < N$, belongs to an access group of index v determined as: $v = \lfloor n/m \rfloor$, where $\lfloor r \rfloor$ denotes the integer part of r, where r is generally a real number. With m>2, the total number N of access nodes is in the range of $\{(2 \times \mu) < N \le m \times \mu\}$.

Figure 43:
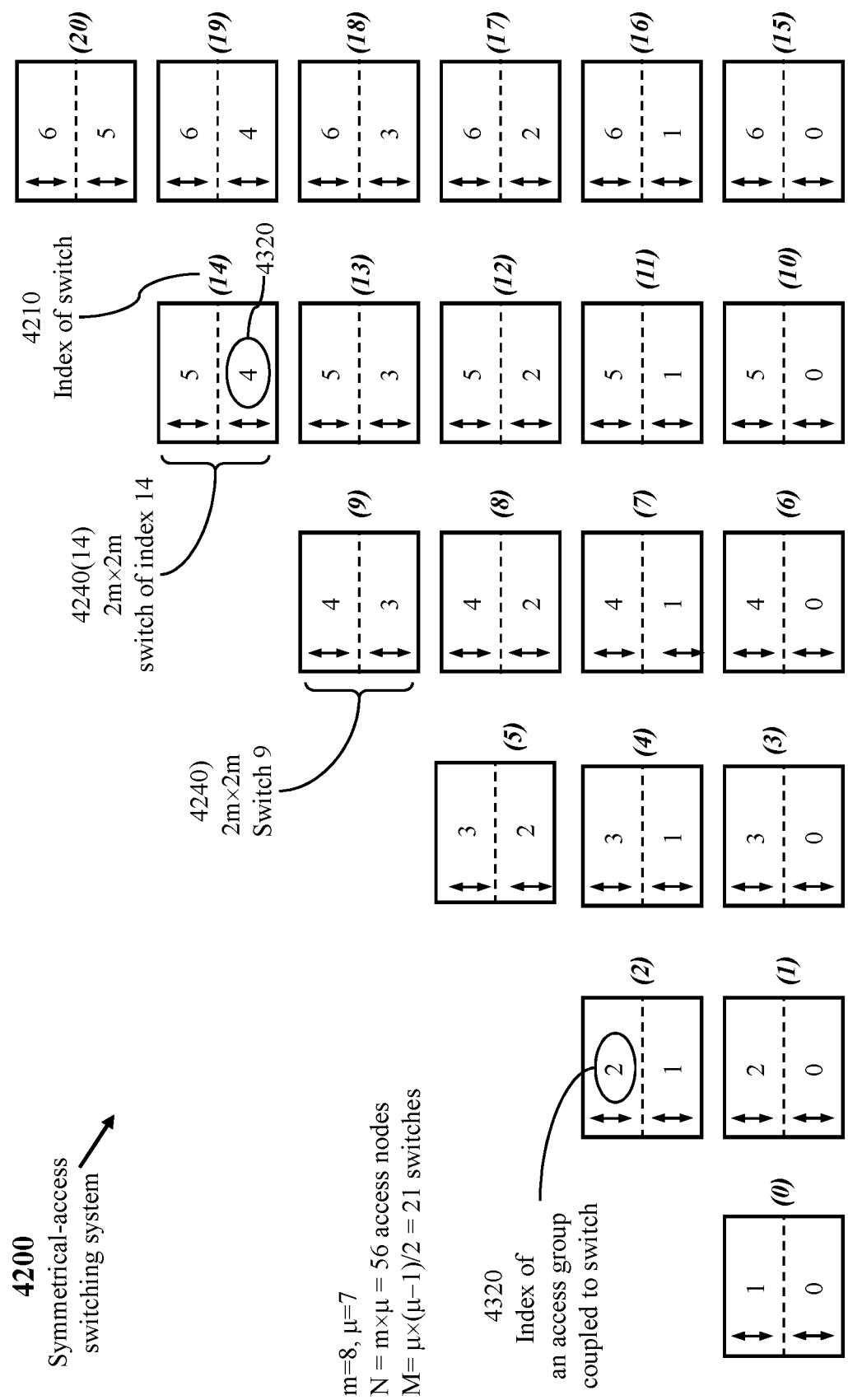
FIG. 43 illustrates the symmetrical-access switching system of FIG. 42 indicating indices of access groups connecting to each distributor.

FIG. 43 illustrates the symmetrical-access switching system 4200 of FIG. 42 illustrating indices 4320 of access groups connecting to each distributor. With m=8, the access groups of {0-7}, {8-15}, {16-23}, {24-31}, {32-39}, {40-47}, and {48-55} are indexed as 0, 1, 2, 3, 4, 5, and 6, respectively.

Figure 44:
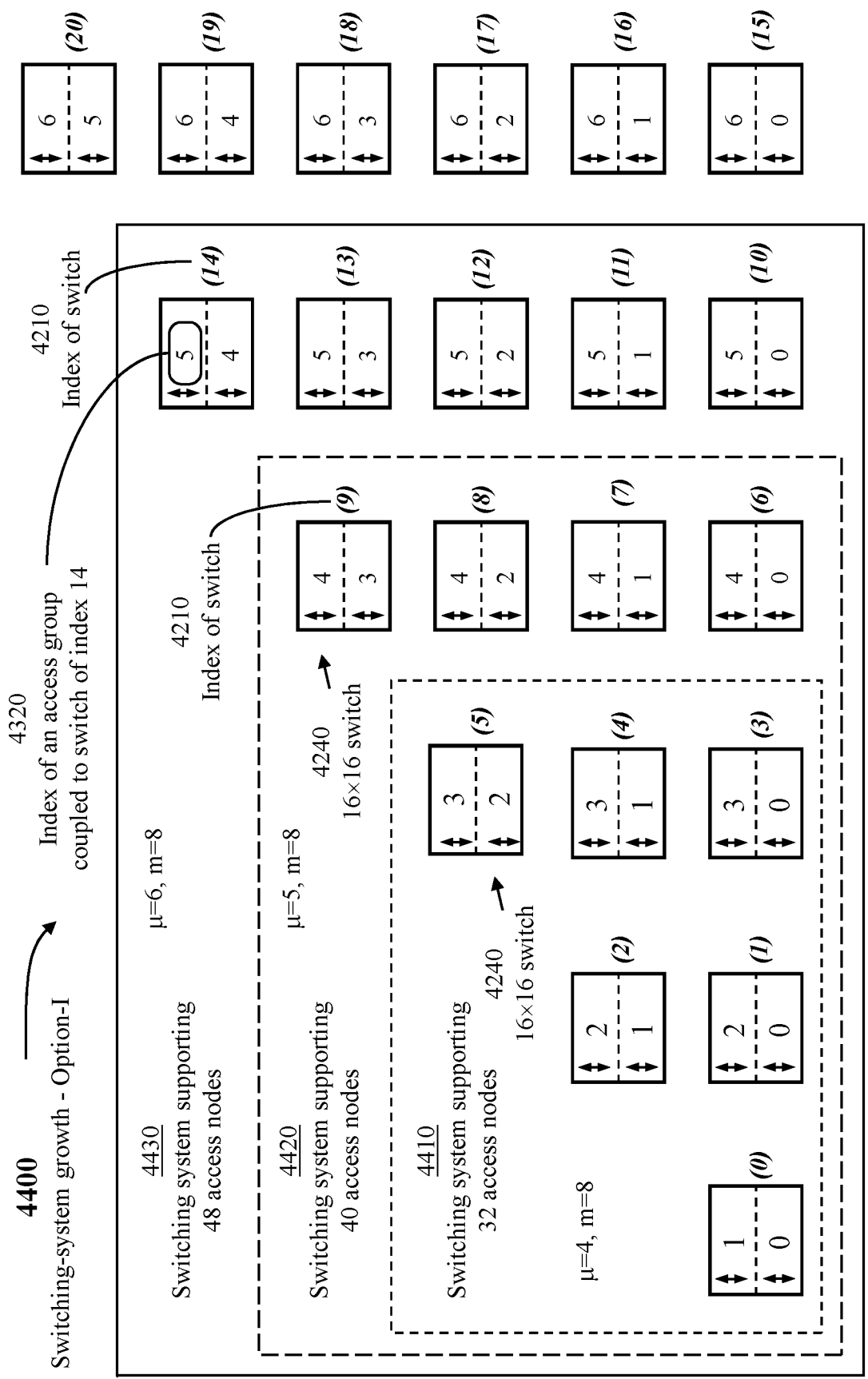
FIG. 44 illustrates a first growth scheme of the symmetrical-access switching system of FIG. 42 based on adding new distributors of same dimensions and new access nodes, in accordance with an embodiment of the present invention.

FIG. 44 illustrates a first expansion scheme 4400 of the symmetrical-access switching system based on adding new distributors and new access nodes. As described above, with each access node having $\mu$ dual channels each connecting to a respective distributor 4240 having 2×m dual ports for handling payload data (content data), the total number M of distributors is $\mu \times (\mu-1)/2$ and the number N of access nodes is limited to $m \times \mu$.

According to the illustrated exemplary case, an initial switching system 4410, with m=8, and $\mu=4$ (four access groups of indices 0, 1, 2, 3) comprises six distributors 4240 {M=(4×3)/2} supporting 32 access nodes (N=8×4). The six distributors are identified by indices 4210 of 0, 1, ... 5. Each distributor 4240 comprises 2×m dual ports for handling payload data, in addition to any dual control ports.

Figure 45:
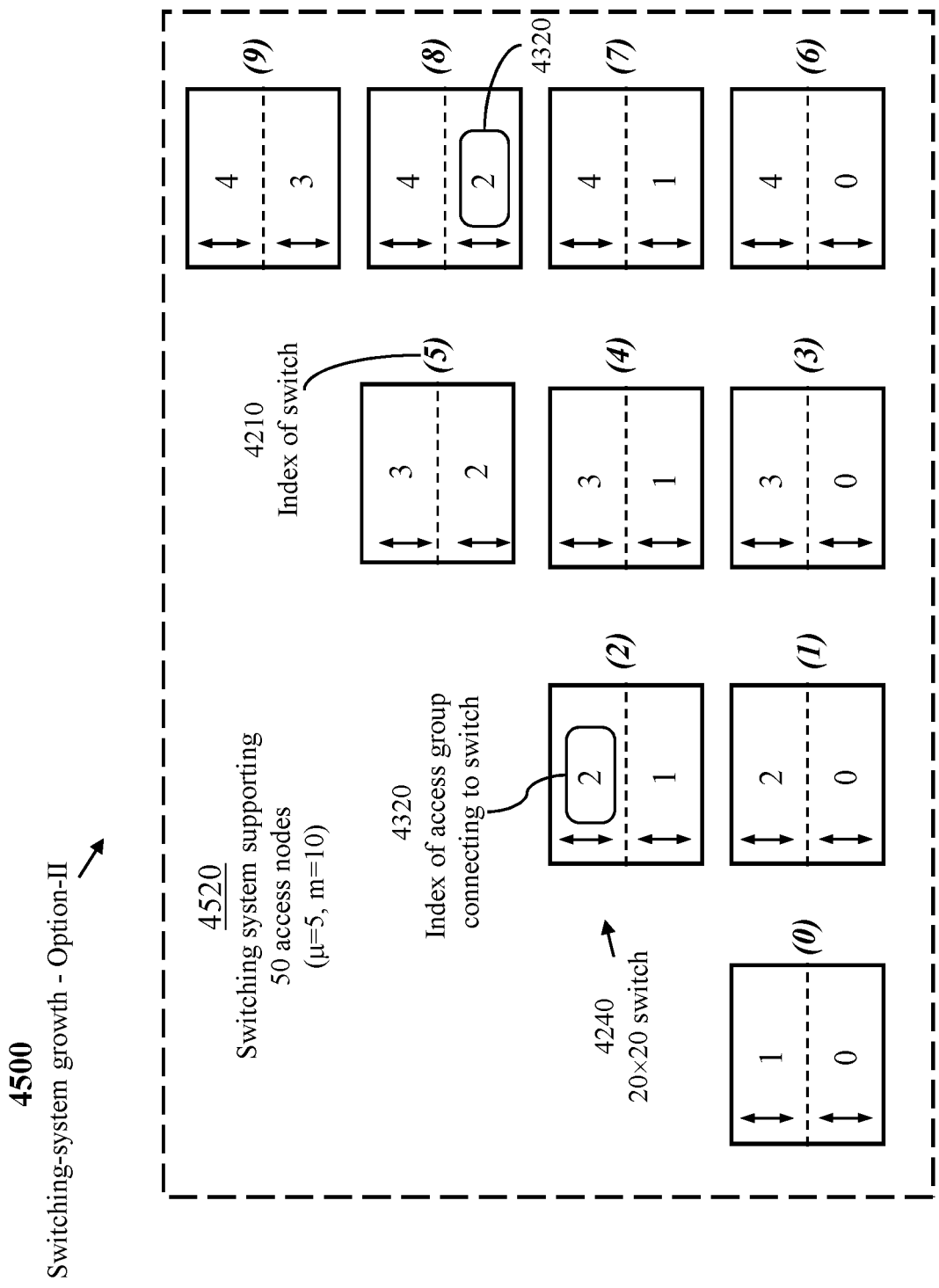
FIG. 45 illustrates a second growth scheme of the symmetrical-access switching system of FIG. 42 based on adding new access nodes and increasing the dimensions of current distributors, in accordance with an embodiment of the present invention.

Expansion of the switching system to support more access nodes may be realized through increasing the number $(\mu-1)$ of distributors to which each access node connects (first expansion scheme, FIG. 44) or increasing the number of dual ports 2×m per distributor (second expansion scheme, FIG. 45). Expansion may also be realized through increasing both μ and m (third expansion scheme, FIG. 46).

In the exemplary case of FIG. 44, expansion to a switching system 4420 is realized through increasing μ from 4 to 5 while keeping the dimensions of the distributors unchanged. With μ=5, the number of distributors 4240 increases to ten {M=(5×4)/2)} and the number of access nodes increases to 40 (N=8×5). Thus, four distributors of indices 6, 7, 8, and 9 are added, and a new access group of index 4 connects to the new distributors. Each of the initial access nodes of indices 0 to 31 (of access groups of indices 0 to 3) further connects to one of the added distributors 4240 of indices 6, 7, 8, and 9. The access groups of indices 0 to 3 connect to distributors 4240 of indices 6, 7, 8, and 9, respectively.

Likewise, further expansion to a switching system 4430 is realized through increasing μ from 5 to 6 while keeping the dimensions of the distributors unchanged. With μ=6, the number of distributors 4240 increases to fifteen and the number of access nodes increases to 48. Thus, five distributors of indices 10, 11, 12, 13, and 14 are added, and a new access group of index 5 comprising up to eight access nodes connects to the new distributors. Each of access nodes of access groups 0 to 4 further connects to one of the added distributors 4240 of indices 10, 11, 12, 13, and 14. The access groups of indices 0 to 4 respectively connect to distributors 4240 of indices 10, 11, 12, 13, and 14. A further expansion step adds six distributors 4240, of indices 15 to 20, and a new access group of index 6 as illustrated in FIG. 44.

FIG. 45 illustrates the second expansion scheme 4500 of the symmetrical-access switching system of FIG. 42 based on increasing the dimensions of current distributors and adding new access nodes. In the exemplary case of FIG. 45, expansion of the switching system 4420 (FIG. 44) to a switching system 4520 is realized through increasing m from 8 to 10 while keeping μ unchanged (μ=5). Thus, the number M of distributors 4240 remains unchanged at M=μ×(μ−1)/2. The number of access groups, μ, remains unchanged but the number m of access nodes per access group increases from 8 to 10. The number N of access nodes is determined as m×μ. Thus, ten access nodes may be added.

Figure 46:
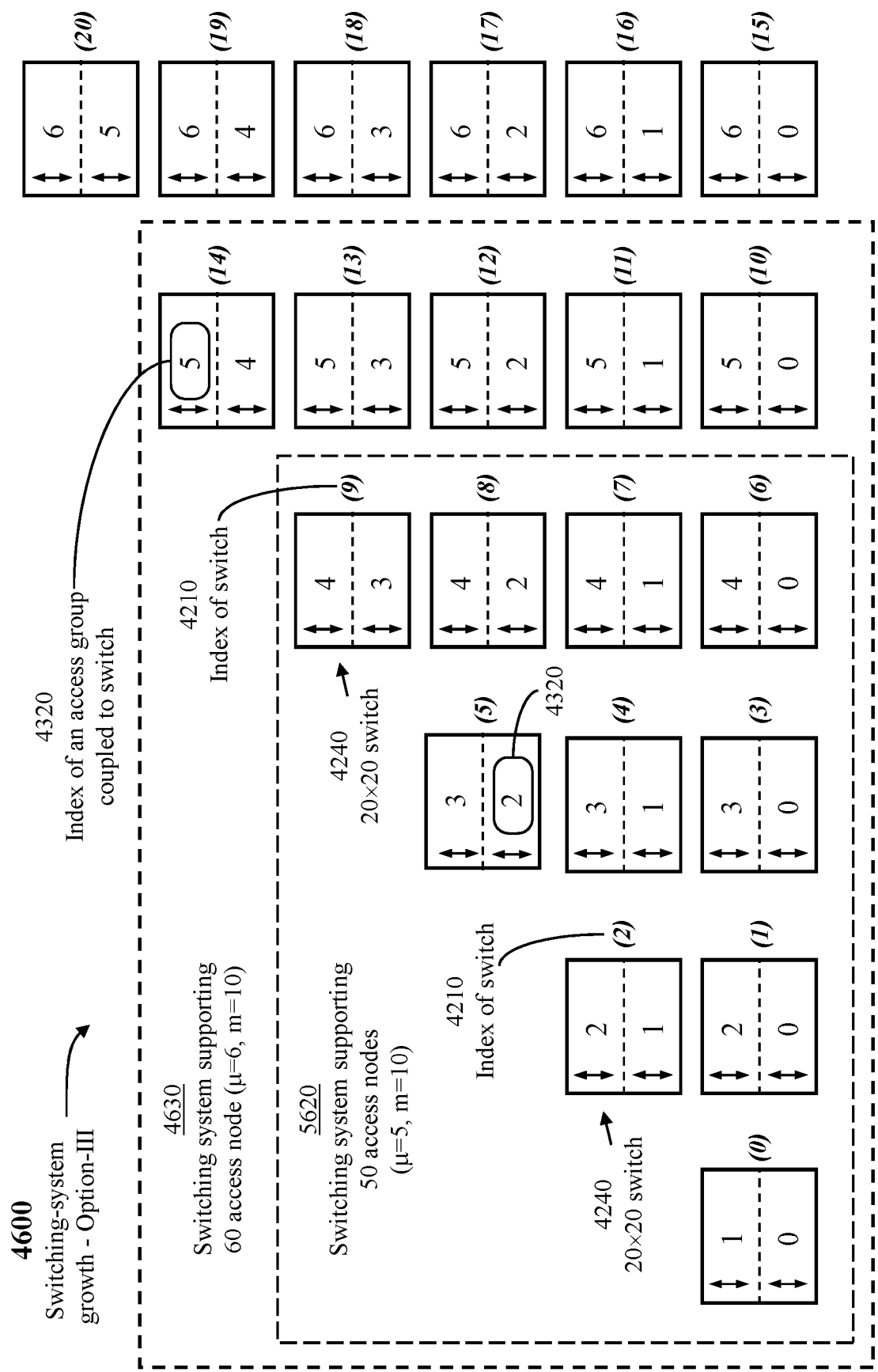
FIG. 46 illustrates a third growth scheme of the symmetrical-access switching system of FIG. 42 based on adding new distributors of larger dimensions and new access nodes, in accordance with an embodiment of the present invention.

FIG. 46 illustrates the third expansion scheme 4600 of the symmetrical-access switching system of FIG. 42 based on adding new distributors of larger dimensions and new access groups.

In the exemplary case of FIG. 46, expansion of the switching system 4420 (FIG. 44) to a switching system 4520 is realized through increasing m from 8 to 10 while keeping μ unchanged (μ=5) as in the case of FIG. 45. Further expansion from switching system 4520 to switching system 4630 is realized by increasing μ from five to six and providing (μ−1) new distributors 4240 of indices 10 to 14, each comprising 20 dual ports, for handling payload data (content data), in addition to dual control ports. A further expansion step adds six distributors 4240, of indices 15 to 20, and a new access group of index 6 as illustrated in FIG. 46, with each distributor 4240 comprising 20 dual ports, for handling payload data, in addition to dual control ports.

As described above, FIG. 14 and FIG. 15 illustrate an asymmetrical switching system employing rotators. A plurality of rotators 1440 is arranged in a matrix of a number of columns and the same number of rows, wherein a first rotator 1440A and a second rotator 1440B of each complementary pair of rotators are collocated (FIG. 18). Each rotator 1440 comprises (FIG. 16) a number m of input ports 1610, m output ports 1630, m>2, a control inlet 1612, a control outlet 1632, and a rotating mechanism 1620. Each access node is communicatively coupled to an input port 1610 of each rotator 1440 of a respective row, and an output port 1630 of each rotator 1440 of a respective column.

Figure 47:
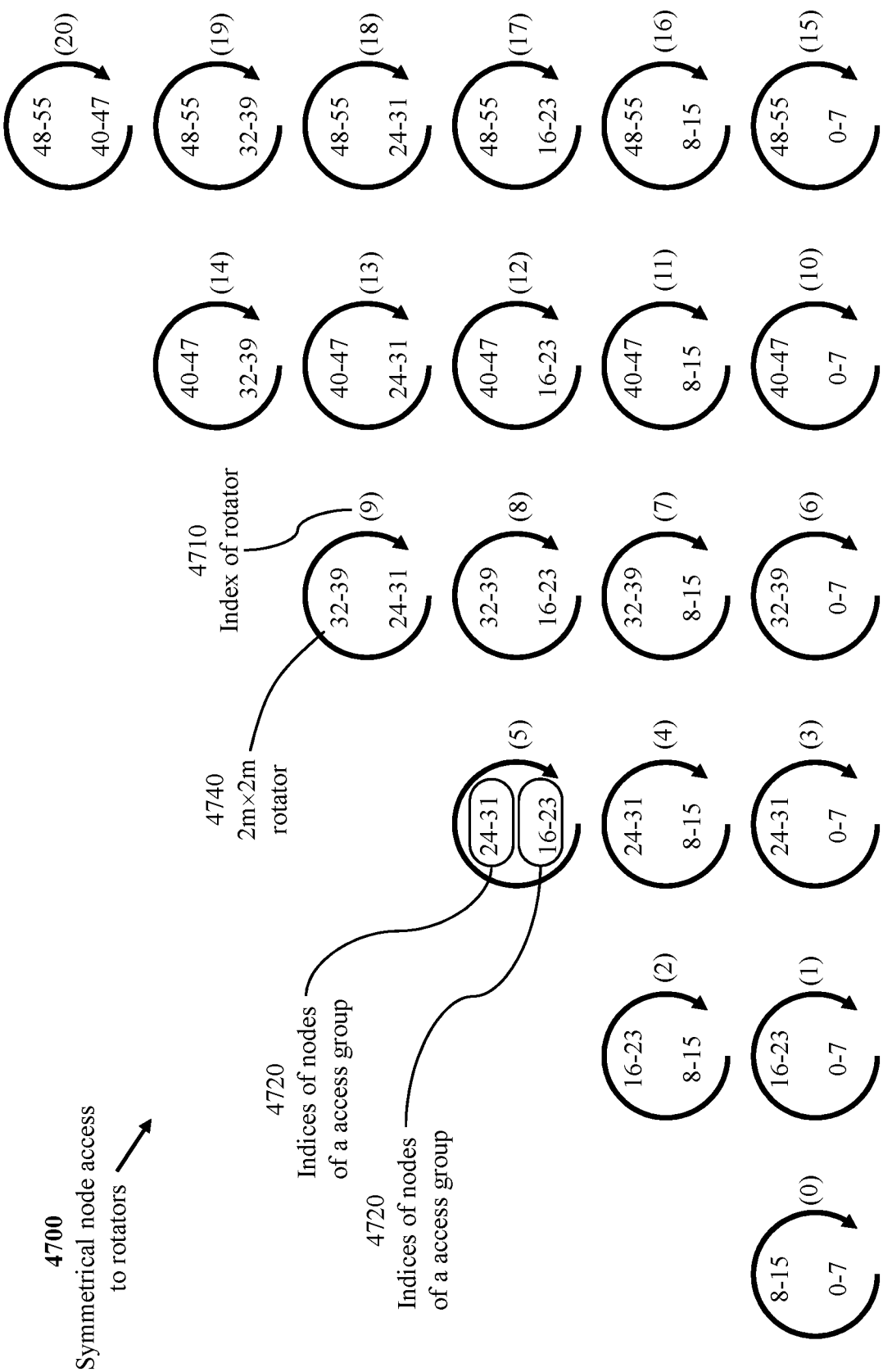
FIG. 47 illustrates a symmetrical-access switching system based on combining each pair of conjugate rotators to form a respective single rotator, in accordance with an embodiment of the present invention.

FIG. 47 illustrates a symmetrical-access switching system 4700 based on combining each pair of complementary rotators to form a respective single rotator 4740 having 2×m dual ports in addition to any control ports. Each rotator is coupled to respective two groups of access nodes 4720. The arrangement of rotators of FIG. 47 is analogous to the arrangement of distributors of FIG. 42 and the indices 4710 of rotators 4740 are likewise selected.

Thus, regardless of the type of distributors (switches or rotators), an access group of index g, 0≤g<μ, connects to (μ−1) distributors of indices:

$\{j+g\times(g-1)/2\}$ for $0j<g$, and $\{g+j\times(j-1)/2\}$ for $g<j<\mu;$

μ denoting a count of access groups of the plurality of access groups. The access groups are indexed sequentially from 0 to (μ−1), and the distributors of the plurality of distributors are indexed sequentially in steps of 1 starting from 0. The plurality of distributors (switches or rotators) comprises M=μ×(μ−1)/2 indexed as 0, 1, . . . , (M−1).

Figure 48:
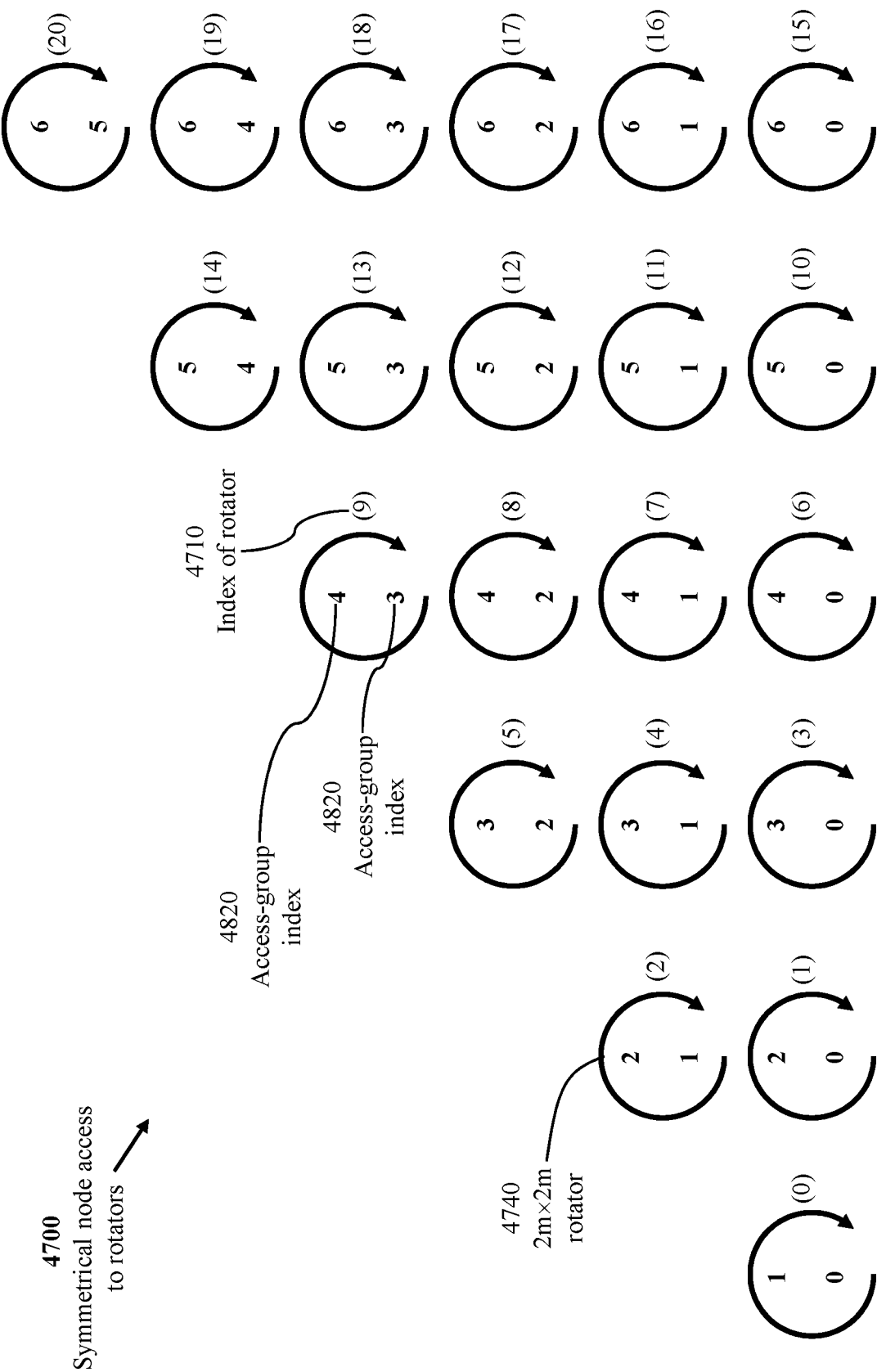
FIG. 48 illustrates the symmetrical-access switching system of FIG. 47 indicating indices of access groups connecting to each rotator.

FIG. 48 illustrates the symmetrical-access switching system 4700 illustrating indices 4820 of access groups connecting to each rotator 4740. With m=8, the access groups of {0-7}, {8-15}, {16-23}, {24-31}, {32-39}, {40-47}, and {48-55} are indexed as 0, 1, 2, 3, 4, 5, and 6, respectively.

Figure 49:
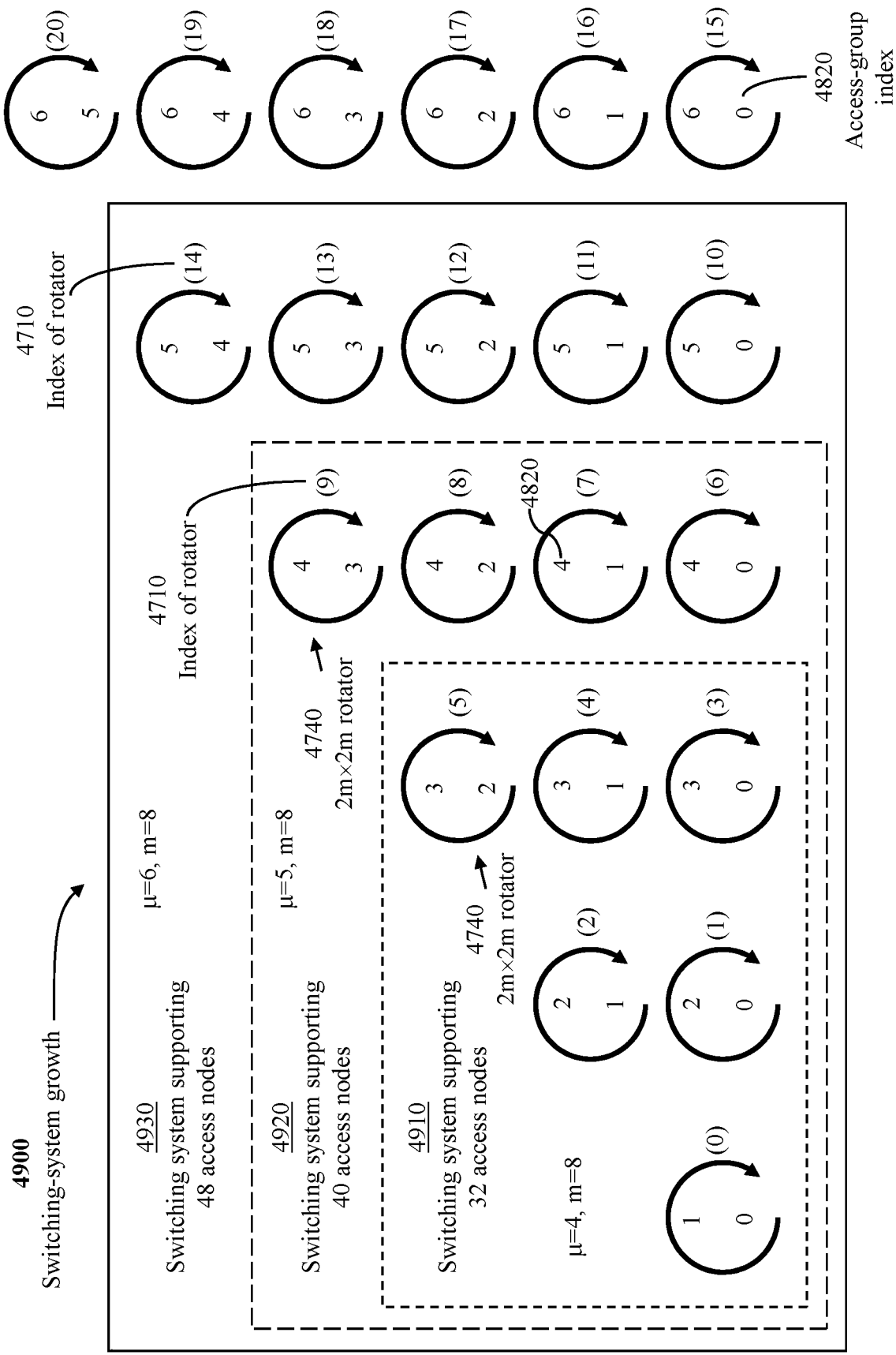
FIG. 49 illustrates an expansion scheme of the symmetrical-access switching system of FIG. 48, in accordance with an embodiment of the present invention.

FIG. 49 illustrates an expansion scheme 4900 of the symmetrical-access switching system 4700 of FIG. 48 similar to expansion scheme 4400. Expansion scheme 4900 is based on adding new rotators of same dimensions and new access nodes. With each access node having (μ−1) dual channels each connecting to a respective rotator 4740 having 2×m dual ports for handling payload data, the total number M of rotators is μ×(μ−1)/2 and the number N of access nodes is limited to m×μ.

Figure 50:
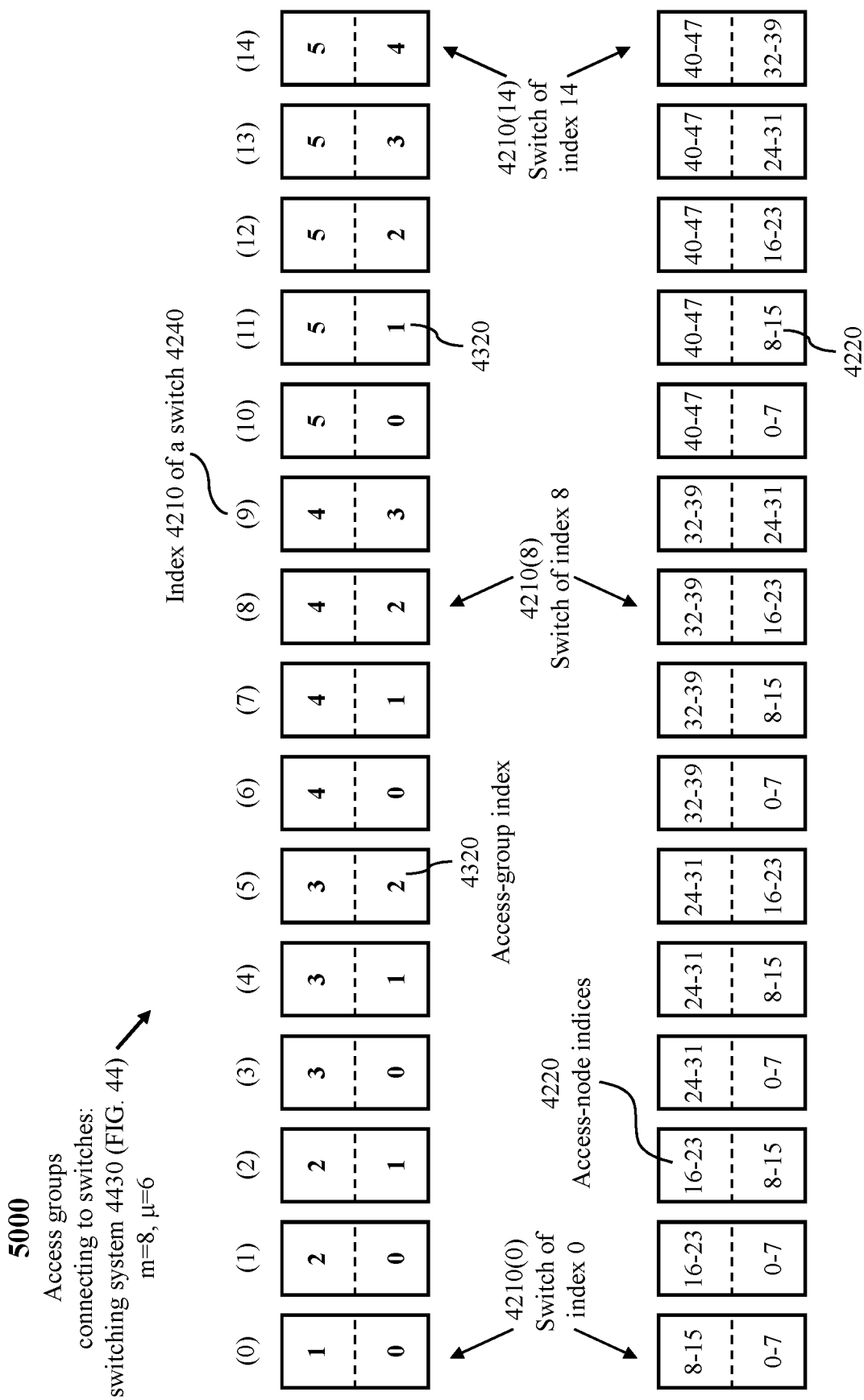
FIG. 50 illustrates indices of access nodes connecting to a set of distributors of the symmetrical-access switching system of FIG. 42 and corresponding indices of access groups.

FIG. 50 illustrates access groups 5000 connecting to distributors 4240 of a symmetrical-access switching system 4430 of FIG. 44. Indices 4220 of access nodes and corresponding indices 4320 of access groups connecting to each distributor 4240 are illustrated.

Figure 51:
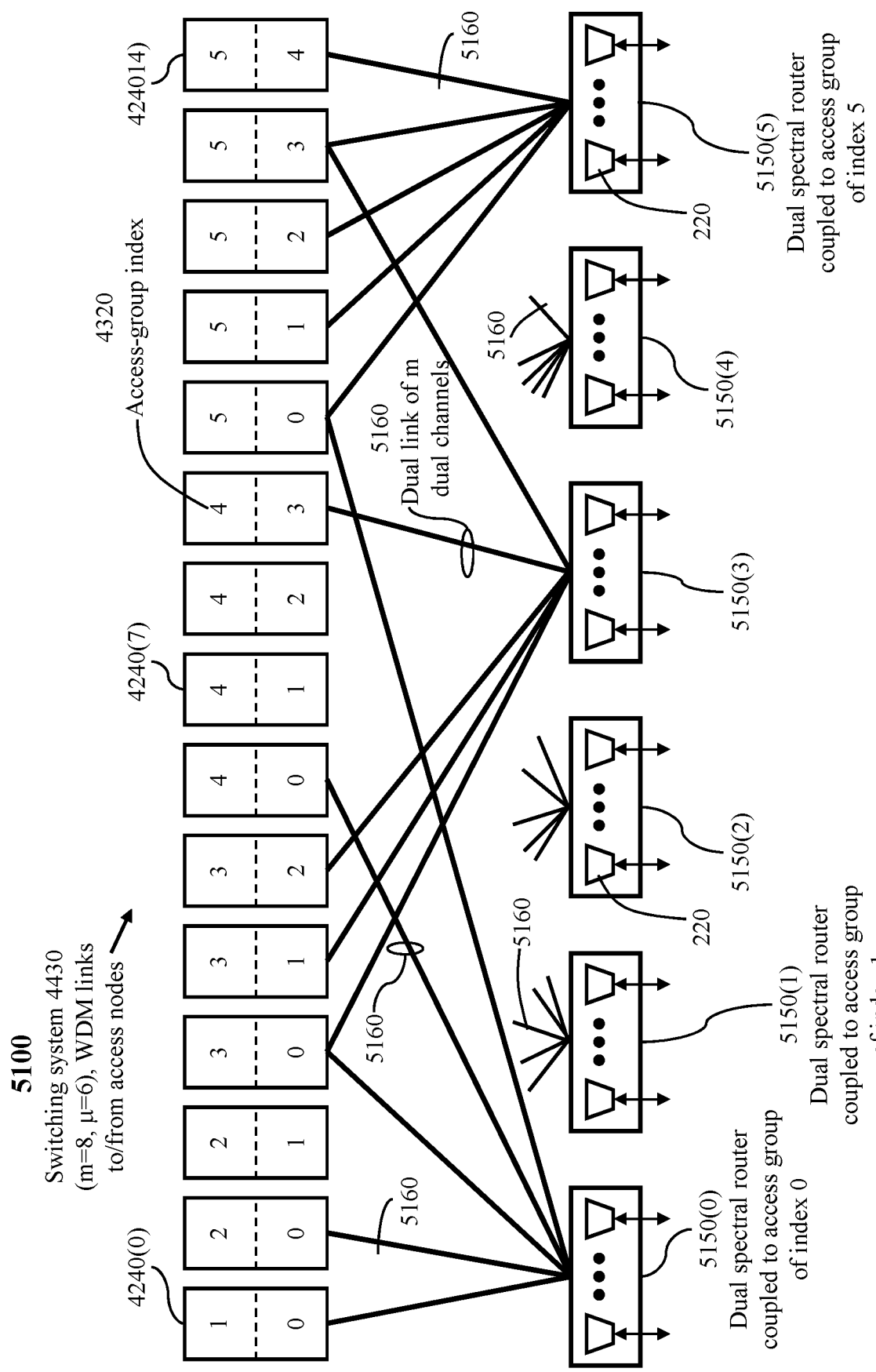
FIG. 51 illustrates connectivity of access groups to distributors of the symmetrical-access switching system of FIG. 42 using upstream WDM links and downstream WDM links in accordance with an embodiment of the present invention.

FIG. 51 illustrates an implementation 5100 of the switching system 4430 of FIG. 44 where access groups 4220 connect to distributors 4240 of the symmetrical-access switching system 4430 using dual WDM links 5160; a dual WDM link comprises an upstream WDM link and a downstream WDM link.

An access group of index g and an access group of index h, 0<g<μ, 0≤h<(μ−1), g>h, connect to a distributor of index {h+g×(g−1)/2}, μ denoting the number of access groups. The distributors of the plurality of distributors are indexed sequentially in steps of 1 starting from 0. For example, an access group of index 4 and an access group of index 5 (g=5 and h=4) connect to a distributor of index {4+(5×4)/2}; that is the distributor of index 14 as indicated in FIG. 44 and FIG. 51.

Each access node of an access group directs a spectral band to each of (μ−1) upstream WDM links directed to a set of (μ−1) distributors 4240 and receives a spectral band from each of (μ−1) downstream WDM links originating from the same set of (μ−1) distributors 4240. An upstream spectral router transfers spectral bands from the access nodes of an access group to (μ−1) upstream WDM links and a downstream spectral router transfers spectral bands from (μ−1) downstream WDM links to the access nodes. An upstream spectral router and a corresponding downstream spectral router are indicated as a dual spectral router 5150 to be further detailed in FIG. 52 to FIG. 56. An upstream WDM link and a corresponding downstream WDM link connecting an access node to a distributor are indicated as a dual link 5160.

FIG. 52 illustrates spectral-band distribution 5200 using a spectral router to transfer spectral bands of input WDM links to a same number of output WDM links. In the illustrated case, an upstream spectral router connects to eight input WDM links originating from access nodes and eight output WDM links directed to distributors, and a downstream spectral router connects to eight input WDM links originating from distributors and directed to access nodes. In the upstream direction, each input WDM link carries eight spectral bands 5220 originating from one access node and directed to eight distributors. Each output WDM link carries eight spectral bands 5230 received from eight access nodes and directed to one distributor 4240. The spectral bands of a first input link are denoted {A0, A1, . . . , A7}, the spectral bands of a second input link are denoted {B0, B1, . . . , B7}, the spectral bands of a third input link are denoted {C0, C1, . . . , C7}, and so on with the spectral bands of the last input link denoted {Y0, Y1, . . . , Y7}. In the spectral-band notation above, the characters A, B, C, D, E, F, X, Y identify a physical link and the numerals 0, 1, 2, 3, 4, 5, 6, and 7 identify respective spectral bands (or wavelength bands). Thus, the set of signals {A0, B0, C0, D0, E0, F0, X0, and Y0} refers to signals occupying the same spectral band in different physical transport media and the set of signals {A0, B1, C2, D3, E4, F5, X6, and Y7} refers to signals occupying non-overlapping spectral bands which may then share a same physical transport medium (a fiber link). Each output WDM link carries eight non-overlapping spectral bands comprising a spectral band from each input link. In the downstream direction, each input WDM link to a downstream spectral router carries eight spectral bands originating from one distributor 4240 and directed to eight access nodes. Each output WDM link of the downstream spectral router carries eight spectral bands received from eight distributors and directed to one access node.

Figure 53:
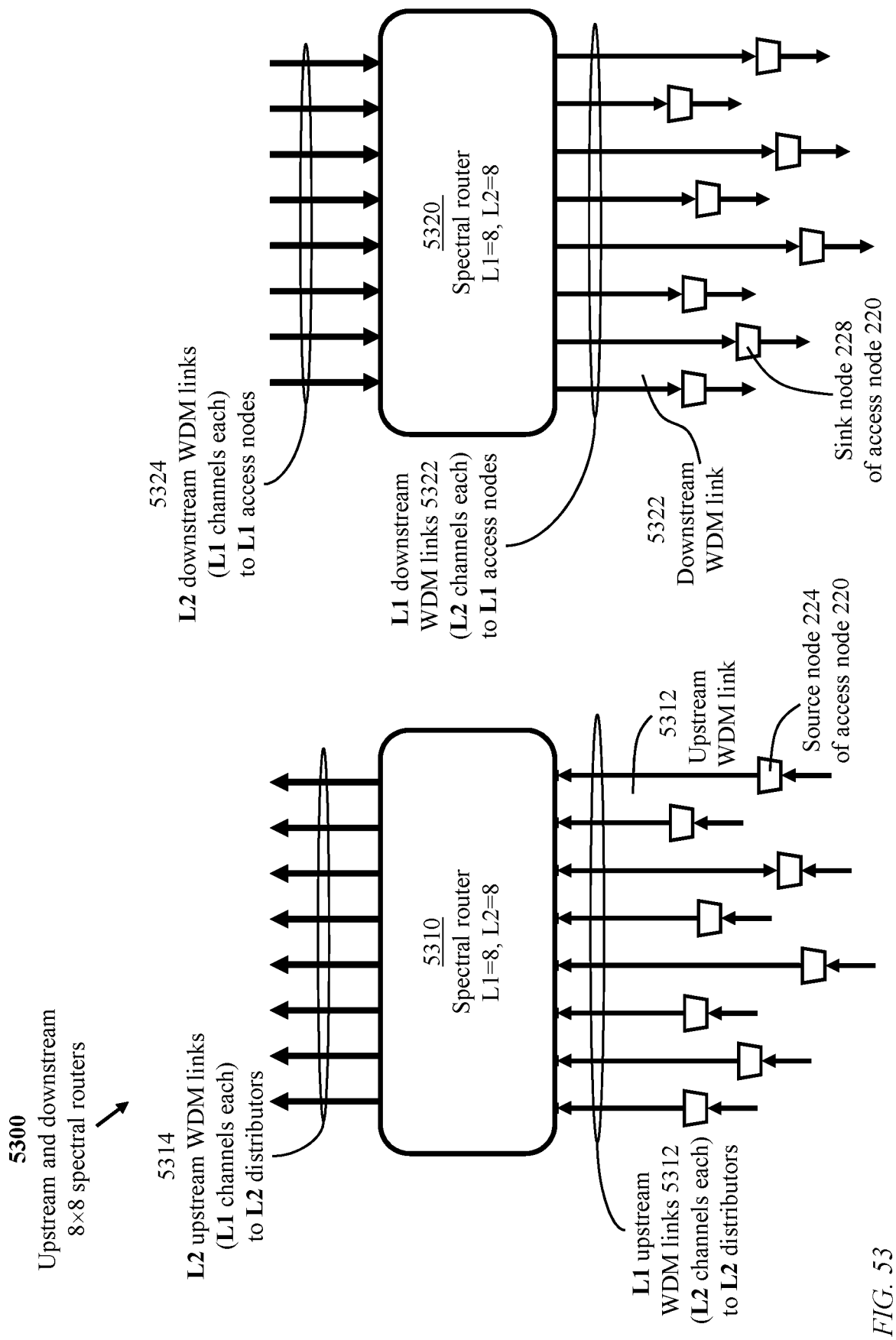
FIG. 53 illustrates an upstream spectral router and a downstream spectral router each having equal numbers of input and output WDM links.

FIG. 53 illustrates a configuration of dual spectral router 5300 comprising an upstream spectral router 5310 connecting to L1 input WDM links and L2 output WDM links and a downstream spectral router 5320 connecting to L1 input WDM links and L2 output WDM links with L1=L2=8. Each of m access nodes 220 connects to a respective upstream WDM link 5312 directed to upstream spectral router 5310 and a respective downstream WDM link 5322 from downstream spectral router 5320. Each of (μ−1) upstream WDM links 5314 from upstream spectral router 5310 connects to a respective distributor. Each of (μ−1) downstream WDM links 5324 connects a respective distributor to downstream spectral router 5320.

Figure 54:
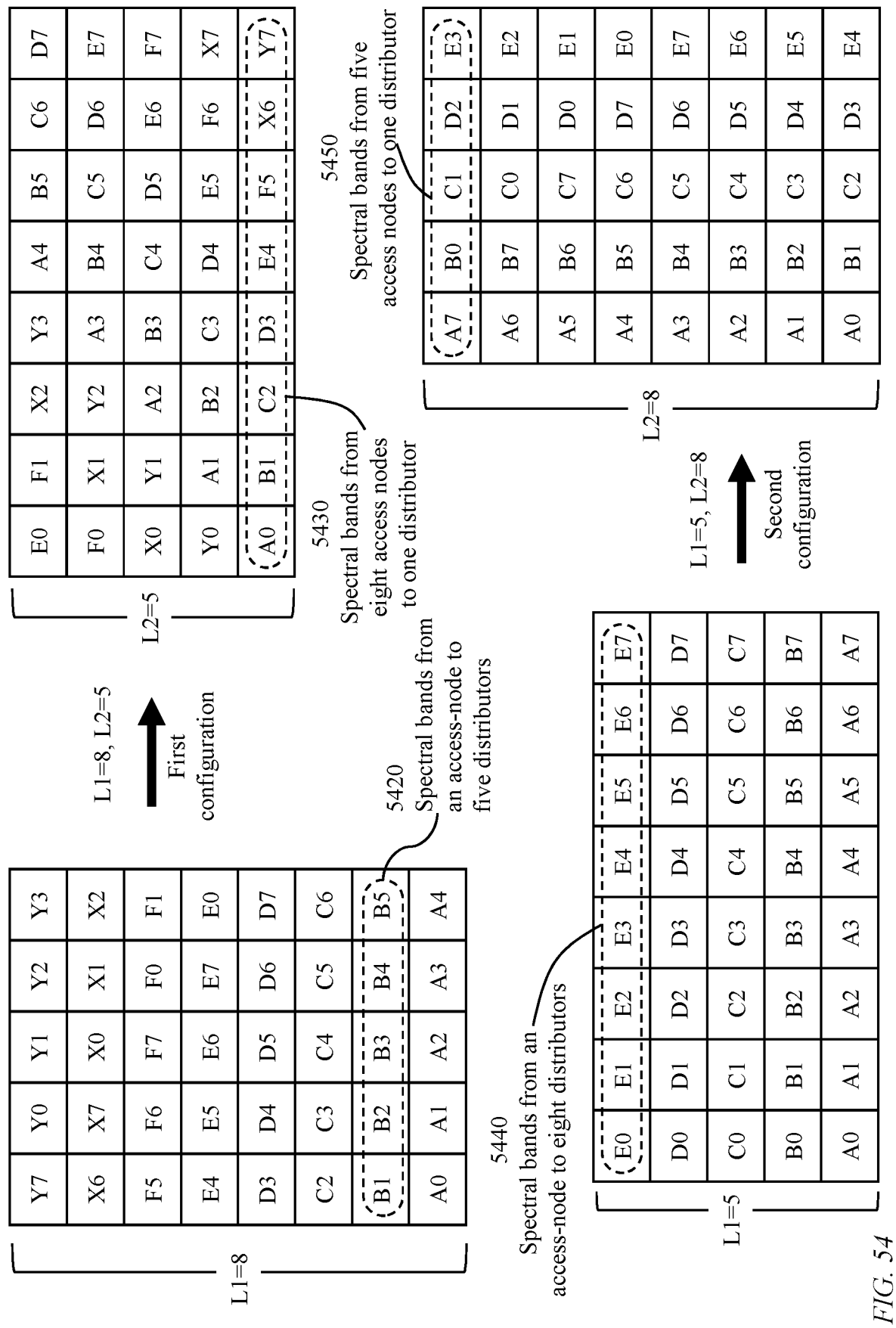
FIG. 54 illustrates distribution of spectral bands of input WDM links among a different number of output WDM links for use as an upstream spectral router or a downstream spectral router.

FIG. 54 illustrates spectral-band distribution using a spectral router to transfer spectral bands of input WDM links to a different number of output WDM links. Two configurations are illustrated.

In a first configuration of FIG. 54, in the upstream direction, each input WDM link from an access node of a group of eight access nodes carries five spectral bands 5420 originating from one access node and directed to five distributors. Each output WDM link carries eight spectral bands 5430 received from eight access nodes and directed to one distributor 4240. The input spectral bands of a first input link are denoted {A0, A1, A2, A3, A4}, the spectral bands of a second input link are denoted {B0, B1, B2, B3, B4}, the spectral bands of a third input link are denoted {C0, C1, C2, C3, C4}, and so on with the spectral bands of the last input link denoted {Y0, Y1, Y2, Y3, Y4}. Each output WDM link carries eight non-overlapping spectral bands 5430 comprising a spectral band from each input link.

In the downstream direction, each input WDM link carries eight spectral bands originating from one distributor (distributor 4240) and directed to eight access nodes. Each output WDM link carries five spectral bands received from five distributors and directed to one access node.

In a second configuration of FIG. 54, in the upstream direction, each input WDM link from an access node of a group of five access nodes carries eight spectral bands 5440 originating from one access node and directed to eight distributors. Each output WDM link carries five spectral bands 5450 received from five access nodes and directed to one distributor 4240. The input spectral bands of a first input link are denoted {A0, A1, . . . , A7}, the spectral bands of a second input link are denoted {B0, B1, . . . , B7}, and so on with the spectral bands of the last input link denoted {E0, E1, . . . , E7}. Each output WDM link carries five non-overlapping spectral bands comprising a spectral band from each input link. In the downstream direction, each input WDM link carries five spectral bands originating from one distributor 4240 and directed to five access nodes. Each output WDM link carries eight spectral bands received from eight distributors and directed to one access node.

Figure 55:
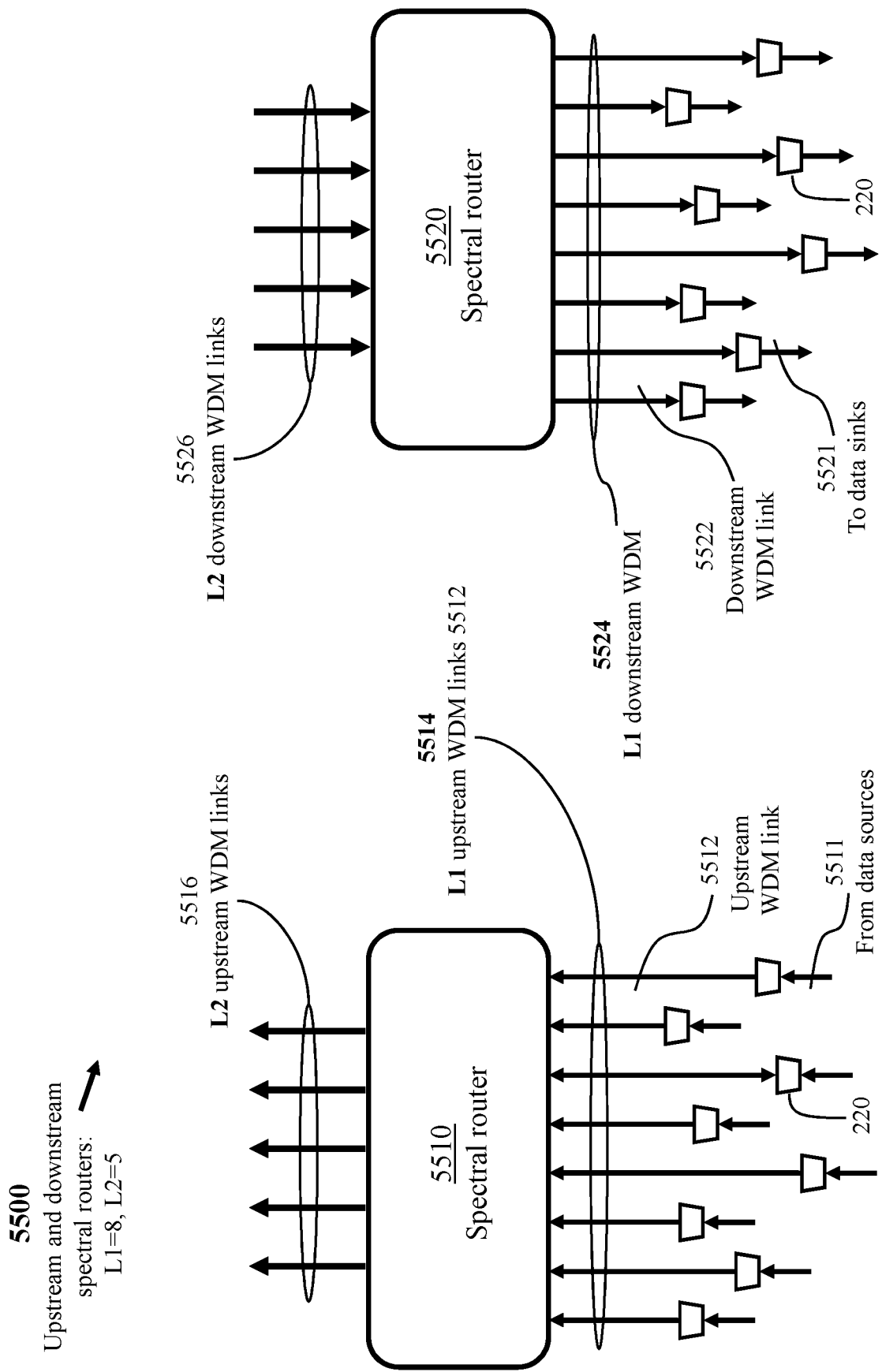
FIG. 55 illustrates an upstream spectral router having a number of input WDM links exceeding a number of output WDM links and a downstream spectral router having a number of output WDM links exceeding a number of input WDM links.

FIG. 55 illustrates a configuration 5500 of dual spectral router 5150 comprising an upstream spectral router 5510 and a downstream spectral router 5520. Upstream spectral router 5510 transfers spectral bands from a set 5514 of L1 WDM links 5512 originating from L1 access nodes to L2 WDM links 5516 directed to L2 distributors 4240, L1=8, L2=5. Downstream spectral router 5520 transfers spectral bands from L2 WDM links 5526 originating from L2 distributors 4240 to a set 5524 of L1 WDM links 5522 directed to eight access nodes. Each of L1 access nodes 120 connects to a respective upstream WDM link 5512 directed to upstream spectral router 5510 and a respective downstream WDM link 5522 from downstream spectral router 5520. Each of upstream WDM links 5516 from upstream spectral router connects to a respective distributor. Each of downstream WDM links 5526 connects a respective distributor to downstream spectral router 5520. Each access node 120/220 receives data from a respective set of data sources through channels 5511 and transmits data to a respective set of data sinks through a set of channels 5521.

Figure 56:
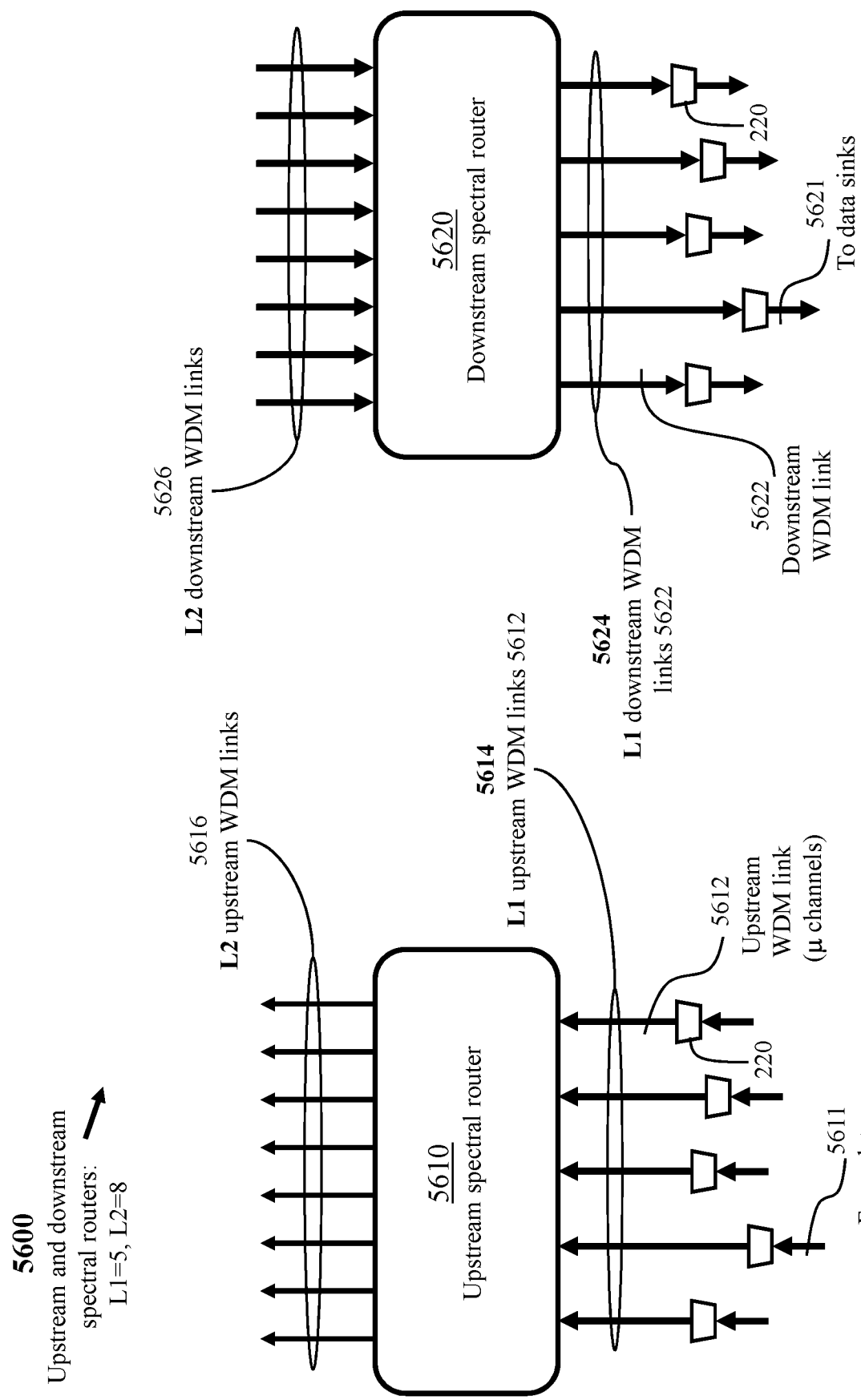
FIG. 56 illustrates an upstream spectral router having a number of output WDM links exceeding a number of input WDM links and a downstream spectral router having a number of input WDM links exceeding a number of output WDM links.

FIG. 56 illustrates a configuration 5600 of dual spectral router comprising an upstream spectral router 5610 and a downstream spectral router 5620. Upstream spectral router 5610 transfers spectral bands from a set 5614 of L1 WDM links 5612 originating from L1 access nodes to a set 5616 of L2 WDM links directed to L2 distributors 4240, L1=5, L2=8. Downstream spectral router 5620 transfers spectral bands from a set 5626 of L2 WDM links originating from L2 distributors to a set 5624 of L1 WDM links 5622 directed to L1 access nodes 220. Each of L1 access nodes 120 connects to a respective upstream WDM link 5612 directed to upstream spectral router 5610 and a respective downstream WDM link 5622 from downstream spectral router 5620. Each of L2 upstream WDM links 5616 from upstream spectral router 5610 connects to a respective distributor. Each of L2 downstream WDM links 5626 connects a respective distributor to downstream spectral router 5620. Each access node 120 receives data from a respective set of data sources through channels 5611 and transmits data to a respective set of data sinks through a set of channels 5621.

Figure 57:
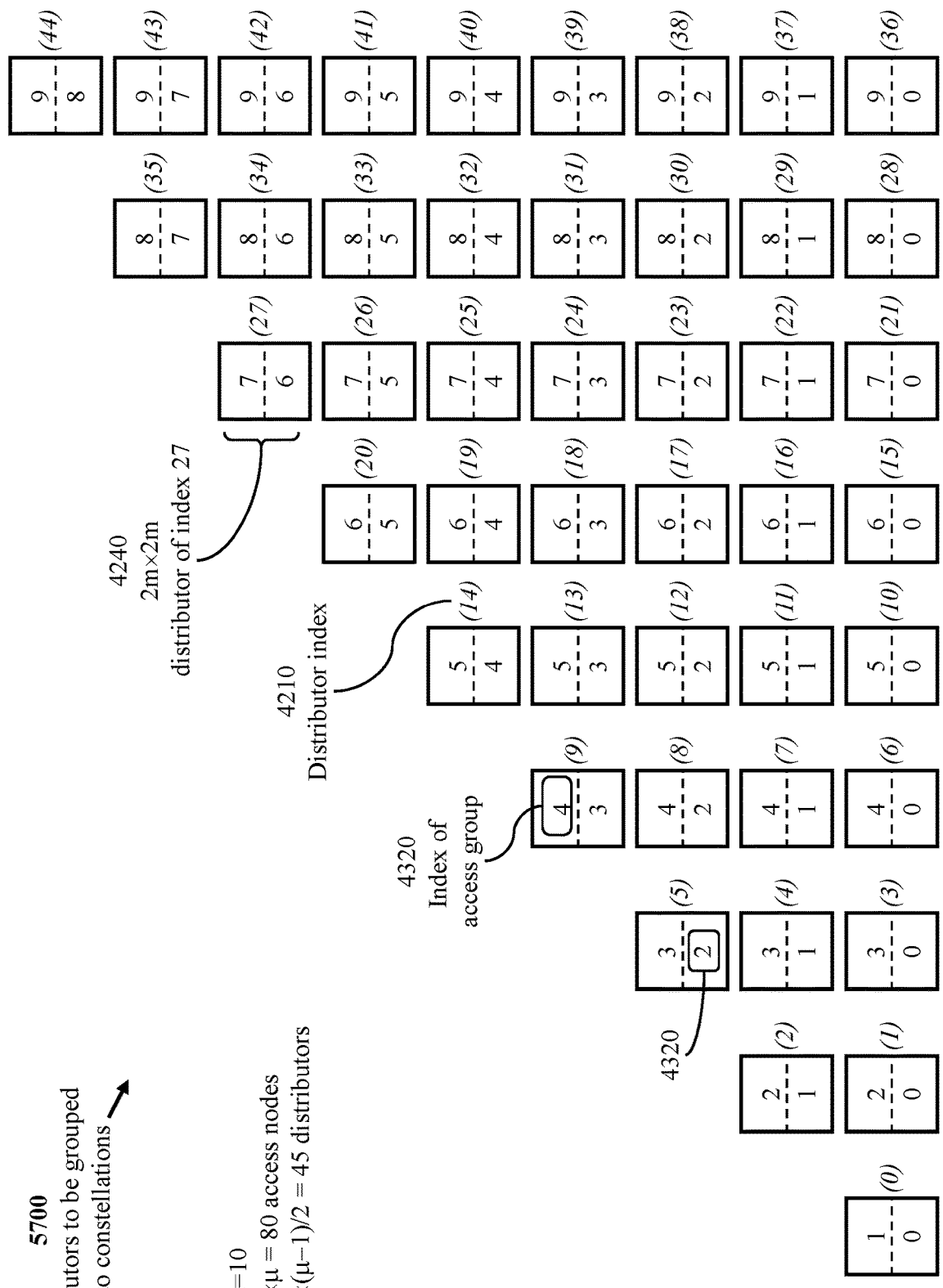
FIG. 57 illustrates distributors of a symmetrical-access distributor to be arranged into constellations of distributors.

FIG. 57 illustrates a symmetrical switching system 5700 of parameters m=8 and μ=10; m being a nominal number of dual ports per distributor and μ being a number of access groups. The symmetrical switching system 5700 comprises μ×(μ−1)/2 distributors 4240 indexed as 0 to 44 interconnecting μ access groups indexed as 0 to 9 (comprising m×μ access nodes indexed as 0 to 79). Indices 4320 of access groups coupled to each distributor 4240 are indicated; for example, access groups of indices 3 and 4 are coupled to distributor 4240 of index 9 (reference numeral 4210). To exploit WDM transport efficiency, the 45 distributors may be arranged into constellations of collocated distributors enabling each access node to connect to a constellation of distributors through a respective WDM link, thus eliminating the need for intermediate spectral routers.

Figure 58:
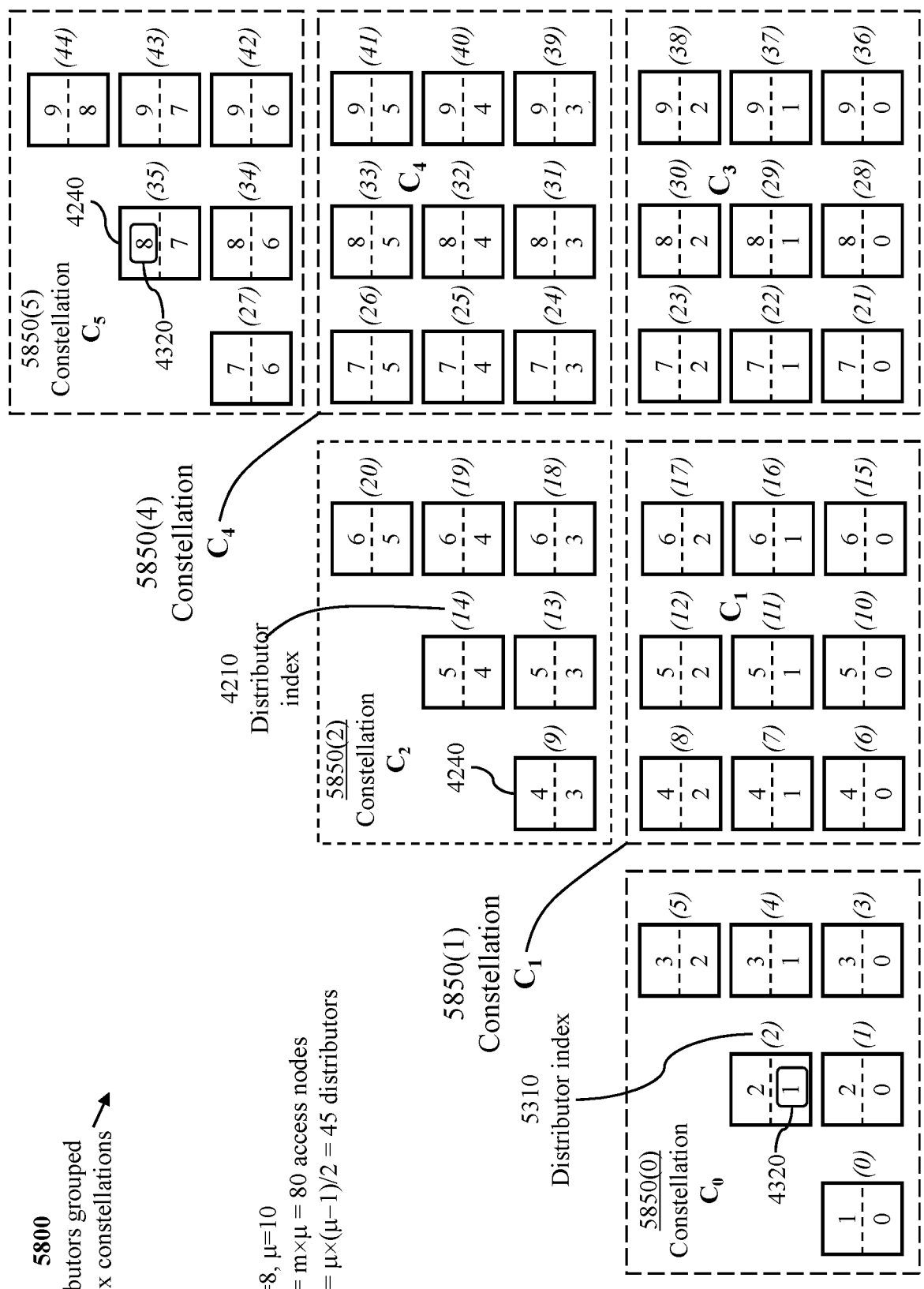
FIG. 58 illustrates an exemplary arrangement of the distributors of FIG. 57 into a number of constellations, in accordance with an embodiment of the present invention.

FIG. 58 illustrates an exemplary arrangement 5800 of the distributors of FIG. 57 into a number of constellations 5850. Each access node connects to each of respective (μ−1) distributors through a respective dual channel. The constellations are formed so that each access node connects to at most Ω distributors in each of respective Π constellations where 1<Ω<(μ−1) and Π=⌈(μ−1)/Ω⌉. In the arrangement of FIG. 58, μ=10, Ω=3, and Π=3. With each distributor connecting to two access groups, the ratio of the number of access groups connecting to a constellation to the number of distributors of the constellation is 2/Ω. If μ is selected to equal 9 instead, with Ω=3, then each access node may connect to three distributors in each of two constellations and two distributors in one constellation. With Ω>1, Π>1, the minimum value of μ to enable forming constellations is 5. Naturally, arranging the distributors (switches or rotators) into constellations is attractive in a large-scale network where the number μ of access groups is significantly large; with μ exceeding 100 for example. For a network of global coverage, a value of μ exceeding 1000 may be considered.

The distributors are arranged in Π×(Π+1)/2 constellations including n diagonal constellations each comprising Ω×(Ω+1)/2 distributors and Π×(Π−1)/2 square constellations each comprising Ω² distributors. With μ=10, Ω=3, Π=3, the number of distributors is 45, the number of diagonal constellations is 3 and the number of square constellations is 3. As illustrated in FIG. 58, each of the diagonal constellations 5850(0), 5850(2), and 5850(5) comprises 6 distributors supporting 4 access groups and each of the remaining constellation 5850(1), 5850(3), and 5850(4) comprises 9 distributors supporting 6 access groups.

Thus, the plurality of distributors is arranged into a plurality of constellations where each access node connects to a respective set of constellations of the plurality of constellations through a set of multichannel links. The constellations to which an access node connects collectively contain a respective set of (μ−1) distributors. Each multichannel link to a constellation carries a set of dual channels directed through a spectral demultiplexer and a spectral multiplexer to a subset of distributors of the respective set of (μ−1) distributors. Table-I below illustrates connectivity of access groups to distributors within constellations.

TABLE I

Connectivity of access-groups to distributors - Configuration of FIG. 58

| Access group | C | Distributors | | | C | Distributors | | | C | Distributors | | |
|---|---|---|---|---|---|---|---|---|---|---|---|---|
| 0 | 0 | 0 | 1 | 3 | 1 | 6 | 10 | 15 | 3 | 21 | 28 | 36 |
| 1 | | 0 | 2 | 4 | | 7 | 11 | 16 | | 22 | 29 | 37 |
| 2 | | 1 | 2 | 5 | | 8 | 12 | 17 | | 23 | 30 | 38 |
| 3 | 0 | 3 | 4 | 5 | 2 | 9 | 13 | 18 | 4 | 24 | 31 | 39 |
| 4 | 1 | 6 | 7 | 8 | 2 | 9 | 14 | 19 | 4 | 25 | 32 | 40 |
| 5 | | 10 | 11 | 12 | | 13 | 14 | 20 | | 26 | 33 | 41 |
| 6 | 1 | 15 | 16 | 17 | 2 | 18 | 19 | 20 | 5 | 27 | 34 | 42 |
| 7 | 3 | 21 | 22 | 23 | 4 | 24 | 25 | 26 | 5 | 27 | 35 | 43 |
| 8 | | 28 | 29 | 30 | | 31 | 32 | 33 | | 34 | 35 | 44 |
| 9 | | 36 | 37 | 38 | | 39 | 40 | 41 | | 42 | 43 | 44 |

With each access node connecting to Π constellations, Π>1, and each multichannel link carrying at most Ω dual channels, Ω>0, the integers Π and Ω may be selected so that the product (Π×Ω) at least equals (μ−1), μ denoting a count of the access groups of the entire network.

Identifiers of paths from an access node to other access nodes, where each path traverses only one distributor, comprise an identifier of a WDM link of the set of multichannel links and an identifier of a dual channel of the set of dual channels.

A constellation of index $\{(q\times(q+1))/2+p\}$, $0 \le p < \Pi$ $p \le q < \Pi$, comprises distributors of indices: $\{j+k\ (k-1)/2\}$, $k > j$, where:

$[p \times \Omega] \le j < [\Omega \times (p+1)]$; and $[(q \times \Omega)+1] \le k \le [\Omega \times (q+1)]$;

the plurality of distributors comprising M distributors, M=μ×(μ−1)/2, indexed from 0 to (M−1), and the plurality of constellations comprising Γ constellations, Γ={Π×(Π+1)}/2, indexed from 0 to (Γ−1).

Figure 59:
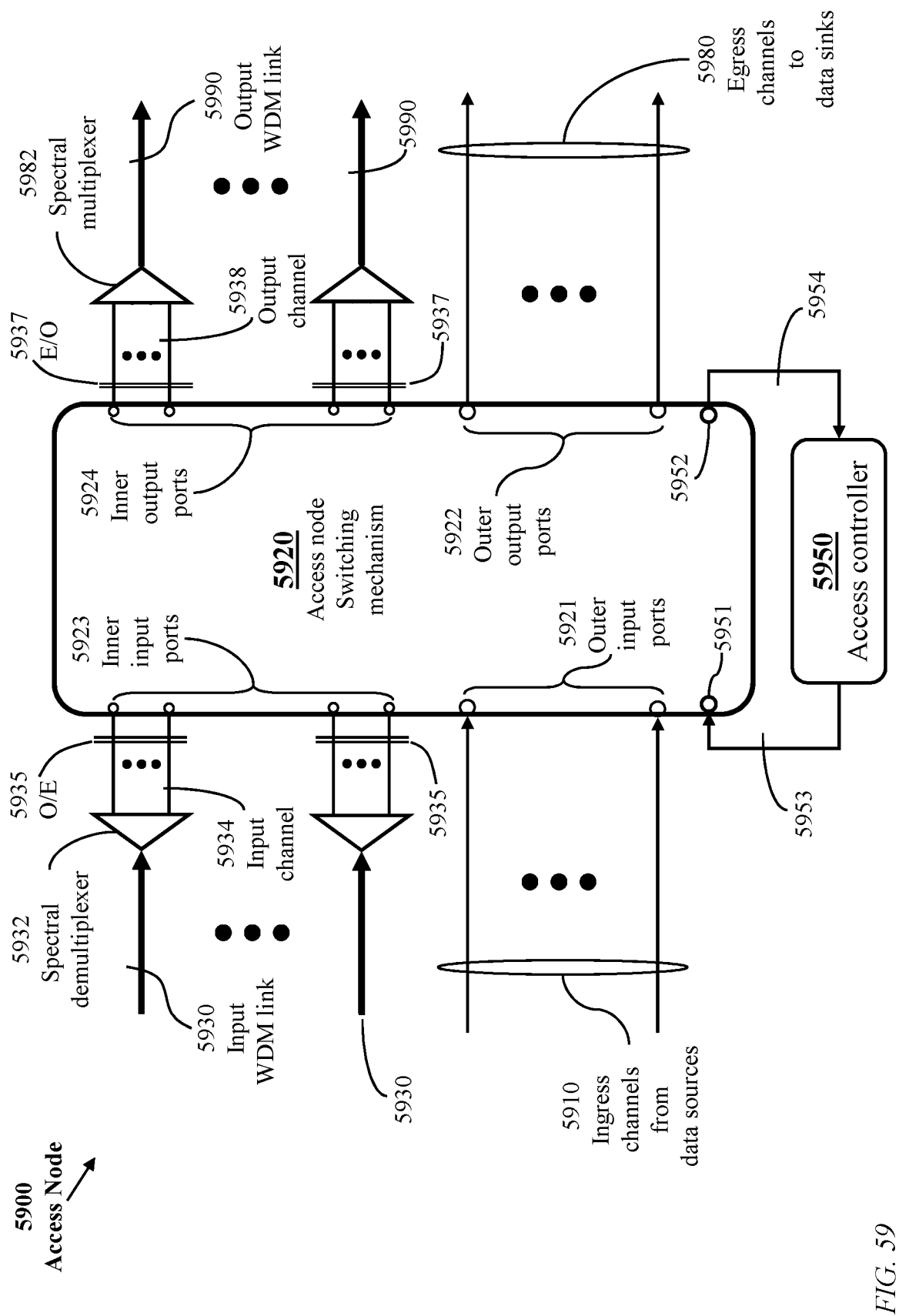
FIG. 59 illustrates an access node coupled to spectral demultiplexers at input and spectral multiplexers at output for use in an embodiment of the present invention.

FIG. 59 illustrates an access node 5900 comprising an access-node switching mechanism 5920 having a plurality of input ports and a plurality of output ports. The input ports are divided into ingress ports 5921 for receiving data from ingress channels 5910 originating from external data sources, inner input ports 5923 for receiving data from respective distributors, and a receiving control port 5951 coupled to a control channel 5953 originating from an output port of access controller 5950. The output ports are divided into egress ports 5922 for transmitting data to external data sinks through egress channels 5980, inner output ports 5924 for transmitting data to respective distributors, and a transmitting control port 5952 coupled to a control channel 5954 connecting to an input port of access controller 5950. A dual ingress channel/egress channel 5910/5980 may connect to a server or a set of network users.

Access node 5900 may receive data from respective distributors through a number of input WDM links 5930 and transmit data to the respective distributors through output WDM links 5990. As described above, an access node of the symmetrical switching system connects to a respective set of (μ−1) distributors through (μ−1) dual channels, μ being the number of access groups in the entire network. The (μ−1) inner input ports 5923 may be divided into a number H of sets of inner input ports each set comprising at most Ω ports where 1<Ω<μ and Π=⌈(μ−1)/Ω⌉, ⌈r⌉ denoting the value of r if r is an integer or the nearest higher positive integer to r if r is a positive real number. Likewise, the μ inner output ports 5924 may be divided into Π sets of inner output ports each set comprising at most Ω inner output ports.

Each input WDM link 5930 carries at most Ω spectral bands. A spectral demultiplexer 5932 separates the spectral bands. Input channels 5934 coupled to outputs of the spectral demultiplexer 5932 connect to a bank of optical-to-electrical converters 5935 the output of which is supplied to respective inner input ports 5923. Each set of inner output ports 5924 connects to a respective bank 5937 of electrical-to-optical converters the output of which is supplied through output channels 5938 to a spectral multiplexer 5982 coupled to a respective output WDM link 5990.

Figure 60:
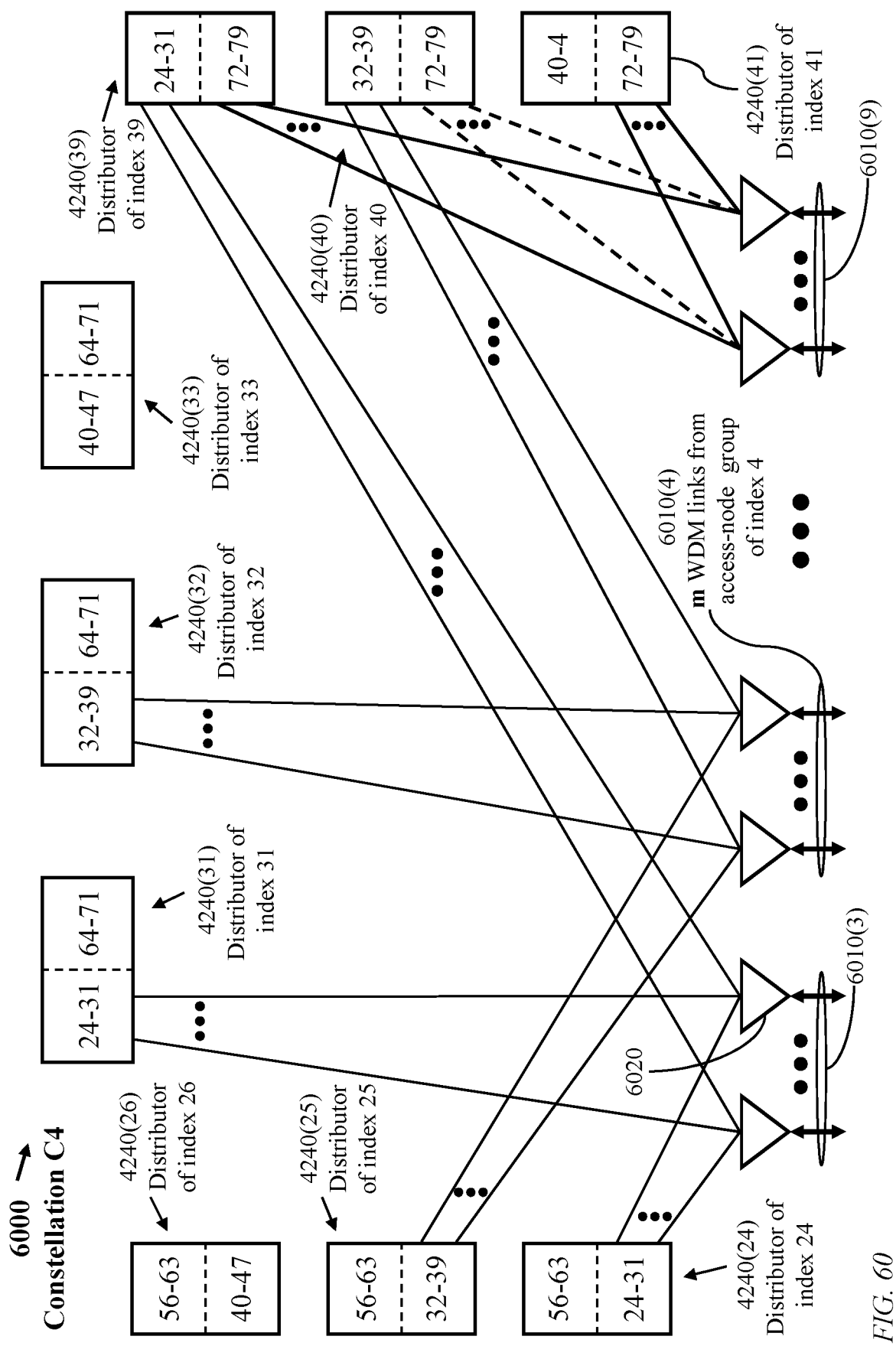
FIG. 60 illustrates distributors of a constellation coupled to independent spectral demultiplexers at input and independent spectral multiplexers at output, in accordance with an embodiment of the present invention.

FIG. 60 illustrates distributors of a constellation 6000 of distributors receiving data from WDM links 5990 (FIG. 59) originating from respective access nodes through independent spectral demultiplexers and transmitting data through independent spectral multiplexers coupled to WDM links 5930 (FIG. 59) directed to respective access nodes. Each dual WDM link 6010 comprises a WDM link 5990 from a respective access node and a WDM link 5930 to the respective access node. Each spectral demultiplexer/multiplexer 6020 comprises: (1) a spectral demultiplexer separating spectral bands of a WDM link 5990 from a respective access node to be directed through internal optical channels to respective distributors of the constellation; and (2) a spectral multiplexer combining spectral bands received from the respective distributors through internal optical channels onto a WDM link 5930 directed to the respective access node.

Figure 61:
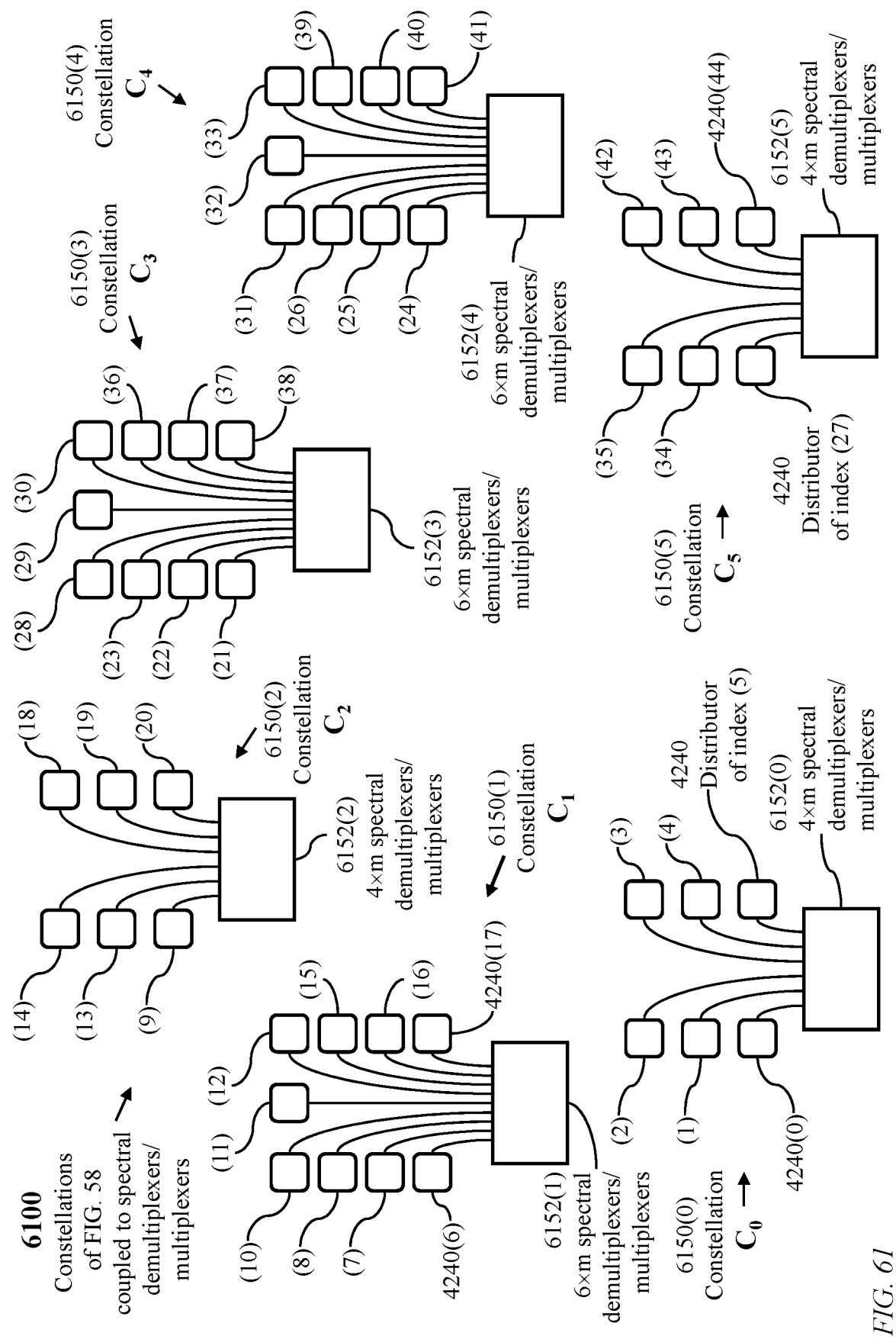
FIG. 61 illustrates the constellations of distributors of FIG. 58 each comprising a respective array of independent spectral demultiplexer and a respective array of independent spectral multiplexers, in accordance with an embodiment of the present invention.

FIG. 61 illustrates constellations 6100 of distributors coupled to respective arrays 6152 of independent spectral demultiplexers/multiplexers. The illustrated constellations 6100 are based on the arrangement of FIG. 58. Constellations 6150(0) to 6150(5) respectively correspond to constellations 5850(0) to 5850(5). Each of constellations 6150(0), 6150(2), and 6150(5) comprises six distributors and supports 4 access groups. With each access group comprising m access nodes, the requisite total number of spectral demultiplexers is 4×m and the requisite total number of spectral multiplexers is 4×m for each of constellations 6150(0), 6150(2), and 6150(5). Each of constellations 6150(1), 6150(3), and 6150(4) comprises nine distributors and supports 6 access groups. With each access group comprising m access nodes, the requisite total number of spectral demultiplexers is 6×m and the requisite total number of spectral multiplexers is 6×m for each of constellations 6150(1), 6150(3), and 6150(4).

Figure 62:
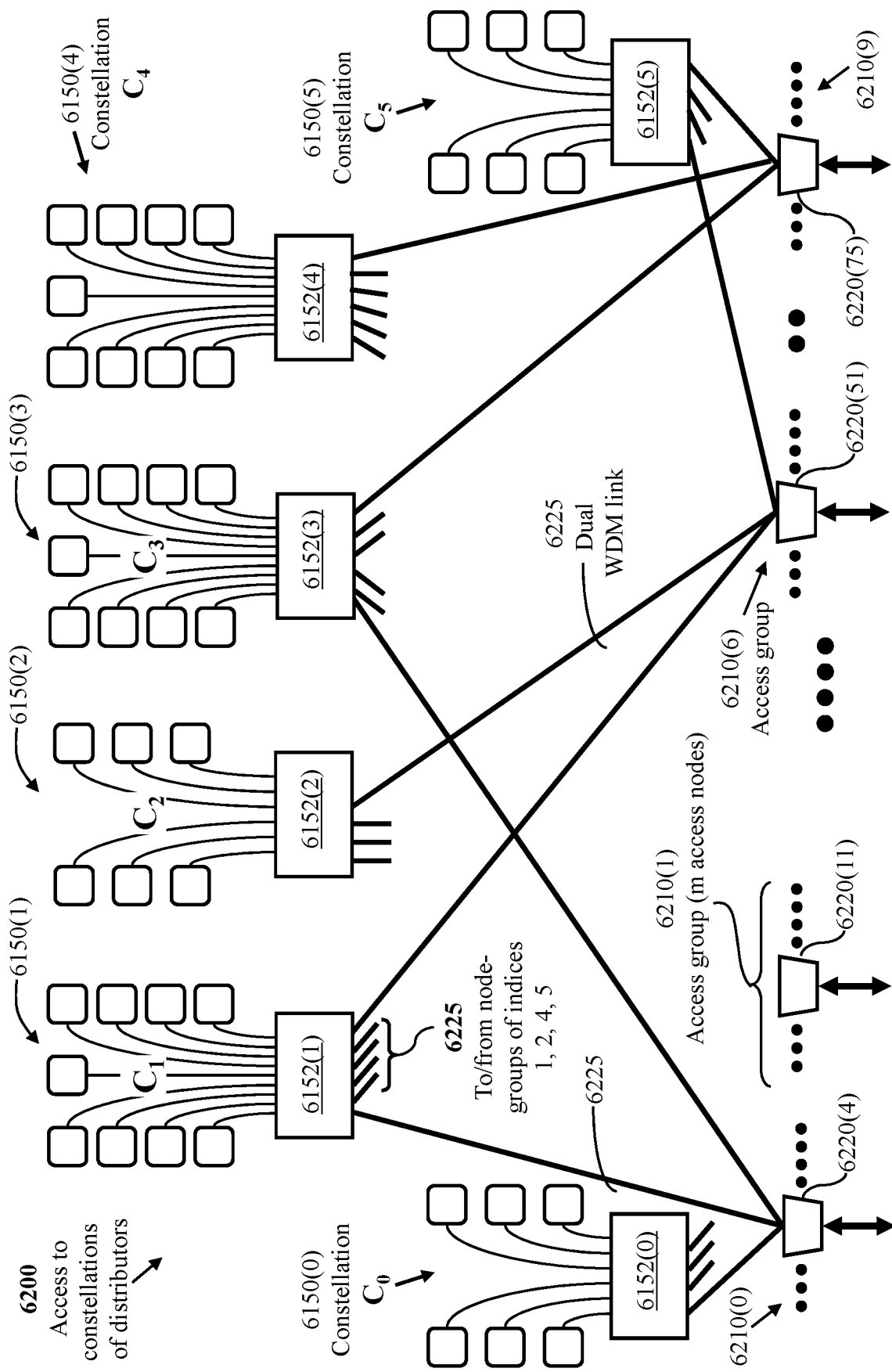
FIG. 62 illustrates connectivity of access nodes to the constellations of distributors of FIG. 61, in accordance with an embodiment of the present invention.

FIG. 62 illustrates a switching system 6200 comprising access nodes connecting to the constellations of distributors of FIG. 61. Each Group 6210 of access nodes 6220 connects to respective Π constellations. Each access node is coupled to Π dual WDM links 6225. Each WDM link 6225 is directed to a respective constellation and carries at most Ω spectral bands directed to respective distributors of the respective constellation.

Figure 63:
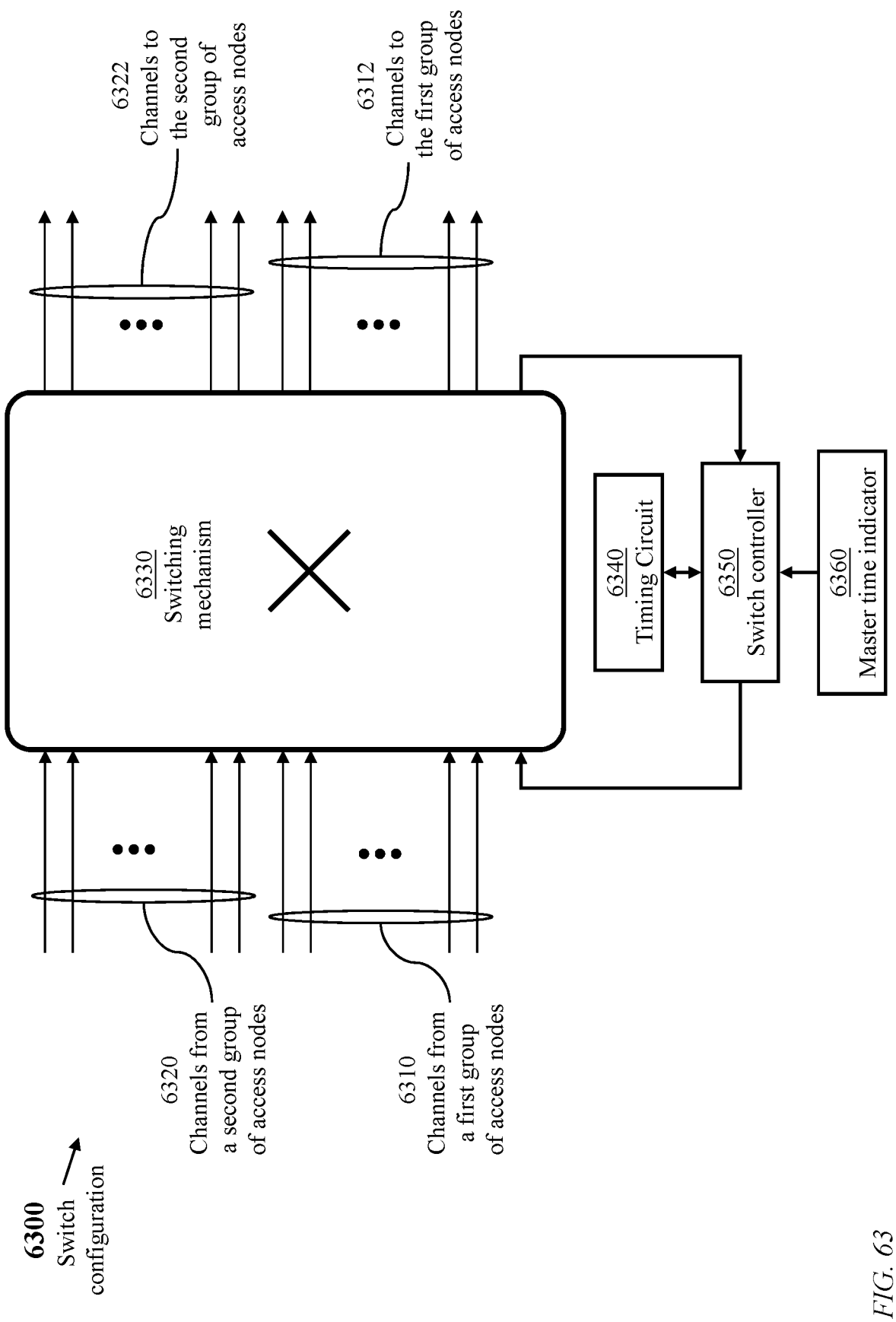
FIG. 63 illustrates a switch comprising a switching mechanism and a switch controller coupled to a timing circuit and a master time indicator, the switching mechanism coupled to two access groups through dual channels and the switch controller communicating with the access nodes through the switching mechanism.

FIG. 63 illustrates a configuration 6300 of a distributor comprising a switching mechanism 6330 and a distributor controller 6350 coupled to a timing circuit 6340 and a master time indicator 6360. The distributor controller comprises at least one hardware processor coupled to memory devices storing processor-executable instructions. Input ports of the switching mechanism 6330 receive data from a first access group through upstream channels 6310 and from a second access group through upstream channels 6320. Output ports of the switching mechanism 6330 transmit data to the first access group through downstream channels 6312 and to the second access group through downstream channels 6322. The distributor controller communicates with the access nodes through the switching mechanism 6330.

Figure 64:
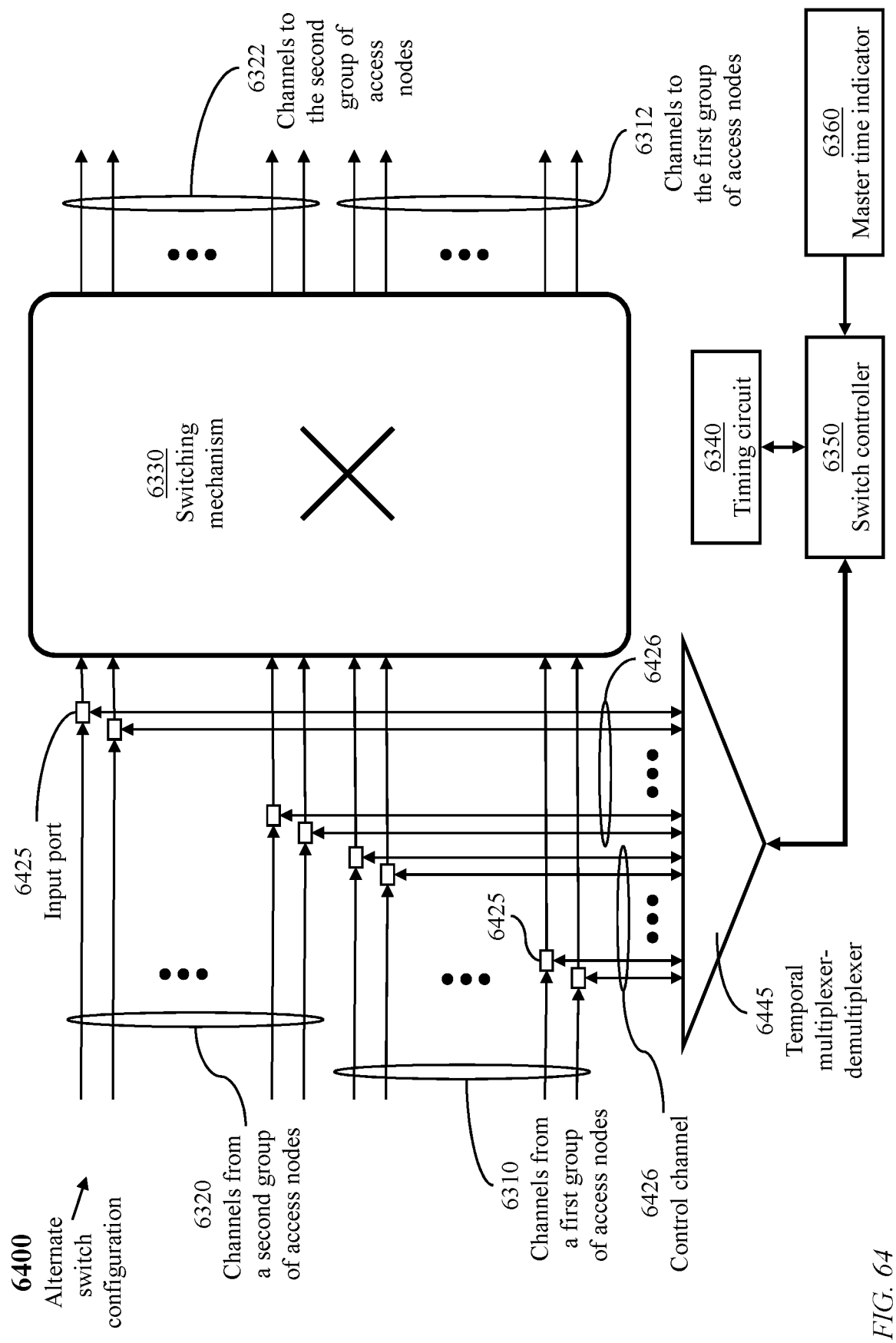
FIG. 64 illustrates a switch comprising a switching mechanism, a temporal multiplexer-demultiplexer coupled to ports of the switching mechanism, and a switch controller coupled to a timing circuit and a master time indicator, the switching mechanism coupled to two access groups through dual channels, and the switch controller communicating with the access nodes through the temporal multiplexer/demultiplexer.

FIG. 64 illustrates an alternate configuration 6400 of a distributor configured as a switch comprising a switching mechanism 6330, a temporal multiplexer-demultiplexer 6445 coupled to input ports 6425 of the switching mechanism 6330, and a distributor controller 6350 coupled to a timing circuit 6340 and a master time indicator 6360. The switching mechanism is coupled to two access groups through dual channels as in the configuration of FIG. 63. The distributor controller 6350 communicates with the access nodes through the temporal multiplexer/demultiplexer 6445, dual control channels 6426 connecting to input ports 6425, and the switching mechanism.

Figure 65:
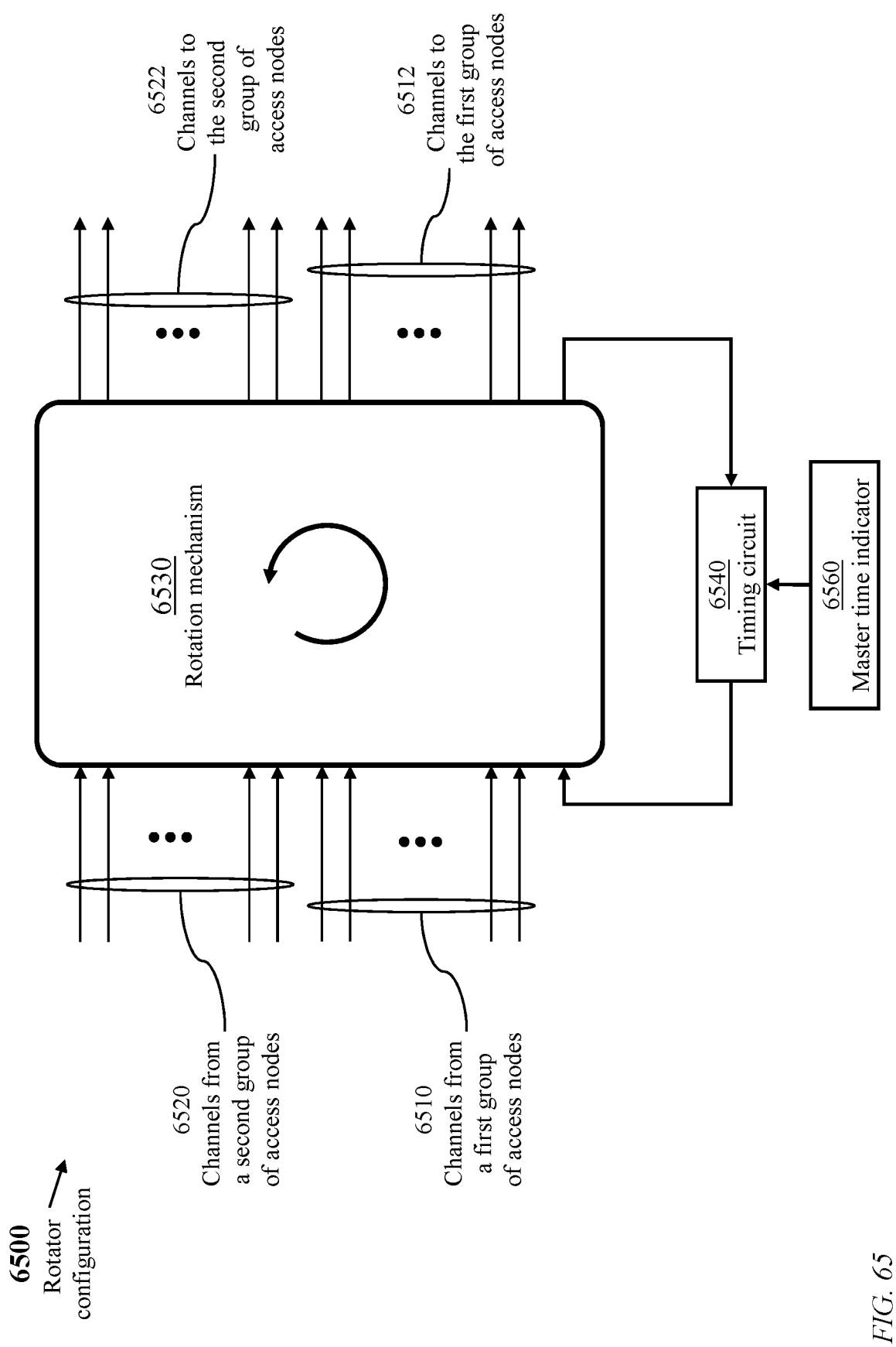
FIG. 65 illustrates a rotator and a timing circuit coupled a master time indicator, the rotator coupled to two access groups through dual channels, the timing circuit exchanging timing data with the access nodes through the rotator.

FIG. 65 illustrates a configuration 6500 of a distributor configured as a rotator comprising a rotation mechanism 6530 and a timing circuit 6540 coupled to a master time indicator 6560. Input ports of the rotation mechanism 6530 receive data from a first access group through upstream channels 6510 and from a second access group through upstream channels 6520. Output ports of the rotation mechanism 6530 transmit data to the first access group through downstream channels 6512 and to the second access group through downstream channels 6522. The timing circuit 6540 communicates with the access nodes through the rotation mechanism 6530.

Figure 66:
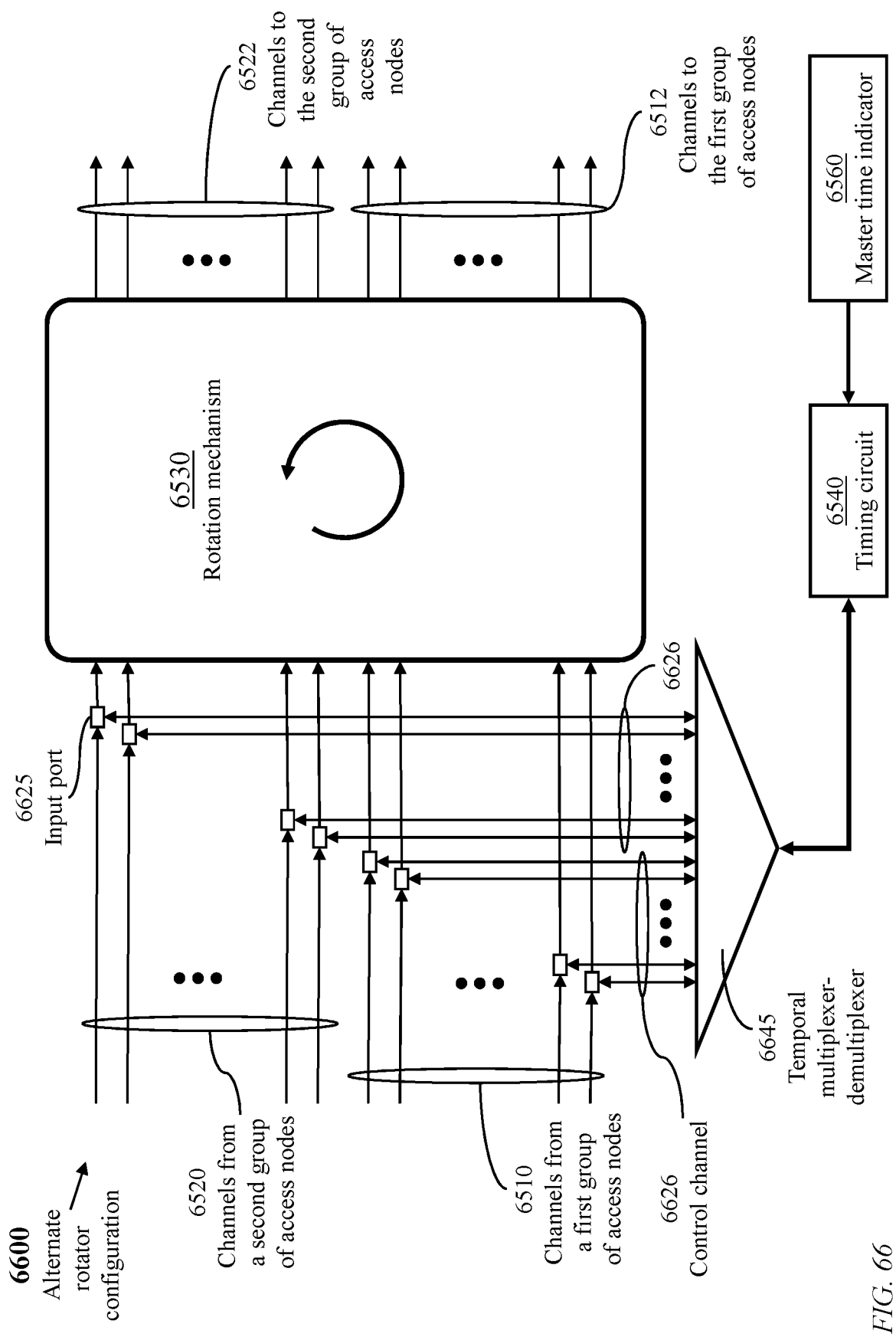
FIG. 66 illustrates a rotator comprising a rotation mechanism, a temporal multiplexer-demultiplexer coupled to ports of the rotation mechanism, and a timing circuit coupled to a master time indicator, the rotation mechanism coupled to two access groups through dual channels, and the timing circuit exchanging timing data with the access nodes through the temporal multiplexer/demultiplexer.

FIG. 66 illustrates an alternate configuration 6600 of a rotator comprising a rotation mechanism 6530, a temporal multiplexer-demultiplexer 6645 coupled to input ports 6625 of the rotation mechanism 6530, and a timing circuit 6540 coupled to a master time indicator 6560. The rotation mechanism is coupled to two access groups through dual channels as in the configuration of FIG. 65. The timing circuit exchanges timing data with the access nodes through the temporal multiplexer/demultiplexer 6645, dual control channels 6626 connecting input ports 6625 to temporal multiplexer-demultiplexer 6645, and the rotation mechanism.

Figure 67:
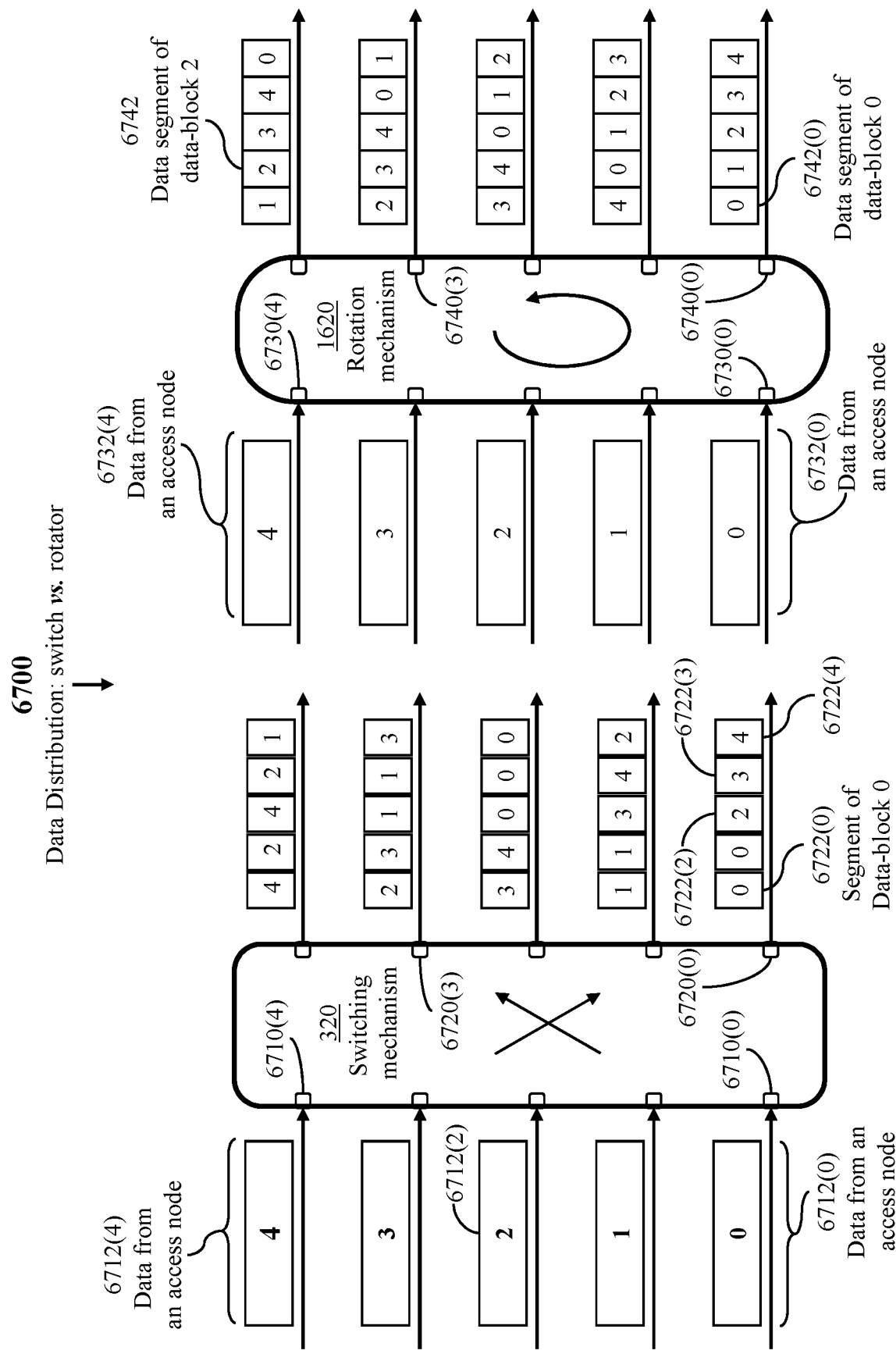
FIG. 67 compares data transfer through a switching mechanism with data transfer through a rotation mechanism.

FIG. 67 illustrates conventional data transfer through a switching mechanism and data transfer through a rotation mechanism. In the exemplary configurations 6700, a distributor comprising switching mechanism 320 (FIG. 3) receives data blocks 6712(0) to 6712(4) from respective access nodes at distributor input ports 6710 while a rotator comprising rotation mechanism 1620 (FIG. 16) receives data blocks 6732(0) to 6732(4) from respective access nodes at rotator input ports 6730.

A data block 6712 is formed at a respective access node and comprises data packets directed to different output ports 6720 of the switching mechanism. The data packets of each data block are formed at a respective access node and scheduled based on control-data exchange between a distributor controller 350 (FIG. 3) and access nodes communicatively coupled to the distributor. The control data includes timing-data exchanged between a timing circuit coupled to the distributor controller and the access nodes coupled to the distributor to enable temporal alignment of data received at the switch input ports 6710. The input ports of switching mechanism 320 may be configured to divide a data packet of arbitrary length into an integer number of data segments of equal sizes for transfer through the switching mechanism; the data packet being reassembled at output. Data block 6712(0) comprises five data segments where two data segments are directed to output port 6720(0) and three data segments are directed to output port 6720(2). Data block 6712(2) comprises five data segments directed to distributor output ports 6720(0), 6720(1), 6720(3), and 6720(4) as illustrated. Distributor output port 6720(0) receives two data segments 6722(0) belonging to data block

6712(0), one data segment 6722(2) belonging to data block 6712(2), one data segment 6722(3) belonging to data block 6712(3), and one data segment 6722(4) belonging to data block 6712(4).

A data block 6732 is formed at a respective access node and comprises data segments of equal sizes directed to different rotator output ports 6740 of the rotation mechanism. Thus, each data block 6732 comprises a same number of data segments each directed to a respective rotator output port 6740. The data segments of each data block are formed at a respective access node.

Each rotator output port 6740 receives one data segment 6742 from each rotator input port 6730. As illustrated, rotator output 6740(3) cyclically receives data segments from rotator input ports 6730 of indices 2, 3, 4, 0, and 1. Likewise, each other rotator output port cyclically receives one data segment 6742 from each rotator input port 6730.

Timing-data exchange between a timing circuit 1650 (FIG. 16) and access nodes coupled to the rotator enables temporal alignment of data received at the rotator input ports 6730. An input data block 6712 or 6732 may include a null data segment.

Figure 68:
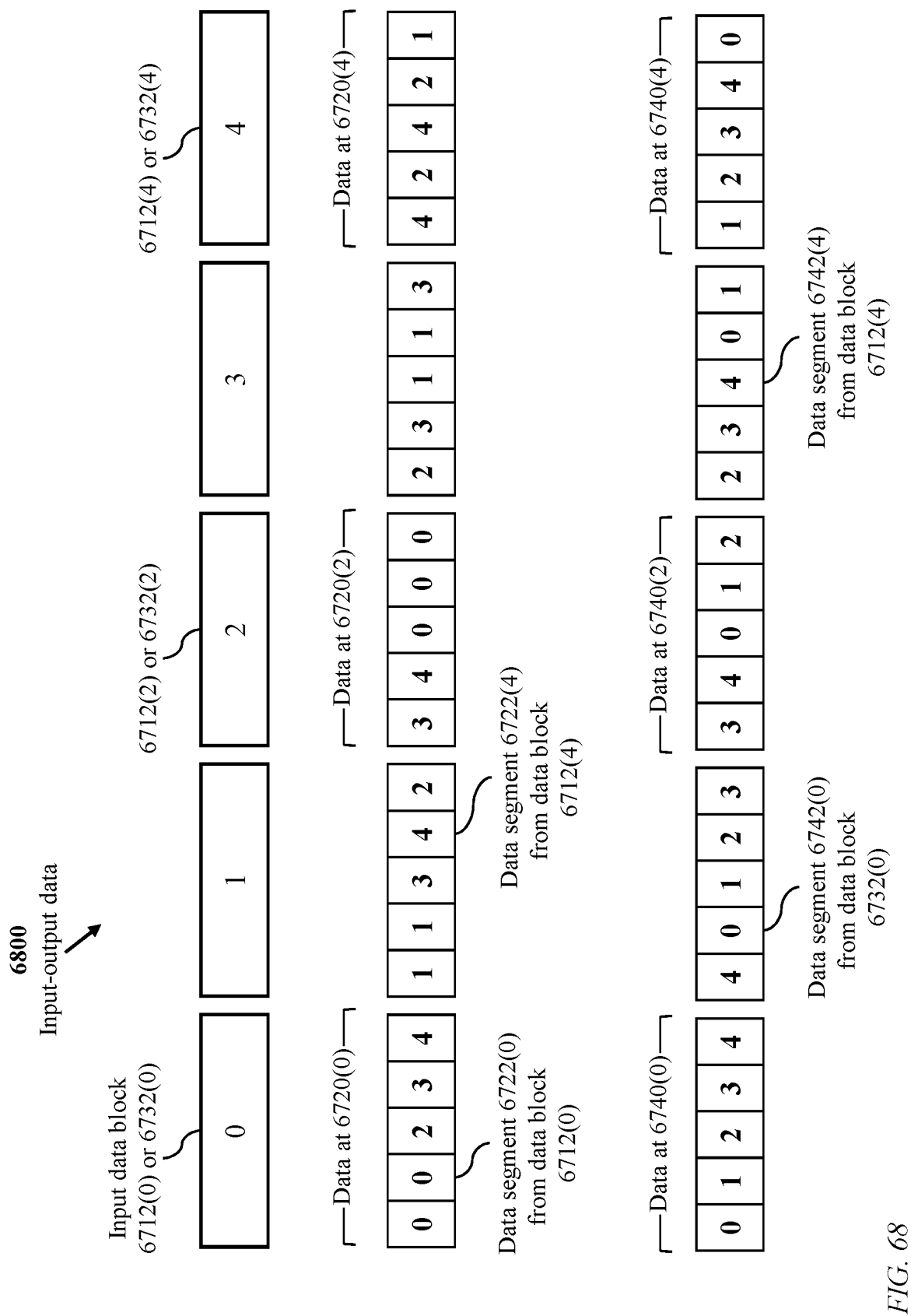
FIG. 68 illustrates further details of data transfer through a switching mechanism and data transfer through a rotation mechanism.

FIG. 68 illustrates further details 6800 of data transfer through a switching mechanism and data transfer through a rotator. Data segments of input data blocks 6712 presented to switching mechanism 320 are selectively distributed to output ports 6720 of the switching mechanism while data segments of input data blocks 6732 presented to rotation mechanism 1620 are cyclically distributed to output ports 6740 of the rotation mechanism. For example, output port 6720(3) receives one data segment from input port 6710(2), two data segments from input port 6720(1), and two data segments from input port 6710(3) while output port 6740(3) receives one data segment from each input port 6730.

Figure 69:
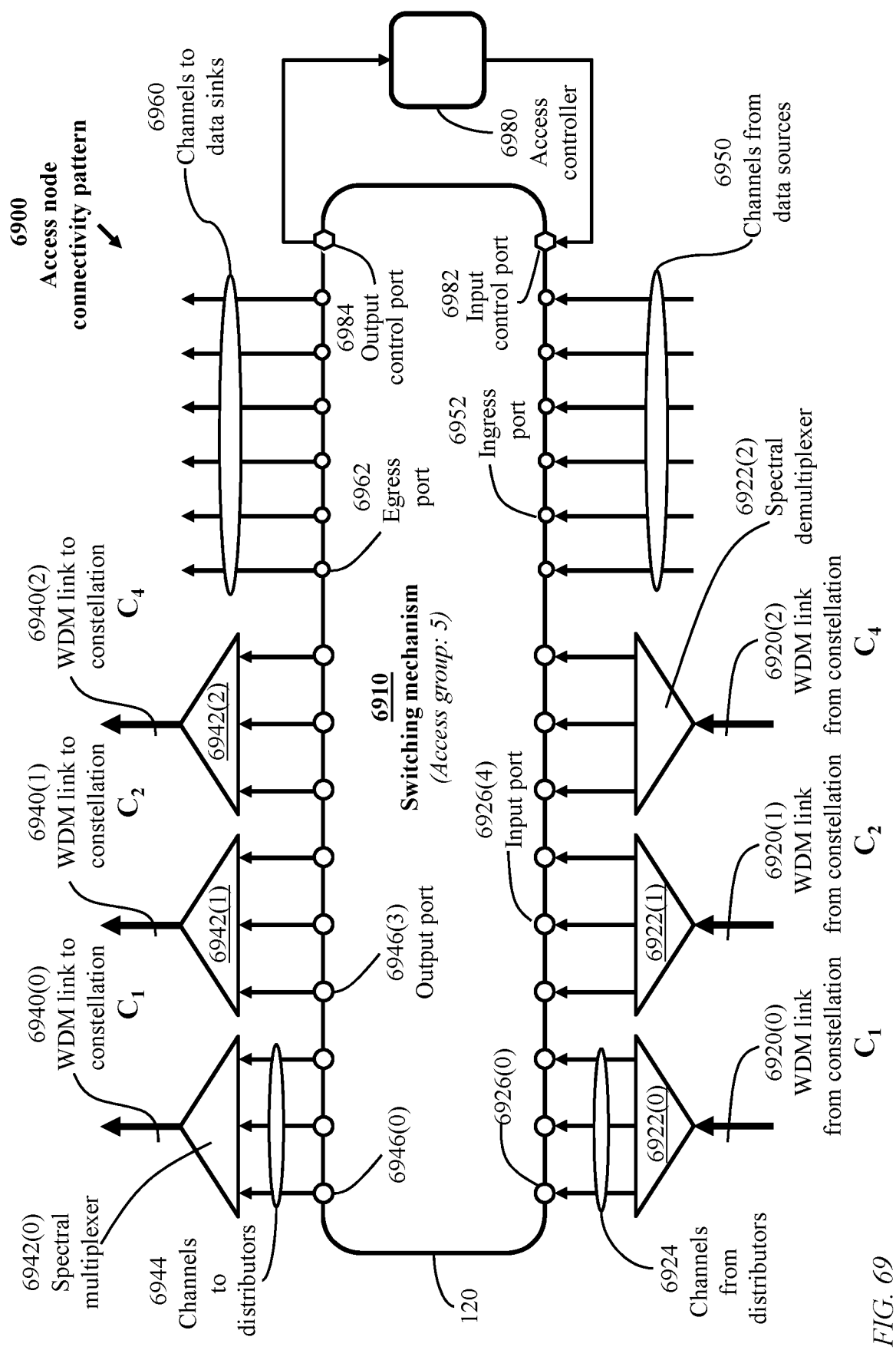
FIG. 69 illustrates a connectivity pattern of a specific access node to constellations of distributors, in accordance with an embodiment of the present invention.

FIG. 69 illustrates a connectivity pattern 6900 of a specific access node 120 to a respective subset of constellations of distributors of the set of constellations of FIG. 58 (further detailed in FIG. 61 and FIG. 62). The access node of FIG. 69 belongs to the access group of index 5 of FIG. 58 and comprises a switching mechanism 6910, a plurality of inner input ports 6926 connecting to inner input channels 6924 originating from distributors, a plurality of inner output ports 6946 connecting to inner output channels 6944 directed to distributors, a plurality of ingress ports 6952 connected to ingress channels 6950 originating from external data sources, a plurality of egress ports 6962 connecting to egress channels 6960 connecting to external data sinks, an input control port 6982 for receiving control data from an access controller 6980, and an output control port 6984 for transmitting control data to access controller 6980. A dual ingress/egress channel 6950/6960 may connect to a server or a set of network users.

As illustrated in FIG. 58, forty-five distributors are arranged into six constellations individually identified as 5850(0) to 5850(5) and labelled $C_0$, $C_1$, $C_2$, $C_3$, $C_4$, and $C_5$, respectively. Each of ten access groups indexed as 0 to 9 connects to respective nine distributors with each distributor connecting to two access groups.

Each of wavelength-division-multiplexed links (WDM links) 6920 originates from a constellation of distributors and carries channels 6924 directed to the access node. Each of WDM links 6940 terminates on a constellation of distributors and carries channels 6944 originating from the access node. As indicated in FIG. 58, the access group of index 6 connects to distributors of indices 15, 16, and 17 of constellation $C_1$, distributors of indices 18, 19, and 20 of constellation $C_2$, and distributors of indices 27, 34, and 42 of constellation $C_5$.

A WDM link 6920(0) carries spectrally-multiplexed channels from distributors of indices 15, 16, and 17 of constellation $C_1$, which are separated into respective individual channels 6924 using spectral demultiplexer 6922(0). A WDM link 6920(1) carries spectrally-multiplexed channels from distributors of indices 18, 19, and 20 of constellation $C_2$, which are separated into respective individual channels 6924 using spectral demultiplexer 6922(1). A WDM link 6920(2) carries spectrally-multiplexed channels from distributors of indices 27, 34, and 42 of constellation $C_5$, which are separated into respective individual channels 6924 using spectral demultiplexer 6922(2).

Channels 6944 directed to distributors of indices 15, 16, and 17 of constellation $C_1$ are spectrally multiplexed onto WDM link 6940(0) using spectral multiplexer 6942(0). Channels 6944 directed to distributors of indices 18, 19, and 20 of constellation $C_2$ are spectrally multiplexed onto WDM link 6940(1) using spectral multiplexer 6942(1). Channels 6944 directed to distributors of indices 27, 34, and 42 of constellation $C_5$ are spectrally multiplexed onto WDM link 6940(2) using spectral multiplexer 6942(2).

Access controller 5950 (FIG. 59) of access node 5900 is configured to exchange time-alignment information with each distributor to which the access node connects through a respective dual channel. Access controller 5950 adjusts transmission time instants of data directed to a specific distributor according to respective time-alignment information.

Likewise access controller 6980 of access node 6900 is configured to exchange time-alignment information with each distributor to which access node 6900 connects through a respective dual channel and adjust transmission time instants of data directed to distributors accordingly.

Figure 70:
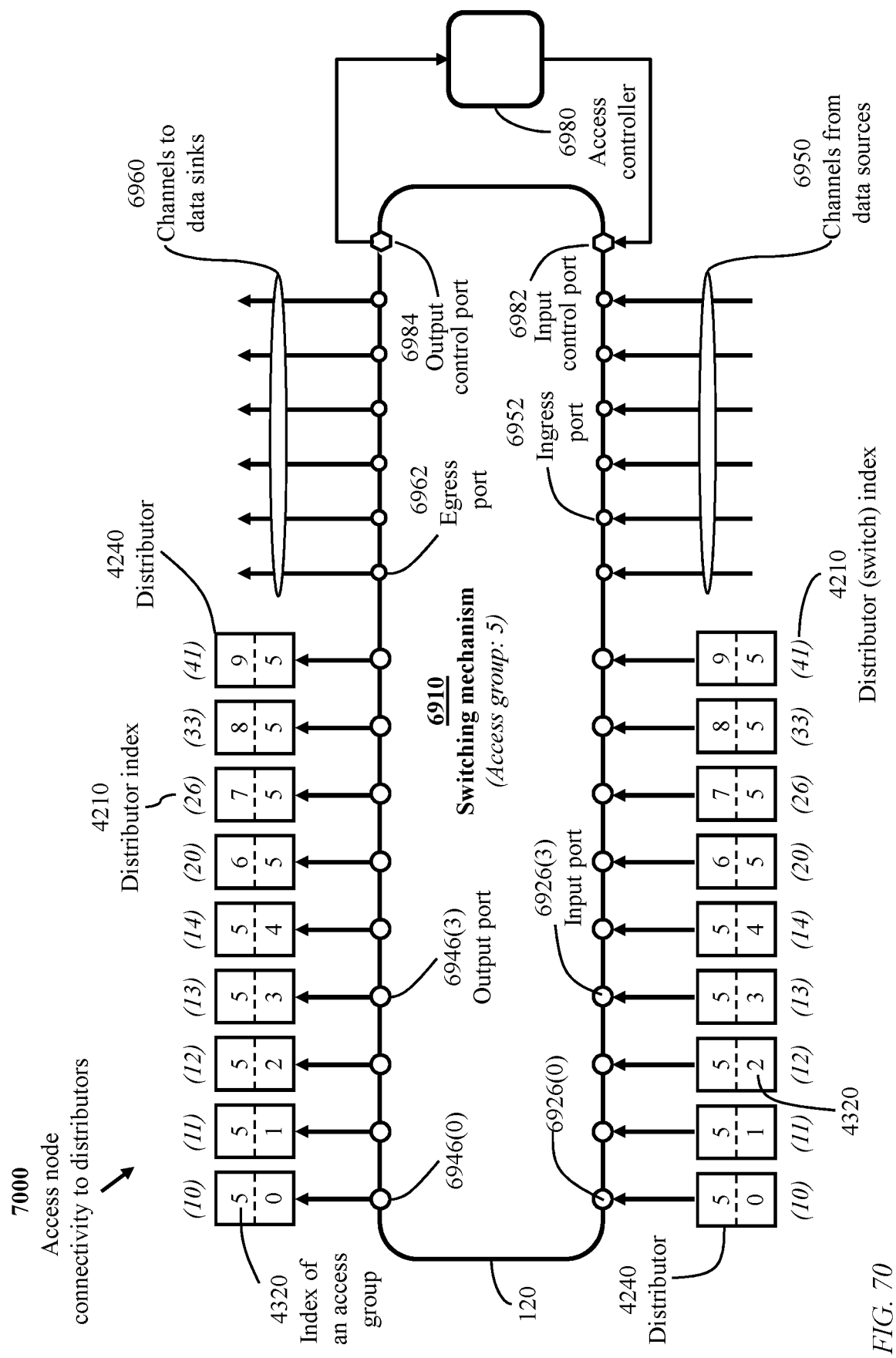
FIG. 70 illustrates connectivity of a specific access node to respective distributors, in accordance with an embodiment of the present invention.

FIG. 70 illustrates connectivity 7000 of the inner ports of the access node of FIG. 69, which belongs to the access group 4320 of index 5, to distributors (switches) 4240 based on the arrangement of FIG. 58. When the access controller 6980 of the access node receives a request to transfer data to a destination access node of an access group g, $0 \le g < \mu$, where $\mu$=10 in the exemplary case of FIG. 69, the access controller may select any of inner output ports 6946 if the destination access node belongs to the same access group (group of index 5) to which the source access node belongs. For a destination access node belonging to an access group of index 0, 1, 2, 3, 4, 6, 7, 8, or 9, the access controller selects an inner output port 6946 of index 0, 1, 2, 3, 4, 5, 6, 7, or 8, respectively in order to select a preferred route traversing only one distributor.

If a preferred route is unavailable, the access controller may select any other inner output port and the route to destination would comprise two parts each traversing a respective distributor.

Figure 71:
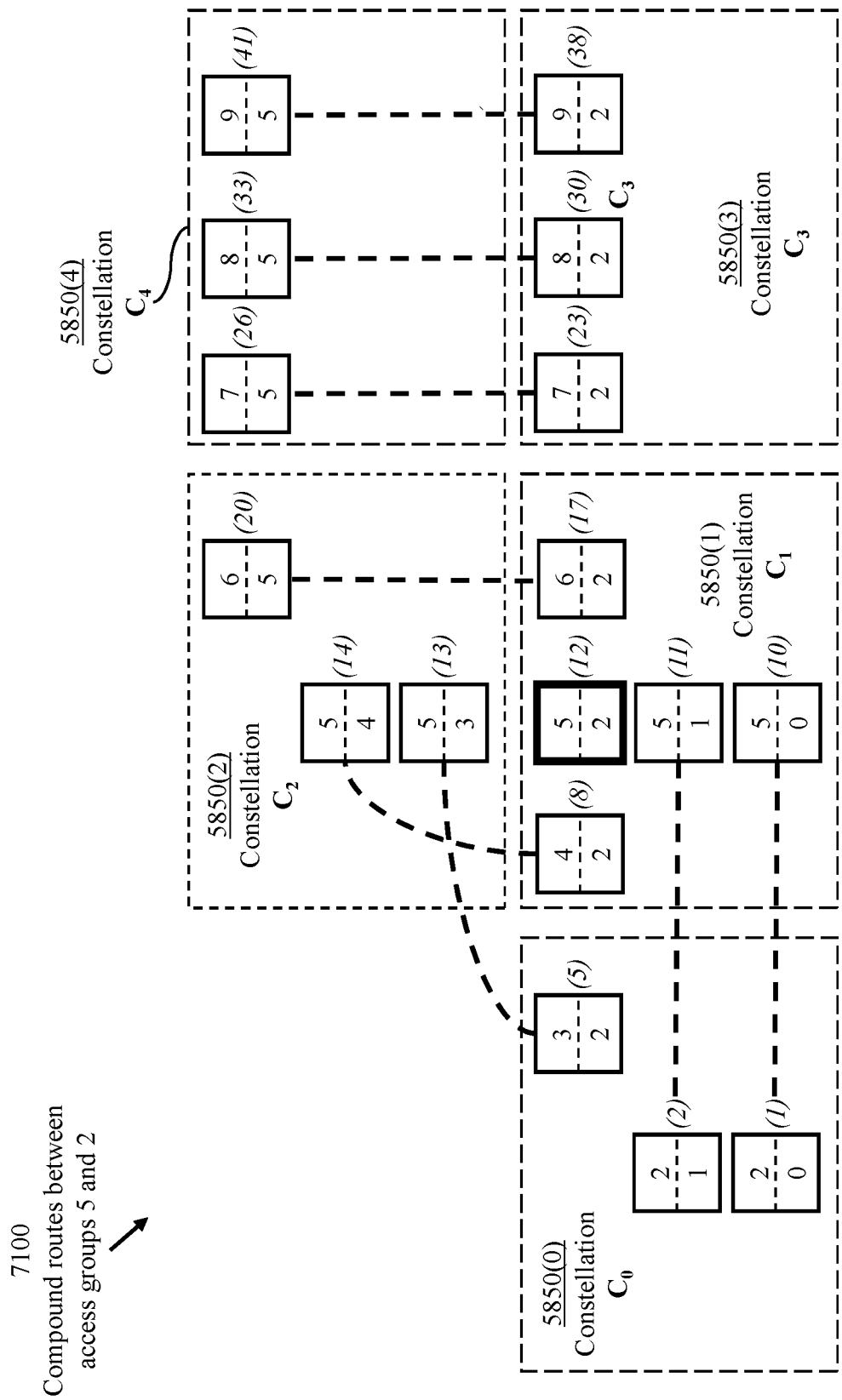
FIG. 71 illustrates compound routes originating from the specific access node of FIG. 70.

FIG. 71 illustrates a case where the destination access node belongs to the access group of index 2. The access controller selects inner output port 6946(2) which leads to the preferred distributor of index 12 that is coupled to the access groups of indices 5 and 2. If a path cannot be established through the preferred distributor, the access controller may select any of the inner output ports. As indicated, eight independent candidate sets of compound routes may be considered. In general, the number of candidate sets of compound routes is ($\mu$−2), where $\mu$ is the total number of access groups in the entire network. Two routes are said to be independent of each other if the two routes coincide only at the originating and destination access nodes.

Figure 72:
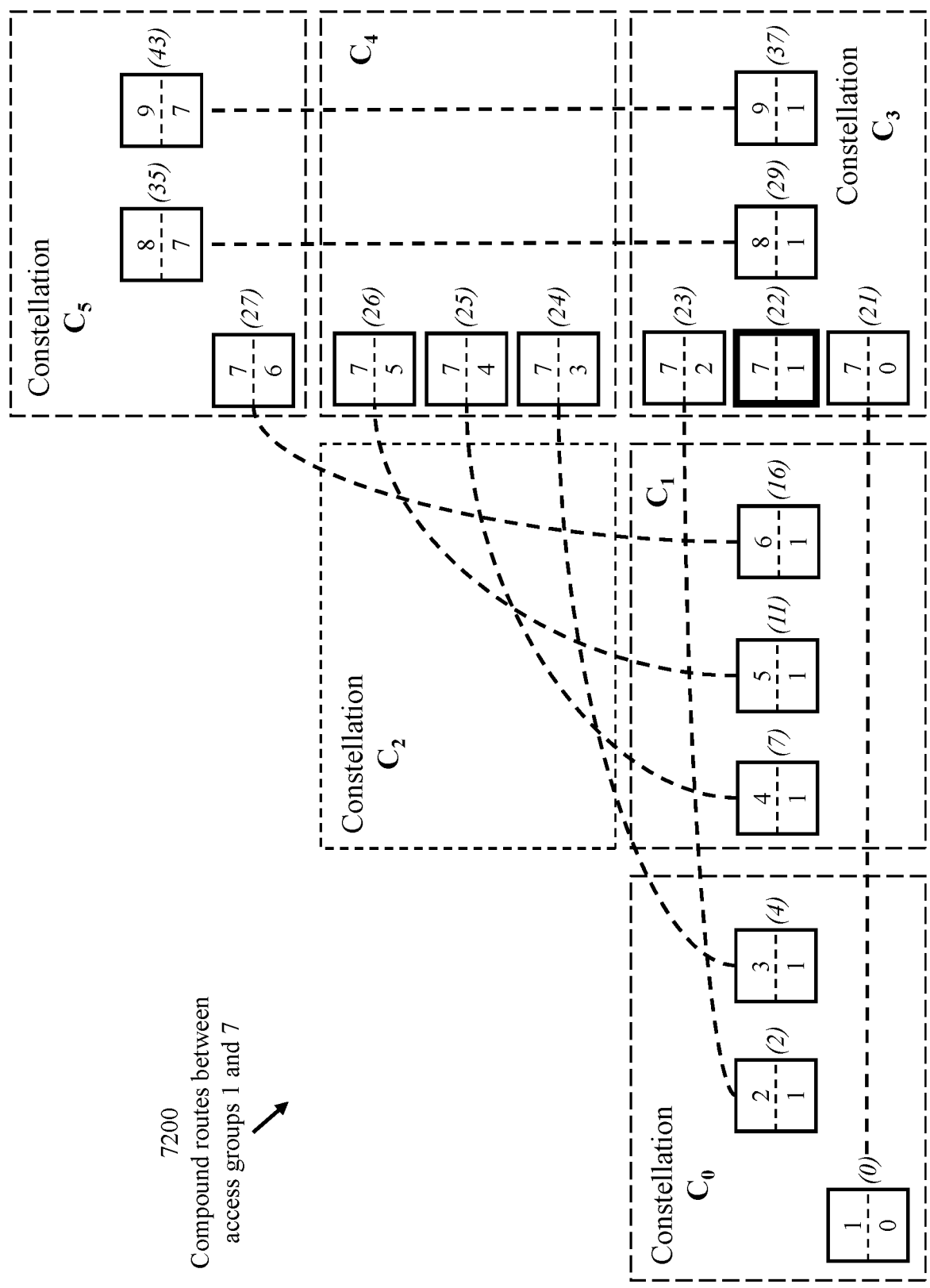
FIG. 72 illustrates compound routes for a selected access-group pair.

FIG. 72 illustrates a route traversing only one distributor and several compound routes between an access node belonging to the access group of index 1 and the access group of index 7. The route traversing only one distributor is effected through the distributor of index 22 which is accessible from any access node belonging to the access group of index 1 or the access group of index 7. Eight sets of compound routes, each traversing two distributors, are indicated.

Figure 73:
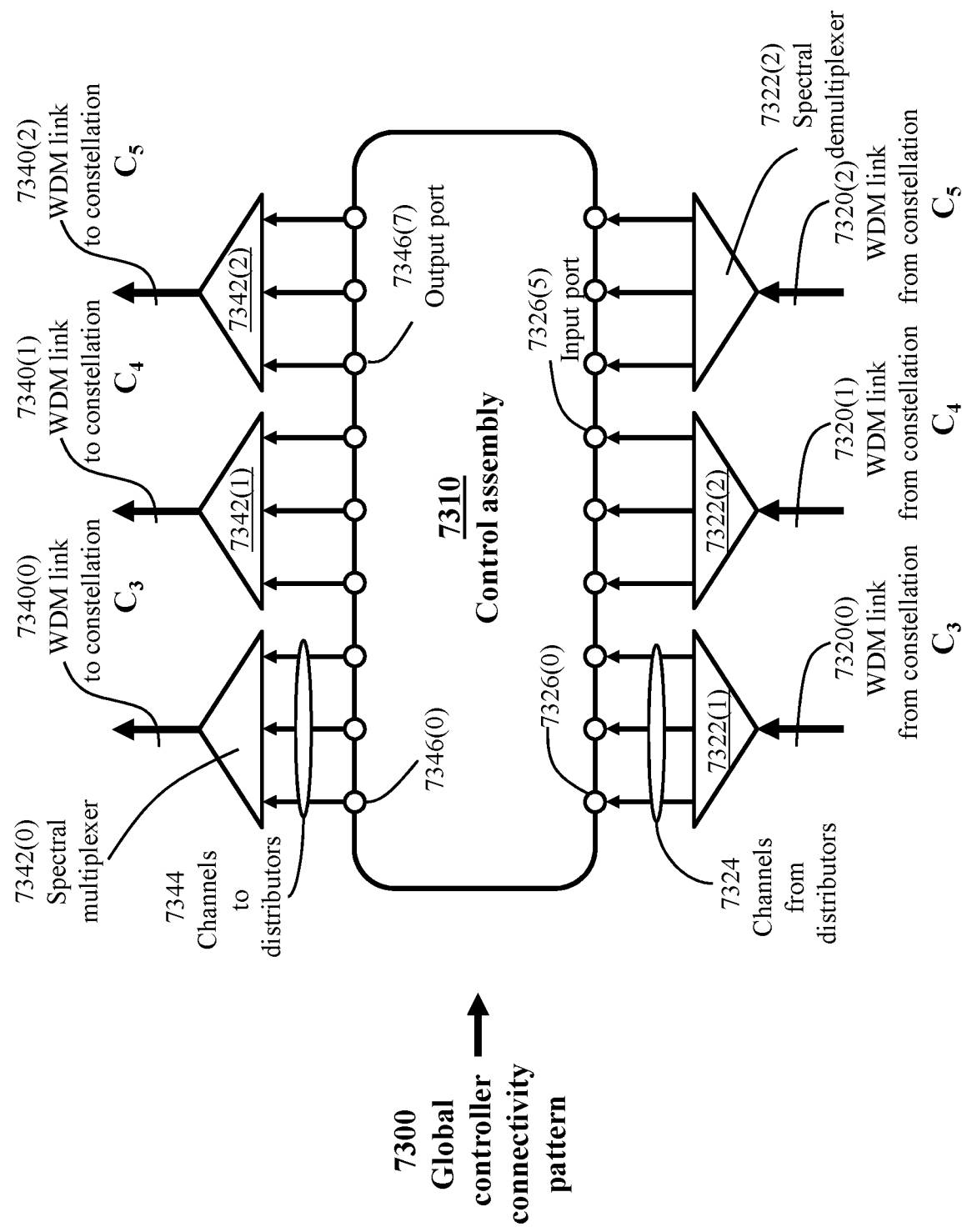
FIG. 73 illustrates a connectivity pattern of a global controller to constellations of distributors, in accordance with an embodiment of the present invention.

FIG. 73 illustrates a connectivity pattern 7300 of a global controller to a respective subset of constellations of distributors of the set of constellations illustrated in FIG. 58 and FIG. 61. The global controller belongs to the access group of index 9 of FIG. 58 and comprises a control assembly 7310 coupled to a plurality of input ports 7326 connecting to input channels 7324 originating from distributors, and a plurality of output ports 7346 connecting to output channels 7344 directed to distributors.

Each of wavelength-division-multiplexed links (WDM links) 7320 originates from a constellation of distributors and carries channels 7324. Each of WDM links 7340 terminates on a constellation of distributors and carries channels 7344. As indicated in FIG. 58, the access group of index 9 connects to distributors of indices 36, 37, and 38 of constellation $C_3$, distributors of indices 39, 40, and 41 of constellation $C_4$, and distributors of indices 42, 43, and 44 of constellation $C_5$. The nine distributors of indices 36 to 44 connect to the access groups of indices 0 to 8, respectively, in addition to the access group of index 9. Thus, the control assembly 7310 has a downstream path to each access node 220 and an upstream path from each access node of the entire network, each upstream path and each downstream path traverses only one respective distributor. Preferably, each path to and from the control assembly is a dedicated path.

A WDM link 7320(0) carries spectrally-multiplexed channels from distributors of indices 36, 37, and 38 of constellation $C_3$, which are separated into respective individual channels 7324 using spectral demultiplexer 7322(0). A WDM link 7320(1) carries spectrally-multiplexed channels from distributors of indices 39, 40, and 41 of constellation $C_4$, which are separated into respective individual channels 7324 using spectral demultiplexer 7322(1). A WDM link 7320(2) carries spectrally-multiplexed channels from distributors of indices 42, 43, and 44 of constellation $C_5$, which are separated into respective individual channels 7324 using spectral demultiplexer 7322(2).

Channels 7344 directed to distributors of indices 36, 37, and 38 of constellation $C_3$ are spectrally multiplexed onto WDM link 7340(0) using spectral multiplexer 7342(0). Channels 7344 directed to distributors of indices 39, 40, and 41 of constellation $C_4$ are spectrally multiplexed onto WDM link 7340(1) using spectral multiplexer 7342(1). Channels 7344 directed to distributors of indices 42, 43, and 44 of constellation $C_5$ are spectrally multiplexed onto WDM link 7340(2) using spectral multiplexer 7342(2).

The control assembly 7310 comprises multiple hardware processors, multiple memory devices storing processor-executable instructions causing the hardware processors to perform the exchange of control data with access processors of the plurality of access nodes of the entire network, and multiple memory devices storing data relevant to overall network connectivity and states of network components. Thus, the contiguous network of the invention significantly facilitates both distributed control and global control where a control signal from any access node to any other access node traverses only one distributor and a control signal from the global controller to any access node, and vice versa, traverses only one distributor.

The network may employ two or more geographically distributed global controllers for increased reliability and expeditious global control.

FIG. 74 tabulates indices of distributors within each constellation to which each of the access group connects in the exemplary formation of constellations of FIG. 58. Each of access groups $G_0, G_1, \ldots, G_9$ connects to three spatially collocated distributors within each of three constellations. Access group $G_0$, for example, connects to:

distributors of indices {0, 1, 3} spatially collocated within cluster $C_0$;

distributors of indices {6, 10, 15} spatially collocated within cluster $C_1$; and distributors of indices {21, 28, 36} spatially collocated within cluster $C_3$.

Each of constellation $C_0$, $C_2$, and $C_5$ contains 12 distributors while each of constellation $C_1$, $C_3$, and $C_4$ contains 18 distributors. While the constellations may be geographically distributed over a wide area, the distributors within each constellation are spatially collocated.

Figure 75:
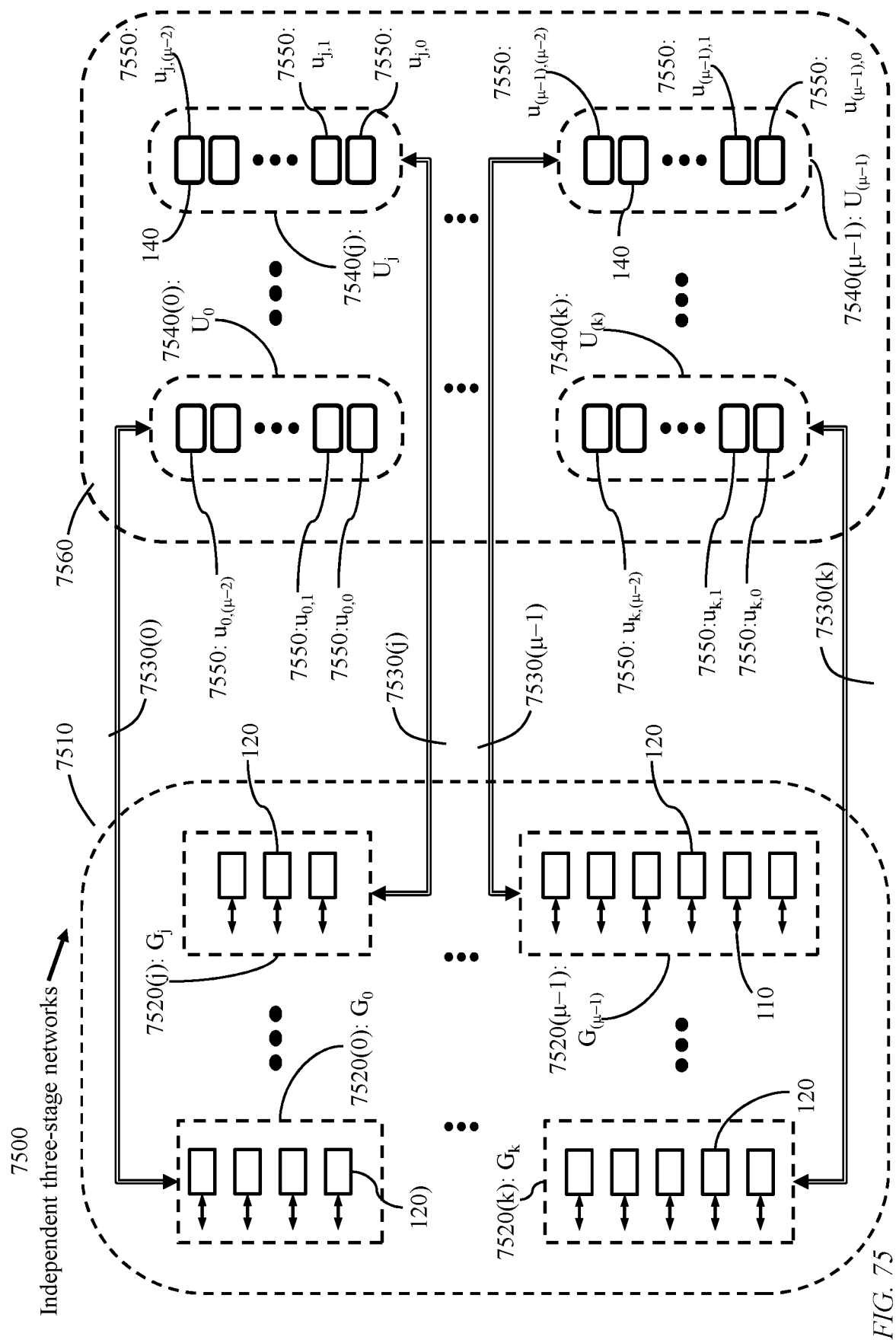
FIG. 75 illustrates a plurality of independent three-stage networks where a plurality of access nodes is organized into a number of access groups and a plurality of connectors is organized into an equal number of connector groups with each access node of each access group having a dual channel to each connector of a respective connector group.

Fusing three-stage networks FIG. 75 illustrates a plurality 7500 of independent three-stage networks where a plurality 7510 of access nodes 120 is organized into a number μ of access groups 7520, μ>4, and a plurality 7560 of connectors 7550 is organized into an equal number, μ, of connector groups 7540, μ>4. The access groups 7520 are individually denoted $\{G_0, G_1, \ldots, G_{(\mu-1)}\}$, and further identified as 7520(0), 7520(1), . . . , 7520(μ−1), respectively. The connector groups are individually denoted $\{U_0, U_1, \ldots, U_{(\mu-1)}\}$, and further identified as 7540(0), 7540(1), . . . , 7540(μ−1), respectively. Each access group 7520 connects to a respective connector group 7540 through a set of multiple dual channels 7530. Preferably, each access node 120 of an access group 7520 has a dual channel, of the set of channels 7530, to each connector 7550 of a respective connector group 7540 to form a three-stage network. A set of channels connecting an access group 7520(j) to a connector group 7540(j) is identified as 7530(j), 0≤j<μ. The connectors 7550 of a connector group $U_j$, 0≤j<μ, are individually denotes as $u_{j,0}, u_{j,1}$.

A connector 7550 comprises a distributing mechanism (a rotating mechanism or a switching mechanism) for interconnecting access nodes 120 of a single access group 7520. A connector 7550 of a connector group 7540a interconnecting access nodes 120 of an access group 7520a may be "fused" with a connector 7550 of another connector group 7540b interconnecting access nodes 120 of an access group 7520b to form a distributor interconnecting access nodes 120 of combined access groups 7520a and 7520b. The formed distributor comprises a (larger) distributing mechanism. With the distributing mechanism of the connector of connector group 7540a having $m_1$ dual ports each interfacing with a respective access node 120 of access group 7520a and the distributing mechanism of the connector of connector group 7540b having $m_2$ dual ports each interfacing with an access node 120 of access group 7520b, the distributing mechanism of the formed distributor would have ($m_1+m_2$) dual ports each interfacing with a respective access node 120 of access groups 7520a and 7520b.

A first three-stage network is said to be fused to a second three-stage network, and vice versa, if the two networks have a common (joint) distributor. The µ three-stage networks may be mutually fused to form a contiguous network where each access node of the entire contiguous network thus formed has a path to each other access-node of the entire network traversing only one distributor. For a set of µ three-stage networks, µ>4, the number of network pairs is (µ×(µ−1))/2. The selection of a connector pair to "fuse" (combined to have a common distribution mechanism) is arbitrary as long as the individual distributors of each distributor pair belong to (µ−1) different three-stage networks.

Figure 76:
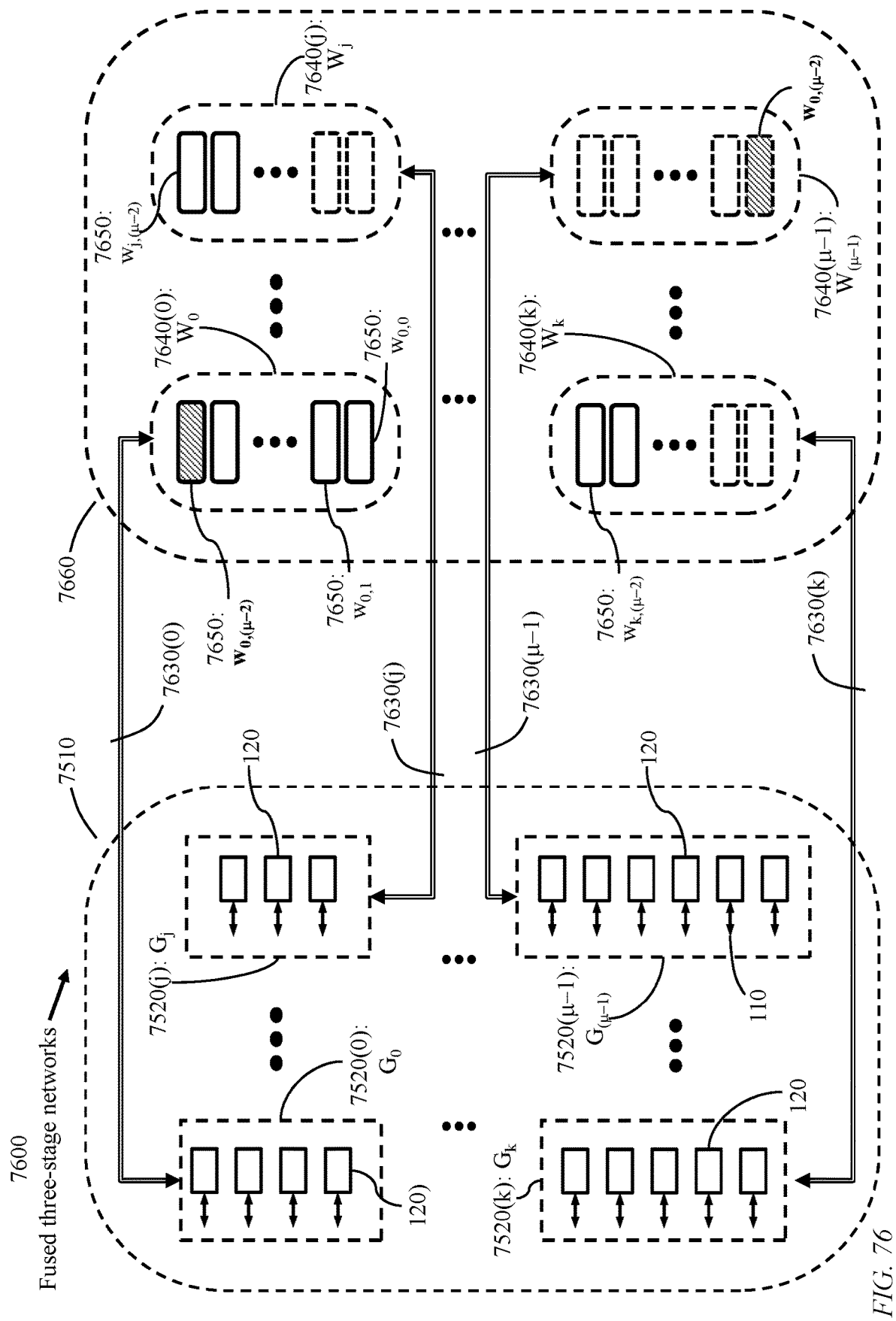
FIG. 76 illustrates a plurality of fused three-stage networks generated from the plurality of independent three-stage networks of FIG. 75 where each connector group is fused with each other connector group to form a respective distributor group, thus forming a contiguous network, in accordance with an embodiment of the present invention.

FIG. 76 illustrates a plurality 7600 of fused three-stage networks where each connector group 7540 is fused with each other connector group 7540 to form a respective distributor group 7640 having respective distributors 7650. Each access group 7520 connects to a respective distributor group 7640 through a set of multiple dual channels 7630.

With µ distributor groups, µ>4, and with each distributor group having one common distributor with each other distributor group, each distributor group 7640 would comprise (µ−1) distributors. For example, a distributor $w_{0,1}$ combines connectors $u_{0,0}$ and $u_{1,0}$ and comprises a distributing mechanism coupled to access group $G_0$ and access group $G_j$. A distributor $w_{0,(µ-1)}$ combines connectors $u_{0,(µ-2)}$ and $u_{(µ-1),0}$ (FIG. 75), and comprises a switching mechanism coupled to access group $G_0$ and access group $G_{(µ-1)}$. The arrangement of FIG. 75 comprises a total of µ×(µ−1) connectors 7550 each connecting to a single access group 7520. The arrangement of FIG. 76 comprises a total of (µ×(µ−1))/2 distributors, each distributor connecting to a pair of access groups 7520.

Figure 77:
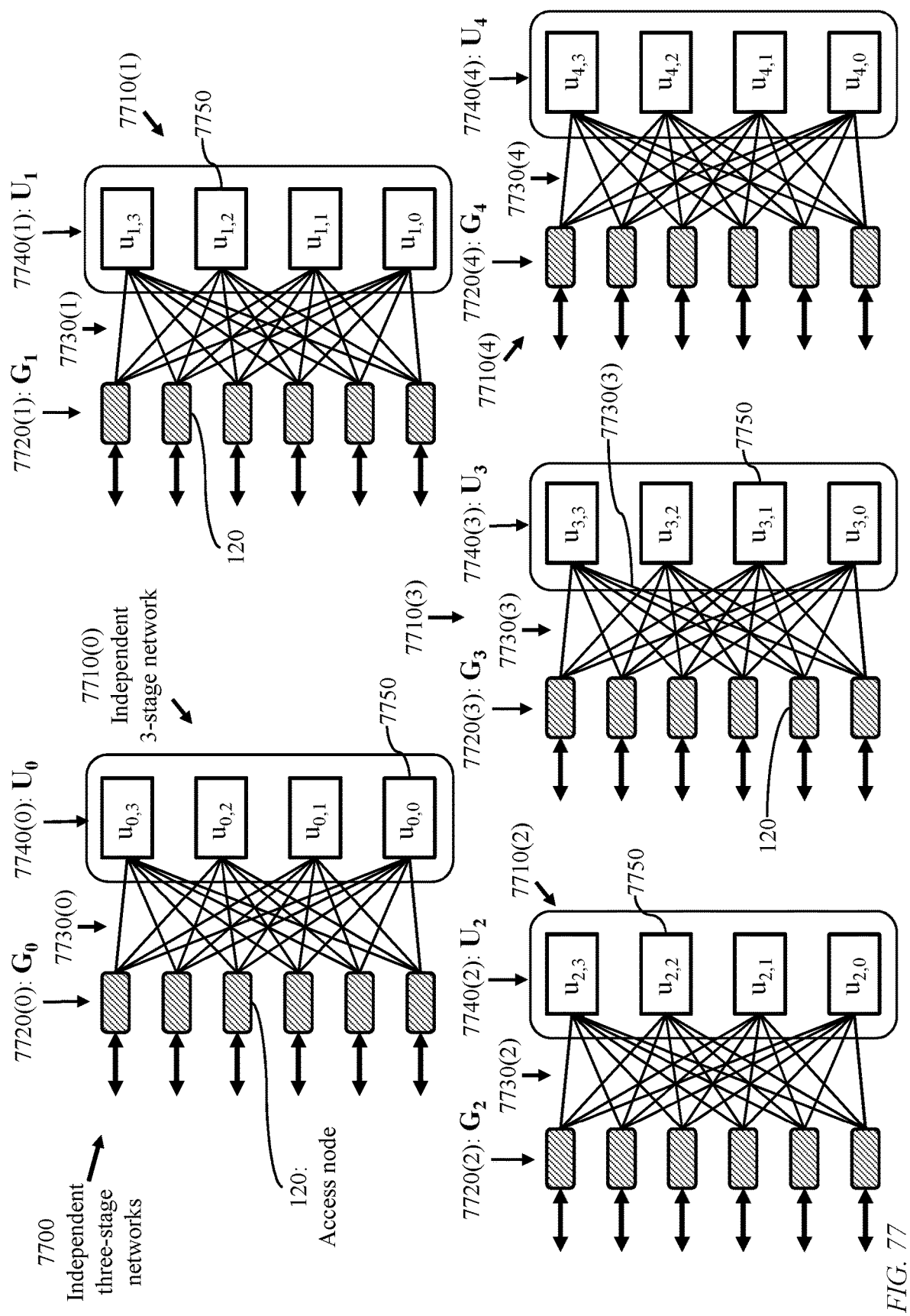
FIG. 77 illustrates an example of the independent three-stage networks of FIG. 75, each three-stage network comprising an access group comprising a respective set of access nodes and a connector group comprising a respective set of distributors.

FIG. 77 illustrates a set 7700 of independent three-stage networks 7710 comprising µ three-stage networks with µ limited to 5. The µ three-stage networks are indexed as 0, 1, ..., (µ−1); the three-stage networks are individually identified as 7710(0) to 7710(4). Each three-stage network 7710 comprises a respective access group 7720 and a respective connector group 7740 of (µ−1) connectors 7750. The access groups 7720 are individually identified as 7720(0), 7720(1), 7720(2), 7720(3), and 7720(4). The connector groups 7740 are individually identified as 7740(0), 7740(1), 7740(2), 7740(3), and 7740(4). A set of dual channels 7730(j) connects a connector group 7720(j) to a respective connector group 7740(j), 0≤j<µ. Each access node 120 of a particular three-stage network 7710 has a respective dual channel to each connector 7750 of the particular three-stage network. Each connector group 7740 comprises (µ−1) connectors 7750. The connectors of a three-stage network of index j are denoted $u_{j,k}$, 0≤j<µ, 0≤k<(µ−1), j being an index of the three-stage network and k being an index of a connector within a distributor group.

Figure 78:
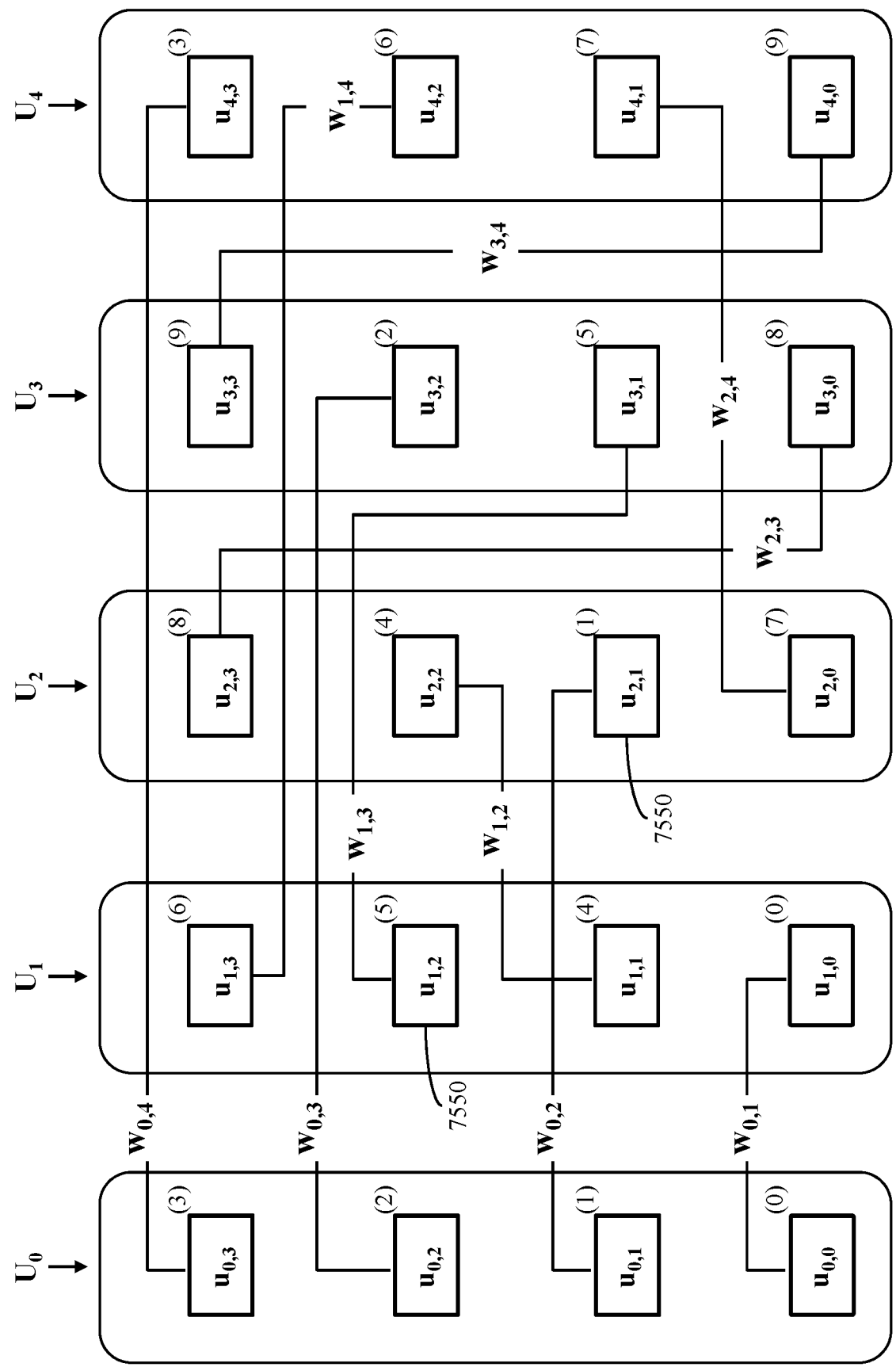
FIG. 78 illustrates selecting pairs of connectors, each pair of connectors comprising connectors of different connector groups, to form distributors, in accordance with an embodiment of the present invention.

FIG. 78 illustrates pairing of connectors of the set of independent three-stage networks 7710 of FIG. 77. The individual connectors 7750 of a connector group 7740(j), denoted $U_j$, are denoted $u_{j,k}$, 0≤j<µ, 0≤k<(µ−1). Thus, the connectors of connector group $U_0$ (7740(0)) are denoted $\{u_{0,0}, u_{0,1}, u_{0,2}, u_{0,3}\}$, the connectors of connector group (7740(1)), denoted $U_1$, are denoted $\{u_{1,0}, u_{1,1}, u_{1,2}, u_{1,3}\}$, and so on. Table-II, below, depicts the fusing pattern of FIG. 78.

Individual connectors $\{u_{0,0}, u_{0,1}, u_{0,2}, u_{0,3}\}$ of connector group $U_0$ are fused with individual connectors $\{u_{1,0}, u_{2,1}, u_{3,2}, u_{4,3}\}$, belonging to connector groups $U_1$, $U_2$, $U_3$, and $U_4$, to form distributors $w_{0,1}$, $w_{0,2}$, $w_{0,3}$, and $w_{0,4}$, respectively.

Individual connectors $\{u_{1,1}, u_{1,2}, U_{1,3}\}$ of connector group $U_1$ are fused with individual connectors $\{u_{2,2}, u_{3,1},$ $u_{4,2}\}$, belonging to connector groups $U_2$, $U_3$, and $U_4$, to form distributors $w_{1,2}$, $w_{1,3}$, and $w_{1,4}$, respectively.

Individual connectors $\{u_{2,0}, u_{2,3}\}$ of connector group $U_2$ are fused with individual connectors $\{u_{4,1}, u_{3,0}\}$, belonging to connector groups $U_4$, and $U_3$, to form distributors $w_{2,4}$ and $w_{2,3}$, respectively.

Connector $u_{3,3}$ of connector group $U_3$ is fused with connector $u_{4,0}$, belonging to connector group $U_4$, to form distributor $w_{3,4}$.

TABLE II

| | Connector pairs | | | |
|---|---|---|---|---|
| Index j of three-stage network | Index k of distributor within respective three-stage network | | | |
| | 0 | 1 | 2 | 3 |
| 0 | (0): $u_{0,0}$ | (1): $u_{0,1}$ | (2): $u_{0,2}$ | (3): $u_{0,3}$ |
| 1 | (0): $u_{1,0}$ | (4): $u_{1,1}$ | (5): $u_{1,2}$ | (6): $u_{1,3}$ |
| 2 | (7): $u_{2,0}$ | (1): $u_{2,1}$ | (4): $u_{2,2}$ | (8): $u_{2,3}$ |
| 3 | (8): $u_{3,0}$ | (5): $u_{3,1}$ | (2): $u_{3,2}$ | (9): $u_{3,3}$ |
| 4 | (9): $u_{4,0}$ | (7): $u_{4,1}$ | (6): $u_{4,2}$ | (3): $u_{4,3}$ |

Table-II illustrates an exemplary connector-pair arrangement for the set of independent three-stage networks of FIG. 77 where µ=5. The number of formed distributors, i.e., the number of connector pairs is (5×4)/2. The 10 distributors are indexed as (0), (1), ..., (9). Distributor (0) constitutes fused connectors $u_{0,0}$ and $u_{1,0}$, distributor (1) constitutes fused connectors $u_{0,1}$ and $u_{2,1}$, Distributor (9) constitutes fused connectors $u_{3,3}$ and $u_{4,0}$. Table-III below indicates constituent connectors of each distributor of the network of FIG. 79 formed according to the pairing pattern (fusing pattern) of FIG. 78.

TABLE III

| | Constituent connectors of each distributor | | | |
|---|---|---|---|---|
| Index j of three-stage network | Index k of distributor within a three-stage network | | | |
| | 0 | 1 | 2 | 3 |
| 0 | (0) $w_{0,1}$: $u_{0,0}$ & $u_{1,0}$ | (1) $w_{0,2}$: $u_{0,1}$ & $u_{2,1}$ | (2) $w_{0,3}$: $u_{0,2}$ & $u_{3,2}$ | (3) $w_{0,4}$: $u_{0,3}$ & $u_{4,3}$ |
| 1 | — | (4) $w_{1,2}$: $u_{1,1}$ & $u_{2,2}$ | (5) $w_{1,3}$: $u_{1,2}$ & $u_{3,1}$ | (6) $w_{1,4}$: $u_{1,3}$ & $u_{4,2}$ |
| 2 | — | — | (7) $w_{2,4}$: $u_{2,0}$ & $u_{4,1}$ | (8) $w_{2,3}$: $u_{2,3}$ & $u_{3,0}$ |
| 3 | — | — | — | (9) $w_{3,4}$: $u_{3,3}$ & $u_{4,0}$ |
| 4 | — | — | — | — |

Figure 79:
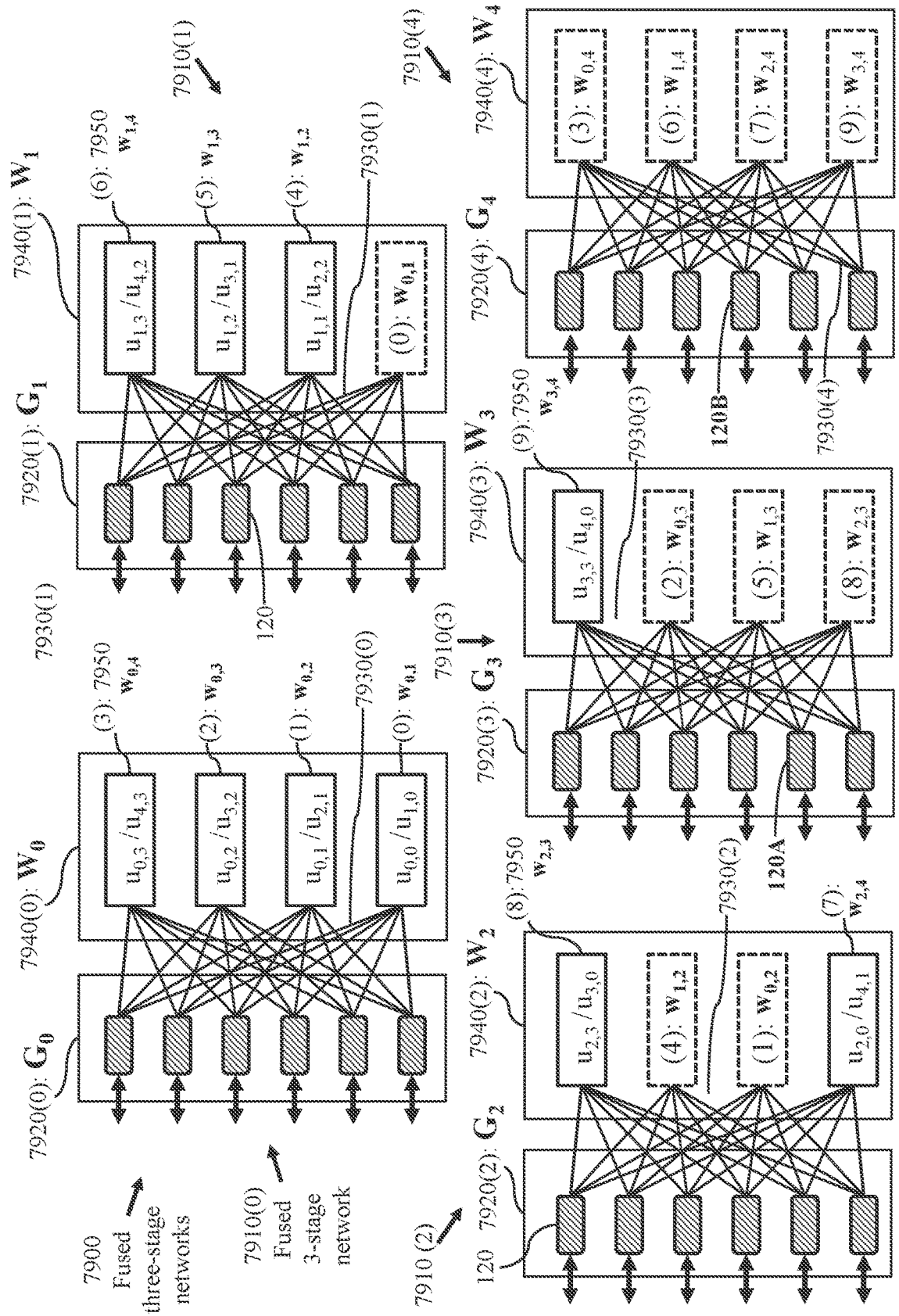
FIG. 79 illustrates fusing the plurality of three-stage networks of FIG. 77 so that each pair of three-stage networks shares a distributor, in accordance with an embodiment of the present invention.

FIG. 79 illustrates a set 7900 of mutually fused three-stage networks generated from the set of independent three-stage networks of FIG. 77. Three-stage networks 7710(0) to 7710(4) are mutually fused to form fused three-stage networks 7910(0) to 7910(4) so that each connector of each three-stage network 7710 is integrated, sharing a common distributing mechanism, with a respective connector of each other three-stage network 7710 according to the connectors' pairing pattern of FIG. 78. Consequently, each formed distributor has dual channels to access nodes of a respective pair of access-groups.

Thus, fused three-stage network 7910(0) connects access nodes 120 of access group $G_0$, 7720(0), to distributors $w_{0,1}$, $w_{0,2}$, $w_{0,3}$, and $w_{0,4}$ of distributor group 7940(0) through a set of dual channels 7930(0). According to the pattern of FIG. 78, distributor $w_{0,1}$ replaces the distributing mechanisms of connectors $u_{0,0}$ and $u_{1,0}$ with a single distributing mechanism of a larger dimension. Likewise, distributor $w_{0,2}$ replaces the distributing mechanisms of connectors $u_{0,1}$ and $u_{2,1}$ with a single distributing mechanism, distributor $w_{0,3}$ replaces the distributing mechanisms of connectors $u_{0,2}$ and $u_{3,2}$ with a single distributing mechanism; and distributor $w_{0,4}$ replaces the distributing mechanisms of connectors $u_{0,3}$ and $u_{4,3}$ with a single distributing mechanism.

Fused three-stage network 7910(4) connects access nodes 120 of access group $G_4$, 7720(4), to distributors $w_{0,4}$, $w_{1,4}$, $w_{2,4}$, and $w_{3,4}$ of distributor group 7940(4) through a set of dual channels 7930(4). According to the pattern of FIG. 78: distributor $w_{0,4}$ replaces the distributing mechanisms of connectors $u_{0,3}$ and $u_{4,3}$ with a single distributing mechanism; distributor $w_{1,4}$ replaces the distributing mechanisms of connectors $u_{1,3}$ and $u_{4,2}$ with a single distributing mechanism; distributor $w_{2,4}$ replaces the distributing mechanisms of connectors $u_{2,0}$ and $u_{4,1}$ with a single distributing mechanism, and distributor $w_{3,4}$ replaces the distributing mechanisms of connectors $u_{3,3}$ and $u_{4,0}$ with a single distributing mechanism.

In FIG. 79, each distributor 7650 belongs to two distributor groups 7640. A distributor 7650 belonging to distributor groups of indices x and y, where y>x, is illustrated using a solid outline in the distributor group of index x but a dashed outline in the distributor group of index y. For example, the distributor 7650 labeled $w_{0,(\mu-2)}$, which belongs to distributor groups of indices 0 and ($\mu$–1), is illustrated using a solid outline in distributor group 7640(0), labeled $W_0$, but illustrated using a dashed outline in the distributor group 7640 ($\mu$–1), labeled $W_{(\mu-1)}$.

Figure 80:
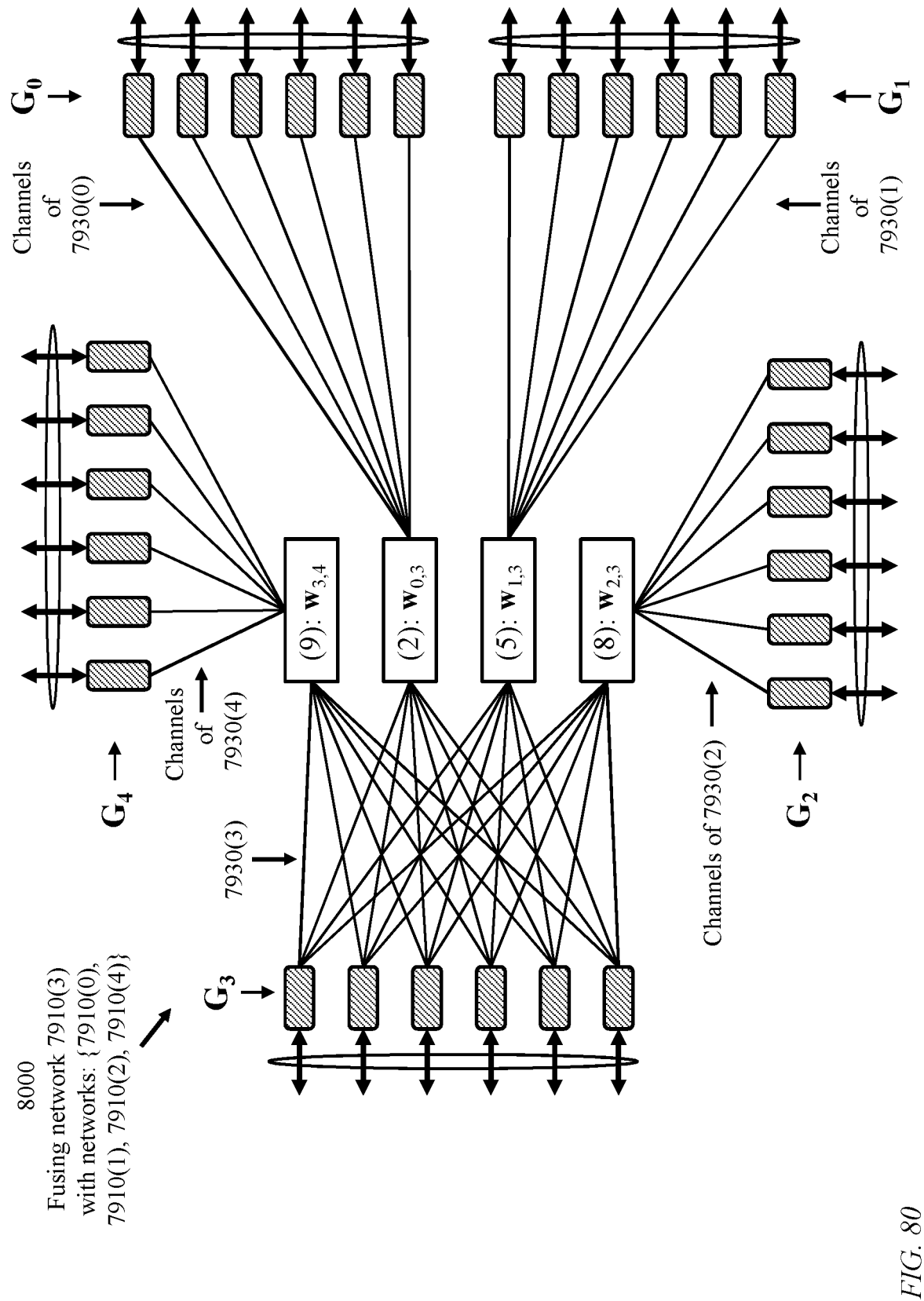
FIG. 80 illustrates connectivity of one of the fused three-stage networks of FIG. 79 to each other three-stage network, in accordance with an embodiment of the present invention.

FIG. 80 illustrates connectivity 8000 of fused three-stage network 7910(3) to each other three-stage network of the set of fused three-stage networks of FIG. 79. As illustrated in FIG. 79, fused three-stage network 7910(3) connects access group 7720(3), denoted $G_3$, to distributors 7950 of indices 8, 5, 2, and 9 through set 7930(3) of dual channels. Distributor 7950(8), labeled $w_{2,3}$, connects to access nodes of access group 7720(2), labeled $G_2$, through a subset of set 7930(2) of dual channels, in addition to access nodes of access group $G_3$. Distributor 7950(5) connects to access nodes of access group 7720(1), labeled $G_1$, through a subset of set 7930(1) of dual channels, in addition to access nodes of access group $G_3$. Distributor 7950(2) connects to access nodes of access group 7720(0), labeled $G_0$, through a subset of set 7930(0) of dual channels, in addition to access nodes of access group $G_3$. Distributor 7950(9) connects to access nodes of access group 7720(4), labeled $G_4$, through a subset of set 7930(4) of dual channels, in addition to access nodes of access group $G_3$.

Thus, a fused three-stage network, having ($\mu$-1) distributors, provides inter-group paths for each pair of $\mu$ access groups through a respective distributor and intra-group paths for one access group through all of the ($\mu$–1) distributors.

Figure 81:
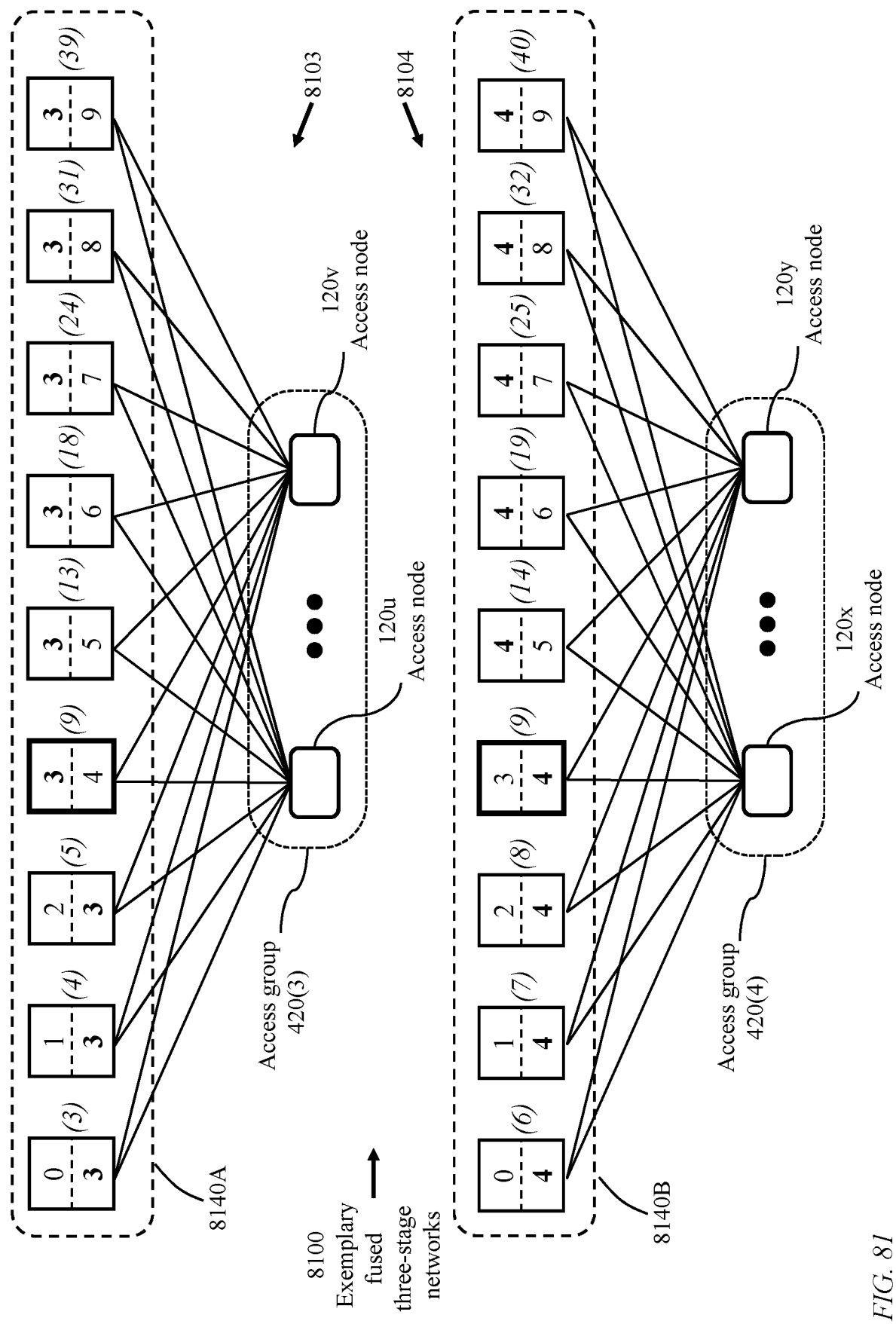
FIG. 81 illustrates two constituent three-stage networks of the switching system of FIG. 57, each of the two three-stage networks being fused with each other three-stage network of the ten constituent three-stage networks of the switching system of FIG. 57.

FIG. 81 illustrates exemplary fused three-stage networks 8100 within the switching system of FIG. 57 which comprises ten mutually fused three-stage networks. Constituent three-stage network 8103 comprises a distributor group 8140A having nine distributors of indices 3, 4, 5, 9, 13, 18, 24, 31, and 39, respectively, each distributor having dual channels to access nodes of a respective pair of access groups. All of the nine distributors connect to each access node of an access group of index 3, which includes access nodes 120*u* and 120*v*. Additionally, distributors of indices 3, 4, 5, 9, 13, 18, 24, 31, and 39, individually connect to the access groups of indices 0, 1, 2, 4, 5, 6, 7, 8, and 9, respectively. Constituent three-stage network 8104 comprises a distributor group 8140B having nine distributors of indices 6, 7, 8, 9, 14, 19, 25, 32, and 40, respectively, each distributor having dual channels to access nodes of a respective pair of access groups. All of the nine distributors connect to each access node of an access group of index 4, which includes access nodes 120*x* and 120*y*. Additionally, distributors of indices 6, 7, 8, 9, 14, 19, 25, 32, and 40, individually connect to the access groups of indices 0, 1, 2, 3, 5, 6, 7, 8, and 9, respectively.

The distributor of index 9 belongs to the two constituent three-stage networks 8103 and 8104. The switching system of FIG. 57 supports 10 access groups ($\mu$=10) and comprises 10 mutually fused three-stage networks of which two fused three-stage networks are illustrated in FIG. 81.

Thus, the invention provides a contiguous network 7900 comprising a plurality of three-stage networks 7910. Each three-stage network 7910 comprises an access group 7720 comprising a respective set of access nodes 120 of a plurality of access nodes and a distributor group 7940 comprising a respective set of distributors 7950 of a plurality of distributors. Each access node 120 of an access group has a dual channel, of a respective set of dual channels 7930, to each distributor of a respective distributor group.

The three-stage networks 7910 of the plurality of three-stage networks are mutually fused so that distributor groups 7940 of each pair of three-stage networks 7910 have one common distributor 7950 and each distributor 7950 is common in exactly two three-stage networks 7910 of the plurality of three-stage networks. Consequently, each access node of a specific access group has multiple parallel path to each other access node of the specific access group, and a path to each access node of each other access group traversing only one distributor.

Figure 82:
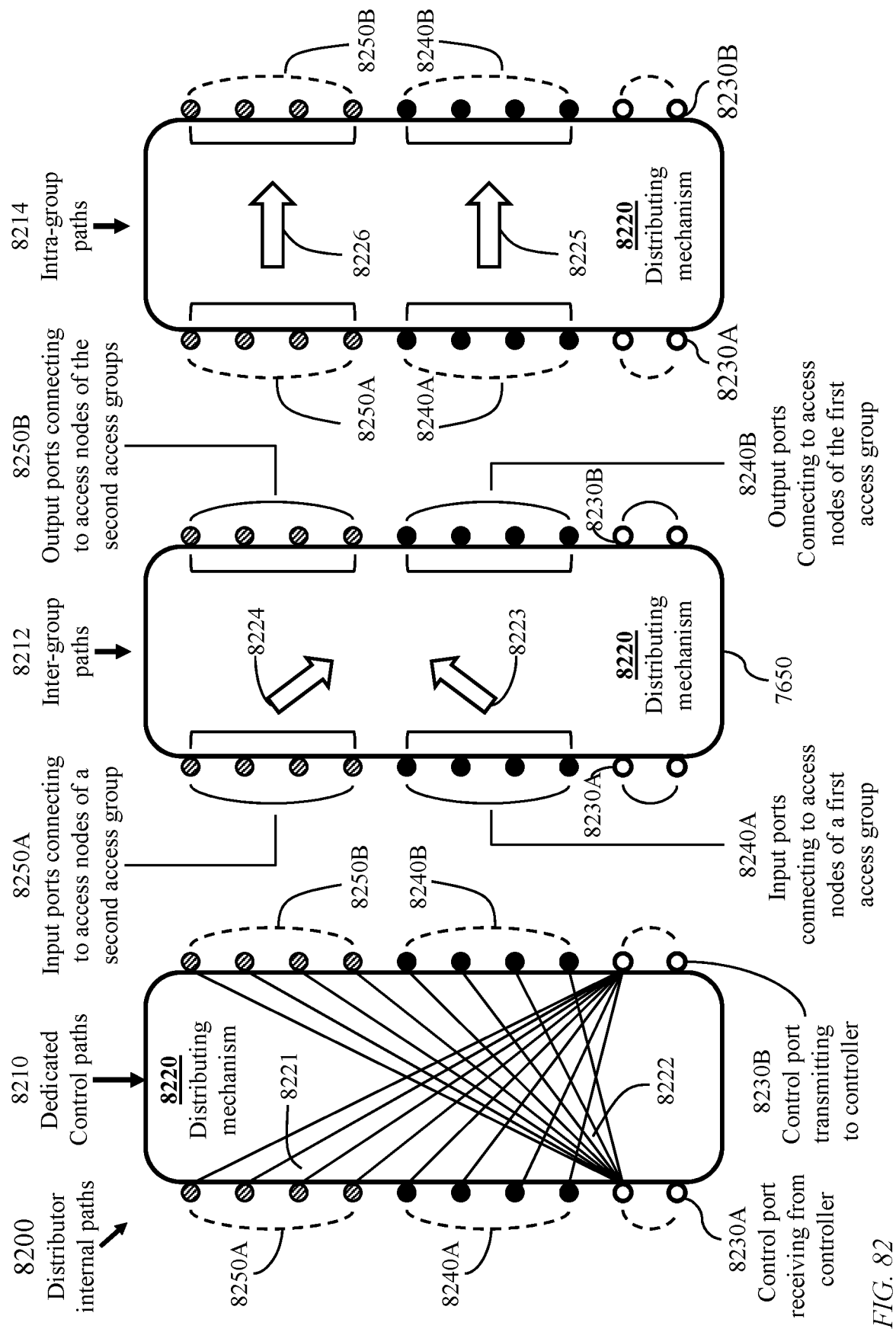
FIG. 82 illustrates data paths within a distributor.

FIG. 82 illustrates flow of control data and content data through internal paths 8200 of a distributing mechanism 8220 of a distributor 7650, where the distributing mechanism 8220 is implemented as a switching mechanism. The internal paths include dedicated control paths 8210, inter-group paths 8212, and intra-group paths 8214. Distributor 7650 is coupled to a respective distributor controller. A distributor controller is not illustrated in FIG. 82. FIG. 63 illustrates a switch controller 6350 coupled to: (1) control ports of a switching mechanism 6330; (2) a master time indicator 6360; and (3) a timing circuit 6340. FIG. 64 illustrates the switch controller 6350 coupled to: (1) input ports of switching mechanism 6330 through a temporal multiplexer/demultiplexer 6445; (2) master time indicator 6360; and (3) timing circuit 6340. FIG. 65 illustrates a timing circuit 6450 coupled to control ports of a rotation mechanism 6530 and a master time indicator 6560.

Distributing mechanism 8220 supports:

(a) control ports 8230A receiving control data from a respective distributor controller;

(b) Control ports 8230B transmitting control data to the distributor controller;

(c) input ports 8240A connecting to access nodes of a first access group;

(d) input ports 8250B connecting to access nodes of a second access group;

(e) output ports 8240B connecting to the access nodes of the first access group; and (f) output ports 8250B connecting to access nodes of the second access group.

Allocated control paths 8221 carry control data from input ports 8240A and 8250A to a control port 8230B. Allocated control paths 8222 carry control data from a control port 8230A to output ports 8240B and 8250B.

Inter-group content data paths 8223 carry content data from input ports 8240A (connecting to the first access group) to output ports 8250B (connecting to the second access group). Inter-group content data paths 8224 carry content data from input ports 8250A (connecting to the second access group) to output ports 8240B (connecting to the first access group).

Intra-group content data paths 8225 carry content data from input ports 8240A (connecting to the first access group) to output ports 8240B (connecting to the same first access group). Intra-group content data paths 8226 carry content data from input ports 8250A (connecting to the second access group) to output ports 8250B (connecting to the same second access group).

The distributor controller is configured to reserve control paths 8221 and 8222 as dedicated paths and grant priority to inter-group flow-rate allocation through paths 8223 and 8224. Content data from an access node of an access group to another access node of the same access group, transferred through paths 8225 or 8226, may be carried through multiple distributors 7950 of a respective distributor group; each distributor group 7940 comprises (μ−1) distributors 7950. Thus, inter-group flow-rate allocation may be given priority over intra-group flow-rate allocation.

Figure 83:
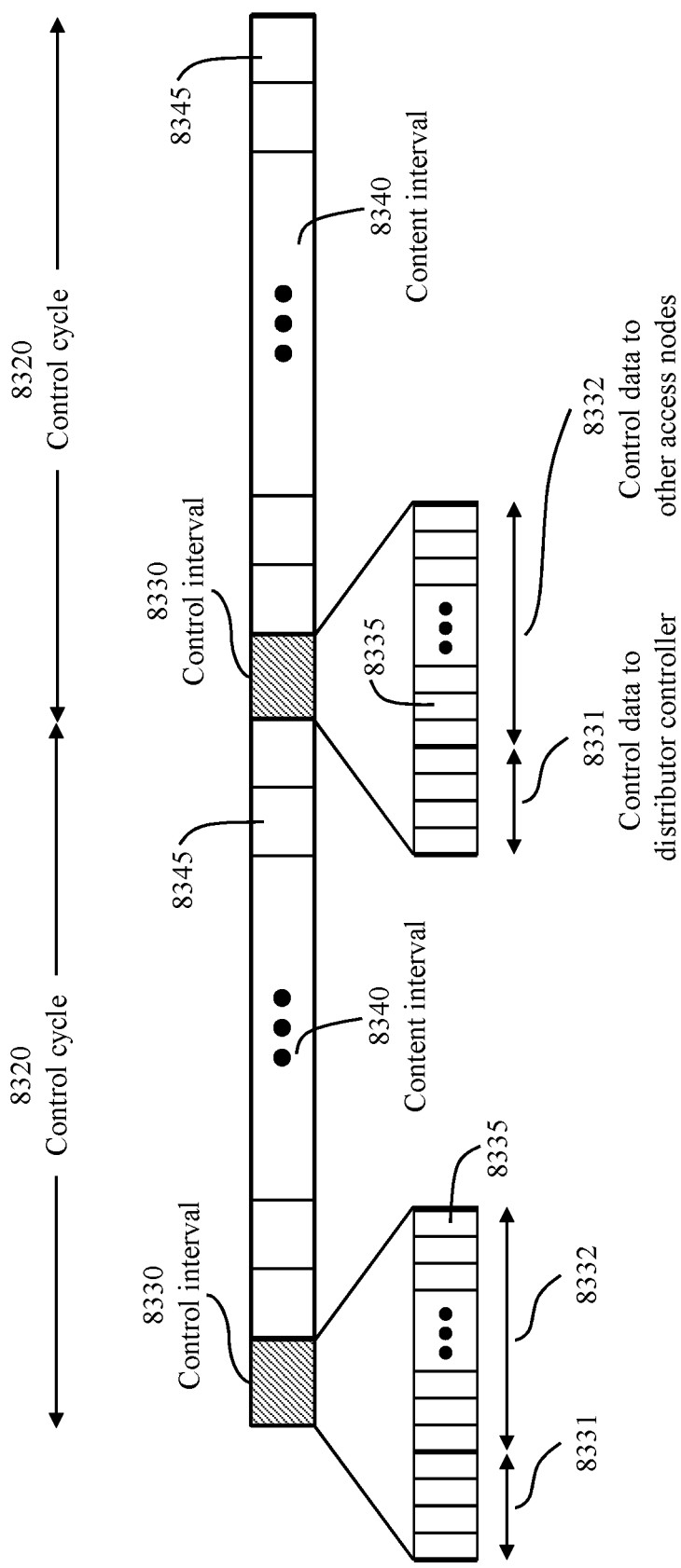
FIG. 83 illustrates a control cycle divided into a control interval and content interval, in accordance with an embodiment of the present invention.

FIG. 83 illustrates establishing dedicated control paths within the contiguous network. For the purpose of path allocation, the time domain is organized into successive control cycles 8320. During each control cycle 8320:
  each of input ports 8240A and 8250A cyclically connects to at least one control port 8230B (control paths 8221); and
  at least one control port 8230A cyclically connects to each of output ports 8240A and 8250A (control paths 8222).

Each control cycle 8320 is divided into a first interval 8330 and a second interval 8340.

During the first interval, an input port 8240A or 8250A communicates with a distributor controller and the distributor controller communicates with an output port 8240B or 8250B. During the second interval 8340 content data may be transferred from an input port 8240A or 8250A to at least one of output ports 8240B and 8250B.

The first interval 8330 is divided into a first period 8331 and a second period 8332.

During the first period 8331:
  requests for flow-rate allocations are communicated from an access node to the distributor controller; and
  responses from the distributor controller are communicated to the access node.

During the second period 8332, control messages from the access node are relayed to output ports 8240B and 8250B, hence to access nodes coupled to the distributor. The second period 8332 is preferably divided into at most 2×m time slices 8335, each time slice 8335 dedicated to a respective output port 8240B or 8250B, where m is an upper bound of the number of access nodes 120 per access group (which is the number of dual ports of a distributor connecting to one access group).

The second interval 8340 may be divided into a number of time slots 8345 with each time slot dynamically or cyclically allocated for transferring content data to an output port 8240B or 8250B. An input port 8240A or 8250A may transfer content data to a specific output port 8240B or 8250B of a switching mechanism during multiple time slots during any control cycle.

To enable allocation of a wide range of flow rates, a scheduling cycle encompassing multiple control cycles may be used to allocate time slots for a flow from an input port to an output port of a distributor. A flow traversing a distributor is allocated at least one time slot during a scheduling cycle. Naturally, the content data of a flow may not fill an integer number of time slots. With each scheduling cycle comprising S, S>1, control cycles 8320, an upper bound of the proportion of idle capacity due to partial time-slot fill is $(1.0/\Omega)$. Selecting S to equal 64, for example, the upper bound of idle capacity would be less than 0.016 of the full capacity. With each distributor having at most E dual ports, the number of time slots per scheduling cycle would be $\Sigma \times S$. The minimum allocated capacity per flow is then $R/(\Sigma \times S)$, R being the capacity (expressed as bits/second, for example) of an upstream channel or a downstream channel connecting to a distributor. For example, with R=40 Gigabits/second (Gb/s), $\Sigma$=128, and S=32, The minimum allocated capacity per flow is approximately 9.8 Megabits/second.

Figure 84:
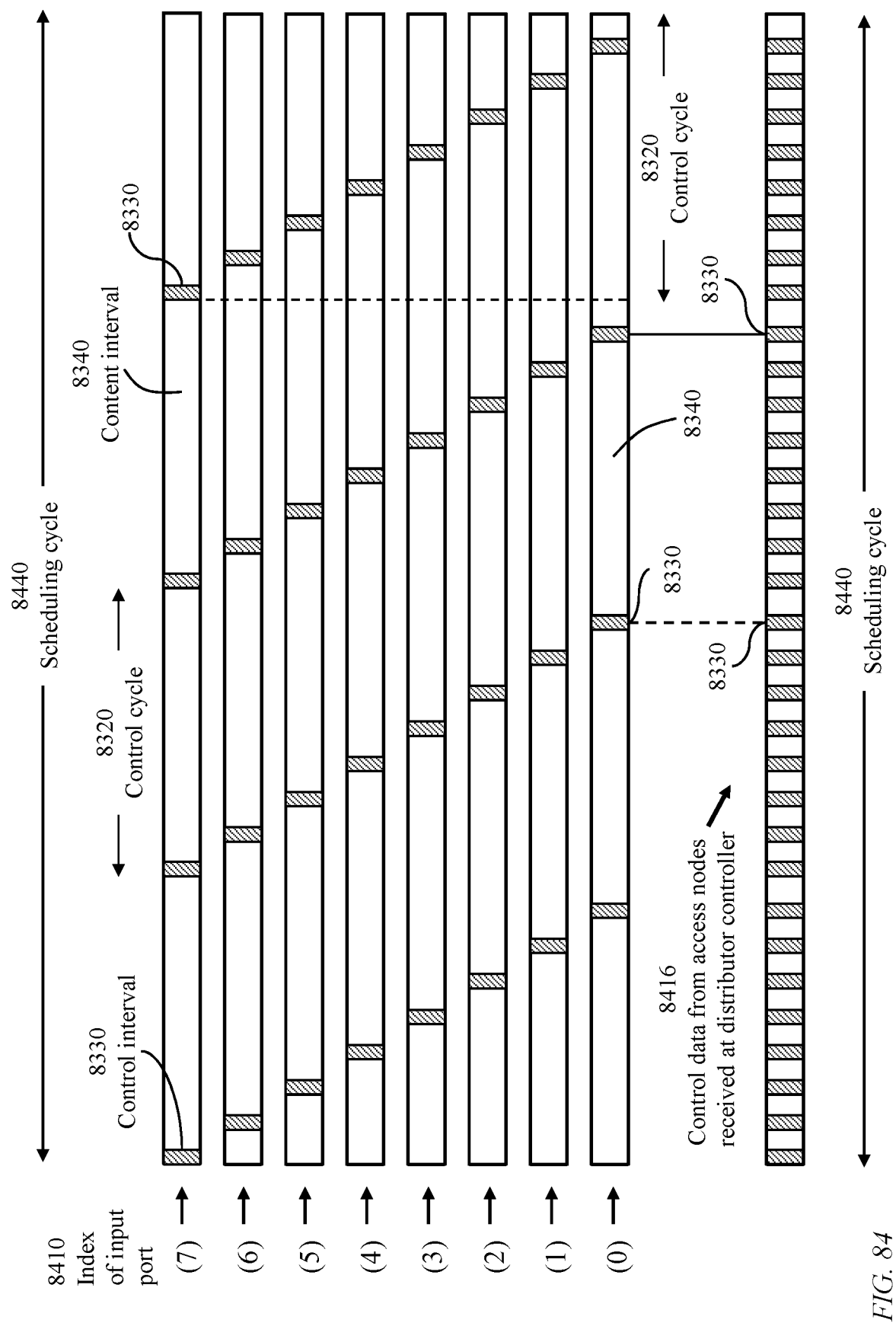
FIG. 84 illustrates organization of a scheduling cycle for each input port of a distributor where the scheduling cycle comprises four control cycles, the control intervals allocated to the input ports being noncoincident.

FIG. 84 illustrates organization of a scheduling cycle 8440 for each input port of a distributor having a total of eight content ports, four content ports per access group, where each scheduling cycle comprises four (S=4) control cycles 8320 with each control cycle including one control interval 8330. The indices 8410 of the input ports are designated as (0), (1), . . . , (7). The control intervals 8330 allocated to the input ports of the distributor are noncoincident. Control data 8416 transferred to the distributor controller occupy noncoincident control intervals.

Each distributor 7650, comprises a respective distributor controller and each access node 120 comprises a respective access controller. An access node connects to (μ−1) distributors, μ being the total number of access groups 7520. An access controller of a specific access node establishes a cyclic time-limited dedicated dual control path, during a respective period 8331, to a distributor controller of each distributor of a distributor group to which the specific access node connects.

An access node 120 has a dual channel to each distributor 7650 of a respective set of (μ−1) distributors. A distributor 7650 provides, through a respective distributor controller, an end-to-end control path from an access node to each other access node connecting to the same distributor. The end-to-end control path may be configured as a reserved time-limited path during a time slice 8335.

Thus, the invention provides a method of data switching according to which a plurality of access nodes 120 is arranged into a plurality of access groups 7520 and a plurality of distributors 7650 is arranged into a plurality of distributor groups 7640 where each access node 120 of the plurality of access nodes connects to each distributor 7650 of a respective distributor group 7640 and each pair of distributor groups has a common distributor 7650 so that each access group 7520 and a respective distributor group 7640 form a respective three-stage network, thus yielding a plurality of mutually fused three-stage networks.

Each distributor group 7640 comprises a predetermined number of distributors 7650 and each access group comprises a respective number of access nodes 120 which may differ from one access group to another.

Each distributor 7650 is coupled to a respective hardware processor executing instructions for establishing a path from each access node connecting to the distributor to each other access node connecting to the same distributor.

Thus, each distributor 7650 of the plurality of distributors is common in two three-stage networks of the formed plurality of three-stage networks, thereby creating a path from each access node to each other node of the plurality of access nodes traversing only one distributor.

The method further comprises organising the time domain into repetitive control cycles 8320. During each control cycle 8320 of successive control cycles, an access node 120 sends to each distributor 7650 of a respective distributor group 7640:
  (a) control data directed to a distributor controller of each distributor of the respective distributor group during a control interval 8330; and
  (b) content data directed to access nodes coupled to each distributor of the respective access group during a content interval 8340.

A control interval 8330 of a control cycle 8320 is further divided into:
  a first period 8331 during which requests for flow-rate allocations for flows originating from an access node are communicated to a respective distributor controller; and
  a second period 8332 during which control messages from an access node are communicated to a controller of a respective distributor to be relayed to access nodes coupled to the respective distributor.

The time-domain is further organized into repetitive scheduling cycles 8440. Each scheduling cycle comprising a predetermined number of control cycles 8320. Each content interval 8340 is divided into a number of time slots; the number of time slots is preferably equal to the total number of dual ports per distributor. At least one time slot per scheduling cycle is allocated to a flow. A flow may be allocated multiple time slots per scheduling cycle; the number of time slots per flow per scheduling cycle is time varying, being adapted to changing the flow rate (bits/second) of a flow.

Figure 85:
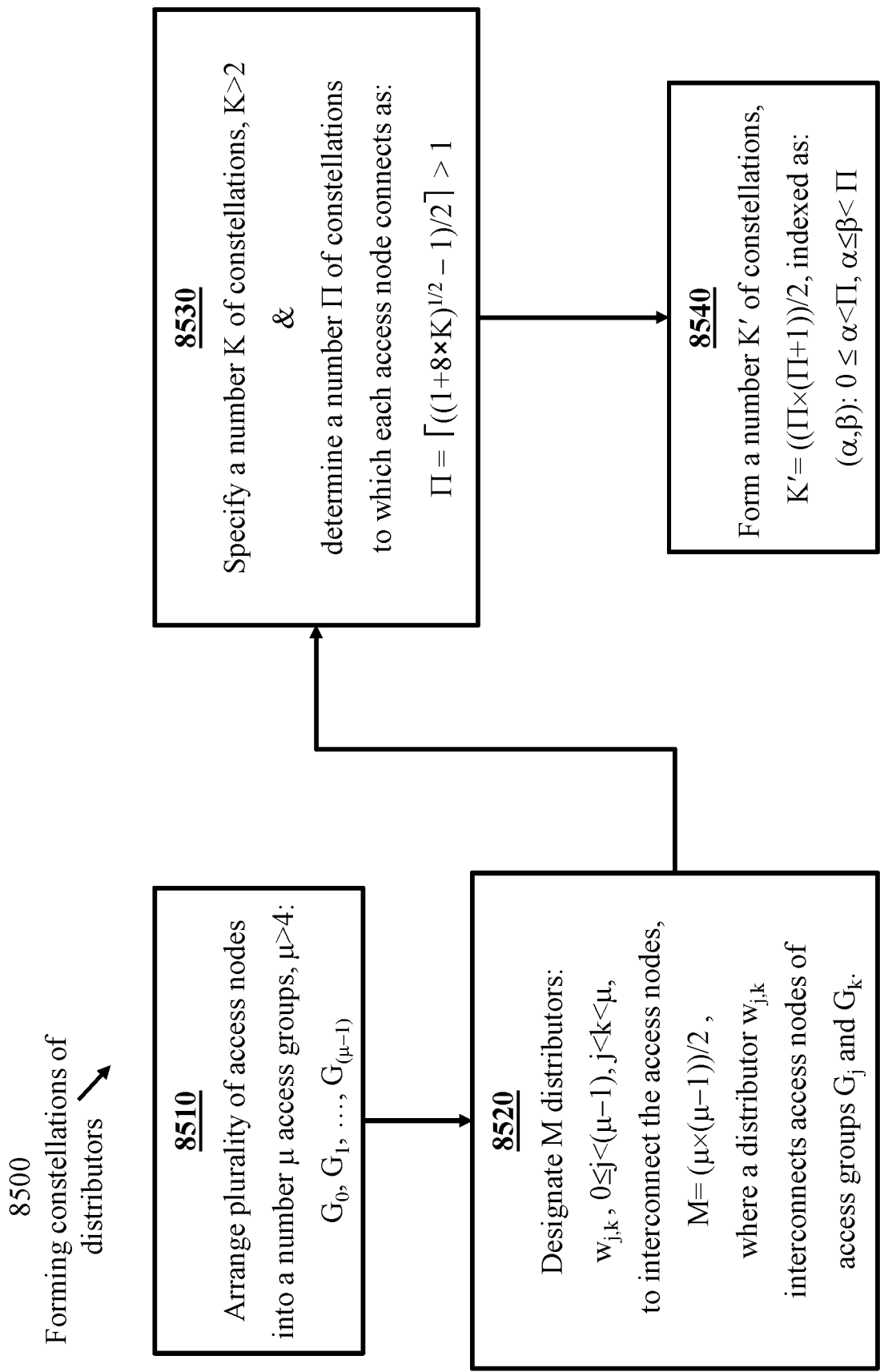
FIG. 85 illustrates a method of arranging distributors of the contiguous network into constellations, in accordance with an embodiment of the present invention.

FIG. 85 illustrates a method 8500 of forming a large-scale contiguous network comprising access nodes arranged into access groups and distributors arranged into constellations of collocated distributors. To start, a plurality of access nodes is arranged (process 8510) into a number $\mu$, $\mu > 4$, of access groups $G_0, G_1, \ldots, G_{(\mu-1)}$ as illustrated in FIG. 4. Each pair of access groups is connected to a respective distributor of a respective three-stage network through dual channels (process 8520). Thus, each access node connects to $(\mu-1)$ distributors. The number M of distributors, each supporting two access groups, is then determined as $M=(\mu \times (\mu-1))/2$. The group of distributors connecting to an access group $G_j$, in addition to other access groups, is denoted $W_j$. The M distributors are individually identified according to indices of connecting access groups so that a distributor connecting to access groups $G_j$ and $G_k$, $0 \le j < \mu$, $j < k \le (\mu-1)$, is identified as $w_{j,k}$.

With the plurality of distributors arranged into constellations, as described above with reference to FIGS. 58, 62, and 74, each access node connects to at most $\Omega$ distributors in each of respective $\Pi$ constellations, $\Omega > 1$, $1 < \Pi \le \mu$. Thus, the number K of constellations is determined as: $K = (\Pi \times (\Pi + 1))/2$.

A link from an access node to a constellation carries at most $\Omega$ channels which may be provided through at least one WDM link. The product $\Pi \times \Omega$ equals or exceeds the total number of channels from an access node to respective $(\mu-1)$ distributors; thus: $(\Pi \times \Omega) \ge (\mu-1)$.

Specifying a value of $\Omega$, the number $\Pi$ of constellations to which an access node connects is determined as $\Pi = \lceil (\mu-1)/\Omega \rceil > 1$. Alternatively, specifying a value of $\Pi$, the maximum number of channels from an access node to a constellation is determined as $\Omega = \lceil (\mu-1)/\Pi \rceil > 1$. Specifying a number K of constellations in the entire network, the corresponding number $\Pi$ to which each access node connects is determined (process 8530) as:

$$\Pi = \lceil \{(1 + 8 \times K)^{1/2} - 1\}/2 \rceil$$

The actual number of constellations to be formed is them determined as (process 8540): $K' = (\Pi \times (\Pi + 1))/2$.

Figure 86:
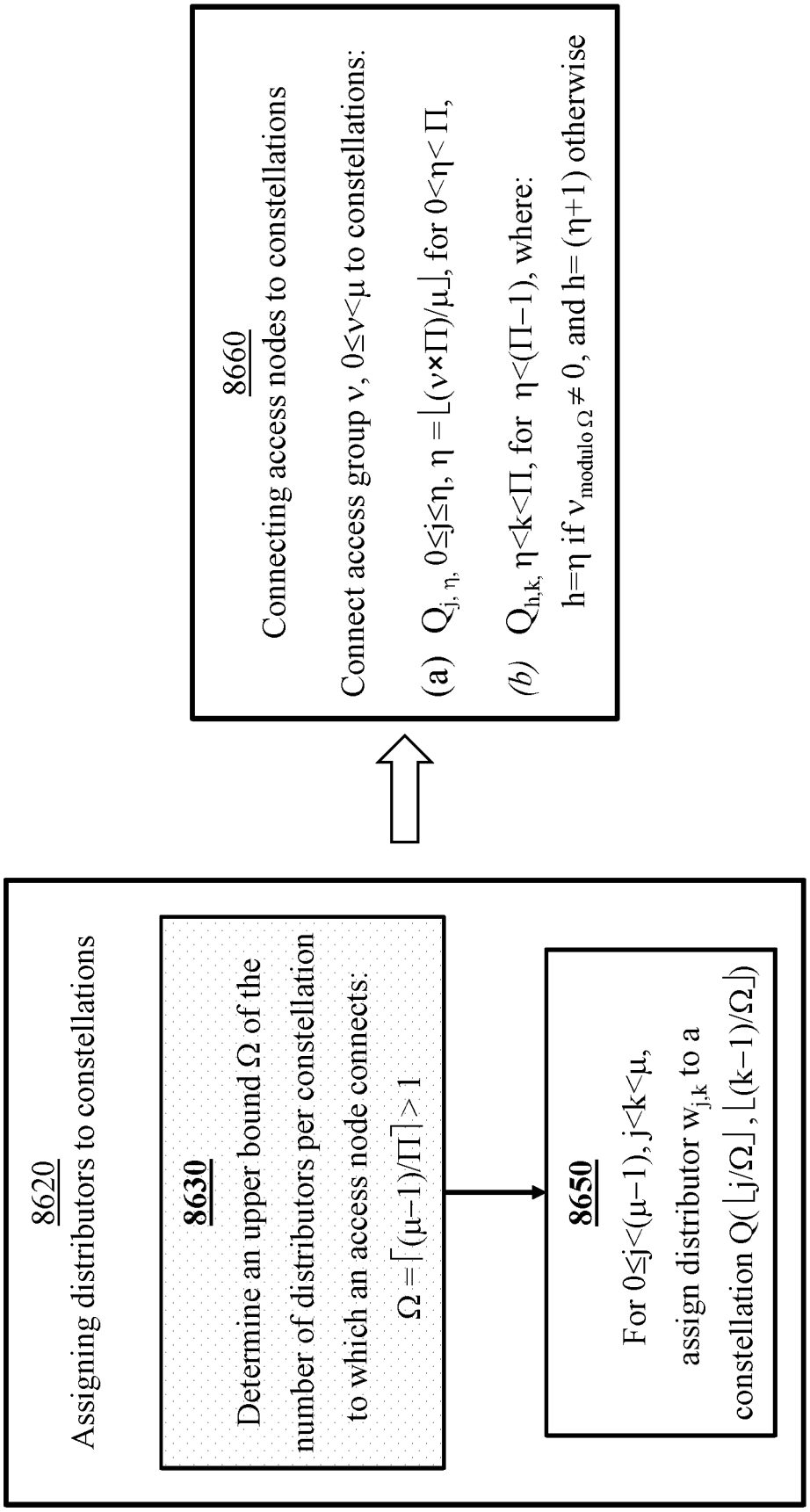
FIG. 86 illustrates assigning distributors to constellations and connecting access-groups to distributors of respective constellations, in accordance with an embodiment of the present invention.

FIG. 86 illustrates a process 8600 of assigning distributors to constellations and connecting access-groups to distributors of respective constellations. Process 8620 assigns distributors to constellations. Process 8660 determines access-node connectivity to respective distributors within a respective set of $\Pi$ constellations.

Upon determining the value of $\Omega$ (process 8630), each of the M distributors (designated in process 8520) is assigned to a respective constellation (process 8650), where a distributor $w_{j,k}$, supporting an access group of index j and an access group of index k, $0 \le j < (\mu-1)$, $j < k \le \mu$, is assigned to a constellation of indices $\lfloor j/\Omega \rfloor$ and $\lfloor (k-1)/\Omega \rfloor$.

An access node connects to $(\mu-1)$ dual channels each leading to a respective distributor of the M distributors $(M = (\mu \times (\mu-1))/2)$. The $(\mu-1)$ dual channels are grouped into $\Pi$ dual WDM links each dual WDM link connecting to a respective constellation of the K constellations $(K = (\Pi \times (\Pi + 1))/2)$. The $\Pi$ dual WDM links from an access group of index $v$, $0 \le v < \mu$, connect (process 8660) to constellations:

$Q_{j,\eta}$, where $\eta = \lfloor (v \times \lceil)/\mu \rfloor$, $0 \le j \le \eta$, for $0 < \eta < \Pi$, and $Q_{h,k}$, $\eta < k < \Pi$, for $\eta < (\Pi - 1)$, where $h = \eta$ if $(v_{modulo\ \Omega}) \ne 0$, and $h = (\eta + 1)$, otherwise.

Figure 87:
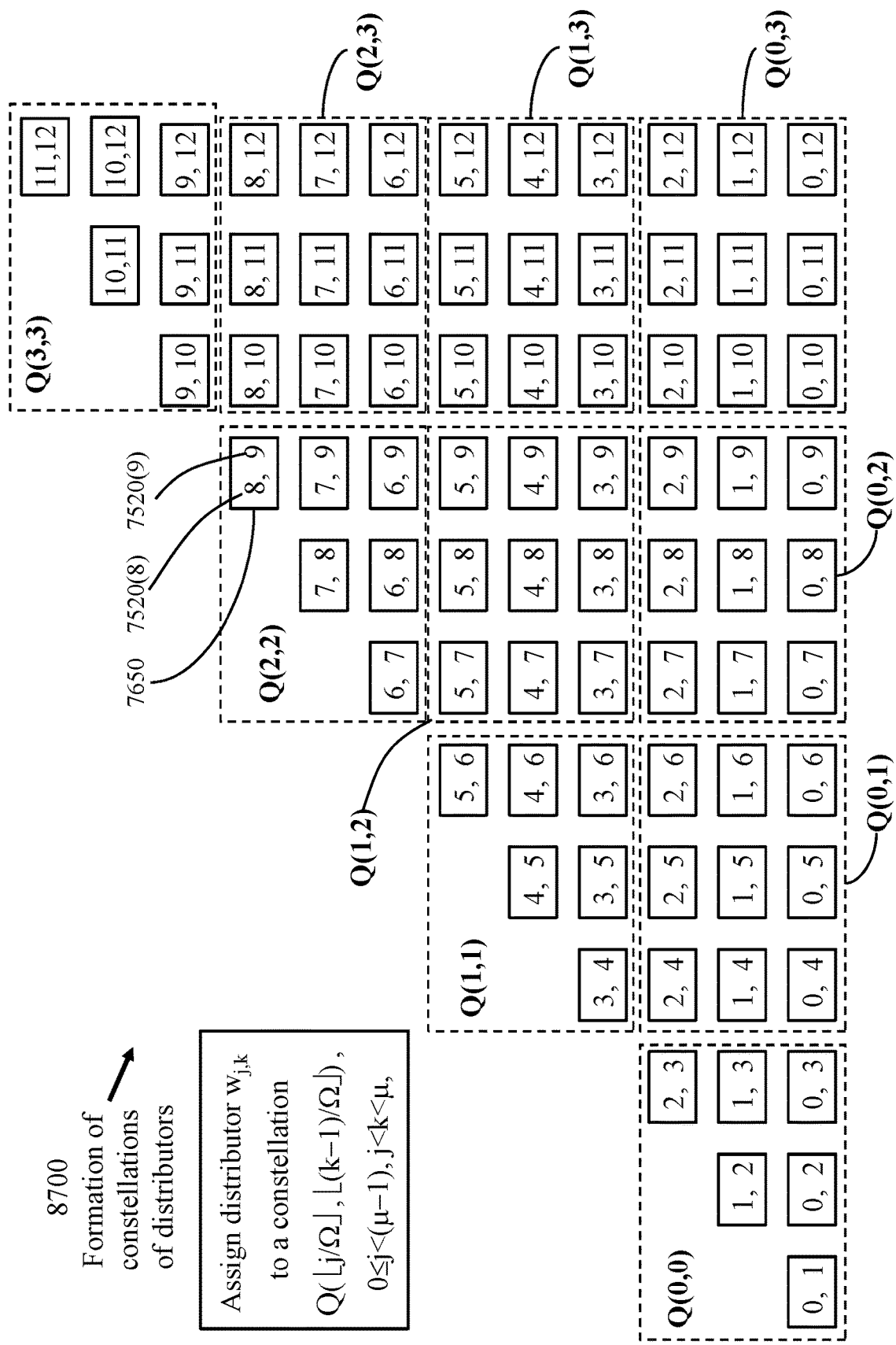
FIG. 87 illustrates arranging a plurality of distributors into constellations, where each distributor is coupled to two access groups, in accordance with an embodiment of the present invention.
Figure 88:
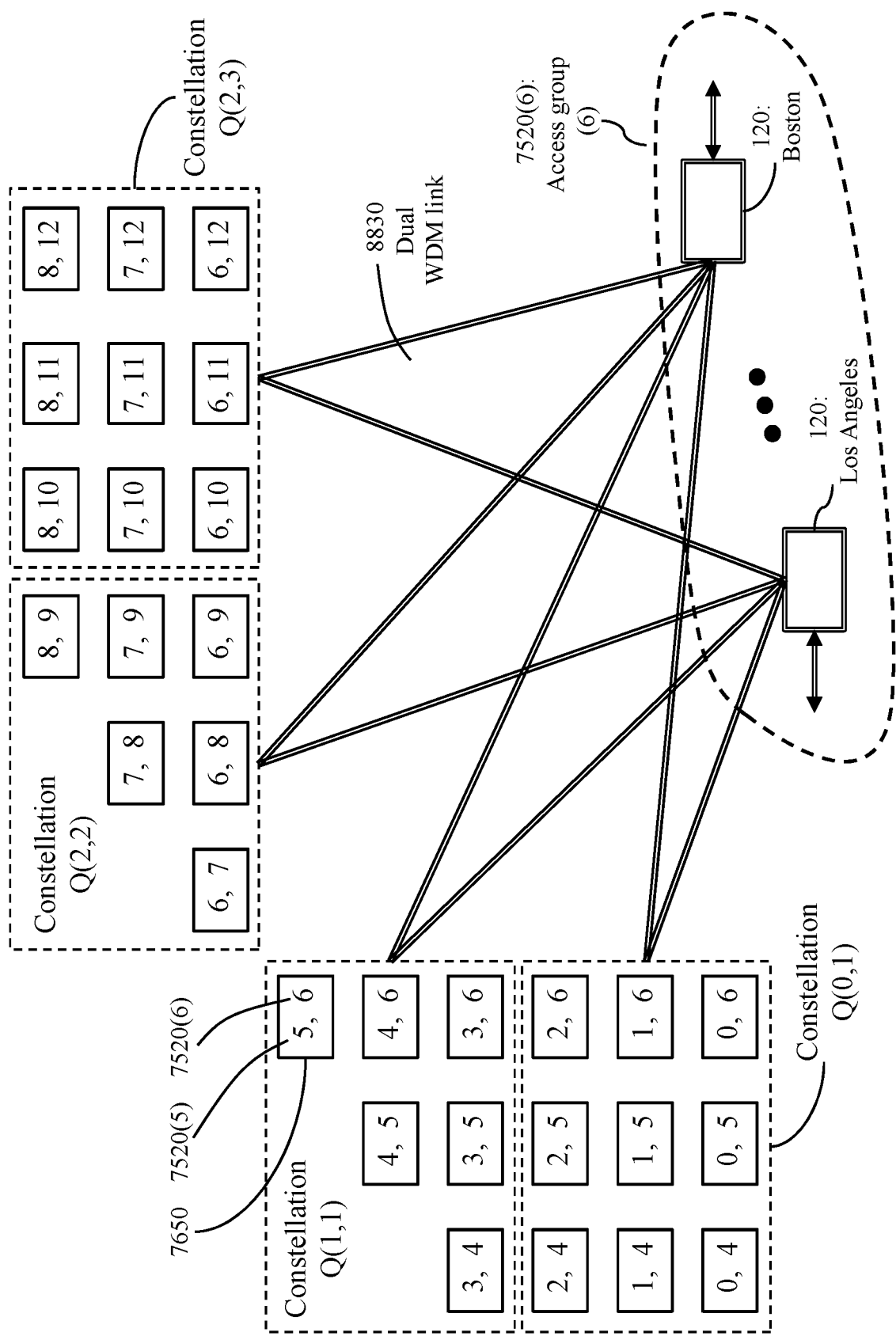
FIG. 88 illustrates connectivity of an access group to respective constellations of the network structure defined in FIG. 87, in accordance with an embodiment of the present invention.

It is noted that the constellations presented in FIGS. 58, 61, and 62 are indexed sequentially while the constellations presented in FIGS. 86, 87 and 88 are indexed according to indices of rows and columns of the constellations' arrangement.

FIG. 87 illustrates a plurality 8700 of constellations of distributors, each distributor coupled to two access groups of $\mu$ access groups, $\mu = 13$. The distributors are individually identified as $w_{j,k}$, $0 \le j < (\mu-1)$. $j < k \le \mu$. Thus, for $j=0$, k varies from 1 to 12. For $j=1$, k varies from 2 to 12. For $j=11$, $k=12$.

With each access node connecting to 4 constellations $(\Pi = 4)$, the number K of constellations is 10 and $\Omega = 3$. The distributers are assigned to constellation according to process 8650. Thus, a distributor $w_{3,5}$ supporting access groups 3 and 5, has a dual WDM link of $\Omega$ channels, $\Omega = 3$, to the constellation of indices $\lfloor 3/3 \rfloor$ and $\lfloor 4/3 \rfloor$, that is $Q_{1,1}$. A distributor $w_{7,11}$ supporting access groups 7 and 11, has a dual WDM link of 3 channels to the constellation of indices $\lfloor 7/3 \rfloor$ and $\lfloor 10/3 \rfloor$, that is $Q_{2,3}$.

FIG. 88 illustrates connectivity of an access group of index 6 to respective constellations of the network structure defined in FIG. 87. The access group may comprise access nodes geographically distributed over a wide area; for example, an access node of the access group may be located in Los Angeles while another access node of the same access group may be located in Boston. Access group $G_6$ connects to constellation $Q_{0,1}, Q_{1,1}, Q_{2,2}$, and $Q_{2,3}$ through dual WDM links, as indicated in FIG. 88. Each access node 120 has a dual WDM link 8830 to each constellation of a respective set of constellations. An access node of access group 6 may communicate with any other access node of access group $G_6$ through any of the 12 distributors of indices (0, 6), (1,6), (2, 6), (3, 6), (4, 6), (5, 6), (6, 7), (6,8), (6, 9), (6, 10), (6, 11), and (6, 12). Distributor $w_{0,6}$ connects each access node of access group $G_6$ to any access node of access group 0, distributor $w_{1,6}$ connects each access node of access group $G_6$ to any access node of access group 1, and so on.

Thus, the invention provides a contiguous network 7600 comprising a plurality of access nodes 120 arranged into a plurality of access groups 7520 and a plurality of distributors 7650 arranged into a plurality of distributor groups 7640 where each pair of distributor groups shares a common distributor. Each access node 120 of the plurality of access nodes has a dual channel to each distributor of a respective distributor group. Each access group and a respective distributor group form a respective three-stage network. Thus, a plurality of mutually fused three-stage networks is created.

Each distributor 7650 is coupled to a respective distributor controller employing at least one hardware processor. A distributor controller of a distributor is configured to establish a path, through the distributor for any pair of access nodes coupled to the distributor. Accordingly, with each distributor of the plurality of distributors being common in two three-stage networks of the formed plurality of three-stage networks, there is a path from any access node to any other node of the plurality of access nodes traversing only one distributor.

Constellations

As illustrated in FIGS. 51 to 56, a plurality of dual spectral routers may be employed to interconnect the plurality of access nodes to the plurality of distributors, where each spectral router directs individual channels of WDM links connecting to a respective set of access nodes to WDM links connecting to a respective set of distributors.

In order to directly connect the access nodes 120 to distributors 7640 through wavelength-division-multiplexed (WDM) links, without employing intermediate cross connectors, the plurality of distributors may be arranged into a plurality of constellations and a given access node connects to a respective set of constellations through a set of multichannel links.

Each constellation comprises a respective set of spatially collocated distributors. Each access node 120 connects to distributors of a designated distributor group 7640 as illustrated in FIG. 76. While the distributors of a constellation are spatially collocated, the distributors of a distributor group need not be spatially collocated. In fact, the distributors 7650 of each distributor group 7640 are assigned to a predetermined number, $\Pi$, of constellations, $\Pi>1$, which is also the number of constellations to which an access node 120 connects. Each multichannel link from an access node to a constellation carries a set of at most $\Omega$ dual channels, $\Omega>1$, connecting through a spectral demultiplexer and a spectral multiplexer to a subset of distributors of the designated set of distributors.

The number $\Pi$ of constellations to which an access node connects and the number $\Omega$ of dual channels per multichannel link from an access node to a constellation are selected so that ($\Pi \times \Omega$) ($\mu-1$), $\Pi$ and $\Omega$ being positive integers, and $\mu$ denoting a count of the access groups of the plurality of access groups, which is the number of constituent three-stage networks 7610 (FIG. 76). The envisaged large-scale contiguous network comprises a relatively large number, ranging from 20 to 2000, or so, of access groups. The number, $\Pi$, of constellations to which an access node connects may be a specified design parameter, in which case, the total number of constellations of the entire contiguous network is determined as $K=(\Pi \times (\Pi+1))/2$.

Alternatively, the total number, $K$, of constellations may be a specified design parameter, in which case, the number, $\Pi$, of constellations to which an access node connects is determined as:

$$\Pi=\{(1+8\times K)^{1/2}-1\}/2],$$

where $2<K\leq(\lfloor\mu/2\rfloor\times\lfloor\mu/2\rfloor+1)/2$, $\mu$ being a number of access groups of the plurality of access groups, $\mu>4$.

The value of $\Omega$ is determined as: $\Omega=\lceil(\mu-1)/\Pi\rceil>1$. Since $\Pi>1$ and $\Omega>1$, the minimum value of $\mu$ would be 5 to benefit from WDM spectral multiplexing. As mentioned above, the value of $\mu$ for a large-scale network would be much higher than 5. The value of $\mu$ for a global inter-continental network would be of the order of 1000. The value of $\mu$ for a large-scale data center of a capacity of 10 petabits/second would be of the order of 100.

With the access groups of the plurality of access groups indexed as $0, 1, \ldots, \mu-1$, and the constellations of the plurality of constellations indexed as $(\alpha, \beta)$, $0\leq\alpha<\Pi$, $\alpha\leq\beta<\Pi$, an access group of index $\nu$, $0\leq\nu<\mu$, connects to constellations of indices $(\alpha, \beta)$ determined as:

$0\leq\alpha\leq\eta$, $k=\eta$, where $\eta=\lfloor\nu\times\Pi/\mu\rfloor<\Pi$; and for $\eta<\Pi-1$, $\alpha=h$, $\eta<\beta<\Pi$, where:

$h=\eta$, if ($\nu$ modulo $\Omega$)$\neq 0$, and $h=\eta+1$ otherwise.

A distributor connecting a pair of access groups of indices $\{j, k\}$, $0\leq j<(\mu-1)$, $j<k<\mu$, is assigned to a constellation indexed $(\alpha, \beta)$ where:

$\alpha=\lfloor j/\Omega\rfloor<\Pi$ and $\beta=\lfloor(k-1)/\Omega\rfloor<\Pi$, where $\Omega=\lceil(\mu-1)/\Pi\rceil>1$.

Figure 89:
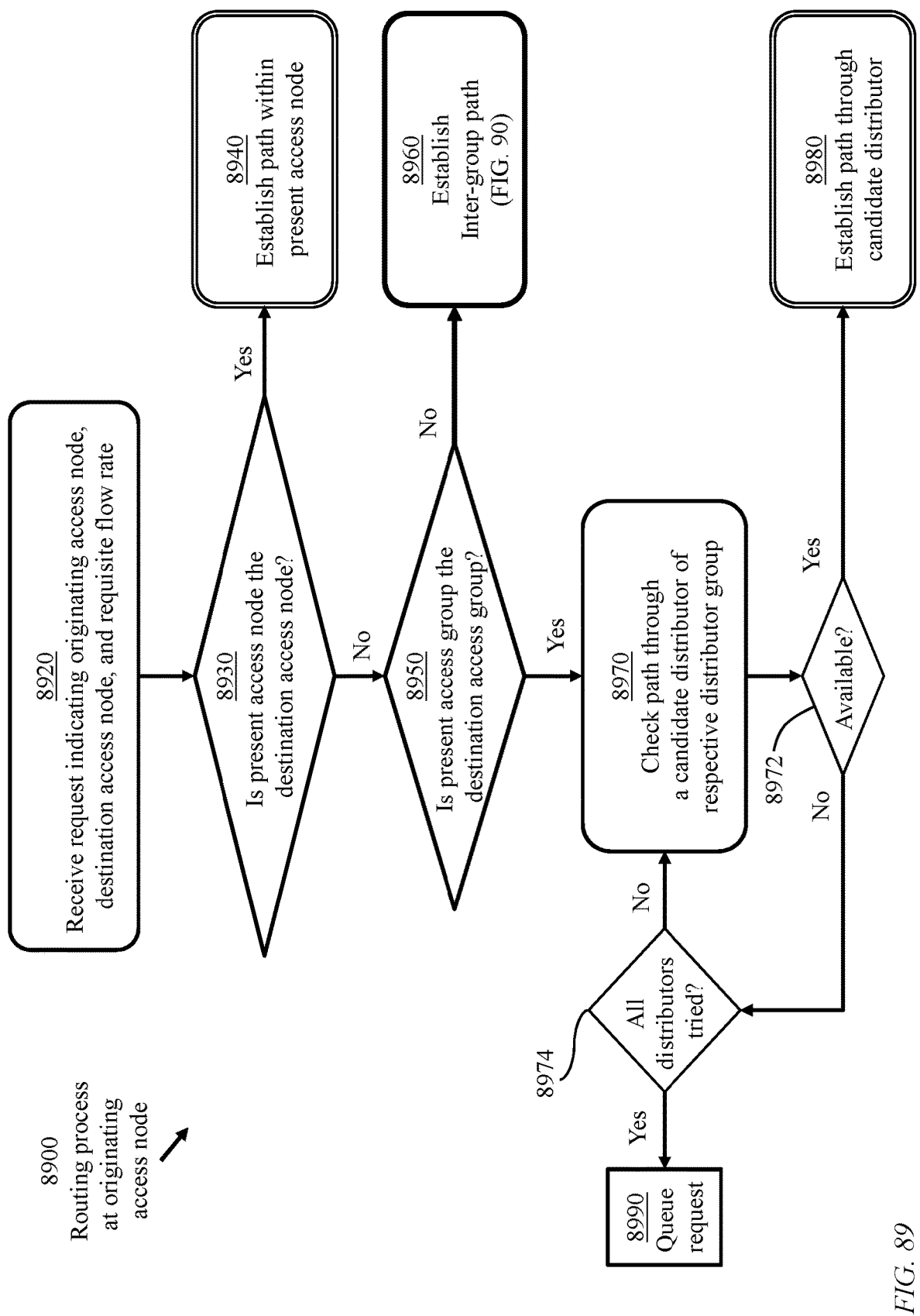
FIG. 89 illustrates processes implemented at an access controller, for establishing paths through the contiguous network.

FIG. 89 illustrates processes 8900, implemented at an access controller, for establishing routes through the contiguous network of FIG. 76. A flow is defined according to an originating access node, a destination access node, and a requisite flow rate. The access controller of an originating access node receives (process 8920) from a data source coupled to the originating access node a request to allocate a requisite flow rate for a flow directed to a specific destination access node.

Process 8930 determines whether the originating access node is the destination access node; i.e., whether the data source and data sink connect to the originating access node. If so, a path is established within the originating access node (process 8940).

If the originating access node is not the destination access node, process 8950 determines whether the originating access group, which is the access group to which the originating access node belongs, is the destination access group. If the originating access group is not the destination access group, processes 8960, detailed in FIG. 90, establish an inter-group path.

If the originating access group is the destination access group, the access controller established an intra-group path. Process 8970 selects a candidate path through a candidate distributor of the ($\mu-1$) distributors to which the originating access node connects. Upon receiving availability status (process 8972) of the candidate path from the candidate distributor, process 8980 establishes a path through the selected candidate distributor if the candidate path is available. Otherwise, process 8974 determines whether at least one of the ($\mu-1$) candidate distributors has not been considered. If so, process 8970 is revisited for a different candidate distributor. Thus, if the available capacity of a candidate path traversing one of the ($\mu-1$) distributors is less than the requisite flow rate, a path through any other distributor of the (μ−1) distributors may be sought. If all candidate distributors have been considered, the request is queued (process 8990) to be reconsidered. It is noted that reaching this state would be a rare event.

Figure 90:
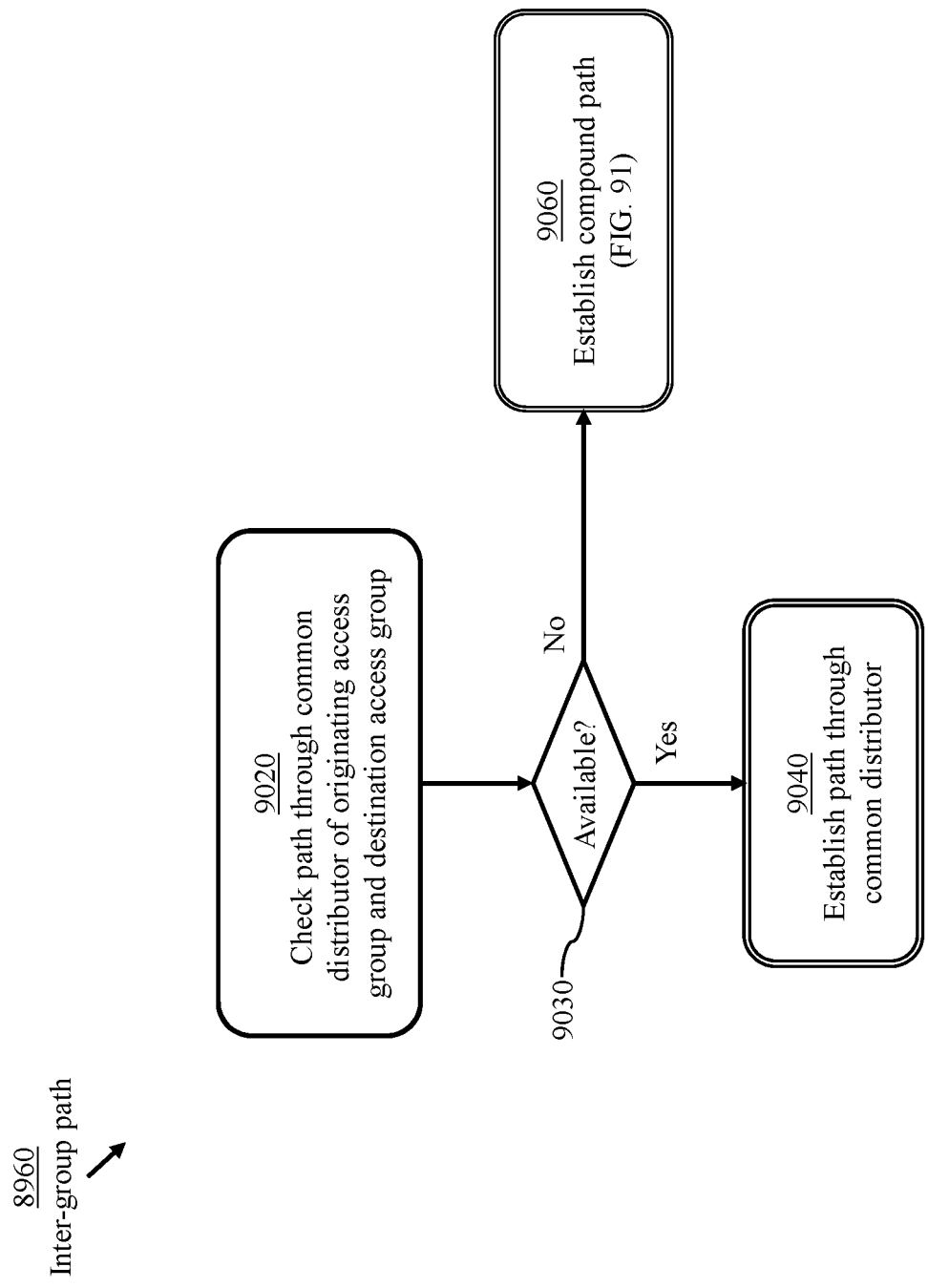
FIG. 90 illustrates details of processes of establishing inter-group paths.

FIG. 90 illustrates details of processes 8960. Process 9020 identifies the common distributor of the originating distributor group, i.e., the (μ−1) distributors to which the originating access node connects, and the destination distributor group, i.e., the (μ−1) distributors to which the destination access node connects. An access controller of an access node is aware of the access-group pair connecting to each distributor to which the access node connects. For example, referring to FIG. 81, each access node 120 of access group 420(3) stores a list of access group pairs {(0,3), (1,3), (2,3), (3,4), (3,5), (3,6), (3,7), (3,8), and (3,9)} connecting to the nine distributors of distributor group 8140A. Thus, to connect to a destination access node 120 of access group 420(4), an entry of index 4 of the list identifies the common distributor connecting to the destination access node. The access controller of the originating access node communicates the request to the common distributor.

Upon receiving availability status (process 9030) of the path, process 9040 establishes a path through the common distributor if the path is available. Otherwise, processes 9060, to be detailed in FIG. 91, seek a compound path.

Figure 91:
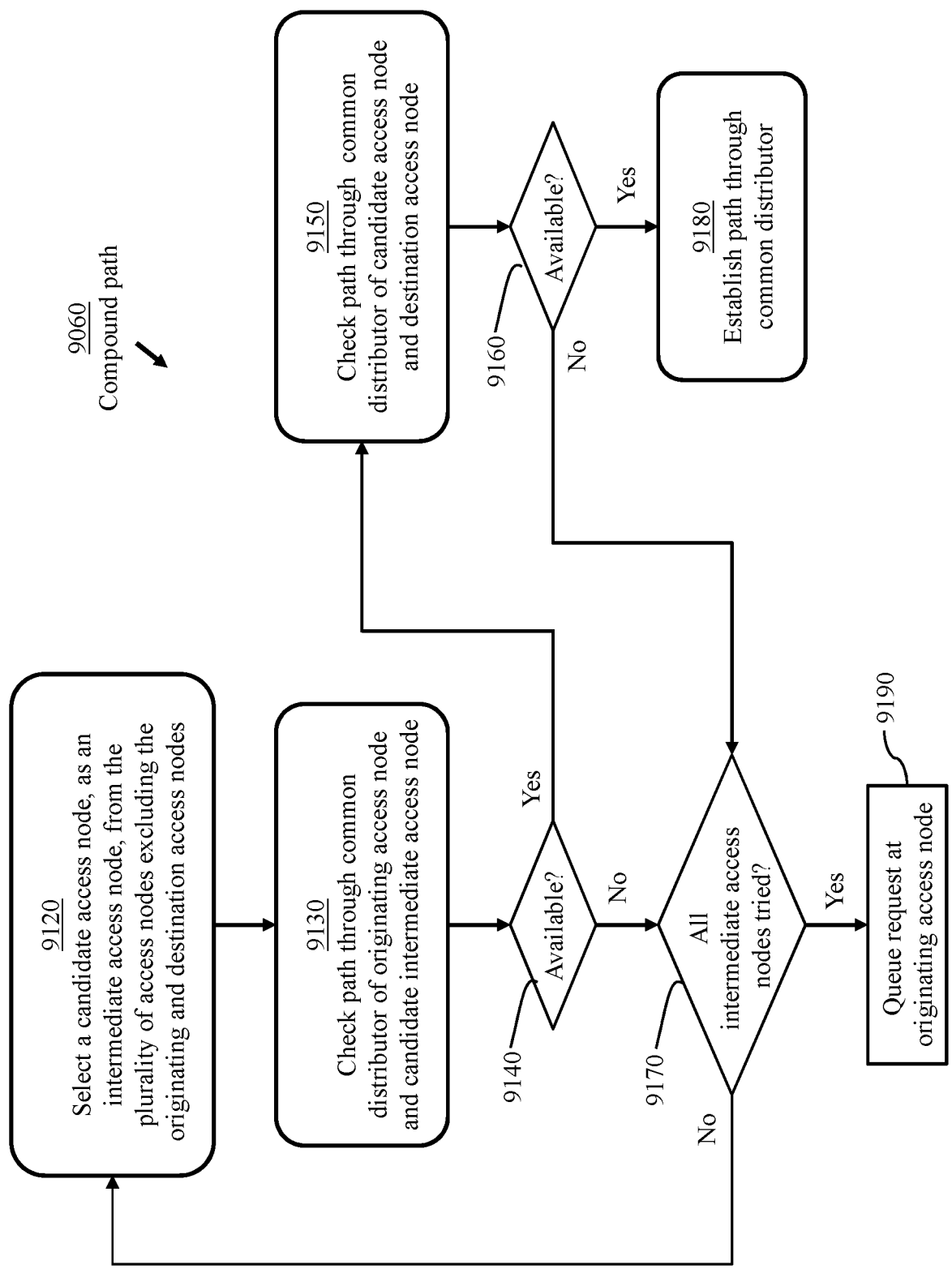
FIG. 91 illustrates details of processes of establishing compound paths.

FIG. 91 illustrates details of processes 9060. An access controller of the originating access node executes process 9120, 9130, 9140, 9170, and 9190. An access controller of an intermediate access node, other than the originating access node or the destination access node, executes processes 9150, 9160, and 9180.

Process 9120 selects a candidate intermediate access node. All access nodes of the plurality of access nodes, or all access nodes of a designated set of access nodes, excluding the originating and destination access nodes, are candidate intermediate access nodes. Process 9130 determines availability of a path connecting the originating access node to the candidate intermediate access node through the common distributor to which both the originating access node and the candidate intermediate access node connect. If a path is available, i.e., has a sufficient free capacity, process 9140 relays the request to the candidate intermediate access node which executes process 9150.

Otherwise, the access controller of the originating access node determines (process 9170) whether all candidate intermediate access nodes have been considered. If at least one candidate intermediate access node has not been considered, process 9120 is revisited. If all candidate intermediate access nodes have been considered, the request is queued (process 9190) to be considered later.

Process 9150 determines availability of a path connecting the candidate intermediate access node determined in process 9130 and the destination access node through the common distributor to which both the candidate intermediate access node and the destination access node connect. If a path is available, i.e., has a sufficient free capacity, process 9160 proceeds to process 9180 which establishes the path (i.e., allocates the requisite flow rate) and informs the access controller of the originating access node. As described above, there is a dedicated control path from each access node to each other access node within the entire switching system.

Otherwise, if a path from the candidate intermediate access node to the destination access node is not available, the access controller of the candidate intermediate access node sends a message to the access controller of the originating access node which would execute process 9170 to seek another candidate access node.

Figure 92:
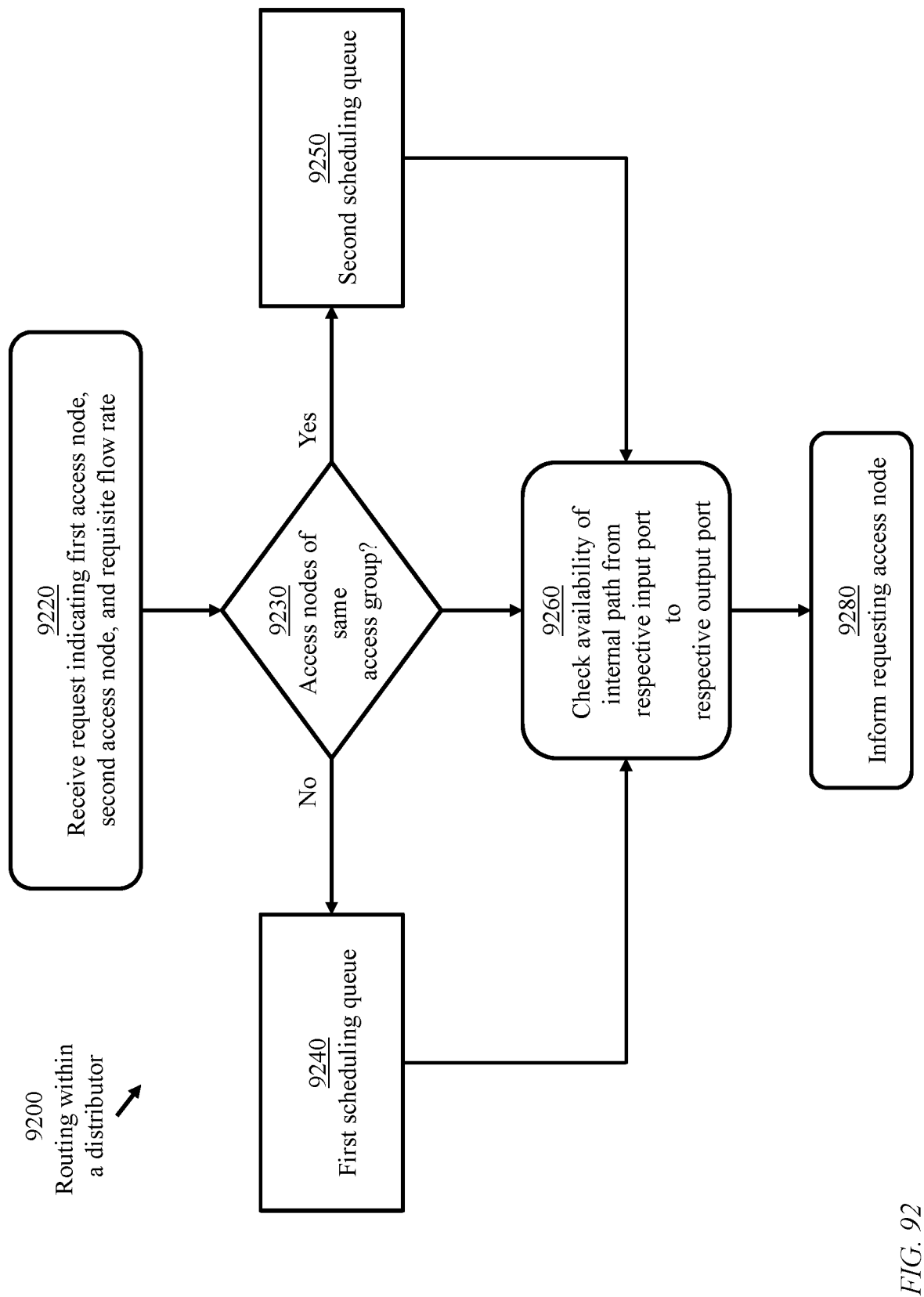
FIG. 92 illustrates processes implemented at a distributor controller.

FIG. 92 illustrates processes 9200, implemented at a distributor controller of a selected distributor, for establishing a data path from a first access node to a second access node through the distributor. The first access node may be an originating access node or an intermediate access node. The second access node may be an intermediate access node or a destination access node. The distributor controller receives (process 9220) a request indicating the first node, the second node, and a requisite flow rate. Process 9230 places the request in a first queue 9240 if the first and second access nodes belong to different access groups. Otherwise, the distributor controller places the request in a second queue 9250. Process 9260 dequeues a request from either of the two queues but gives a higher priority to requests held in the first queue as described above with reference to FIG. 82 where data transferred through paths 8223 and 8224 is given priority over data transferred through paths 8225 and 8226. Any of well-known priority-enforcement schemes may be applied. The distributor controller identifies an input port of the selected distributor connecting to the first node and an output port of the selected distributor connecting to the second access node and determines availability of an internal path from the input port to the output port.

Basically, an internal path from an input port to an output port of a distributor may be established only if each of the input port and output port has a sufficient free capacity. If the distributing mechanism of the distributor is contention-free or nonblocking, then an internal path is guaranteed. Otherwise, the distributor's controller may either queue the request for establishing the path or reject the request immediately so that the request may be directed to another distributor. The distributor's controller informs the access controller of the first access node of the availability, or otherwise, of an internal path. A distributing mechanism may be configured as a switching mechanism or a rotating mechanism. A rotating mechanism is naturally contention-free. A switching mechanism may be configured as contention-free, nonblocking where contention resolution is guaranteed, or subject to blocking but with an insignificant probability of blocking.

Figure 93:
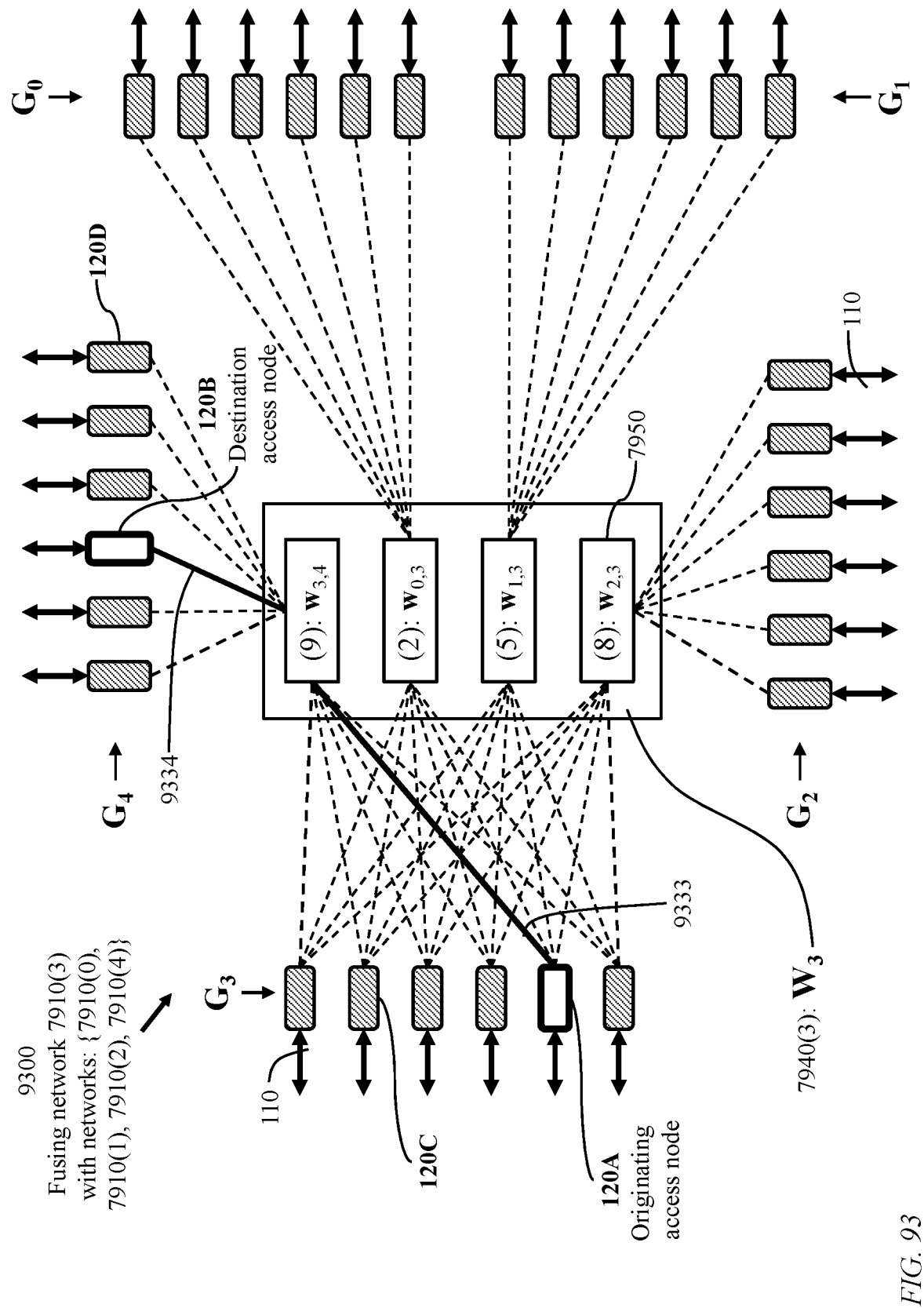
FIG. 93 illustrates exemplary inter-group paths through an originating three-stage network and a destination three-stage network.

FIG. 93 illustrates connectivity 9300 of fused three-stage network 7910(3) to each other three-stage network of the set of fused three-stage networks of FIG. 79. An inter-group path from an originating access node 120A belonging to access group 7720(3), denoted $G_3$, to a destination access node 120B belonging to access group 7720(4), denoted $G_4$, may be established through distributor 7950 of index (9), denoted $w_{3,4}$, along channels 9333 and 9334.

Additionally, a first part of a compound path may be established from access node 120A to any intermediate access node 120 of access group $G_3$, through any distributor 7950 of distributor group $W_3$, excluding distributor 7950 of index (9), and a second part of the compound path may be established from the intermediate access node to destination access node 120B through distributor 7950 of index (9). For example, a first part of the compound path may be established from access node 120A to access node 120C, through any of distributors $w_{0,3}$, $w_{1,3}$, or $w_{2,3}$ with the second part of the compound path established from access node 120C to destination access node 120B through distributor 7950 of index (9). With access group $G_3$ having six access nodes 120, five alternate compound paths from originating access node 120A to destination access node 120B of access group $G_4$ may be established through access nodes 120 of access group $G_3$.

Alternatively, a first part of a compound path may be established from access node 120A to any intermediate access node 120 of access group $G_4$, other than destination access node 120B, through distributor 7950 of index (9), with a second part of the compound path established from the intermediate access node to destination access node 120B through any of the distributors of distributor group 7940(4), excluding distributor 7950 of index (9). Thus, any of distributors 7950 of indices (3), (6), or (7), respectively denoted $w_{0,4}$, $w_{1,4}$, and $w_{2,4}$, may be used to complete the compound path. For example, a first part of a compound path may be established from access node 120A to intermediate access node 120D then a second part of the compound path is established from access node 120D to destination access node 120B through any of distributors $w_{0,4}$, $w_{1,4}$, and $w_{2,4}$. With access group $G_4$ having six access nodes 120, five alternate compound paths from originating access node 120A to destination access node 120B of access group $G_4$ may be established through access nodes 120 of access group $G_4$.

Thus, data may be transferred from originating access node 120A to destination access node 120B along any of multiple paths including:

(1) a path from access node 120A to access node 120B traversing only one distributor (7950 of index (9));

(2) five compound paths each traversing a distributor 7950 of index (2), (5), or (8), respectively denoted $w_{0,3}$, $w_{1,3}$, and $w_{2,3}$, of distributor group 7940(3) to an intermediate access node of access group $G_3$ then traversing distributor 7950 of index (9), denoted $W_{3,4}$, to access node 120B; and (3) five compound paths each traversing distributor 7950 of index (9) to an intermediate access node of access group $G_4$ then traversing any of distributors 7950 of index (3), (6), or (7), respectively denoted $w_{0,4}$, $w_{1,4}$, and $w_{2,4}$, to access node 120B.

With access group 7720(j), $0 \leq j < 5$, of the switching system of FIG. 79 having $m_j$ access nodes 120, $m_j > 1$, the number of compound paths traversing the originating access group $G_3$ is $(m_3 - 1)$, and the number of compound paths traversing the destination access group $G_4$ is $(m_4 - 1)$.

Figure 94:
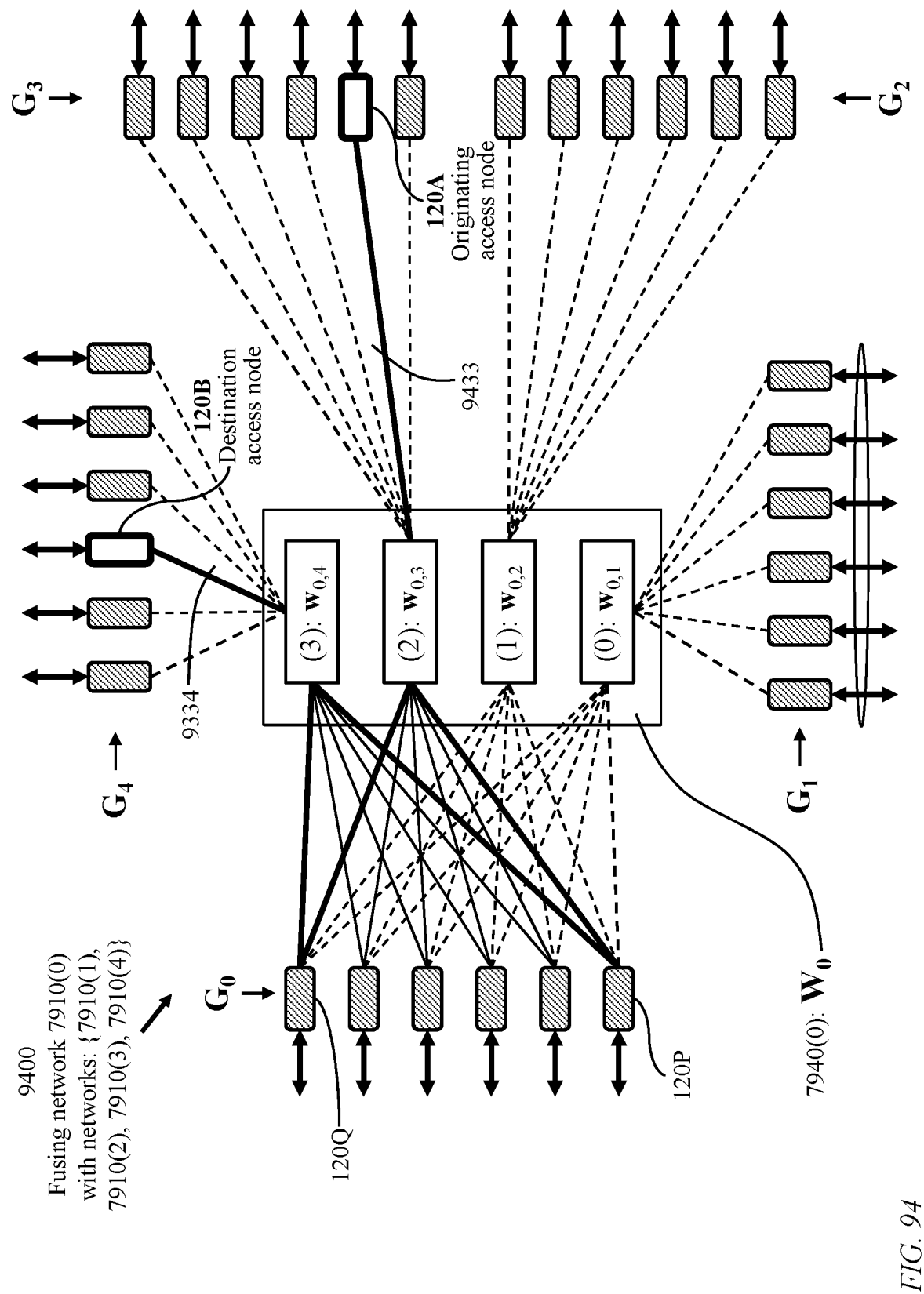
FIG. 94 illustrates exemplary inter-group paths through an originating three-stage network, an intermediate three-stage network, and a destination three-stage network.

FIG. 94 illustrates connectivity 9400 of fused three-stage network 7910(0) to each other three-stage network of the set of fused three-stage networks of FIG. 79 indicating inter-group paths from originating access node 120A of access group $G_3$ to destination access node 120B of access group $G_4$.

Access node 120A has direct channels to distributor group 7940(3) which comprises distributors 7950 of indices (8), (5), (2), and (9). FIG. 93 illustrates a short path traversing distributor 7950 of index (9) in addition to compound paths confined to the originating and destination distributor groups 7940(3) and 7940(4), respectively. There are $\mu$ access groups, hence $\mu$ distributor groups, $\mu=5$, in the switching system of FIG. 79. Further compound paths from access node 120A to access node 120B may be established through any of the remaining $(\mu-2)$ distributor groups; that is $W_0$, $W_1$, and $W_2$.

FIG. 94 illustrates further compound paths established through distributor group $W_0$. Distributor group $W_3$ comprises distributors 7950 of indices (8), (5), (2), and (9) as indicated in FIG. 79. Distributor group $W_0$ comprises distributors 7950 of indices (0), (1), (2), and (3) as indicated in FIG. 79. Distributor 7950 of index (2) is common in $W_3$ and $W_0$. Access node 120A of access group $G_3$ has a channel 9433 to distributor 7950 of index (2).

A first part of a compound path may be established from access node 120A to any intermediate access node 120 of access group $G_0$. For example, a first part of a compound path may be established from access node 120A to access node 120P or to access node 120Q of access group $G_0$.

A second part of the compound path may be established from any access node 120 of access group $G_0$ to destination access node 120B of access group $G_4$ through distributor 7950 of index (3). For example, the second part of the compound path may be established from access node 120P or from access node 120Q to access node 120B through distributor 7950(3), denoted $w_{0,4}$. With access group $G_0$ having $m_0$ access nodes 120, $m_0=6$, a total of $m_0$ compound paths may be established from access node 120A to destination access node 120B. Likewise, multiple compound paths may be established through distributor group $W_1$ or distributor group $W_2$.

Thus, for the switching system of FIG. 76, comprising $\mu$ mutually fused three-stage networks, $\mu > 4$, ($\mu=5$ in the exemplary implementation of FIG. 79, but a large-scale switching system may encompass hundreds of constituent three-stage networks) an access controller of an access node of a specific access group, in communication with distributor controllers of distributors of a respective distributor group 7640, may establish:

(a) $(\mu-1)$ intra-group parallel paths, each traversing one distributor, to any access node of the same access group;

(b) one inter-group path traversing one distributor to any access node of any other access group; and (c) a number of compound paths equal to the total number of access nodes that may be used as intermediate access nodes minus 2; thus, if all access nodes are designated as potential intermediate access nodes, the total number of compound paths would be: $\{(m_0 + m_1 + \ldots + m_{\mu-1}) - 2\}$.

As described above, an access node has a dedicated control path to each distributor to which the access node directly connects through a respective channel.

Routing

An access controller of a specific access node 120 of a specific three-stage network 7910 is configured to direct a request for flow-rate allocations for a path, originating from the specific access node and directed to any other access node belonging to the same access group, to any distributor of the specific three-stage network (processes 8950 and 8970). Preferably, the access controller equitably distributes requests for flow-rate allocations to distributors of the specific three-stage network, so that the aggregate data flow within each three-stage network is equitably divided among the distributors of the specific three-stage network. For example, the requests may be directed to the distributors 7650 of a distributor group 7640 is a round robin fashion.

The access controller is further configured to direct a request for flow-rate allocations for a path, originating from the specific access node of the specific three-stage network and directed to a destination access node of a different destination three-stage network, to a respective common distributor of the specific three-stage network and the destination three-stage network (process 8980).

The access controller is further configured to direct a request for flow-rate allocations for a path, originating from the specific access node and directed to a destination access node of a different destination three-stage network, to a first distributor joining the specific three-stage network to an intermediate three-stage network other than the destination three-stage network. A path traversing a second distributor is then established from the intermediate access node to the destination access node (FIG. 91).

Each distributor controller is configured to receive (process 8920) a request for flow-rate allocation from a source access node to a destination access node. Subject to a determination that the source access node and destination access node belong to different access groups, the distributor controller places the request in a first scheduling queue 9240. Otherwise, where the source access node and destination access node belong to same access group, the distributor controller places the request the request in a second scheduling queue 9250. The distributor controller processes requests of the first scheduling queue ahead of requests of the second scheduling queue.

Systematic Connector Pairing

Each three-stage network of the μ three stage networks of FIG. 75, μ>4, comprises (μ−1) connectors 7550. To form the contiguous network of FIG. 76, each of the connectors 7650 of each three-stage network is fused with a respective connector of another three-stage network to form a respective distributor. Any pattern of pairing connectors to form respective distributors may be used provided that each of (μ−1) connectors of each connector group 7540 is paired with a connector of another connector group 7540 to form a respective distributor so that each pair of connector groups has a common distributor. However, a systematic connector-pairing scheme is preferred.

Figure 95:
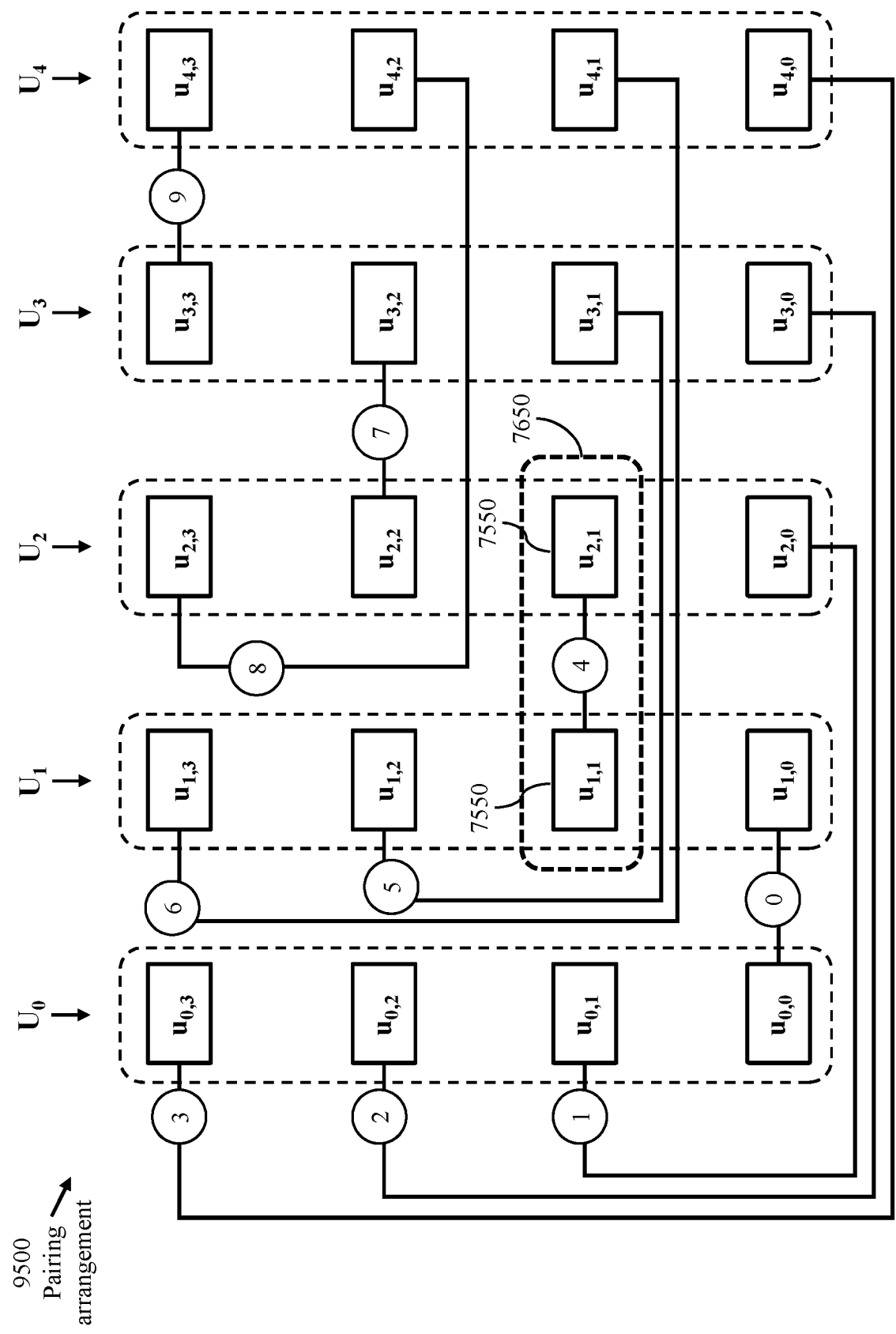
FIG. 95 illustrates systematic pairing of connectors to form distributors, in accordance with an embodiment of the present invention.

FIG. 95 illustrates a systematic pairing pattern (fusing pattern) 9500 of connectors of the set of independent three-stage networks 7510 of FIG. 75. Table-IV below presents the systematic fusing pattern.

A connector 7550 is denoted $u_{j,k}$, where j is an index of a respective connector group and k is an index of the connector within the connector group, $0 \leq j < \mu$, $0 \leq k < (\mu-1)$. A connector $u_{j,k}$ is paired with connector $u_{(k+1),j}$ to form a distributor $w_{j,(k+1)}$. The formed distributors may be indexed in an arbitrary fashion; for example, distributors $w_{j,(k+1)}$, $0 \leq j < \mu$, and $j \leq k < (\mu-1)$, may be indexed as:

$\gamma_{j,k} = (j \times (2 \times \mu - j - 3))/2 + k$.

Conversely, a connector $u_{x,y}$, $0 < x < \mu$, and $0 \leq y < x$, is paired with connector $u_{y,(x-1)}$ to form a distributor $w_{y,x}$ of index $\eta_{x,y}$ determined as:

$\eta_{x,y} = (y \times (2 \times \mu - y - 3))/2 + x - 1$.

The integer $j \times (2 \times \mu - j - 3)$ is an even number for any value of integer j; if j is an odd integer, $(2 \times \mu - j - 3)$ becomes an even integer. Likewise, the integer $y \times (2 \times \mu - y - 3)$ is an even number for any value of integer y.

For example, with μ=5, a connector $u_{2,3}$ is paired with connector $u_{4,2}$ to form a distributor $w_{2,4}$ (which is $w_{j,(k+1)}$; j=2, k=3) belonging to distributor groups 7640(2), denoted $W_2$ and 7640(4), denoted $W_4$. The index of distributor $w_{2,4}$ is determined as:

$\gamma_{j,k} = (j \times (2 \times \mu - j - 3))/2 + k = (2 \times (2 \times 5 - 2 - 3)/2) + 3 = 8$.

Conversely, a connector $u_{4,2}$ is paired with connector $u_{2,3}$ to form a distributor $w_{y,x}$, x=4, y=2, belonging to distributor groups 7640(2), denoted $W_2$, and 7640(4), denoted $W_4$. The index of distributor $w_{2,4}$ is determined as $\eta_{x,y} = (y \times (2 \times \mu - y - 3))/2 + x - 1 = 8$.

It is noted that other systematic pairing patterns may be devised based on the same principle and other methods of indexing of the formed distributors may be used.

TABLE IV fusing pattern of FIG. 95

| Index j of three-stage network | Index k of distributor within a three-stage network | | | |
|---|---|---|---|---|
| | 0 | 1 | 2 | 3 |
| 0 | (0)<br>$w_{0,1}$: $u_{0,0}$ & $u_{1,0}$ | (1)<br>$w_{0,2}$: $u_{0,1}$ & $u_{2,0}$ | (2)<br>$w_{0,3}$: $u_{0,2}$ & $u_{3,0}$ | (3)<br>$w_{0,4}$: $u_{0,3}$ & $u_{4,0}$ |
| 1 | — | (4)<br>$w_{1,2}$: $u_{1,1}$ & $u_{2,1}$ | (5)<br>$w_{1,3}$: $u_{1,2}$ & $u_{3,1}$ | (6)<br>$w_{1,4}$: $u_{1,3}$ & $u_{4,1}$ |
| 2 | — | — | (7)<br>$w_{2,3}$: $u_{2,2}$ & $u_{3,2}$ | (8)<br>$w_{2,4}$: $u_{2,3}$ & $u_{4,2}$ |
| 3 | — | — | — | (9)<br>$w_{3,4}$: $u_{3,3}$ & $u_{4,3}$ |
| 4 | — | — | — | — |

Table-V below depicts a systematic pairing pattern (fusing pattern) of connectors of a set of 120 independent three-stage networks (μ=120) indexed as 0 to 119. Each three-stage network comprises a respective access group 7520 coupled to a respective connector group 7540 through a set 7530 of dual channels. The connectors of each connector group are individually fused with respective connectors of different connector groups.

A connector 7550 comprises a respective number of content ports and, optionally, a respective (small) number of control ports. Likewise, a distributor 7650 comprises a respective number of content ports and, optionally, a respective (small) number of control ports A content port is a port connecting to an access node. A control port is a port connecting to a controller. A control port may be integrated within a distributing mechanism (FIGS. 3, 9, 16, 18, 63, 65, 69) of a connector 7550 or a distributor 7650. Alternatively, a control port may be external (FIG. 64, FIG. 66). With μ=120, the independent three-state networks 7510 comprise (120×119) connectors 7550 and fused three-state networks 7610 comprise (120×119)/2 distributors 7650. The total number of content ports of the connectors 7550 is the same as the total number of content ports of the distributors 7650.

Part-I of Table-V illustrates pairing of each of three-stage networks of indices 0 to 5. Part-II of Table-V illustrates pairing of each of three-stage networks of indices 114 to 119.

TABLE V fusing pattern of 120 independent three-stage networks (μ = 120)
Part-I

| Index j of three-stage network | Index k of distributor within a three-stage network | | | | | | | |
|---|---|---|---|---|---|---|---|---|
| | 0 | 1 | 2 | 3 | 4 | 5 | • • • | 118 |
| 0 | (0)<br>$w_{0,1}$:<br>$u_{0,0}$ &<br>$u_{1,0}$ | (1)<br>$w_{0,2}$:<br>$u_{0,1}$ &<br>$u_{2,0}$ | (2)<br>$w_{0,3}$:<br>$u_{0,2}$ &<br>$u_{3,0}$ | (3)<br>$w_{0,4}$:<br>$u_{0,3}$ &<br>$u_{4,0}$ | (4)<br>$w_{0,5}$:<br>$u_{0,4}$ &<br>$u_{5,0}$ | (5)<br>$w_{0,6}$:<br>$u_{0,5}$ &<br>$u_{6,0}$ | • • • | (118)<br>$w_{0,119}$:<br>$u_{0,118}$ &<br>$u_{119,0}$ |

TABLE V-continued fusing pattern of 120 independent three-stage networks (μ = 120)
Part-I

| Index j of three-stage network | Index k of distributor within a three-stage network | | | | | | |
|---|---|---|---|---|---|---|---|
| | 0 | 1 | 2 | 3 | 4 | 5 | ··· 118 |
| 1 | — | (119) $w_{1,2}$: $u_{1,1}$ & $u_{2,1}$ | (120) $w_{1,3}$: $u_{1,2}$ & $u_{3,1}$ | (121) $w_{1,4}$: $u_{1,3}$ & $u_{4,1}$ | (122) $w_{1,5}$: $u_{1,4}$ & $u_{5,1}$ | (123) $w_{1,6}$: $u_{1,5}$ & $u_{6,1}$ | ··· (236) $w_{1,119}$: $u_{1,118}$ & $u_{119,1}$ |
| 2 | — | — | (237) $w_{2,3}$: $u_{2,2}$ & $u_{3,2}$ | (238) $w_{2,4}$: $u_{2,3}$ & $u_{4,2}$ | (239) $w_{2,5}$: $u_{2,4}$ & $u_{5,2}$ | (240) $w_{2,6}$: $u_{2,5}$ & $u_{6,2}$ | ··· (353) $w_{2,119}$: $u_{2,118}$ & $u_{119,2}$ |
| 3 | — | — | — | (354) $w_{3,4}$: $u_{3,3}$ & $u_{4,3}$ | (355) $w_{3,5}$: $u_{3,4}$ & $u_{5,3}$ | (356) $w_{3,6}$: $u_{3,5}$ & $u_{6,3}$ | ··· (469) $w_{3,119}$: $u_{3,118}$ & $u_{119,3}$ |
| 4 | — | — | — | — | (470) $w_{4,5}$: $u_{4,4}$ & $u_{5,4}$ | (471) $w_{4,6}$: $u_{4,5}$ & $u_{6,4}$ | ··· (584) $w_{4,119}$: $u_{4,118}$ & $u_{119,4}$ |
| 5 | — | — | — | — | — | (585) $w_{5,6}$: $u_{5,5}$ & $u_{6,5}$ | ··· (698) $w_{5,119}$: $u_{5,118}$ & $u_{119,5}$ |

TABLE V fusing pattern of 120 independent three-stage networks (μ = 120)
Part-II

| Index j of three-stage network | Index k of distributor within a three-stage network | | | | |
|---|---|---|---|---|---|
| | 114 | 115 | 116 | 117 | 118 |
| 114 | (7125) $w_{114,115}$: $u_{114,114}$ & $u_{115,114}$ | (7126) $w_{114,116}$: $u_{114,115}$ & $u_{116,114}$ | (7127) $w_{114,117}$: $u_{114,116}$ & $u_{117,114}$ | (7128) $w_{114,118}$: $u_{114,117}$ & $u_{118,114}$ | (7129) $w_{114,119}$: $u_{114,118}$ & $u_{119,114}$ |
| 115 | — | (7130) $w_{115,116}$: $u_{115,115}$ & $u_{116,115}$ | (7131) $w_{115,117}$: $u_{115,116}$ & $u_{117,115}$ | (7132) $w_{115,118}$: $u_{115,117}$ & $u_{118,115}$ | (7133) $w_{115,119}$: $u_{115,118}$ & $u_{119,115}$ |
| 116 | — | — | (7134) $w_{116,117}$: $u_{116,116}$ & $u_{117,116}$ | (7135) $w_{116,118}$: $u_{116,117}$ & $u_{118,116}$ | (7136) $w_{116,119}$: $u_{116,118}$ & $u_{119,116}$ |
| 117 | — | — | — | (7137) $w_{117,118}$: $u_{117,117}$ & $u_{118,117}$ | (7138) $w_{117,119}$: $u_{117,118}$ & $u_{119,117}$ |
| 118 | — | — | — | — | (7139) $w_{118,119}$: $u_{118,118}$ & $u_{119,118}$ |
| 119 | — | — | — | — | — |

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A contiguous network comprising:
    a plurality of three-stage networks, each three-stage network comprising:
        an access group comprising a respective set of access nodes of a plurality of access nodes; and
        a distributor group comprising a respective set of distributors of a plurality of distributors;
        each access node of said access group having a dual channel to each distributor of said distributor group;
    wherein:
        distributor groups of each pair of three-stage networks of the plurality of three-stage networks have one common distributor; and
        said each distributor is common in exactly two three-stage networks of the plurality of three-stage networks;
    thereby, said each access node has a path to each of the access nodes of each other access group traversing only one distributor.

2. The contiguous network of claim 1 wherein:
    said each distributor comprises a respective distributor controller; and
    said each access node comprises a respective access controller having a cyclic time-limited dedicated dual control path to said respective distributor controller.

3. The contiguous network of claim 2 wherein said each access node has an end-to-end control path, through said respective distributor controller, to each access node connecting to said each distributor; said end-to-end control path configured as one of:
    a reserved time-limited path; and
    a contention-free path.

4. The contiguous network of claim 2 wherein said respective access controller is configured to periodically send control data to distributor controllers of said distributor group, said control data comprising:
    requests for flow-rate allocations to other access nodes; and
    control messages individually directed to access nodes directly coupled to said each distributor.

5. The contiguous network of claim 2 wherein said each access controller is configured to direct a request for flow-rate allocations for a path from said each access node to any other access node of said each three-stage network to any distributor of said each three-stage network.

6. The contiguous network of claim 5 wherein said each access controller is configured to equitably distribute requests for flow-rate allocations to distributors of said distributor group, so that aggregate data flow within said each three-stage network is equitably divided among distributors of said distributor group.

7. The contiguous network of claim 2 wherein said each access controller is configured to direct a request for flow-rate allocations for a path from said each access node to any access node of any other three-stage network of said plurality of three-stage network to a respective common distributor of said each three-stage network and said any other three-stage network.

8. The contiguous network of claim 2 wherein a path from an originating access node to a destination access node is established as a compound path comprising:
   a first part connecting the originating access node to any other access node of the plurality of access nodes excluding the originating access node and the destination access node; and
   a second part connecting said any access node to said destination access node;
   the first part traversing only one distributor and the second part traversing only one distributor.

9. The contiguous network of claim 2 wherein said respective distributor controller is configured to:
   receive a request for flow-rate allocation from a source access node to a destination access node;
   subject to a determination that the source access node and destination access node belong to different access groups place the request in a first scheduling queue, otherwise, place the request in a second scheduling queue;
   and
   process requests of the first scheduling queue ahead of requests of the second scheduling queue.

10. The contiguous network of claim 1 wherein said plurality of distributors is arranged into a set of constellations, each constellation comprising a respective set of spatially collocated distributors with each access node of the plurality of access nodes connecting to multiple distributors within each constellation of a respective subset set of the set of constellations.

11. The contiguous network of claim 10 wherein the set of constellations comprises a predetermined number K of constellations and said respective subset of constellations comprises a number Π of constellations determined as:

$$\Pi = \lceil \{(1+8\times K)^{1/2} - 1\}/2 \rceil$$

where $2 < K \leq (\lfloor \mu/2 \rfloor \times \lfloor \mu/2 \rfloor + 1)/2$, μ being a number of access groups of the plurality of access groups, μ>4.

12. The contiguous network of claim 10 wherein the multiple distributors comprise at most Ω distributors, $\Omega = \lceil (\mu-1)/\Pi \rceil > 1$, μ being a number of access groups of said plurality of access groups, μ>4, and Π being a number of constellations of the respective subset set of the set of constellations.

13. The contiguous network of claim 10 wherein:
   said plurality of access groups comprises μ access groups, μ>4, indexed as 0, 1, . . . , μ−1;
   said set of constellations comprises {Π(Π+1)/2} constellations indexed as (j, k), 0≤j<Π, j≤k<Π, Π being a number of constellations of the respective subset set of the set of constellations, Π>1;
   an access group of index v, 0≤v<μ, connects to constellations of indices (j, k):

0≤j≤η, k=η, where η=⌊(v×Π)/μ⌋<Π; and for η<Π−1, j=h, η<k<Π, where:

h=η, if (v$_{modulo\ \Omega}$)=0, and h=η+1 otherwise.

14. The contiguous network of claim 10 wherein
   said plurality of access groups comprises μ access groups, μ>4, individually indexed as 0, 1, . . . , μ−1;
   said set of constellations comprises {Π×(Π+1)/2} constellations indexed as (j, k), 0≤j<Π, j≤k<Π, Π being a number of constellations of the respective subset set of the set of constellations, Π>1;
   a distributor connecting a pair of access groups of indices j and k, 0≤j<(μ−1), j<k<μ, is assigned to a constellation indexed (α, β) where:

α=⌊j/Ω⌋<Π and β=⌊(k−1)/Ω<Π, where Ω=⌈(μ−1)/Π⌉>1.

15. The contiguous network of claim 1 further comprising a plurality of dual spectral routers connecting said plurality of access nodes to said plurality of distributors, each spectral router directing individual channels of WDM links connecting to a respective set of access nodes to WDM links connecting to a respective set of distributors.

16. A contiguous network comprising:
   a plurality of access nodes arranged into a plurality of access groups; and
   a plurality of distributors arranged into a plurality of distributor groups, wherein:
      each pair of distributor groups shares a common distributor; and
      each access node of the plurality of access nodes has a dual channel to each distributor of a respective distributor group so that each access group and a respective distributor group form a respective three-stage network, yielding a plurality of mutually fused three-stage networks;
   said each distributor couples to a respective hardware processor configured to execute instructions for establishing a path from said each access node connecting to said each distributor to each other access node connecting to said each distributor;
   thereby, each distributor of the plurality of distributors is common in two three-stage networks of the formed plurality of three-stage networks, creating a path from each access node to each other node of the plurality of access nodes traversing only one distributor.

17. A method of data switching comprising:
   arranging a plurality of access nodes into a plurality of access groups, each access group comprising a respective set of access nodes;
   arranging a plurality of distributors into a plurality of distributor groups, each distributor group comprising a predetermined number of distributors with distributor groups of each pair of distributor groups sharing one common distributor;
   forming a plurality of three-stage networks, each three-stage network comprising:
      a respective distributor group; and
      a respective access group, each access node of said respective access group having
      a dual channel to each distributor of said respective set of distributors;
   and
   configuring a hardware processor coupled to said each distributor to execute instructions for establishing a path from said each access node to each other access node connecting to said each distributor;
   thereby, each distributor of the plurality of distributors is common in two three-stage networks of the plurality of three-stage networks, thus creating a path from each access node to each other node of the plurality of access nodes traversing only one distributor.

18. The method of claim 17 further comprising sending from said each access node to said each distributor during each control cycle of successive control cycles:

control data directed to a distributor controller of said each distributor during a control interval of said control cycle; and content data directed to access nodes coupled to said each distributor during a content interval of said control cycle.

19. The method of claim 18 wherein said control interval is further divided into:

a first period during which requests for flow-rate allocations for flows originating from said each access node are communicated to said distributor controller; and a second period during which control messages from said each access node are communicated to said distributed controller to be relayed to access nodes coupled to said each distributor.

20. The method of claim 18 further comprising allocating at least one time slot per scheduling cycle for each flow traversing said each distributor, said scheduling cycle comprising a predetermine integer number of control cycles and said content interval being organized into a predetermined integer number of time slots.

* * * * *